United States Patent
Ezerzer et al.

(10) Patent No.: US 7,366,293 B2
(45) Date of Patent: Apr. 29, 2008

(54) CALL CENTER ADMINISTRATION MANAGER

(75) Inventors: Ran Ezerzer, San Diego, CA (US); Gerald Augustin Holly, Jr., San Diego, CA (US); Roberto Armando Portillo Jarquin, San Diego, CA (US); Ali Aljane, San Diego, CA (US); Eli Ben Borodow, La Jolla, CA (US)

(73) Assignee: Oracle Sytems Corporation, Redwood Shores, CA (US)

( * ) Notice: Subject to any disclaimer, the term of this patent is extended or adjusted under 35 U.S.C. 154(b) by 692 days.

(21) Appl. No.: 09/798,226

(22) Filed: Mar. 2, 2001

(65) Prior Publication Data

US 2003/0093533 A1 May 15, 2003

Related U.S. Application Data

(63) Continuation-in-part of application No. 09/638,274, filed on Aug. 14, 2000, now Pat. No. 6,697,858.

(51) Int. Cl.
H04M 3/00 (2006.01)
H04M 5/00 (2006.01)

(52) U.S. Cl. ............... 379/265.1; 379/265.09; 379/266.01

(58) Field of Classification Search ........... 379/265.09, 379/266.01, 265.11, 221.14, 265.1
See application file for complete search history.

(56) References Cited

U.S. PATENT DOCUMENTS

| | | | |
|---|---|---|---|
| 5,185,780 A | 2/1993 | Leggett et al. | |
| 5,479,487 A | 12/1995 | Hammond | |
| 5,742,675 A * | 4/1998 | Kilander et al. | 379/266.09 |
| 5,822,306 A | 10/1998 | Catchpole | |
| 5,825,870 A | 10/1998 | Miloslavsky | |
| 5,841,854 A * | 11/1998 | Schumacher et al. | 379/265.11 |
| 5,889,799 A * | 3/1999 | Grossman et al. | 379/266.08 |
| 5,903,641 A | 5/1999 | Tonisson | |
| 5,940,496 A * | 8/1999 | Gisby et al. | 379/265.02 |
| 5,982,873 A | 11/1999 | Flockhart et al. | |
| 6,046,762 A | 4/2000 | Sonesh et al. | |
| 6,163,607 A | 12/2000 | Bogart et al. | |
| 6,173,053 B1 | 1/2001 | Bogart et al. | |
| 6,175,564 B1 | 1/2001 | Miloslavsky et al. | |
| 6,201,804 B1 | 3/2001 | Kikinis | |

(Continued)

OTHER PUBLICATIONS

"CALLCENTER Anywhere, The Complete Contact Center Solution," *Administration Manager V.3.0 User Manual, Multi Tenant Version*; CR 1998, 1999, 2000 Telephony@Work, Inc.

Primary Examiner—William J. Deane, Jr.
(74) Attorney, Agent, or Firm—Paul, Hastings, Janofsky & Walker LLP

(57) ABSTRACT

A network-based call center for managing a company's interactions with its customers uses resources supplied by an application service provider. The call center stores sensitive information on a database within the company's private network, behind a firewall. When a call center resource or another client or server obtains new sensitive information, the resource writes the information to the database and then erases the information. When a resource needs sensitive information stored on the database, the resource requests the information from the database, uses it, and then erases the information. The call center further provides a browser-based tool, running on the Internet, for enabling non-technical personnel of the company to provision a call center from the resources of the application service provider.

81 Claims, 98 Drawing Sheets

U.S. PATENT DOCUMENTS

| | | | |
|---|---|---|---|
| 6,230,197 B1 * | 5/2001 | Beck et al. .................. 709/223 |
| 6,263,066 B1 | 7/2001 | Shtivelman et al. |
| 6,295,353 B1 | 9/2001 | Flockhart et al. |
| 6,295,551 B1 | 9/2001 | Roberts et al. |
| 6,373,836 B1 * | 4/2002 | Deryugin et al. ........... 370/352 |
| 6,553,113 B1 * | 4/2003 | Dhir et al. ............. 379/265.02 |
| 6,597,685 B2 * | 7/2003 | Miloslavsky et al. ....... 370/352 |
| 6,628,777 B1 * | 9/2003 | McIllwaine et al. ... 379/265.01 |
| 6,674,852 B1 * | 1/2004 | Hamilton ............... 379/221.14 |
| 6,697,858 B1 * | 2/2004 | Ezerzer et al. .............. 709/224 |
| 6,735,299 B2 * | 5/2004 | Krimstock et al. .... 379/265.11 |
| 6,744,858 B1 * | 6/2004 | Ryan et al. .................... 379/45 |
| 6,751,310 B1 * | 6/2004 | Crossley ................ 379/266.07 |
| 6,763,104 B1 * | 7/2004 | Judkins et al. ......... 379/265.09 |
| 6,771,760 B1 * | 8/2004 | Vortman et al. ....... 379/209.01 |
| 6,970,829 B1 * | 11/2005 | Leamon .......................... 705/9 |
| 7,039,176 B2 * | 5/2006 | Borodow et al. ...... 379/265.02 |
| 2002/0029161 A1 * | 3/2002 | Brodersen et al. ............. 705/9 |
| 2002/0101979 A1 * | 8/2002 | Borodow et al. ...... 379/265.02 |
| 2004/0057569 A1 * | 3/2004 | Busey et al. ........... 379/265.09 |

* cited by examiner

FIGURE 64

CALL CENTER ADMINISTRATION MANAGER

RELATED APPLICATION

This application is a Continuation-in-Part and claims priority benefit of U.S. patent application Ser. No. 09/638,274, entitled Call Center, filed on 14 Aug. 2000, now U.S. Pat. No. 6,697,858 which application is hereby incorporated by reference for all purposes.

COMPUTER PROGRAM LISTING APPENDIX

Two compact discs (CDs) are being filed with this document. They are identical. their content is hereby incorporated by reference as if fully set forth herein. Each CD contains files listing code in FTP Server files and Internet Manager Server files used in an embodiment of the Call Center. The following is a listing of the files included on each CD, including their names, sizes, and dates of creation:

```
Volume in drive E is 010302_1414
Volume Serial Number is 3D93-F774
Directory of E:\
FTPSER~5       <DIR>      03-02-01    2:14p FtpServerSource
IMSERV~7       <DIR>      03-02-01    2:14p IMServerSource
       0 file(s)              0 bytes
Directory of E:\FtpServerSource
               <DIR>      03-02-01    2:14p .
..             <DIR>      03-02-01    2:14p ..
COM            <DIR>      03-02-01    2:14p com
       0 file(s)              0 bytes
Directory of E:\FtpServerSource\com
               <DIR>      03-02-01    2:14p .
..             <DIR>      03-02-01    2:14p ..
TAW            <DIR>      03-02-01    2:14p taw
       0 file(s)              0 bytes
Directory of E:\FtpServerSource\com\taw
               <DIR>      03-02-01    2:14p .
..             <DIR>      03-02-01    2:14p ..
NET            <DIR>      03-02-01    2:14p net
SERVER         <DIR>      03-02-01    2:14p server
SERVLET        <DIR>      03-02-01    2:14p servlet
UTIL           <DIR>      03-02-01    2:14p util
       0 file(s)              0 bytes
Directory of E:\FtpServerSource\com\taw\net
               <DIR>      03-02-01    2:14p .
..             <DIR>      03-02-01    2:14p ..
REQUES~6 JAV         575  02-09-01    2:22p RequestClient.java
REQUES~8 JAV       1,793  02-09-01    2:20p
RequestServicingThread.java
SERVE~10 JAV       4,359  02-21-01    1:05a
ServerConnection.java
SERVE~12 JAV       3,662  02-26-01   10:19p
ServerNetworkConnection.java
       4 file(s)         10,389 bytes
Directory of E:\FtpServerSource\com\taw\server
               <DIR>      03-02-01    2:14p .
..             <DIR>      03-02-01    2:14p ..
DYNAMI~6 JAV       2,138  02-21-01    1:05a
DynamicLibraryLoader.java
FTP            <DIR>      03-02-01    2:14p ftp
IM             <DIR>      03-02-01    2:14p im
INTER~12 JAV         348  02-09-01    2:19p
InternetRequest.java
INTER~14 JAV       6,205  02-09-01    2:22p
InternetRequestImpl.java
INTER~16 JAV         272  02-09-01    2:22p
InternetResponse.java
INTER~18 JAV       1,190  02-09-01    2:18p
InternetResponseImpl.java
       5 file(s)         10,153 bytes
Directory of E:\FtpServerSource\com\taw\server\ftp
               <DIR>      03-02-01    2:14p .
..             <DIR>      03-02-01    2:14p ..
FILERE~6 JAV       2,411  02-27-01    3:17a
FileRetrievalSubsystem.java
FILERE~8 JAV       3,916  02-28-01    2:07a
FileRetrievalThreadPool.java
FILER~10 JAV       3,499  03-02-01    3:42a
FileRetrievalThreadPoolWorker.java
FTPSE~12 JAV       2,744  02-13-01    4:20p
FTPServerSysParams.java
FTPSE~14 JAV      11,262  03-02-01    3:51a FTPServerLink.java
FTPSE~16 JAV       8,281  03-01-01    1:19p FTPServer.java
FTPSE~18 JAV         439  02-26-01    7:58p
FTPServerConstants.java
FTPSE~20 JAV         264  02-27-01    1:23a
FTPServerException.java
FTPSE~22 JAV         284  02-13-01    4:25p
FTPServerGlobals.java
FTPTA~24 JAV       7,125  03-02-01    3:45a FTPTask.java
LOCAL~26 JAV       9,454  02-26-01   11:51a
LocalDatabaseProxy.java
RECOR~28 JAV         208  02-24-01    2:14a
RecordingSQLTask.java
REMOT~30 JAV       1,411  02-27-01    3:21a
RemoteDBSubsystem.java
REMOT~32 JAV         509  02-27-01    3:04a
RemoteDBThreadPool.java
REMOT~34 JAV         474  02-27-01    3:03a
RemoteDBThreadPoolWorker.java
SQLTA~36 JAV       2,139  02-27-01   10:37p SQLTask.java
SQLTA~38 JAV       5,543  03-02-01    3:47a
SQLTaskClientHistory.java
SQLTA~40 JAV       4,952  03-02-01    3:46a
SQLTaskQualityControl.java
TASK~42 JAV          459  02-24-01    2:38a Task.java
      19 file(s)         65,374 bytes
Directory of E:\FtpServerSource\com\taw\server\im
               <DIR>      03-02-01    2:14p .
..             <DIR>      03-02-01    2:14p ..
       0 file(s)              0 bytes
Directory of E:\FtpServerSource\com\taw\servlet
               <DIR>      03-02-01    2:14p .
..             <DIR>      03-02-01    2:14p ..
IM             <DIR>      03-02-01    2:14p im
REMOTEDB       <DIR>      03-02-01    2:14p remotedb
       0 file(s)              0 bytes
Directory of E:\FtpServerSource\com\taw\servlet\im
               <DIR>      03-02-01    2:14p .
..             <DIR>      03-02-01    2:14p ..
       0 file(s)              0 bytes
Directory of E:\FtpServerSource\com\taw\servlet\remotedb
               <DIR>      03-02-01    2:14p .
..             <DIR>      03-02-01    2:14p ..
PROXYC~6 JAV         364  02-09-01    2:11p
ProxyConnectInfo.java
PROXYS~8 JAV       5,996  02-26-01   10:53p ProxyServlet.java
REMOT~10 JAV       6,012  02-26-01   10:00p RemoteDBProxy.java
REMOT~12 JAV      13,126  02-09-01    2:12p
RemoteDBProxyMessageCenter.java
REMOT~14 JAV       6,134  02-09-01    2:22p
RemoteDBProxyServlet.java
       5 file(s)         31,632 bytes
Directory of E:\FtpServerSource\com\taw\util
               <DIR>      03-02-01    2:14p .
..             <DIR>      03-02-01    2:14p ..
EVENTL~6 JAV       7,495  02-26-01    9:59p EventLog.java
MESSAG~8 JAV       1,643  02-27-01   10:39p Message.java
MESSA~10 JAV       2,165  02-27-01    9:20p
MessageConsumer.java
MESSA~12 JAV         598  02-21-01   12:54a MessageQueue.java
OBJEC~14 JAV       3,278  02-21-01   12:59a ObjectQueue.java
TAWBY~16 JAV       4,407  01-11-01    3:57p TAWByteFIFO.java
TAWDA~18 JAV      14,804  01-10-01    9:33p TAWDataSet.java
TAWVE~20 JAV       1,730  01-12-01    4:53a TAWVector.java
THREA~22 JAV       1,660  02-24-01    7:52p ThreadPool.java
THREA~24 JAV       2,687  02-28-01    4:48a
ThreadPoolWorker.java
      10 file(s)         40,467 bytes
```

-continued

```
Directory of E:\IMServerSource
.              <DIR>       03-02-01    2:14p .
..             <DIR>       03-02-01    2:14p ..
COM            <DIR>       03-02-01    2:14p com
       0 file(s)                   0 bytes
Directory of E:\IMServerSource\com
.              <DIR>       03-02-01    2:14p .
..             <DIR>       03-02-01    2:14p ..
CALLCE~5       <DIR>       03-02-01    2:14p callcenter
       0 file(s)                   0 bytes
Directory of E:\IMServerSource\com\callcenter
.              <DIR>       03-02-01    2:14p .
..             <DIR>       03-02-01    2:14p ..
ADMIN          <DIR>       03-02-01    2:14p admin
CLIENT~7       <DIR>       03-02-01    2:14p clientobject
INFO           <DIR>       03-02-01    2:14p info
NET            <DIR>       03-02-01    2:14p net
SECURITY       <DIR>       03-02-01    2:14p security
SERVER         <DIR>       03-02-01    2:14p server
UTIL           <DIR>       03-02-01    2:14p util
WEBCA~19       <DIR>       03-02-01    2:14p webcallback
       0 file(s)                   0 bytes
Directory of E:\IMServerSource\com\callcenter\admin
.              <DIR>       03-02-01    2:14p .
..             <DIR>       03-02-01    2:14p ..
CALLCE~6 JAV        24,878 03-02-01    1:25a
CallCenterAdminListBean.java
CALLCE~8 JAV         2,507 03-02-01    1:25a
CallCenterAdminLogin.java
CALLC~10 JAV         9,038 03-02-01    1:25a
CallCenterAdminTreeBean.java
CALLC~12 JAV        13,256 03-02-01    1:25a
CallCenterRequestBean.java
       4 file(s)             49,679 bytes
Directory of E:\IMServerSource\com\callcenter\clientobject
.              <DIR>       03-02-01    2:14p .
..             <DIR>       03-02-01    2:14p ..
ADMINU~6 JAV         1,145 03-02-01    1:25a AdminUpdate.java
BUTTON~8 JAV           718 03-02-01    1:25a Button.java
COMPA~10 JAV           558 03-02-01    1:25a Company.java
DATAB~12 JAV           643 03-02-01    1:25a
DatabaseConnectionPool.java
DIALI~14 JAV           643 03-02-01    1:25a
DialingProperties.java
FIELD~16 JAV           961 03-02-01    1:25a Field.java
HISTO~18 JAV           691 03-02-01    1:25a HistoryEntry.java
INTER~20 JAV         1,281 03-02-01    1:25a
InteractionInfo.java
LIBRA~22 JAV           531 03-02-01    1:25a LibraryScript.java
LIBRA~24 JAV           425 03-02-01    1:25a LibraryUrl.java
LIBRA~26 JAV           558 03-02-01    1:25a LibraryEMail.java
LIBRA~28 JAV           440 03-02-01    1:25a LibraryFax.java
LIBRA~30 JAV           490 03-02-01    1:25a LibraryPush.java
LIBRA~32 JAV           507 03-02-01    1:25a LibraryQA.java
OUTCO~34 JAV           819 03-02-01    1:25a Outcome.java
PROJE~36 JAV           437 03-02-01    1:25a Project.java
PROJE~38 JAV           417 03-02-01    1:25a
ProjectLibraries.java
PROJE~40 JAV           590 03-02-01    1:25a ProjectTab.java
SUPER~42 JAV         6,457 03-02-01    1:25a
SupervisorConfig.java
SUPER~44 JAV           543 03-02-01    1:25a
SupervisorRecording.java
TAB~46 JAV           1,706 03-02-01    1:25a Tab.java
USERS~48 JAV           479 03-02-01    1:25a UserStatus.java
WORKG~50 JAV           536 03-02-01    1:25a Workgroup.java
      23 file(s)             21,575 bytes
Directory of E:\IMServerSource\com\callcenter\into
.              <DIR>       03-02-01    2:14p .
..             <DIR>       03-02-01    2:14p ..
REQUES~6 JAV           479 03-02-01    1:25a RequestClient.java
REQUES~8 JAV         1,975 03-02-01    1:25a
RequestServicingThread.java
SERVE~10 JAV         5,047 03-02-01    1:25a
ServerConnection.java
       3 file(s)              7,501 bytes
Directory of E:\IMServerSource\com\callcenter\net
.              <DIR>       03-02-01    2:14p .
..             <DIR>       03-02-01    2:14p ..
SERVER~6 JAV         5,048 03-02-01    1:25a ServerNetConn.java
       1 file(s)              5,048 bytes
Directory of E:\IMServerSource\com\callcenter\security
.              <DIR>       03-02-01    2:14p .
..             <DIR>       03-02-01    2:14p ..
USERMA~6 JAV         2,807 03-02-01    1:25a UserManager.java
USER~8 JAV           7,166 03-02-01    1:25a User.java
       2 file(s)              9,973 bytes
Directory of E:\IMServerSource\com\callcenter\server
.              <DIR>       03-02-01    2:14p .
..             <DIR>       03-02-01    2:14p ..
CALLCE~6 JAV         1,150 03-02-01    1:25a
CallCenterServerRequestHandler.java
CALLCE~8 JAV        92,564 03-02-01    1:25a
CallCenterServerDataSource.java
CALLC~10 JAV         1,386 03-02-01    1:25a
CallCenterServerResponse.java
CALLC~12 JAV           304 03-02-01    1:25a
CallCenterServerGlobals.java
CALLC~14 JAV        15,581 03-02-01    1:26a
CallCenterServerSupervisorServiceThread.java
CALLC~16 JAV         9,507 03-02-01    1:25a
CallCenterServerContact.java
CALLC~18 JAV           287 03-02-01    1:26a
CallCenterServerThread.java
CALLC~20 JAV           370 03-02-01    1:26a
CallCenterServerServiceThread.java
CALLC-22 JAV           191 03-02-01    1:26a
CallCenterServerThreadEvent.java
CALLC~24 JAV           405 03-02-01    1:25a
CallCenterServerChatConstants.java
CALLC~26 JAV           434 03-02-01    1:25a
CallCenterServerRessourceInfo.java
CALLC~28 JAV        11,236 03-02-01    1:26a
CallCenterServerSessionManager.java
CALLC~30 JAV         9,966 03-02-01    1:26a
CallCenterServerWebCallbackThread.java
CALLC~32 JAV         1,581 03-02-01    1:26a
CallCenterServerServiceThreadConfig.java
CALLC~34 JAV        40,207 03-02-01    1:25a
CallCenterServerLink.java
CALLC~36 JAV         8,762 03-02-01   12:16p
CallCenterServerSupervisorConstants.java
CALLC~38 JAV        39,027 03-02-01    1:25a
CallCenterServerClientThread.java
CALLC~40 JAV        13,512 03-02-01   12:16p
CallCenterServerConstants.java
CALLC~42 JAV           345 03-02-01    1:25a
CallCenterServerEventListener.java
CALLC~44 JAV         1,105 03-02-01    1:25a
CallCenterServerComm.java
CALLC~46 JAV           193 03-02-01    1:25a
CallCenterServerException.java
CALLC~48 JAV         1,775 03-02-01    1:25a
CallCenterServerInitializerThread.java
CALLC~50 JAV         1,523 03-02-01    1:26a
CallCenterServerThreadPool.java
CALLC~52 JAV         5,433 03-02-01    1:26a
CallCenterServerWebCallbackServiceThread.java
CALLC~54 JAV        11,621 03-02-01    1:25a
CallCenterServerChatThread.java
CALLC~56 JAV           837 03-02-01    1:26a
CallCenterSupervisorMenuItem.java
CALLC~58 JAV         6,277 03-02-01    1:25a
CallCenterServerRequest.java
CALLC~60 JAV           461 03-02-01    1:26a
CallCenterServerStateChangeEvent.java
CALLC~62 JAV         9,940 03-02-01    1:25a
CallCenterServerClientServiceThread.java
CALLC~64 JAV         8,591 03-02-01    1:25a
CallCenterServerAdminThread.java
CALLC~66 JAV         5,341 03-02-01    1:25a
CallCenterServerChatServiceThread.java
CALLC~68 JAV        29,540 03-02-01    1:26a
CallCenterServerSupervisorThread.java
CALLC~70 JAV         1,615 03-02-01    1:25a
CallCenterServerClientThreadPool.java
CALLC~72 JAV        15,494 03-02-01    1:25a
CallCenterServerMessageCenter.java
```

-continued

```
CALLC~74 JAV        10,698 03-02-01  1:26a
CallCenterServerSysParams.java
CALLC~76 JAV         5,818 03-02-01  1:25a
CallCenterServerAdminServiceThread.java
CALLC~78 JAV           262 03-02-01  1:25a
CallCenterRequest.java
CALLC~80 JAV           179 03-02-01  1:25a
CallCenterResponse.java
CALLC~82 JAV        10,800 03-02-01  1:25a
CallCenterServer.java
CALLC~84 JAV           437 03-02-01  1:25a
CallCenterServerAdapter.java
SERVLETS      <DIR>        03-02-01  2:14p servlets
       40 file(s)         374,755 bytes
Directory of E:\IMServerSource\com\callcenter\server\servlets
              <DIR>        03-02-01  2:14p .
..            <DIR>        03-02-01  2:14p ..
CALLCE~6 JAV         9,128 03-02-01  1:26a
CallCenterProxyServlet.java
CALLCE~8 JAV         6,073 03-02-01  1:26a
CallCenterServlet.java
PROXY~10 JAV           268 03-02-01  1:26a
ProxyConnectInfo.java
        3 file(s)          15,469 bytes
Directory of E:\IMServerSource\com\callcenter\util
              <DIR>        03-02-01  2:14p .
..            <DIR>        03-02-01  2:14p ..
JDBCCO~6 JAV         2,991 03-02-01  1:26a
JDBCConnectionPool.java
KEVENT~8 JAV         7,486 03-02-01  1:26a KEventLog.java
KOBJE~10 JAV         5,887 03-02-01  1:26a KObjectPool.java
KRESU~12 JAV         4,812 03-02-01  1:26a KResultSet.java
KSCHE~14 JAV         5,885 03-02-01  1:26a KScheduler.java
KSCHE~16 JAV           287 03-02-01  1:26a
KSchedulerClient.java
KSOCK~18 JAV         1,198 03-02-01  1:26a
KSocketConnectionPool.java
MESSA~20 JAV           677 03-02-01  1:26a Message.java
TABLE~22 JAV        14,694 03-02-01  1:26a TableDataSet.java
UTILI~24 JAV         2,598 03-02-01  1:26a Utility.java
       10 file(s)          46,515 bytes
Directory of E:\IMServerSource\com\callcenter\webcallback
              <DIR>        03-02-01  2:14p .
..            <DIR>        03-02-01  2:14p ..
CALLCE~6 JAV           451 03-02-01  1:26a
CallCenterWebCallbackConstants.java
CALLCE~8 JAV         4,391 03-02-01  1:26a
CallCenterWebCallbackRequest.java
        2 file(s)           4,842 bytes
Total files listed:
      131 file(s)         693,372 bytes
       69 dir(s)               0 bytes free
```

APPENDIX AND COPYRIGHT NOTICE

FIGS. 2-98 included in this document represent screen output of a browser-based call center administration manager interface. These figures form part of the disclosure of the specification. The Figures and the Computer Program Listing Appendix included on the Compact discs filed with this document are copyrighted. The copyright owner has no objection to facsimile reproduction by anyone of the patent document, including the copyrighted Figures and the Appendix, as they appear in the Patent and Trademark Office files or records, but otherwise reserves all rights.

BACKGROUND OF THE INVENTION

1. Field of the Invention

The present invention relates to call center provisioning, management, and supervision.

2. Background

Organizations with more than trivial needs for customer interaction often use call centers to provide services to their customers and to organize sales personnel. A call center is the means by which an organization, e.g., company or "enterprise," handles customer and other calls, usually with some amount of computer automation. Typically, a call center can handle a considerable volume of inbound and outbound calls at the same time, screen inbound calls, forward them to agents (e.g., customer service representatives) with appropriate skills, and maintain records of the calls and of the call center agents. Call centers have traditionally been used by mail-order catalog companies, telemarketing companies, computer product help desks, and other similar organizations that use the telephone to sell or support their products and services.

Many call centers use computer-telephony integration (CTI), also known as "computer telephony," to process telephone calls. These terms refer simply to the use of computers in managing the calls. Since the advent of the information technology revolution, companies have increasingly felt the need to interact with their customers through alternative communication channels that include, for example, facsimile transmissions, email, and web-based contacts. (We will collectively refer to such interactions and the conventional telephone calls as "e-contacts," "contacts," "interactions," or simply as "calls.") The alternative channel contacts are generally susceptible to CTI-based processing at least to the same extent as conventional telephone calls, and the benefits of computer-based management apply to them as well.

A typical modern call center is a complicated technological amalgam of hardware and software residing in whole or in part on a telecommunications network. Provisioning such a call center for an enterprise can be a lengthy, technically involved process performed by "integrators"—technicians, engineers, and programmers highly skilled in combining computer equipment, telecommunication equipment, and software from various manufacturers. Consequently, the time and costs involved in provisioning a call center may be substantial, and the ability to minimize them may provide an important competitive advantage. It is therefore desirable to enable provisioning call centers quickly and without massive efforts of trained and highly compensated specialists.

Call centers are often provisioned and hosted for clients-subscribers by providers of telecommunication services, for example, long distance telephone carriers (Telcos) and application service providers (ASPs). Thus, provisioning a call center may involve discussions between the representatives of a long distance carrier and an enterprise to define, for example, functionality of the call center; its limitations; and the capabilities available to the enterprise, such as the number and skills of the enterprise's agents. The definitions tend to be made without sufficient precision, necessitating redesigns with their concomitant additional delays and costs. It would therefore be beneficial to provide a high-level design tool for defining and provisioning a call center. Furthermore, it would be beneficial to push out the design tool's interface to a subscriber, to enable the subscriber to self-provision and administer a call center using non-technical employees, with little involvement by the service provider, such as an ASP or a Telco.

Some of the information used by a call center may be sensitive and confidential, i.e., information that the subscriber-enterprise prefers to keep in secure storage. For example, the call center may be capable of identifying a calling party-customer through automatic number identification (ANI), retrieving the customer's data such as history of the customer's interactions, and routing the call to an appropriate agent based on that data. Customer information, however, is usually kept confidential for at least three reasons. First, there are customer expectations of privacy. Second, the subscriber-enterprise does not want its competitors to use the information. And third, the enterprise may want to market the information itself. There may also exist other types of sensitive information, e.g., rules for vectoring inbound calls. To keep the information protected, the enterprise may not want to entrust a copy of its database to the telecommunications service provider or to an unsecure server. Therefore, it would be desirable to allow a subscriber to provision a call center using third-party resources while not providing the third-party with a copy of the subscriber's database.

SUMMARY OF THE INVENTION

The present invention is directed to a network-based company call center comprising: call-center resources running on a third-party network, the resources including a first server and a second resource; a third server running on a private network of the company behind the company's firewall; a database for storing sensitive information, the database running on the private network behind the firewall, the database communicating with the third server; wherein when the second resource generates sensitive data, it transmits the sensitive data to the database through the first server and the third server.

The call center may further include a fourth resource that requests and obtains information from the database through the first server and the third server.

The second resource may erase the generated sensitive data after transmitting it to the database, and the fourth resource may erase the information obtained from the database after the fourth resource no longer needs the obtained information.

The call center may further comprise a computer with a graphical user interface, running a program that enables the computer's operator to define, modify, and provision the call center from a wide area network such as the Internet.

BRIEF DESCRIPTION OF THE DRAWINGS

The present invention will now be explained, by way of examples only, with reference to the following description, appended claims, and accompanying Figures where:

DETAILED DESCRIPTION

Figure 1:
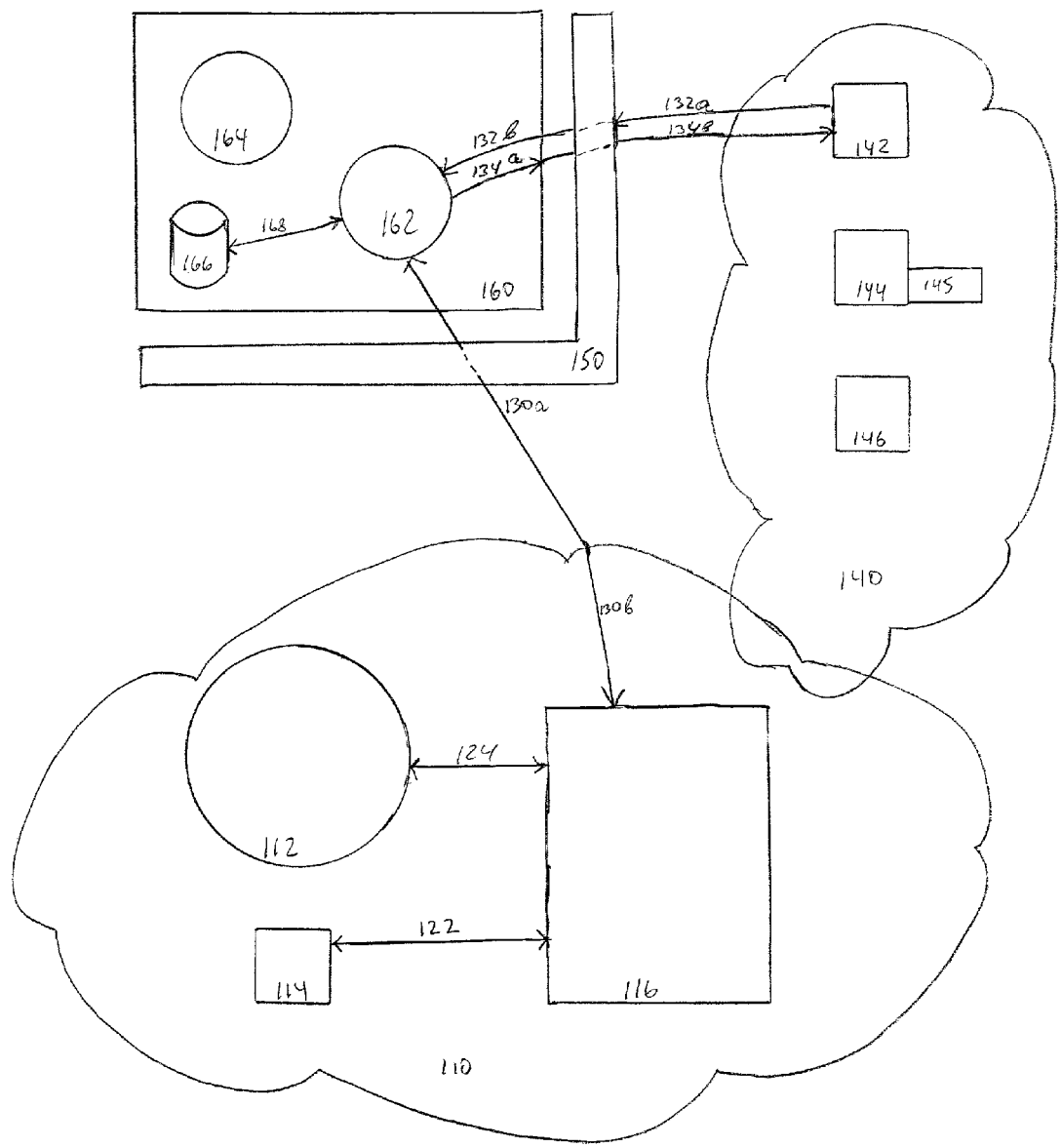
FIG. 1 is a block diagram of a distributed call center architecture with secure storage for sensitive data and Internet-based administration, supervision, and interaction managers.

FIG. 1 illustrates the architecture of an embodiment of a distributed call center. The call center's resources 112 and 114 run on a private network 110, for example an intranet or an extranet, of an ASP or a Telco. The resources include an automatic call distributor (ACD) 114 and the remaining resources 112. Note that the call center resources may be distributed or concentrated on one or a few clustered servers. An example of a distributed call center can be found in the related U.S. patent application Ser. No. 09/638,274; another example of a network-based call center can be found in U.S. Pat. No. 5,825,870 to Miloslavsky. The call center resources 112 and 114 communicate with an Internet Manager Server (IMS) 116 over connections 122 and 124. In the representative embodiment of FIG. 1, these two connections are TCP/IP connections.

In a distributed call center architecture, the agents can be located anywhere. Thus, browser-based interaction manager 144 runs on one of the agent workstations in wide area network 140, e.g., the Internet. The interaction manager 144 can receive and send information through the wide area network 140. It may also have additional connections to the call center resources. For example, the interaction manager may be connected to a PBX in order to receive inbound calls vectored by the automatic call distributor 114 to the interaction manager 144 or to telephone 145 coupled to the interaction manager 144.

Similarly, browser-based supervision manager 146 also connects to the call center through the wide area network 140. The supervision manager 146 may have all or some of the capabilities of the interaction manager 144, and additional—i.e., supervisory—capabilities. The supervisory capabilities may include, for example, obtaining real-time reports and broadcasts on network usage and agent statistics, monitoring real-time activities of agents and of other network users, recording user activities, secret or three-party monitoring of transactions, sending instant messages to users for network alerts, replacing agents during contacts with the clients (barge-in), closing down user or agent conversations, and logging users off the call center.

The administration manager 142 includes an interface through which the representatives of the enterprise-subscriber initially configure and later administer (e.g., modify) the call center and the call center's resources. The administration manager 142 controls the call center resources by sending commands to the Internet manager server 116 via web server 162. Located behind firewall 150, the web server 162 runs in the demilitarized (secure) zone 160 of the enterprise's private network. To establish a session between the browser-based administration manager 142 and a call center resource, the administration manager 142 "pings" a Java™ servlet running on the web server 162 through connections 132a and 132b using, for example, http port 80. (By "pinging" the servlet we mean sending packets to probe and establish a connection with the servlet.) The servlet receives the ping message and responds via connections 134a and 134b, effectively opening, identifying, and maintaining the session with the administration manager 142. Once the servlet assigns an ID to the session, it can communicate securely with the administration manager 142. After receiving the configuration data from the administration manager 142, the servlet running on the web server 162 communicates the data to the Internet manager server 116 over secure connections 130a and 130b.

In an analogous fashion, the Internet manager server 116 conveys data back to the administration manager 142 via the connections 130a/130b, the web server 162, and the connections 132a/132b. More generally, the web server 162 passes data inputted at the browser-based applications, e.g., the administration manager 142, the interaction manager 144, and the supervision manager 146, to the Internet manager server 116 and through it to other call center resources. The Internet manager server 116 thus acts as a communication bridge between the call center resources 112/114 and the browser-based client applications running on the wide area network 140. Further, the Internet manager server 116 serves as a bridge between the call center resources 112/114 and clients and servers running in the enterprise's secure zone 160 behind the firewall 150.

In the call center of FIG. 1, the connections, including the connections 130a and 130b, are TCP/IP connections, as are connections 122 and 124 between the Internet manager server 116 and other call center resources 112/114. Using these TCP/IP connections, the Internet manager server 116 provides secure communications between the other resources 112/114 and the clients running on the wide area network 140.

The Internet manager server 116 may perform additional functions, including those that require frequent message exchanges with Internet-based clients and servers within the enterprise's secure zone 160. For example, in an embodiment of a call center in accordance with the description in the U.S. patent application Ser. No. 09/638,274, the Internet manager server 116 replaces the collaboration server, the chat server, and the unified mail server. It may further provide private aliasing and resource and load balancing.

The call center administration scheme described can also enhance security and reliability of data management in a distributed call center. As was discussed in the BACKGROUND section of this document, the enterprise implementing the call center may be reluctant to expose its sensitive data to the vagaries of a wide area network or even to the ASP's or Telco's own private network. The sensitive data may include, for example, call detail data and history of customer interactions; quality control records, possibly including recordings of monitored interactions; customer consent to transaction recording; customers' names and addresses; billing permissions and credit authorizations; email and chat files; time stamps relating to the above records; and customer-identifying interaction origination data, such as customer telephone numbers or email sender data. The sensitive data may be generated by the call center resources 112/114 or by the interaction manager 144 during customer interactions. Alternatively, previously-generated sensitive data may be accessed by the call center resources 112/114, e.g., when ANI data is used for vectoring incoming calls; or the data may be accessed by the interaction manager 144, e.g., when an agent at the interaction manager 144 needs to see a record of an earlier call.

In the call center architecture depicted in FIG. 1, the enterprise's sensitive information resides in database 166, within the enterprise's secure zone 160. When new sensitive information is generated, for example by one of the call center resources 112, the resource sends the information to the Internet manager server 116 through the connection 124. The Internet manager server 116 transmits the information to the web server 162 via the TCP/IP connections 130a/130b by the process described above. Next, the web server 162 writes the newly-generated sensitive information to the database 166 by generating an SQL command and sending it via connection 168. After the information is written to the database 166, the local copy of the information is erased from the resource that had generated the information.

When one of the call center resources requires data from the database 166, the resource informs the Internet manager server 116 of the need. The Internet manager server then establishes a session to transmit an appropriate request to the web server 162, or uses an existing session for this purpose. The web server 162 generates an SQL query to the database 166, and the data responsive to the query is returned via the same route to the resource that originated the request, e.g., the automatic call distributor 114. When the resource no longer needs the data, it erases its local copy of the data.

Figure 2:
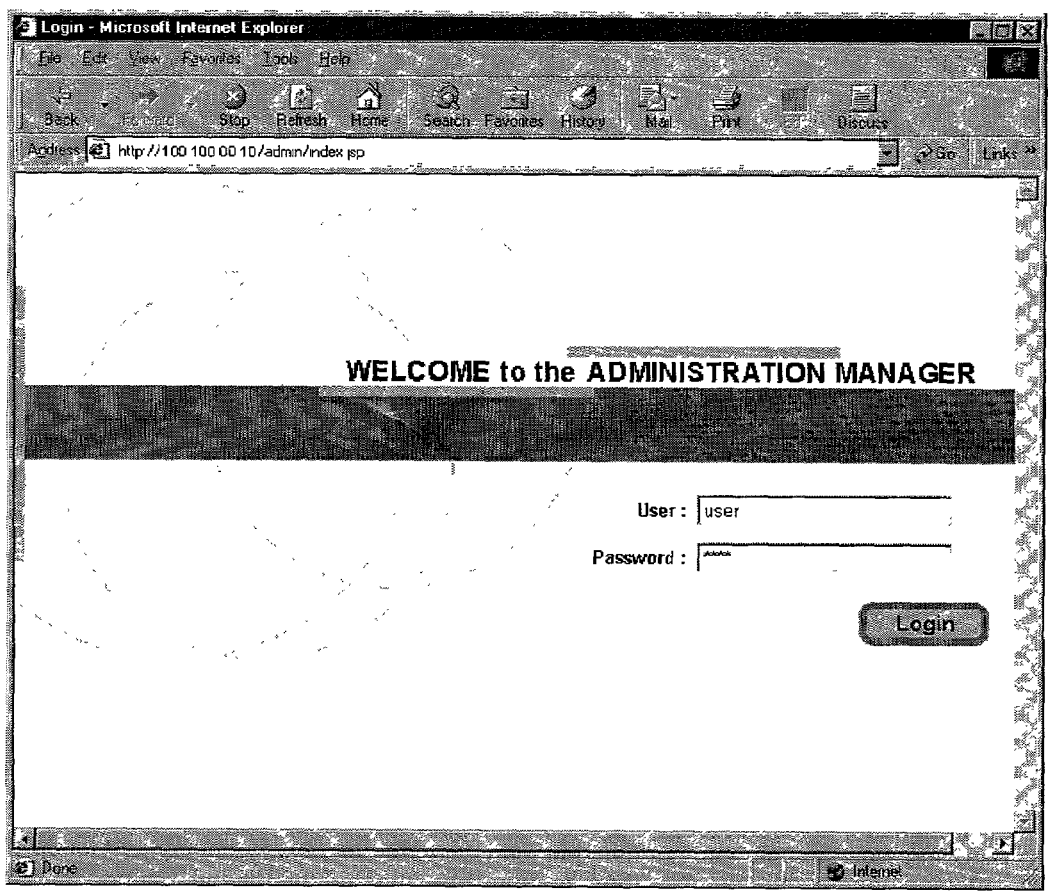
FIGS. 2-98 illustrate screen outputs of a browser-based call center Administration Manager.
Figure 96:
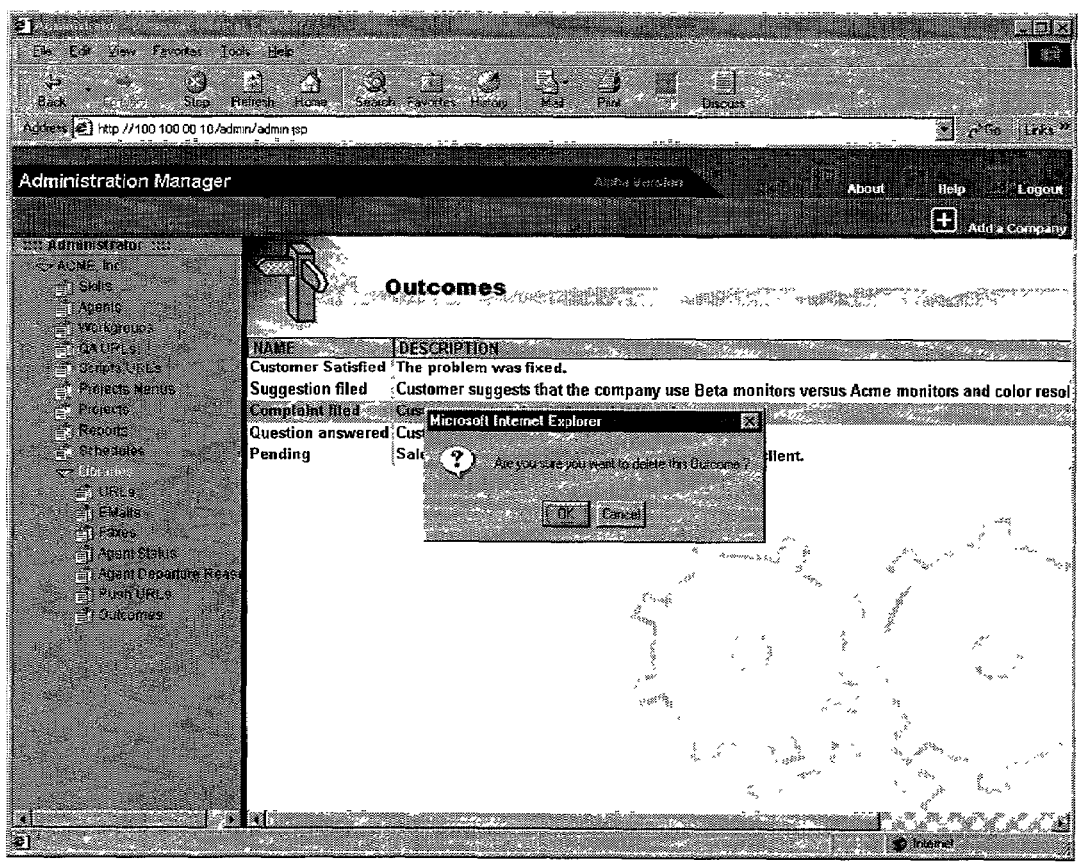

Turning now to the administration manager interface, FIGS. 2-96 illustrate interactive screens of an embodiment of the administration manager as the screens appear in a version of Microsoft Corporation's Internet Explorer web browser. The specific embodiment illustrated is Administration Manager Browser Version 4.0 ("Administration Manager" hereinafter), an object-oriented call center administration manager expected to be marketed soon by TELEPHONY@tWORK, Inc. Generally, any form-capable browser, such as Netscape Corporation's Communicator 6, running on any platform, such as a Wintel PC, Macintosh, or Unix, can perform this function.

To provision a call center initially, or to change its parameters at a later time, the user first directs the browser to go the site designated for the call center's administration, and then logs into the site. FIG. 2 is a log in screen of the Administration Manager. Here, as in the other figures, the "http" address shown in the browser's Address window is not a real address as far as is known to the inventors; it is used for illustration only. To log in, the user enters the user's identification and password in the User ID and Password fields, and then left-clicks on ("clicks" or "selects") the Login button.

Figure 3:
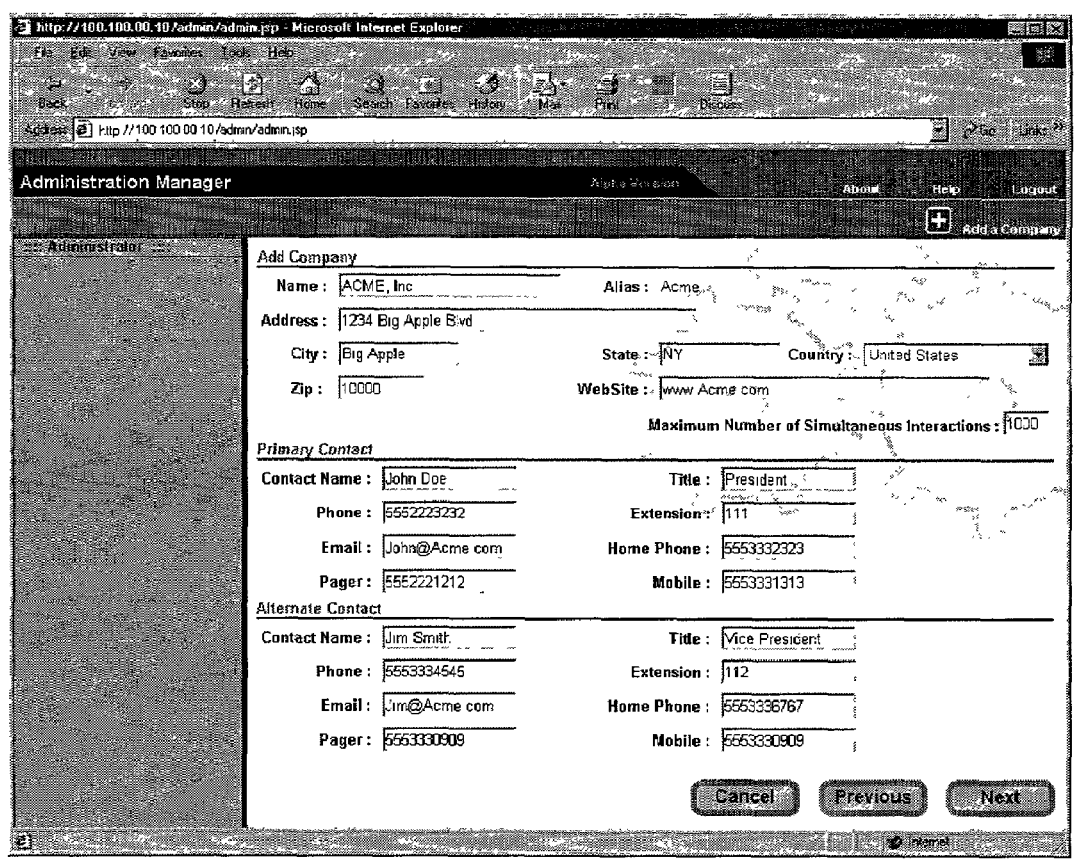
Figure 4:
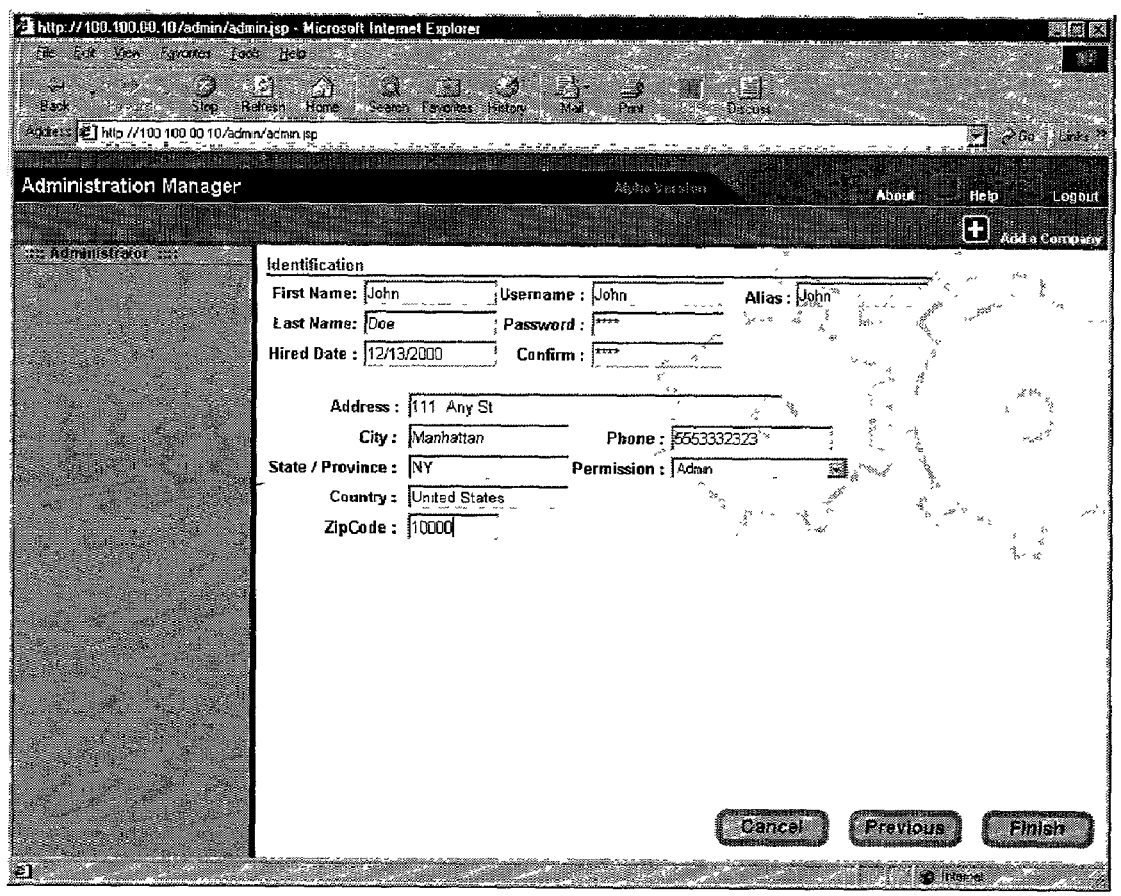

FIGS. 3 and 4 illustrate screens used in creating a new Company object, i.e., creating a new call center object for an enterprise. The steps involved are as follows:

1. Select the Add a Company button from the upper menu in the Administration Manager window;
2. Enter the name of the Company in the Name field; if the Company has an Alias, enter it in the Alias field;
3. Enter the address of the Company in the Address field;
4. Enter the city in which the Company is located in the City field;
5. Enter the state in which the Company is located in the State field;
6. Select the country in which the Company is located by selecting one from the Country drop-down list;
7. Enter the zip (postal) code in which the Company is located in the Zip field;
8. Enter the Company's web site address in the Web Site field;
9. Enter the maximum number of simultaneous interactions for this Company in the Maximum Number of Simultaneous Interactions field;
10. Complete the Contact Name, Title, Phone, Extension, Email, Home Phone, Pager, and Mobile fields for a Primary and an Alternative Contact, as desired;
11. When the form is completed, click the Next button to continue;
12. Complete the First Name, Last Name, Username, Alias, Password and Confirm, Hired Date, Address, City, Phone, State/Province, Country, and ZipCode fields for the Administrator, as desired; and
13. When the form is completed, click the Finish button to create the Company.

Note that an Administrator object is configured together with the Company object.

Not all of the information requested by the screens in FIGS. 3 and 4, and in most screens of the Administration Manager, must be supplied by the user. For example, the Web Site field may be left blank.

Figure 5:
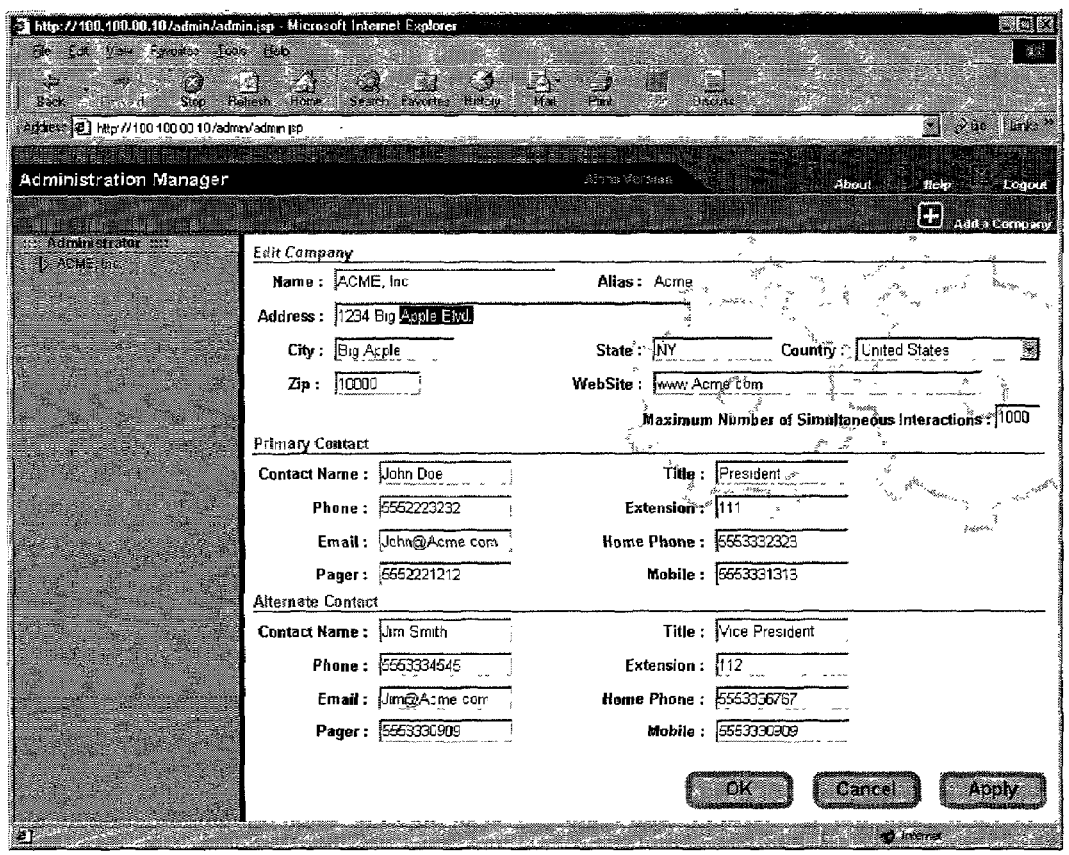

FIG. 5 illustrates modifying an existing Company object. The steps involved in a modification are listed below:

1. Select the Company to modify by clicking on that Company from the given list on the left-hand side of the window;
2. Click the Edit button under the Company name once the Company has been selected; the Edit Company window opens;

3. Modify information as necessary;

4. Select the Apply button to save the changes; and

5. Select the OK button to return to the main Company window.

Figure 6:
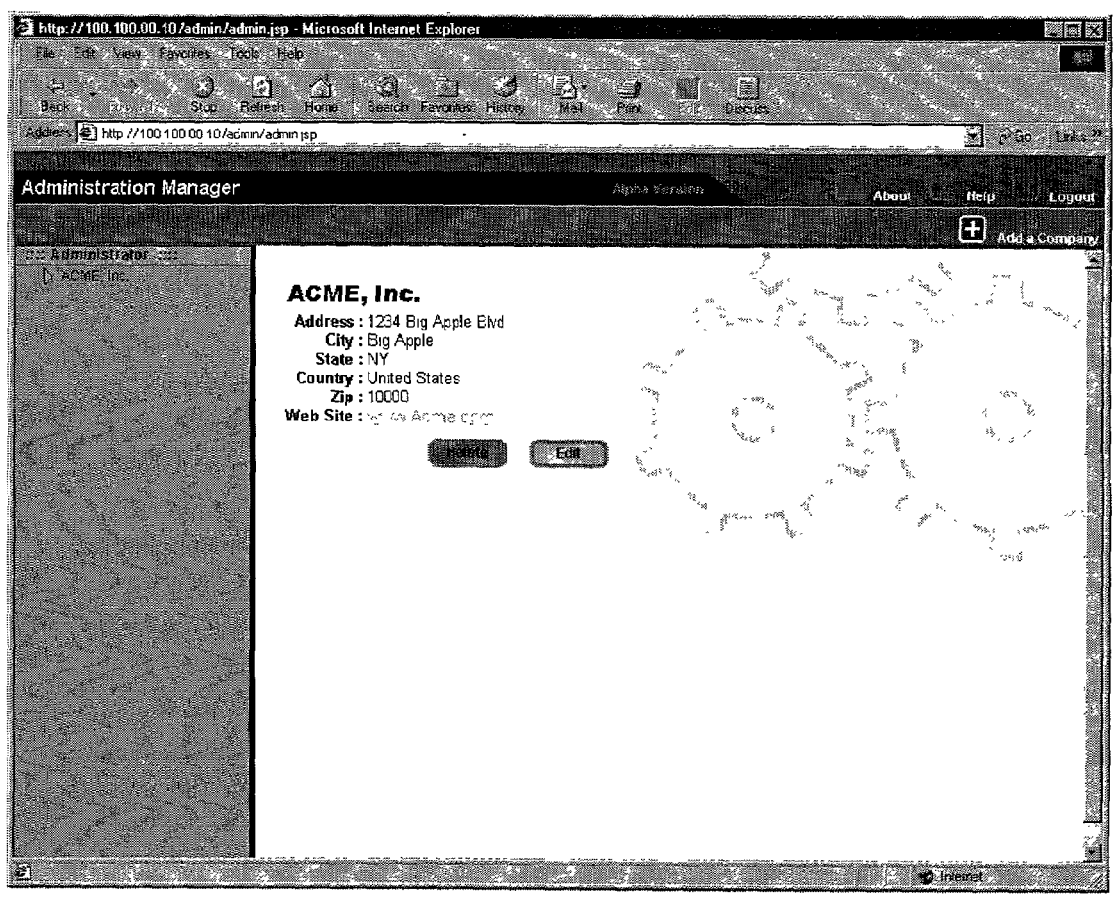

FIG. 6 illustrates deletion of a Company object. The steps involved in deletion are listed below.

1. Select the Company to delete by clicking on that Company from the given list on the left-hand side of the window;

2. Click the Delete button under the Company name once the Company has been selected; and 3. A notice will appear asking for confirmation of the delete command; click OK to delete the Company.

Figure 7:
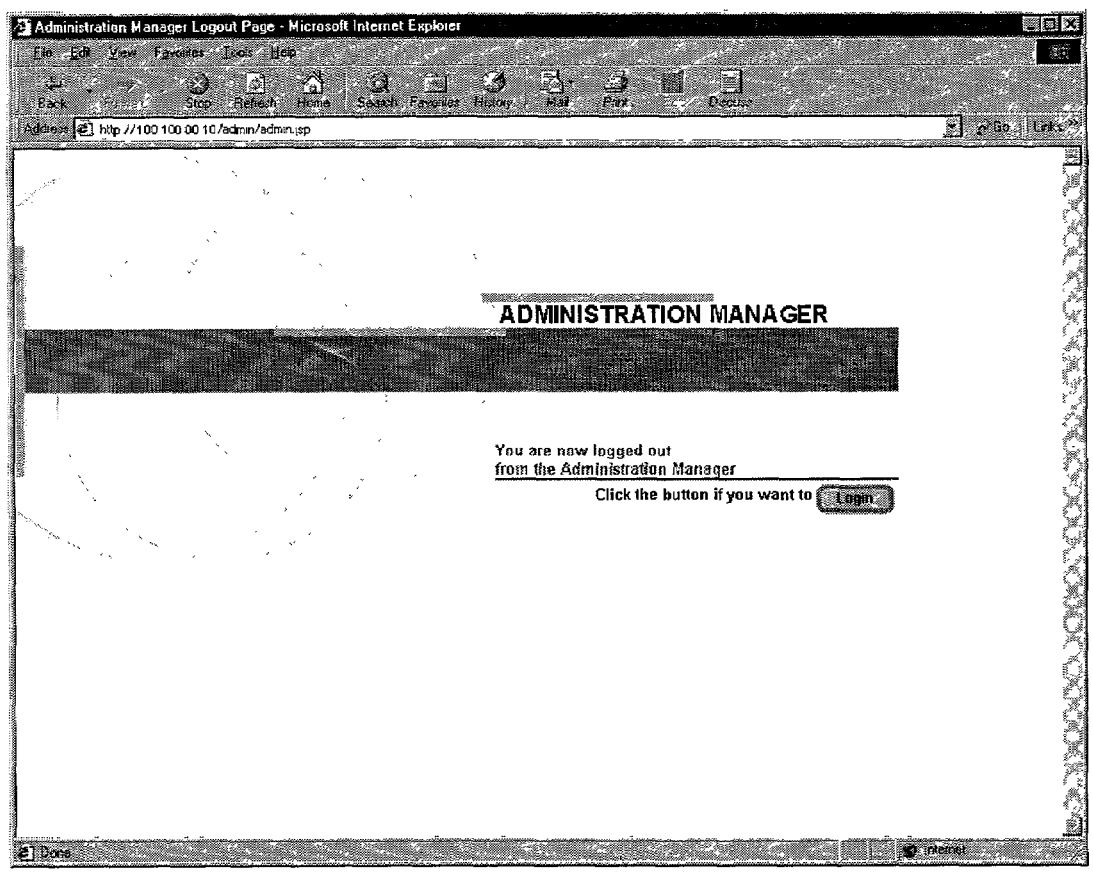

FIG. 7 is the log out screen. The user selects the Log Out button from the upper menu and receives a confirmation notice. The log out step is taken after the user completes the steps of creating, deleting, and modifying Company or Companies associated with the User ID and the Password entered during the log in process.

Figure 8:
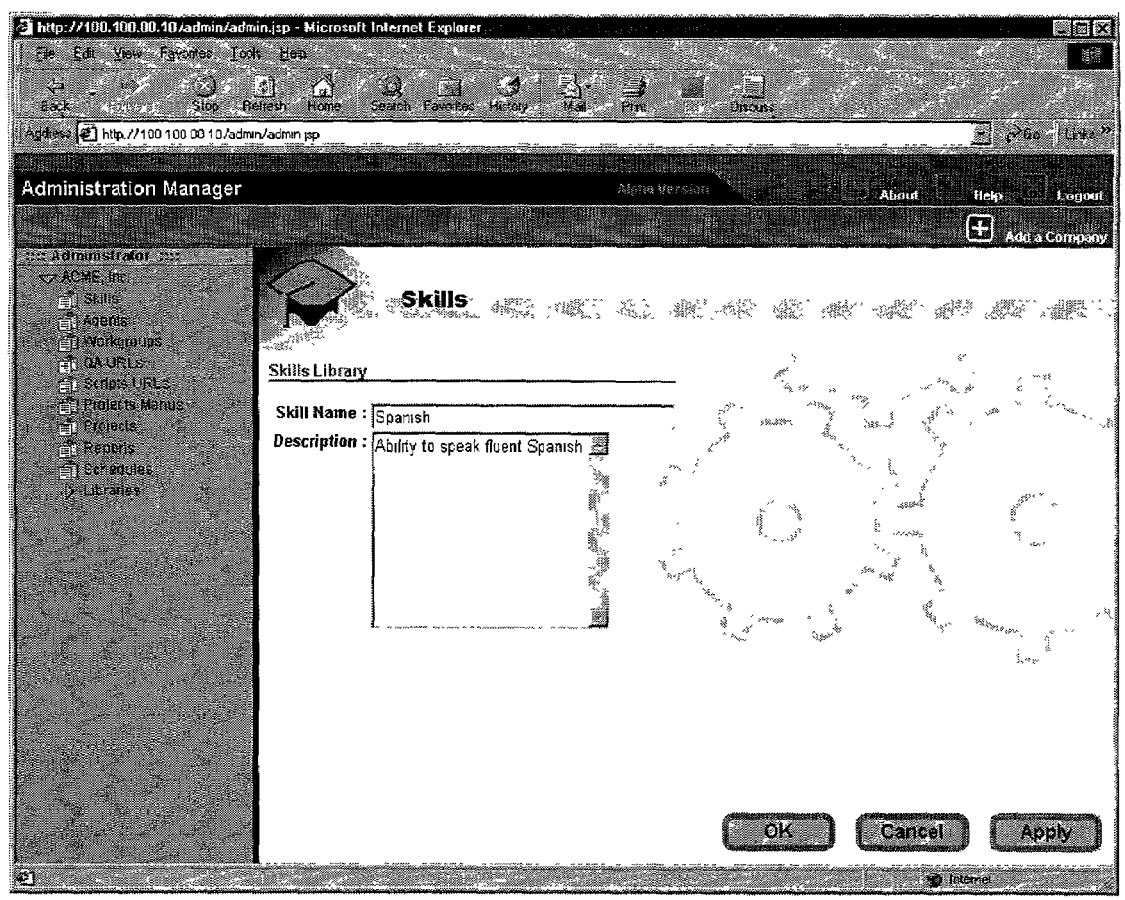

FIG. 8 illustrates a Skill object creation. A skill is a capability parameter of an Agent or of an automated endpoint. The following steps are involved in creating a Skill object:

1. Select the Skill tab from beneath the Company you wish to add a skill to;

2. Right-click in the skill window and select Add Skill;

3. Enter the Skill Name in the Skill Name field;

4. Enter the Skill Description in the Skill Description field;

5. Click Apply to save the skill; and

6. Click the OK button to return to the main Skill window.

Figure 9:
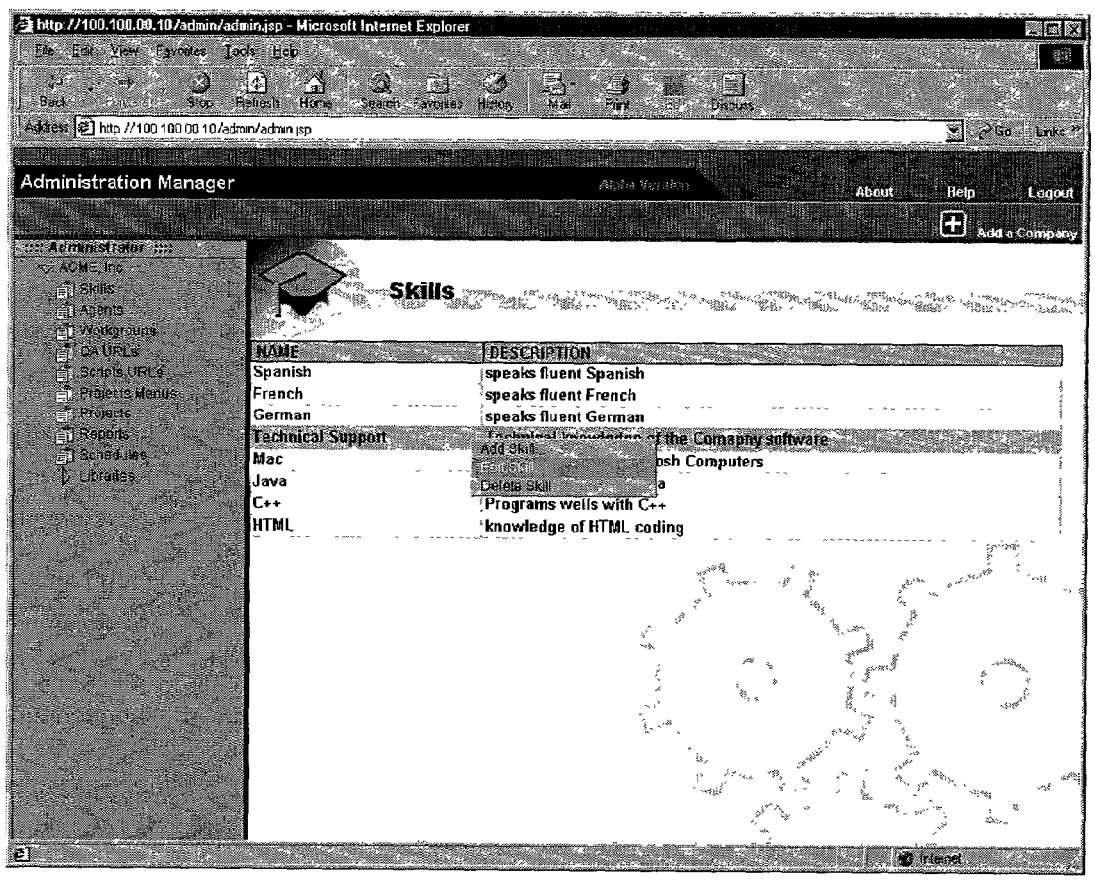

FIG. 9 illustrates editing a Skill object. The steps involved are as follows:

1. Select the Skill tab from beneath the Company you wish to edit a skill for;

2. Right-click in the skill window and select Edit Skill;

3. Make the necessary changes;

4. Click Apply to save the changes made to the skill; and

5. Click the OK button to return to the main Skill window.

Figure 10:
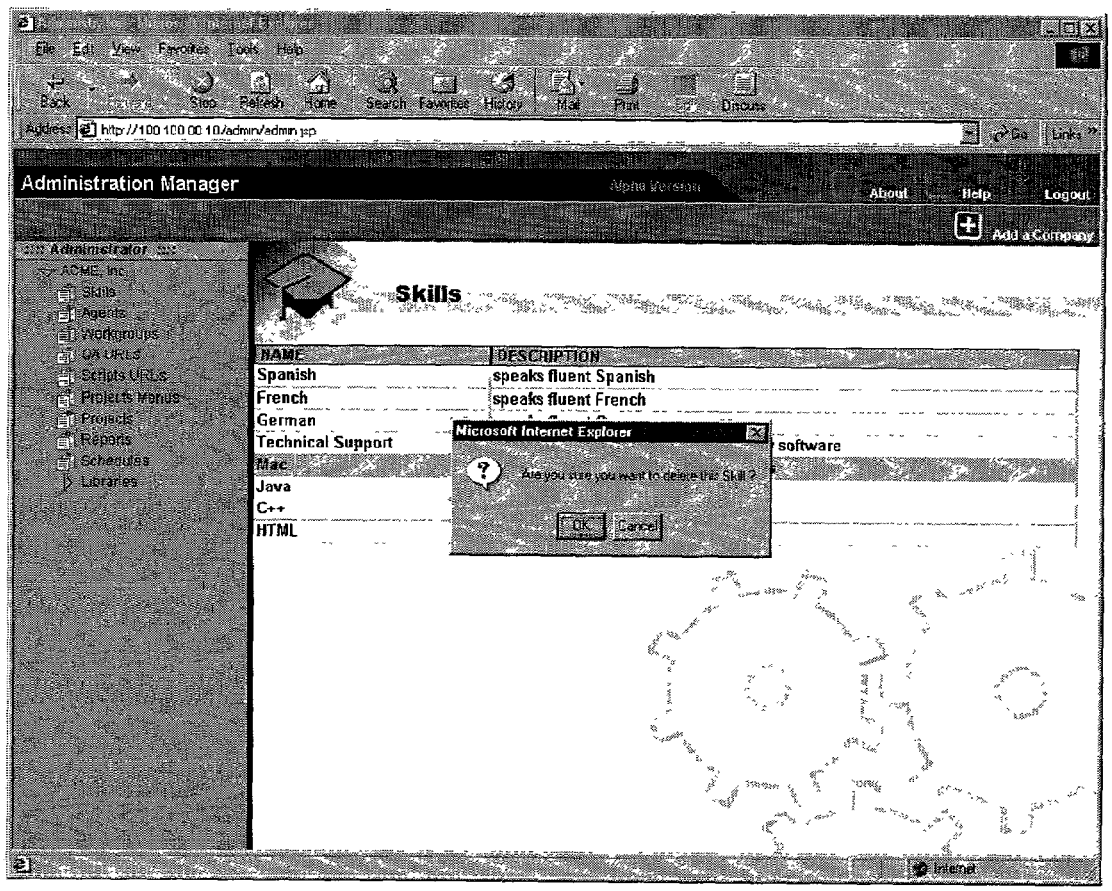
Figure 11:
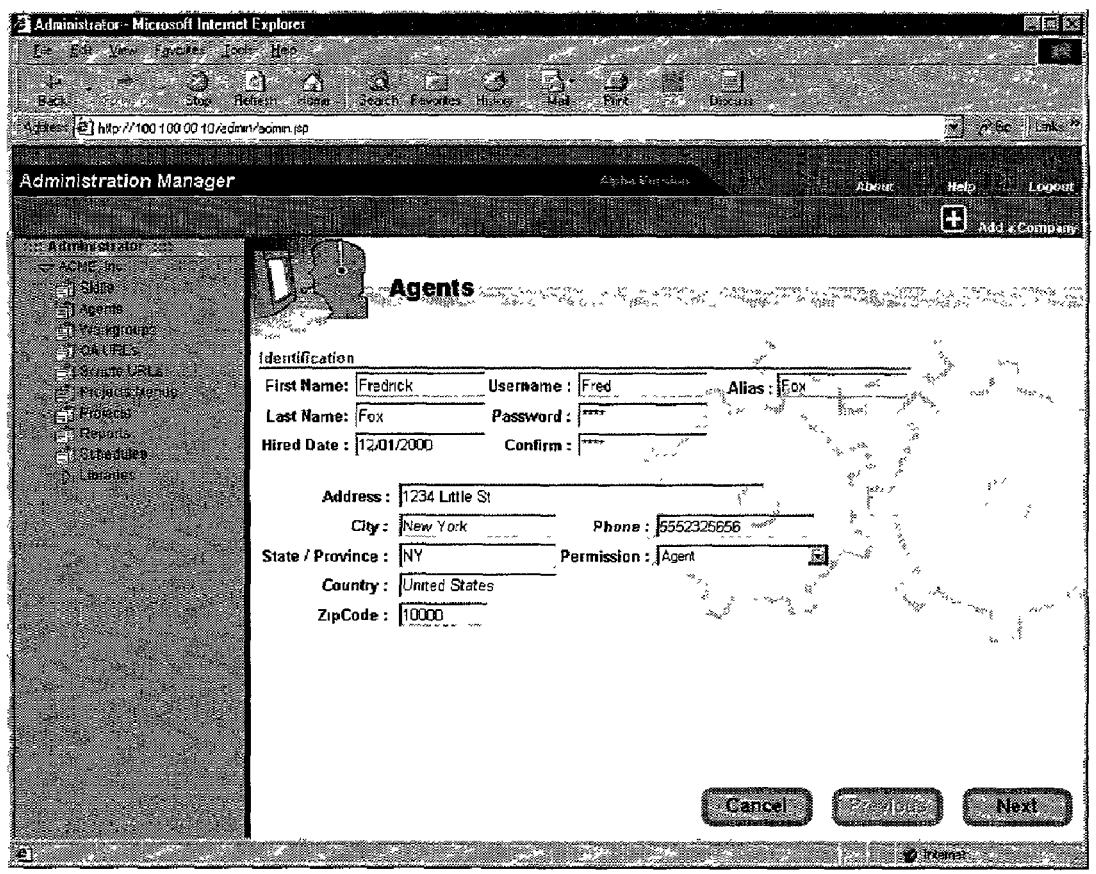
Figure 12:
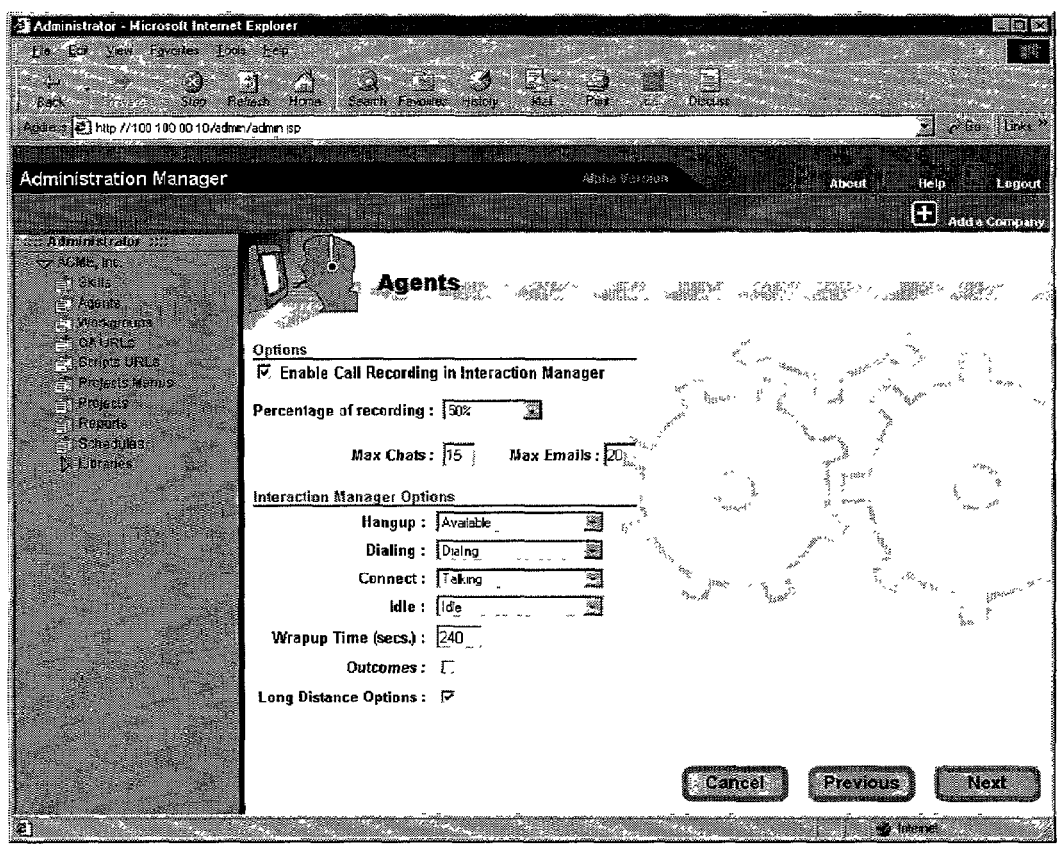
Figure 13:
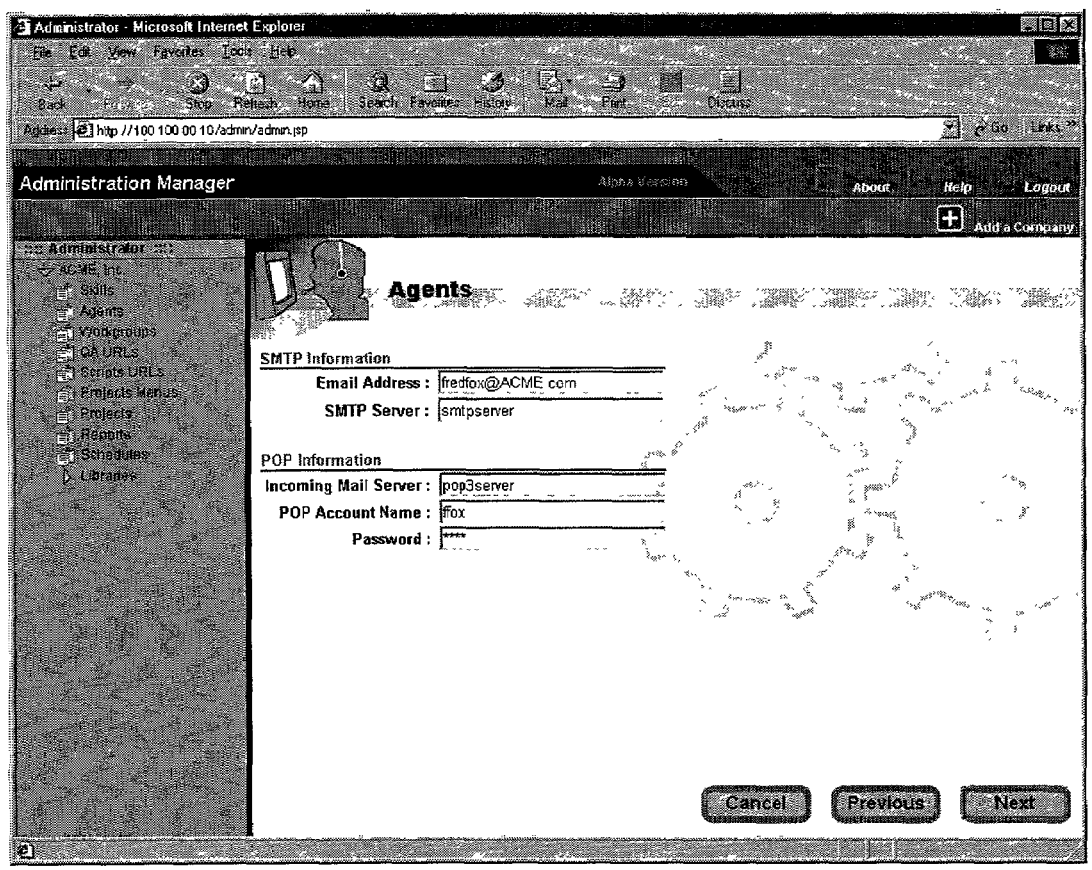
Figure 14:
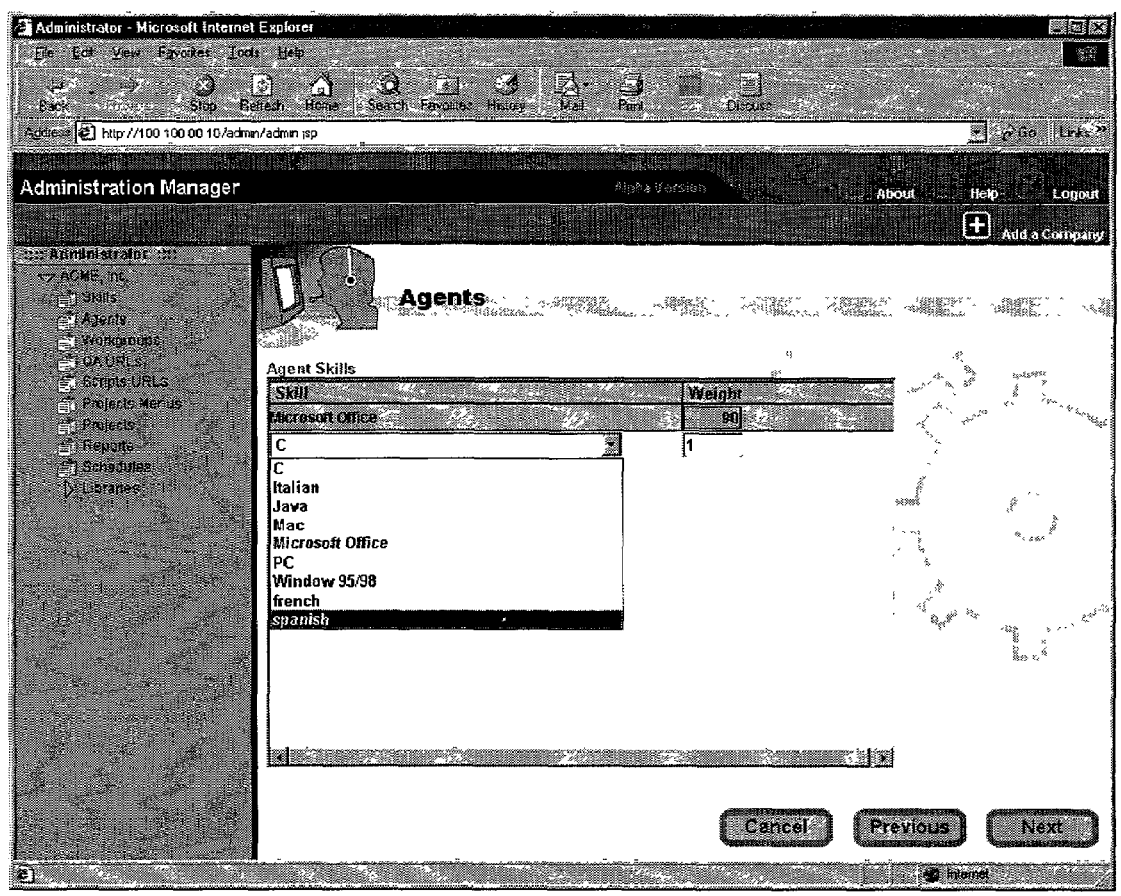
Figure 15:
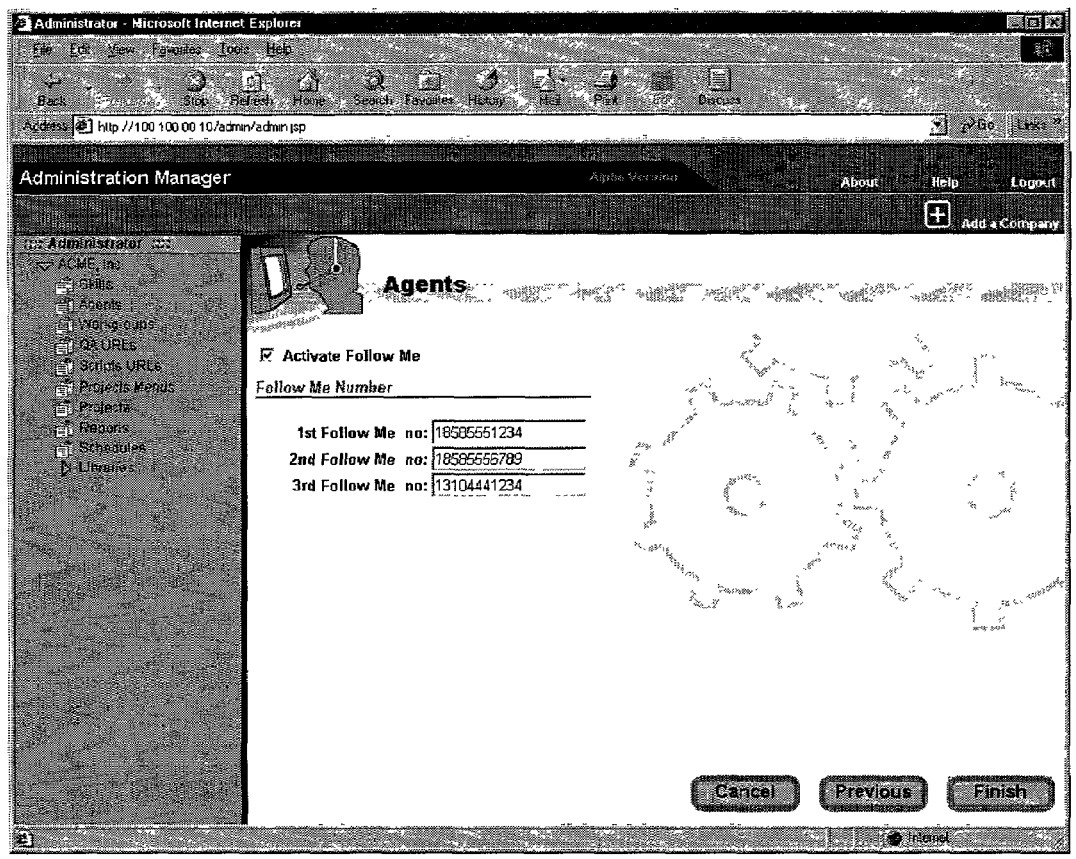

FIG. 10 illustrates deletion of a Skill object. The steps performed to delete a Skill object are as follows:

1. Select the Skill tab from beneath the Company you wish to delete a skill from;

2. Right-click on the selected skill in the skill window and select Delete Skill;

3. A message will appear asking for a confirmation of the Delete command; click OK to delete the skill.

FIGS. 11-15 illustrate creation of an Agent object. In this example, the object corresponds to a person; it is also possible to have automated endpoints for receipt and even initiation of contacts. The steps involved in Agent object creation are as follows:

1. Select the Agents tab from beneath the Company you wish to add an Agent to;

2. Right-click in the Agent window and select Add Agent;

3. Enter the User Name in the First Name and Last Name fields;

4. In the Username field, enter a Username for the Agent to have when logged in;

5. Enter the Agent Alias name in the Alias field;

6. Enter a password in the Password field and confirm the password by re-entering it into Confirm field;

7. The current date will be entered in the Hired Date field, but the Administrator may modify the date as desired;

8. Determine the Permission the Agent has by selecting a title from the Permission drop-down list;

9. Complete the remaining detail fields, as desired and click Next;

10. To enable Call Recording in the Interaction Manager for an Agent, select the corresponding check box;

11. If Call Recording is enabled, select the percentage of calls to be monitored by selecting a percentage from the Percentage of Recording drop-down list;

12. Enter a number for the maximum number of Chats and maximum number of Emails to be conducted at one time by an Agent by entering them in the Max Chats and Max Emails fields;

13. Select Agent Status that corresponds to the Interaction actions by selecting an Agent Status for each command from the drop-down lists next to Hangup, Dialing, Connect, and Idle;

14. Enter a number (in seconds) to determine the allotted wrapup time for an Agent in the Wrapup Time field;

15. To enable Outcomes or Long Distance Options, select the corresponding check box;

16. When completed filling out the Agents Options and Interaction Manager Options, click Next;

17. Enter the Agent's Email Address in the Email Address field under SMTP Information;

18. Enter the SMTP Server name in the SMTP Server field;

19. Enter the Incoming Mail Server name in the Incoming Mail Server field under POP Information;

20. Enter the Agent's POP3 Account Name in the POP3 Account Name field;

21. Enter the Agent's Password in the Password field;

22. When completed the Agents Email Information, click Next;

23. Fill out the corresponding information about the selected Active Address Type for that Agent (see the discussion pertaining to Setting up an Agent's Telephone/Extension); when complete, click Next.

24. Right-click in the Skill window and select Add;

25. Select a skill from the New Skill drop-down list that corresponds to that Agent;

26. Enter a number from 1-100 in the Weight field to display how efficient that Agent is at that skill (e.g., "Spanish 85");

27. Repeat steps 24-27 to add more Skills; when done, click Next.

28. To Activate Follow Me, select the Activate Follow Me check box;

29. If Follow Me is activated, enter numbers for the First, Second, and Third Follow me phone numbers, as desired;

30. Click Finish.

Figure 16:
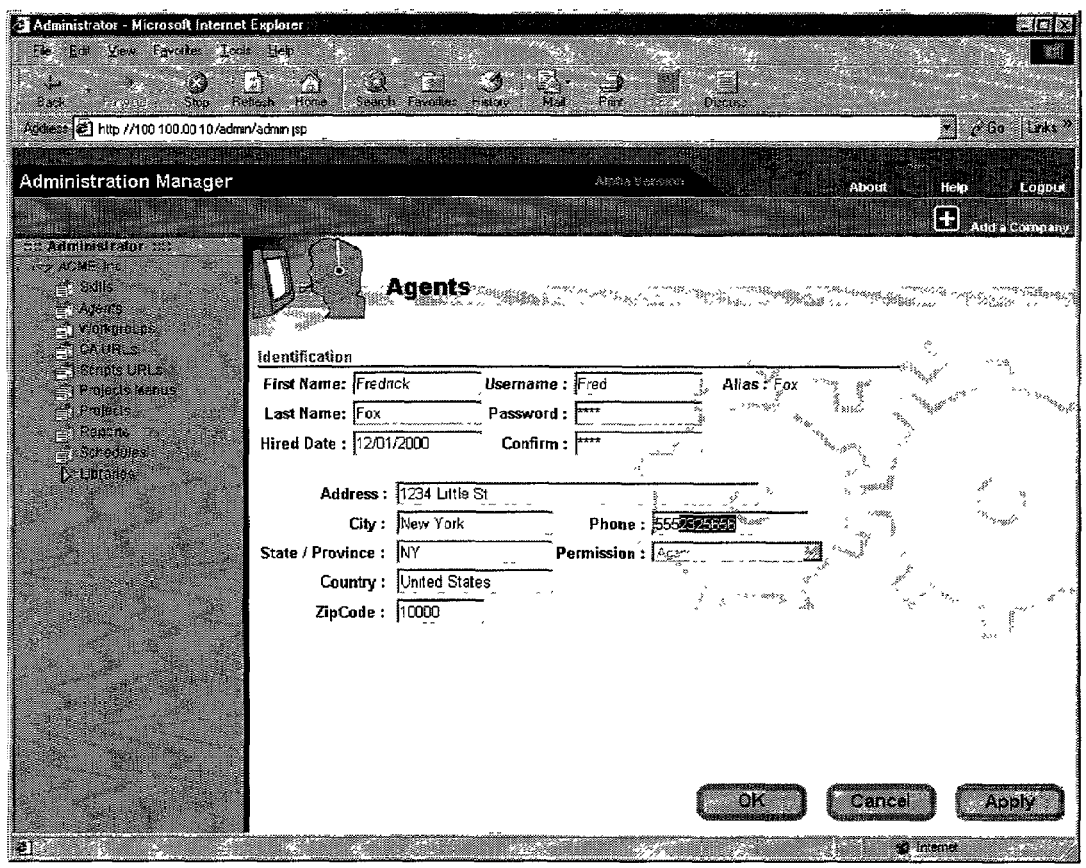

FIG. 16 illustrates modification of an existing Agent object. The following steps are involved in modifying an Agent object:

1. Select the Company to be modified an Agent for from the main left-hand column;

2. Click on the Agents tab under the Company previously selected;

3. Right-click on the Agent to be modified, then click on Edit Agent;

4. Make any necessary changes to the Agent; click Apply to save these changes, and click OK when complete, to return to the main Agents window.

5. To edit any other sections of the Agent information, right-click on the Agent to be modified and select the section to be modified (e.g. Agent Email, Agent Options, Agent Skills, etc.);

6. Make any necessary changes to those sections; click Apply to save the changes and click OK to return to the main Agent window.

Figure 17:
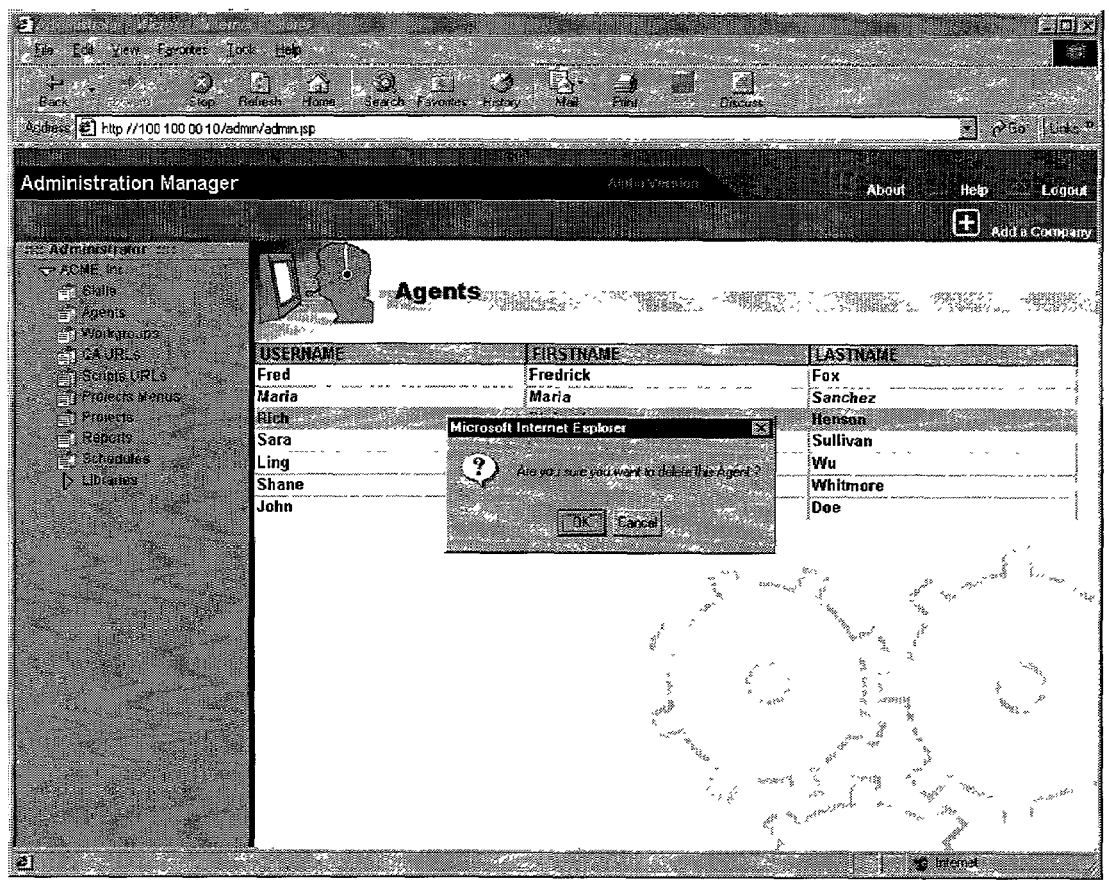

FIG. 17 illustrates deletion of an Agent. To delete an Agent, follow these steps:

1. Select the Company from which an Agent is to be deleted by selecting a Company from the main left-hand column;

2. Click on the Agents tab under the Company selected;

3. Right-click on the Agent to be deleted, and click on Delete Agent.

4. A notice will pop asking the user to confirm the deletion;

5. Click OK to delete the Agent, or click Cancel to cancel the deletion.

Figure 18:
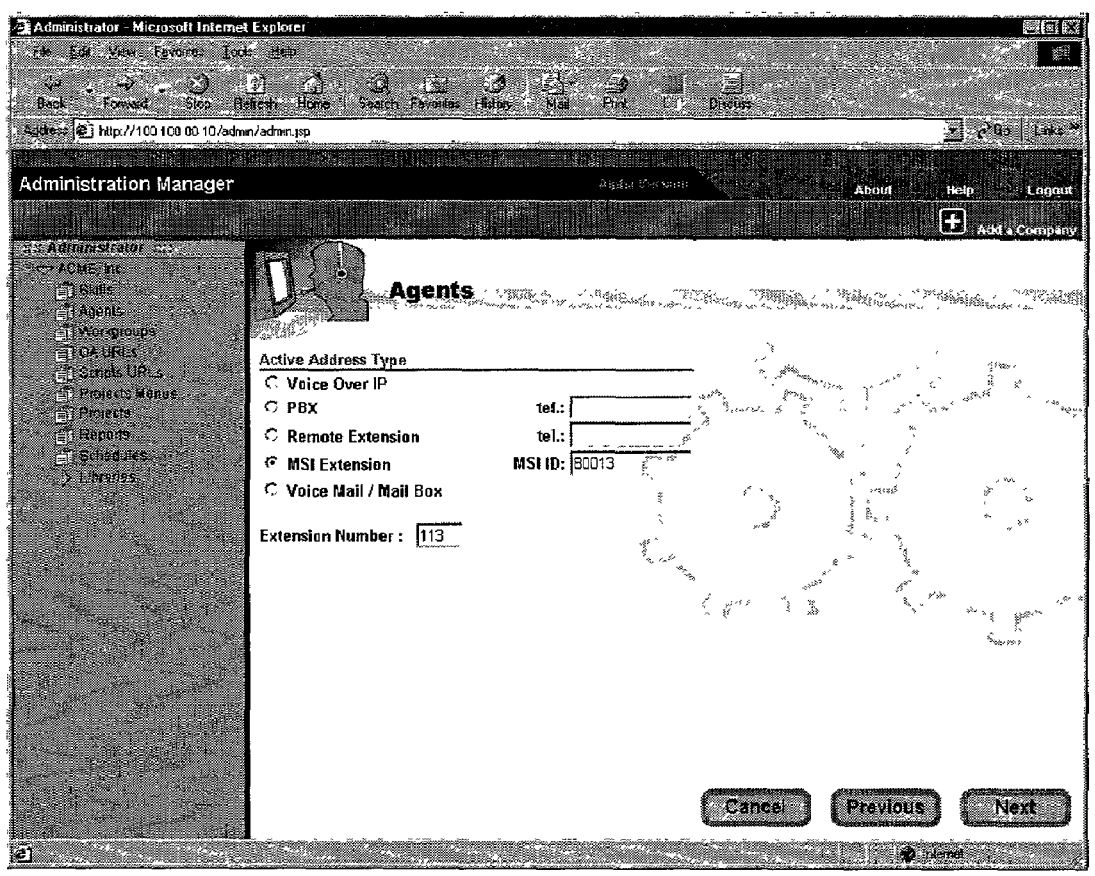

FIGS. 18-22 illustrate setting up of an Agent's telephone extension. Five basic types of extensions have been defined in the Administration Manager: (1) local extension; (2) virtual extension; (3) voice over IP (VoIP) extension; (4) voice mail extension; and (5) PBX extension. In the Administration Manager, an Agent's Telephone/Extension setting is entered when the Agent is first created. FIG. 18 illustrates setting up of a local extension. The corresponding steps are as follows:

1. From the main left-hand column, select the Company with Agents to be modified;

2. Click on the Agents tab under the Company selected;

3. Right-click on the Agent to be modified, and click on Telephone Extension;

4. To create local extensions for users, select the MSI Extension radio button and enter the MSI ID into the MSI ID field (network administrator can provide this information);

5. Enter the extension number in the Extension Number field;

6. When creating a new Agent, click Next; when modifying an Agent, click Apply.

Figure 19:
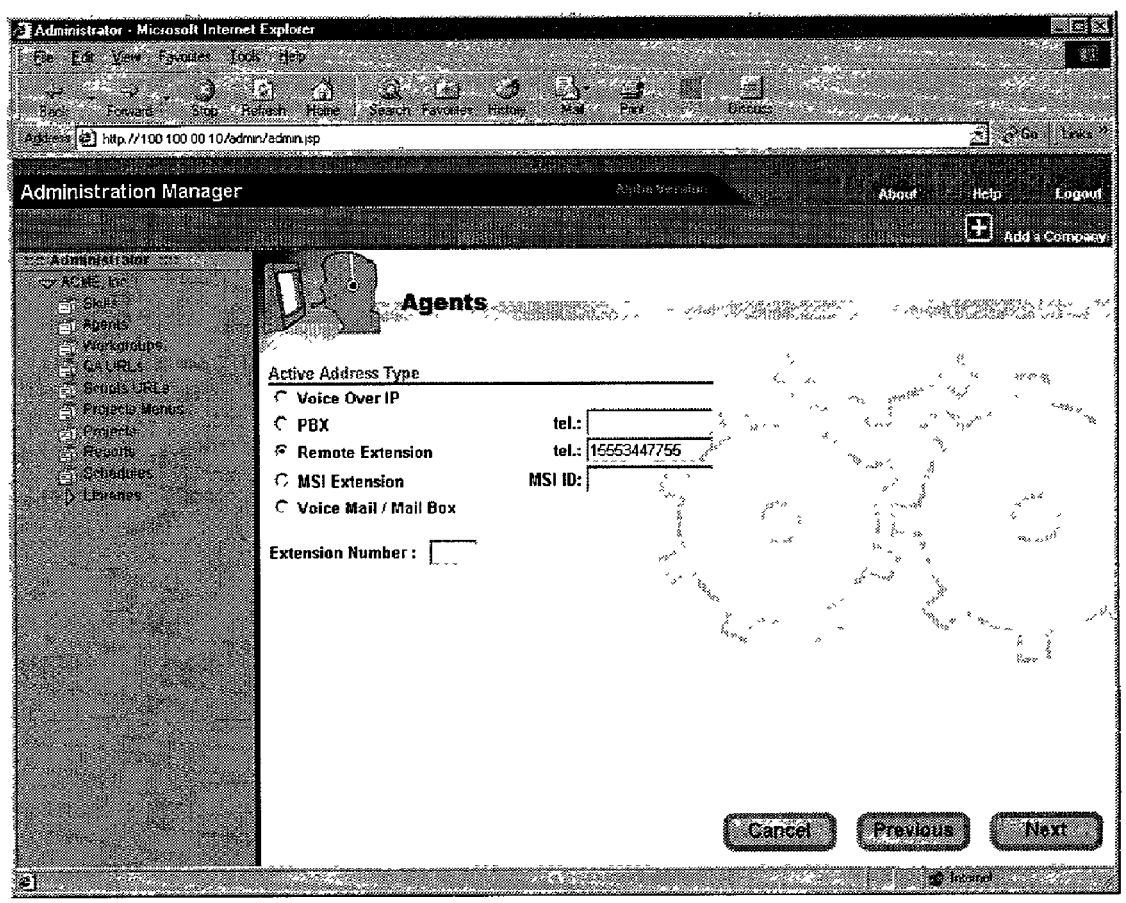

FIG. 19 illustrates creating a virtual extension. The corresponding steps are as follows:

1. From the main left-hand column, select the Company with Agents to be modified;

2. Click on the Agents tab under the Company selected;

3. Right-click on the Agent to be modified, and click on Telephone Extension;

4. Select the Remote Extension radio button;

5. Enter the remote telephone number in the Remote Tel # field; (this number can be an ordinary telephone number or a cell phone number; if it is necessary to dial an international number, or a national or an area code when calling this number from the location of the server, enter those same codes in this field; do not enter a prefix (e.g., "9") for dialing out; when the telephone rings, a message will play asking the user to confirm acceptance of the call);

6. Enter the extension number in the Extension Number field;

7. If creating an Agent, click Next; for an Agent modification, click Apply.

Virtual extensions preferably do not begin with the same DTMF as the call center uses to indicate outbound calls.

Figure 20:
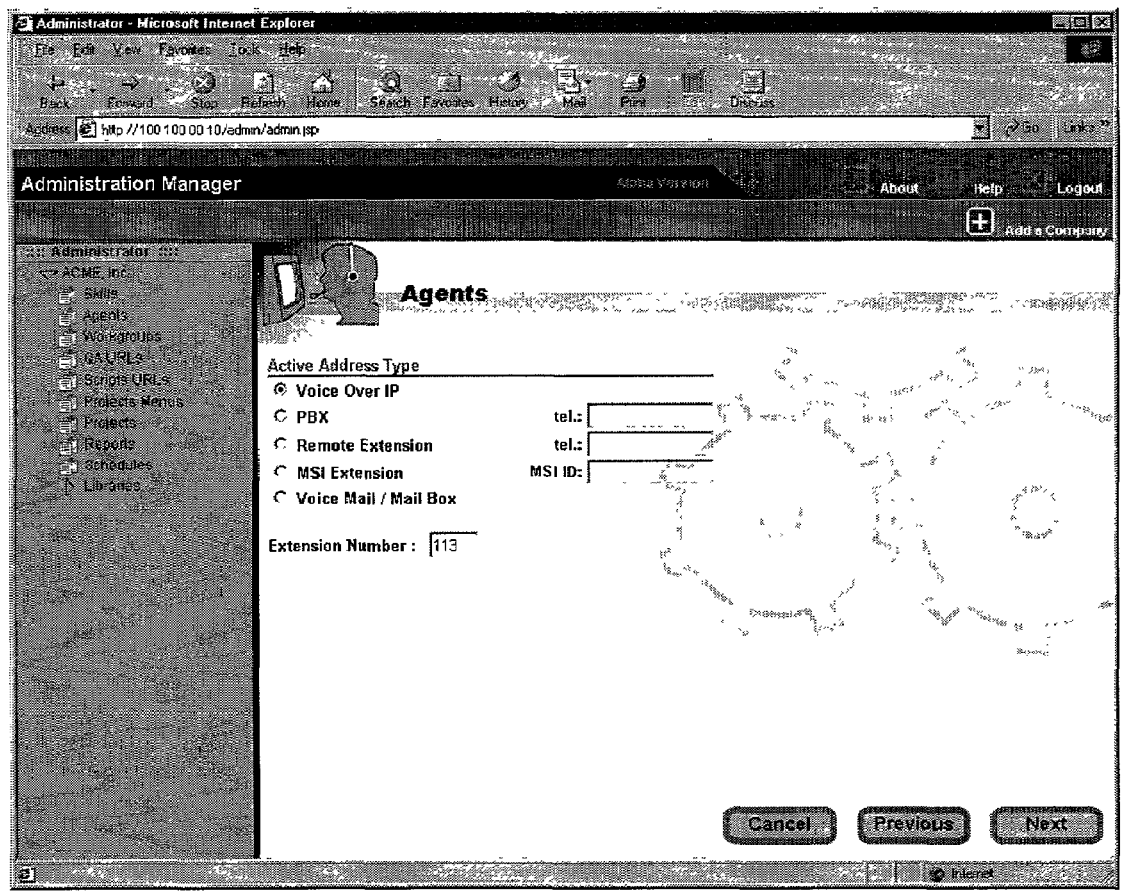
Figure 21:
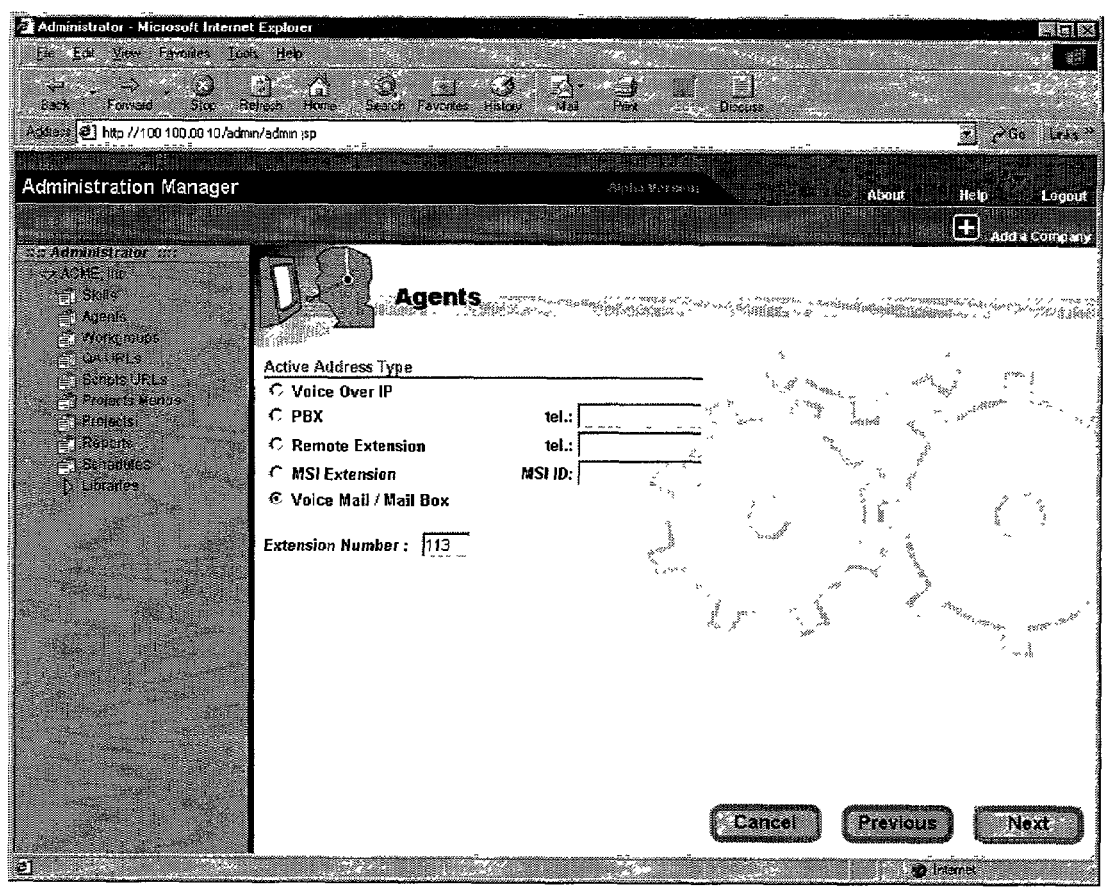
Figure 22:
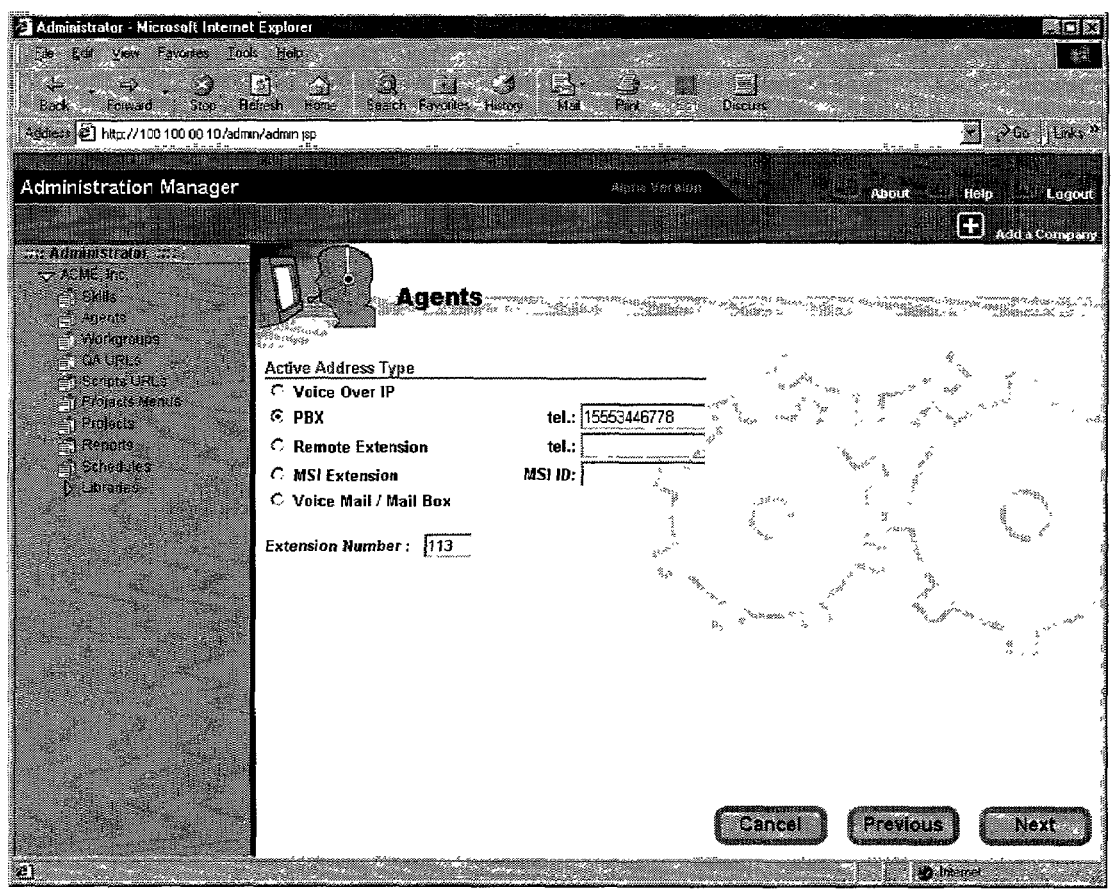

FIG. 20 illustrates creating a VoIP extension in a VoIP-enabled system. The corresponding steps are as follows:

1. From the main left-hand column, select the Company with Agents to be modified;

2. Click on the Agents tab under the Company selected;

3. Right-click on the Agent to be modified, and click on Telephone Extension;

4. Select the Voice Over IP radio button;

5. Enter the extension number in the Extension Number field;

6. If creating an Agent, click Next; for an Agent modification, click Apply;

FIG. 21 illustrates creating a voice mail extension, and allows an Agent's calls to be routed directly to the Agent's Mail Box. The steps for creating a voice mail extension are as follows:

1. From the main left-hand column, select the Company with Agents to be modified;

2. Click on the Agents tab under the Company selected;

3. Right-click on the Agent to be modified, and click on Telephone Extension;

2. Select the Voice Mail radio button;

5. Enter the extension number in the Extension Number field;

6. If creating an Agent, click Next. For an Agent modification, click Apply;

FIG. 22 illustrates creating a PBX extension. The corresponding steps are as follows:

1. From the main left-hand column, select the Company with Agents to be modified;

2. Click on the Agents tab under the Company selected;

3. Right-click on the Agent to be modified, and click on Telephone Extension;

2. Select the PBX radio button and enter a telephone number in the tel. field;

5. Enter the extension number in the Extension Number field;

6. If creating an Agent, click Next; for an Agent modification, click Apply.

Figure 23:
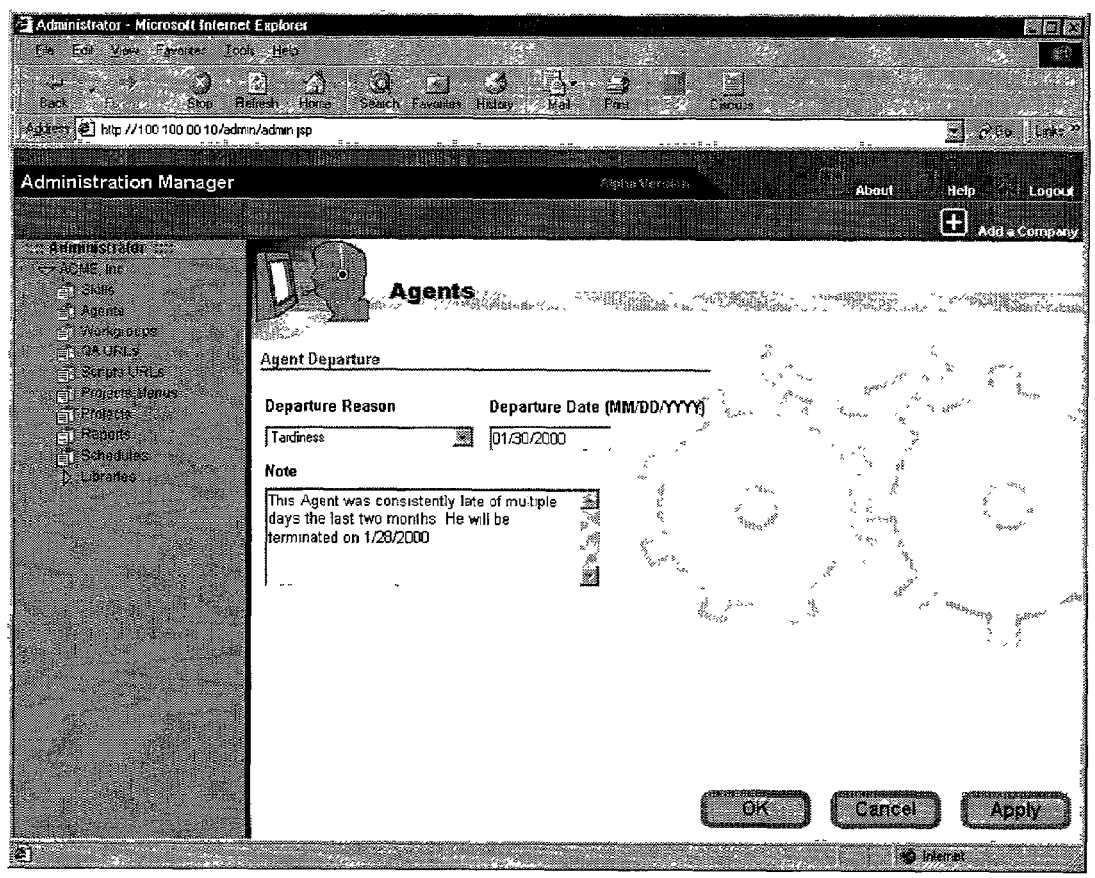

When an agent-employee leaves the Company, the Administration Manager allows the Company to document the time of and the reason for the departure. This is illustrated in FIG. 23. The steps for documenting the departure are as follows:

1. Select the Company from which an Agent has departed from the main left-hand column;

2. Click on the Agents tab under the Company selected;

3. Right-click on the Agent who has departed, and click on User Departure Reason;

4. Select a Departure Reason from the Departure Reasons in the drop-down list (the list is compiled from the Agent Departure Reason Library discussed later in this document);

5. Enter the date of departure for the Agent in the Departure Date field;

6. Enter any notes about the Departure Reason in the Note window;

7. Click Apply to save the Departure Reason for that Agent; and

8. Click OK to return to the main Agent Window.

Figure 24:
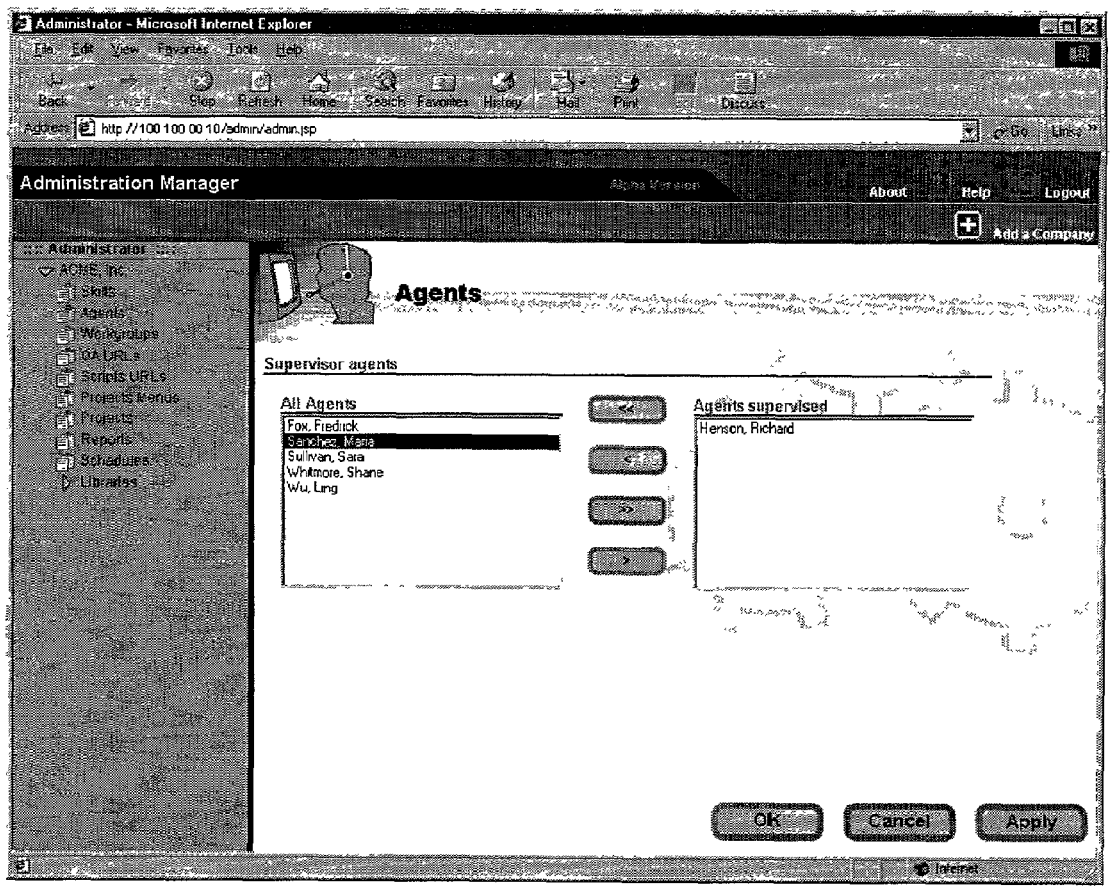

For each Company, the Administrator has the option of assigning Agents to a designated Supervisor who will be able to view the assigned Agents' screens. FIG. 24 illustrates assignment of Agents to a Supervisor, i.e., modification of Supervisor Rights, with the corresponding steps being as follows:

1. From the main left-hand column, select the Company in which Supervisor Rights are to be modified;

2. Click on the Agents tab under the Company selected;

3. Right-click on the Supervisor whose rights are to be modified and then click on Supervisor/Agents;

4. From all the Agents listed in the left of the All Agents window, select the corresponding Agents for that Supervisor by clicking on the Agent and then clicking the > button;

5. The Agents appearing in the right Agents Supervised window are the Agents being viewed by the selected Supervisor; to add all the Agents to a specified Supervisor, click the >> button; and 6. Click Apply and OK to return to the main Agent window.

Figure 25:
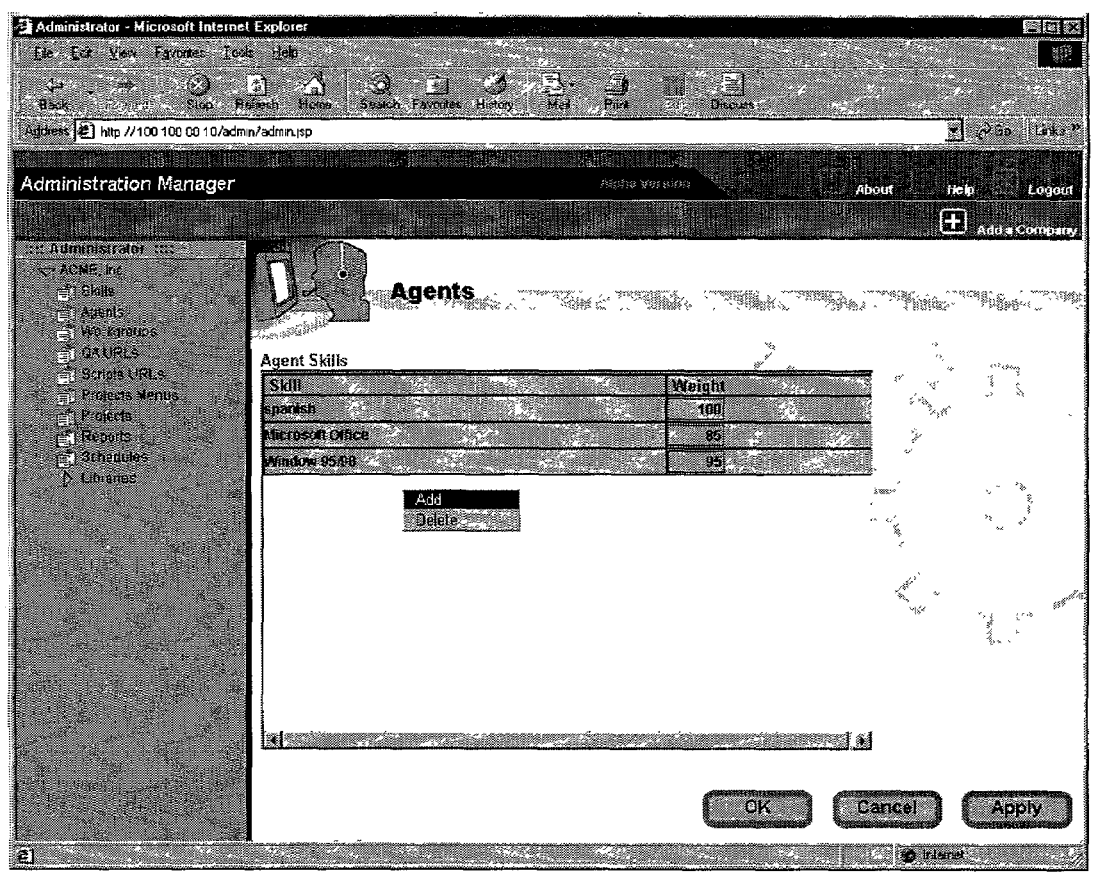

FIG. 25 illustrates the following steps performed during addition of Skills to an Agent:

1. From the main left-hand column, select the Company in which skills of Agents are to be modified;

2. Click on the Agents tab under the Company selected;

3. Right-click on the Agent to be modified, and click on Agent Skills;

4. Right-click in the Skill Window and click on Add;

5. Select a Skill to add to that Agent from the New Skill drop-down list;

6. Select a Weight for that Skill (1-100) and enter it into the Weight field;

7. Repeat steps 4-6 to add more Skills for that Agent;

8. Click the Apply button to save the changes, and click OK to return to the main Agent window.

Figure 26:
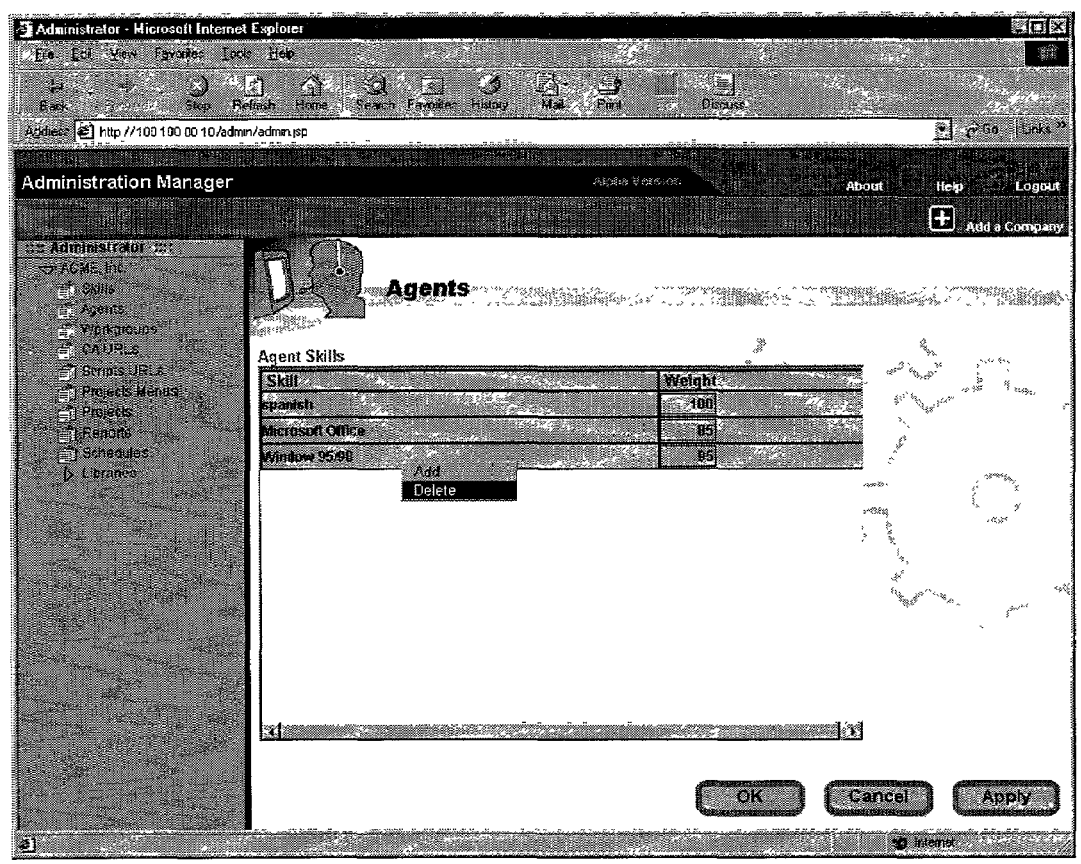

FIG. 26 illustrates the task of deleting Skills from an Agent. The task involves eight steps:

1. From the main left-hand column, select the Company in which Agent Skills are to be deleted;

2. Click on the Agents tab under the Company selected;

3. Right-click on the Agent whose Skill is to be deleted, and click on Agent Skills;

4. Right-click in the Skill Window on the Skill that is to be deleted, and click on Delete; the Skill will be removed from that Agent;

5. Repeat steps 3-4 to delete additional Skills for each Agent, as needed; and

6. Click the Apply button to save changes, and click OK to return to the main Agent window.

Figure 27:
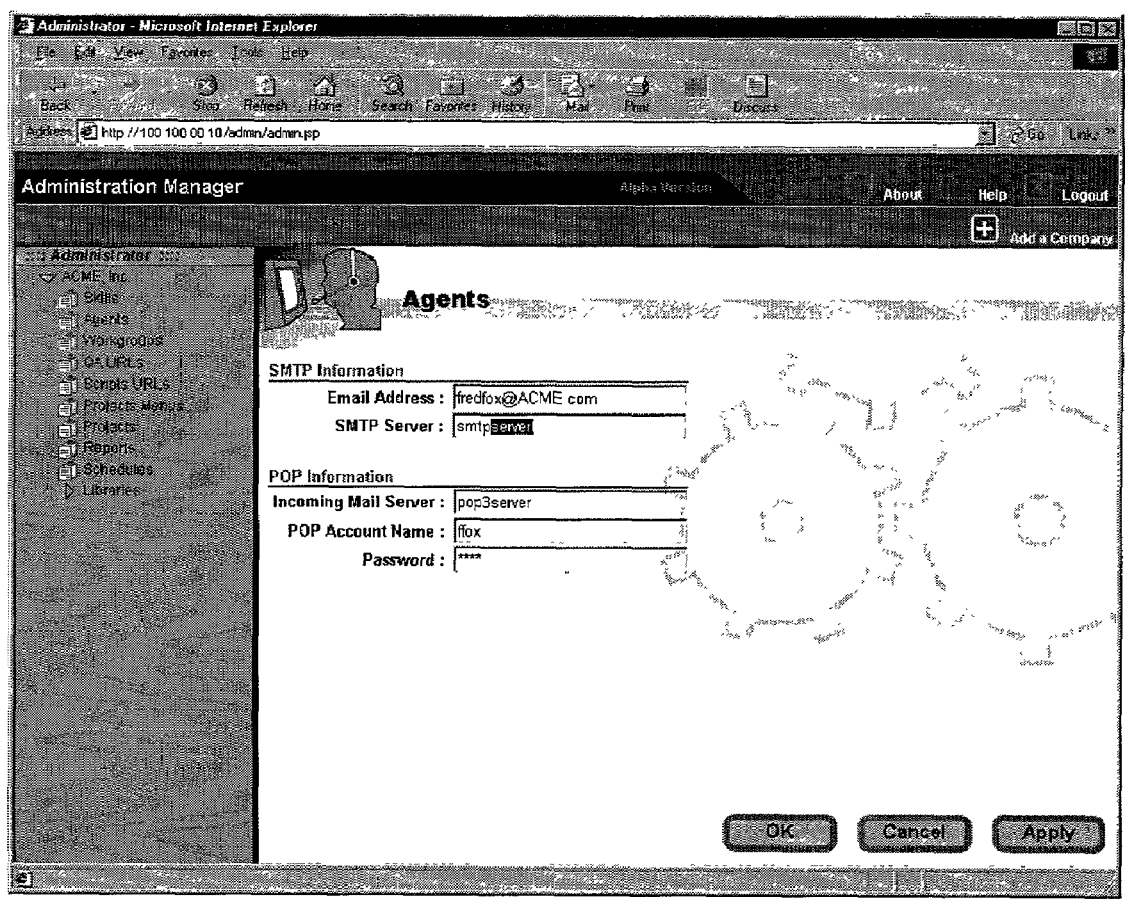

FIG. 27 illustrates modifying an Agent's email parameters. The steps involved are listed below:

1. From the main left-hand column, select the Company to be modified;

2. Click on the Agents tab under the Company previously selected;

3. Right-click on the Agent to be modified, and click on Agent Email;

4. Make any necessary changes to the Agent's Email information;

5. Click the Apply button to save the changes, and click OK to return to the main Agent Window.

Configuring the Call Follow Me parameter for an Agent provides callers with the option of reaching the corresponding Agent at remote numbers. The person configuring this option should consider whether or not these numbers require any toll, long distance, or international prefixes when dialed from the Call Center. That is, for example, if it is necessary for the user to dial a "1" and the area code preceding a certain number when dialed from the Call Center, the number entered in the Follow Me fields should also contain these prefixes.

Figure 28:
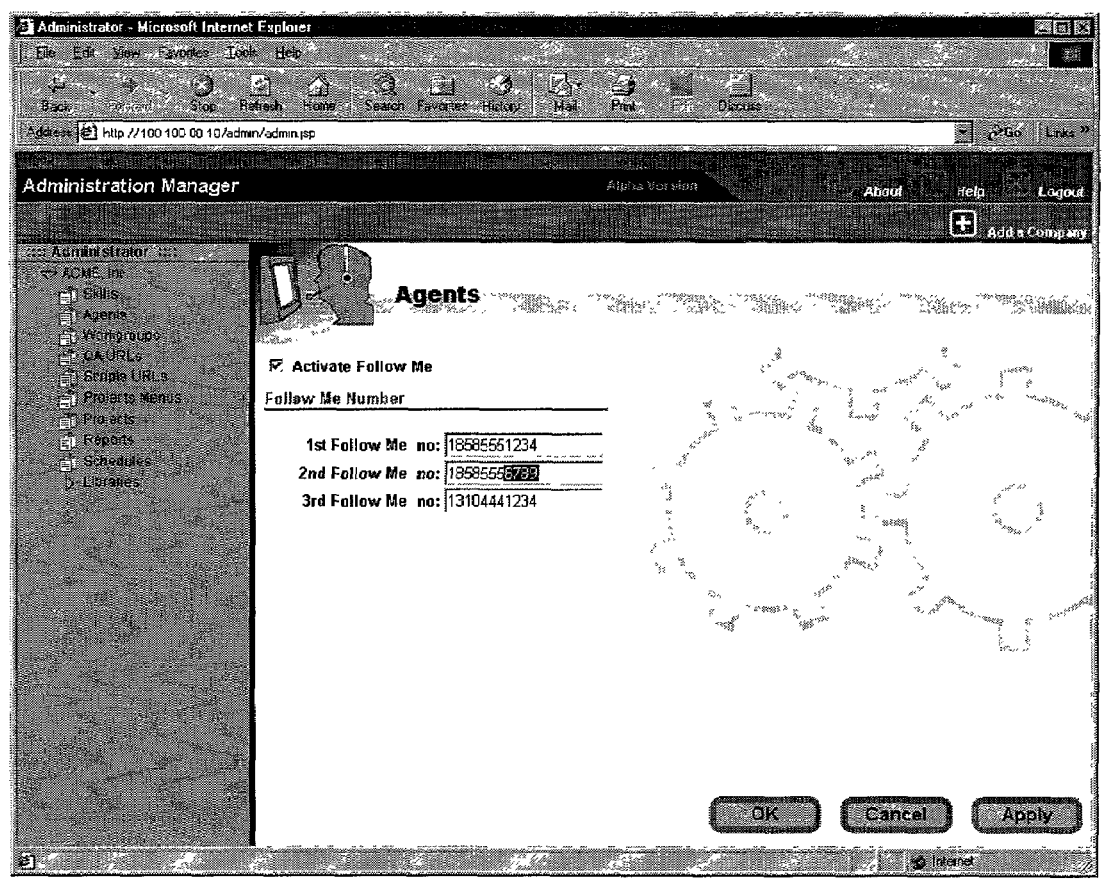

Modifying an Agent's Call Follow Me assignment is illustrated in FIG. 28. The following steps need to be performed to accomplish this process:

1. From the main left-hand column, select the Company to be modified;

2. Click on the Agents tab under the Company selected;

3. Right-click on the Agent to be modified, and click on Agent Follow;

4. Make any necessary changes to the Agent's Follow Me Information;

5. Click the Apply button to save the changes, and click OK to return to the main Agent Window.

Figure 29:
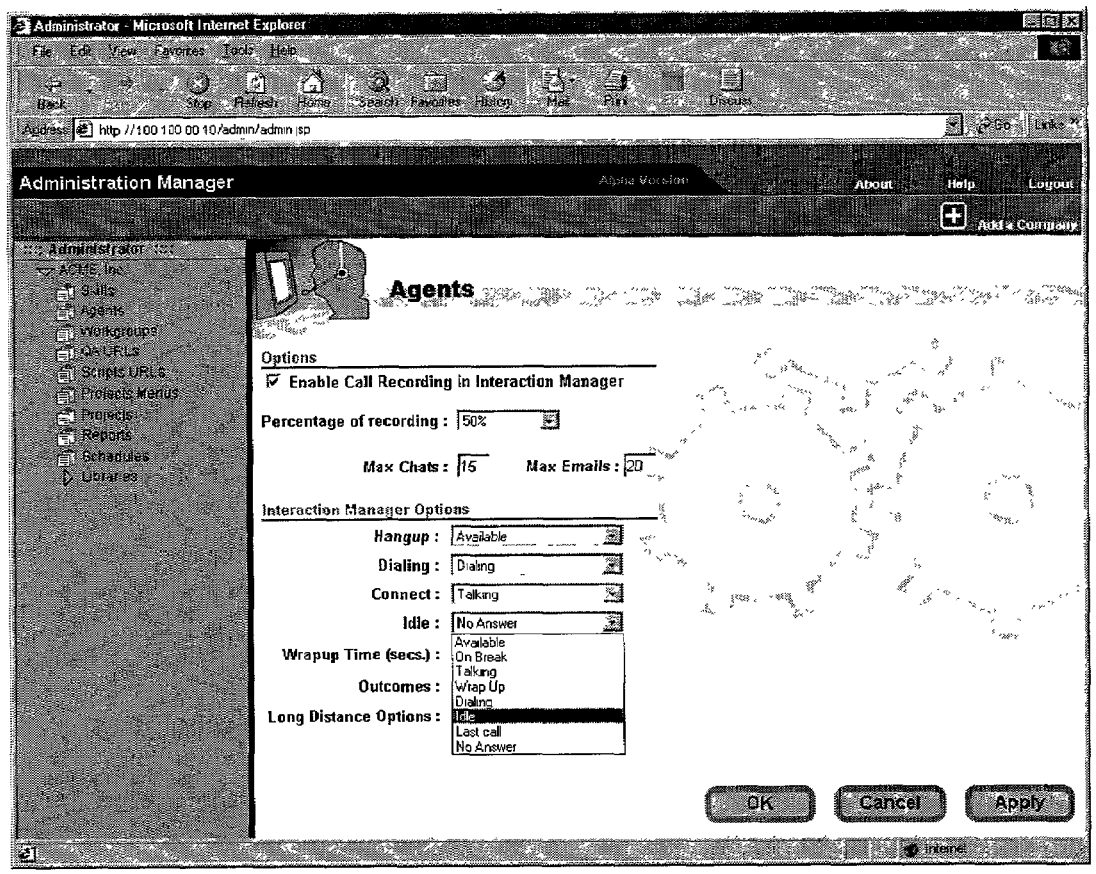

The Interaction Manager Options allow configuring of individualized options for an Agent's Interaction Manager interface. Modifying Agent options, including the Interaction Manager Options, is illustrated in FIG. 29. Five fields relating to Agent status allow the Administrator to designate the status that is displayed during various events. For example, the default status that is displayed when an Agent is connected to a client is "Talking". This status conveys to the system that the Agent is busy, and is not available to take another call. The Agent can view this status designation at the bottom of his or her Interaction Manager browser. The Agent's supervisor can view this status information alongside other information regarding the corresponding Agent in the Supervision Manager's browser. An Administrator may change the default status selections, but should keep in mind that certain key status names communicate commands to the system because they change internal logic states of the Call Center. When such a change is made, the agent may have to select manually the appropriate option via the Interaction Manager. In other words, the agent can select a new status by clicking the "Available" or "On Break" buttons, or by making a selection from the "Change Status" button on the Call Control tab.

The Wrapup Time field allows the Administrator to assign the length of time an Agent may use to "wrap up" the interaction, e.g., write up necessary paperwork. Once this time limit has expired, the Agent's status will be automatically changed to "Available," which means that new interactions may be directed to the Agent.

The Outcomes check-box allows the Administrator to choose whether or not the selected Agent has access to the Outcomes window in the Interaction Manager.

The Long Distance Options section allows the Administrator to enable or disable an Agent to make long distance calls.

The following five steps are performed to modify Agent options:

1. From the main left-hand column, select the Company in which options of an Agent are to be modified;

2. Click on the Agents tab under the Company selected;

3. Right-click on the Agent to be modified, and click on Agent Options;

4. Make any necessary changes to the Agent's Options Information;

5. Click the Apply button to save the changes, and click OK to return to the main Agent Window.

Figure 30:
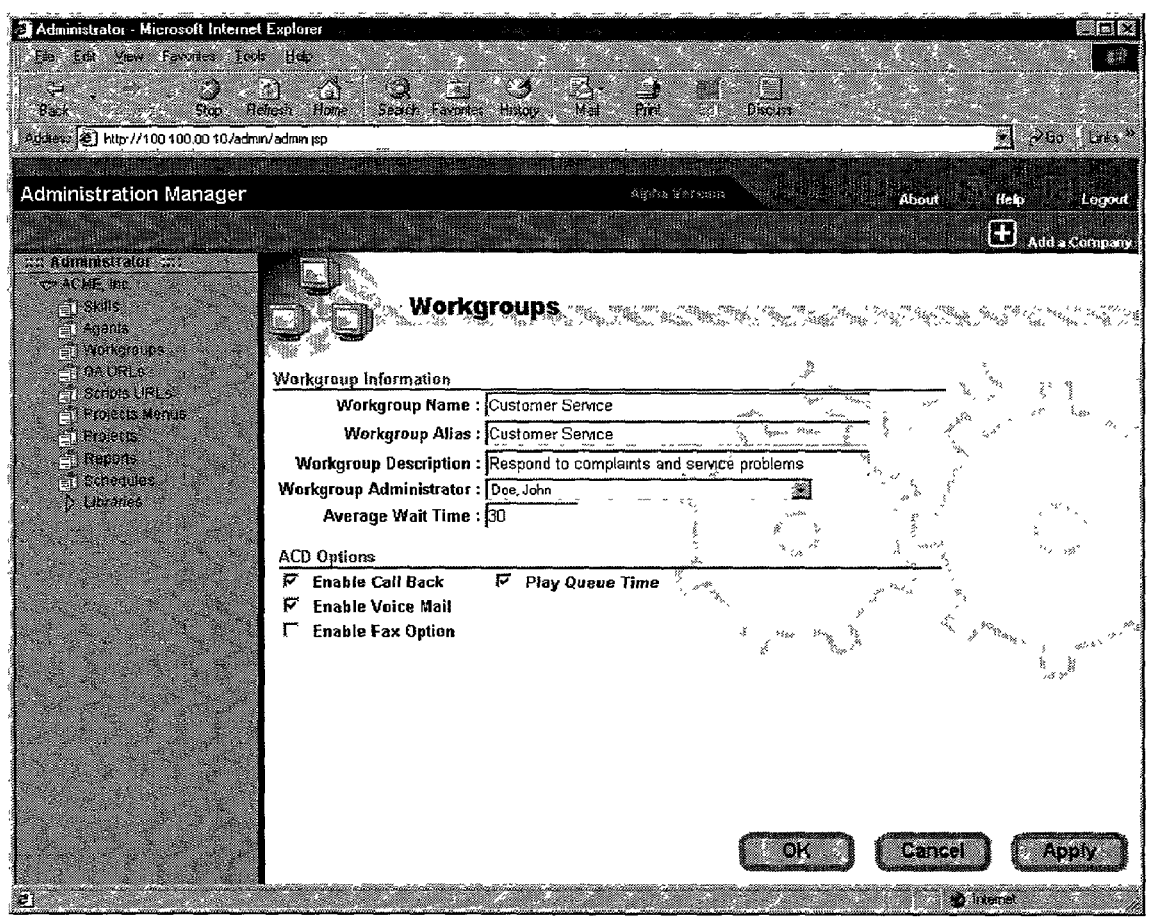

A Workgroup object is a set of Agent objects sharing some parameter or corresponding to individual Agents with common work assignment. Adding a workgroup to a Company involves the following steps, illustrated in FIG. 30:

1. From the main left-hand column, select the Company to add a workgroup to;

2. Click on the Workgroups tab under the Company selected;

3. Right-click in the Workgroup window, and click on Add Workgroup;

4. Enter a name for the Workgroup in the Workgroup Name field;

5. Enter a name for the Workgroup Alias in the Workgroup Alias field;

6. Enter a brief description of the Workgroup into the Workgroup Description field;

7. Designate a Workgroup Administrator by selecting one from the Workgroup Administrator drop-down list (this list is compiled from the list of Agents; to edit to this list, simply add or delete Agents from the Agents tab);

8. Enter a length of time to be allowed for the Average Wait Time of each call;

9. For the ACD options, click all the check boxes that apply to the Workgroup (e.g., if a Queue Time message is to be played, select that check box);

10. Click Apply to save the Workgroup, and click the OK button to return to the Workgroup Window.

Predetermined types of calls can be evenly distributed among all the Agents in a workgroup. For example, all calls directed to "sales" can be routed to the Agents in the "Sales" workgroup so that an Agent in the workgroup who has not received a call for the longest period will always receive the next inbound call, provided that the Agent's line is free and the Agent is available when the call comes in.

Calls on a "direct-dial" telephone number can be routed directly to a workgroup using the Routing sub-tab located on the Phone section of the Projects tab. To achieve that, simply specify the telephone number that the callers will dial, or another type of physical channel, and define the Workgroup.

Figure 31:
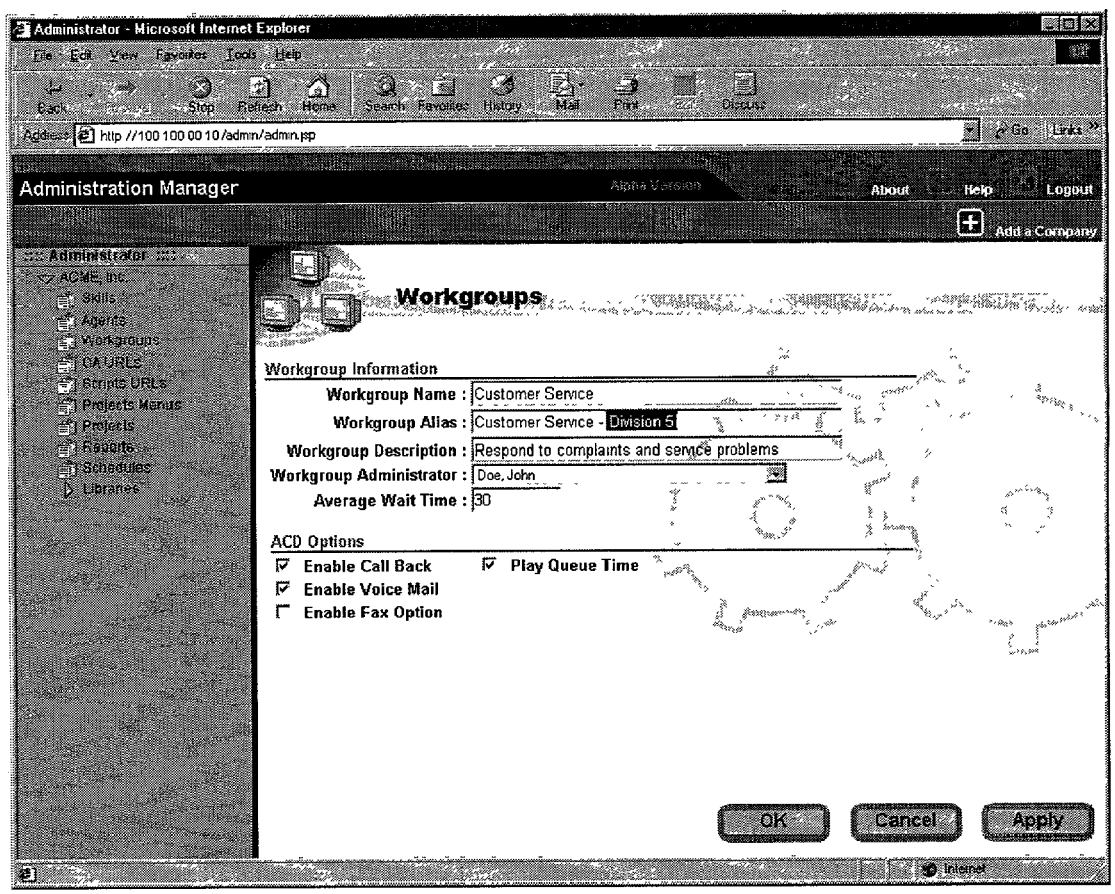

Modifying a Workgroup is illustrated in relation to FIG. 31. The process for modifying a Workgroup is as follows:

1. From the main left-hand column, select the Company in which a Workgroup is to be modified;

2. Click on the Workgroups tab under the Company selected;

3. Right-click on the Workgroup to be modified, and click on Edit Workgroup;

4. Make any necessary changes to the Workgroup Information;

5. Click Apply to save the changes made and click OK when complete to return to the main Workgroup window.

Figure 32:
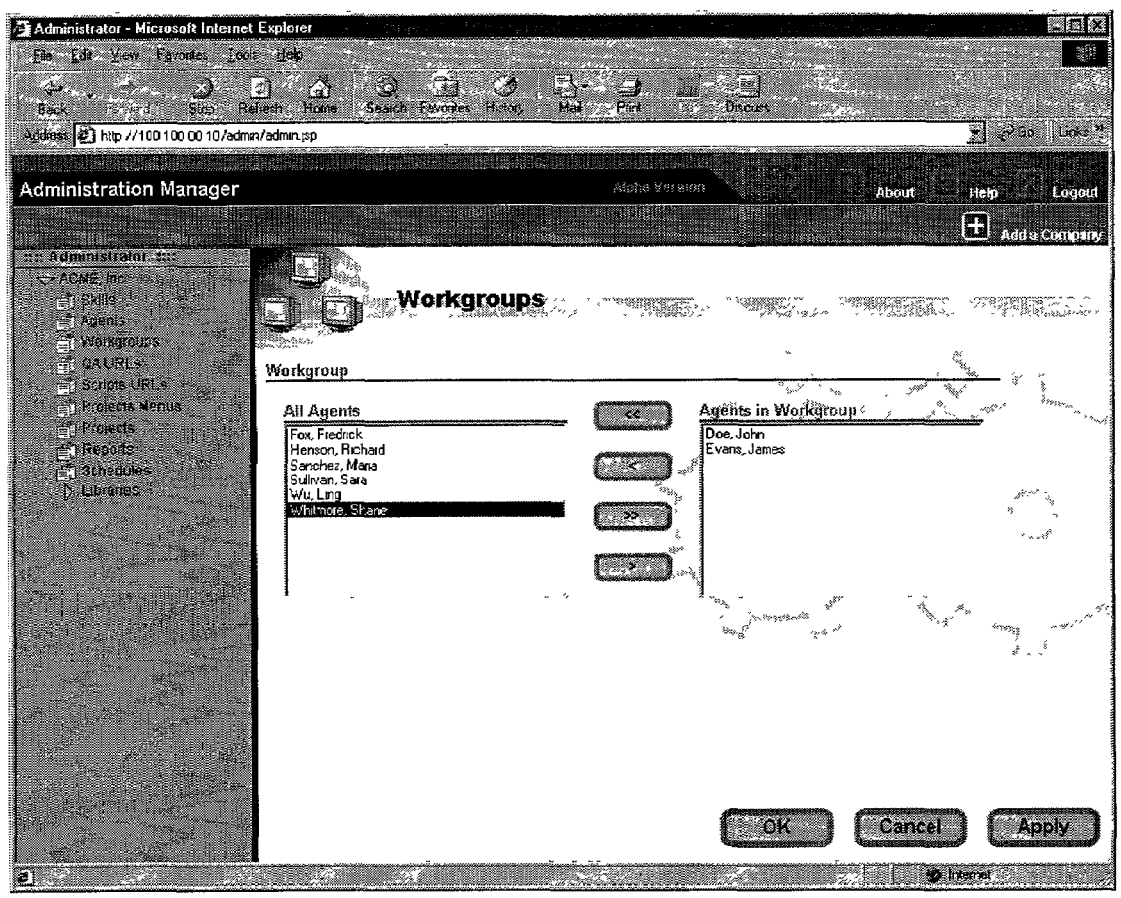

Adding Agents to a Workgroup is illustrated in FIG. 32. The process for adding Agents is as follows:

1. From the main left-hand column, select the Company in which Agents are to be added to a Workgroup;

2. Click on the Workgroups tab under the Company selected;

3. Right-click on the Workgroup to be modified, and click on Workgroup Agents;

4. Select an Agent from the list of All Agents;

5. Click the right-facing arrow (>) button to add an Agent to the list of Agents in the Workgroup;

6. Repeat steps 6-7 to add more Agents to the Workgroup;

7. Click Apply to save the changes and click OK to return to the main Workgroup window.

Figure 33:
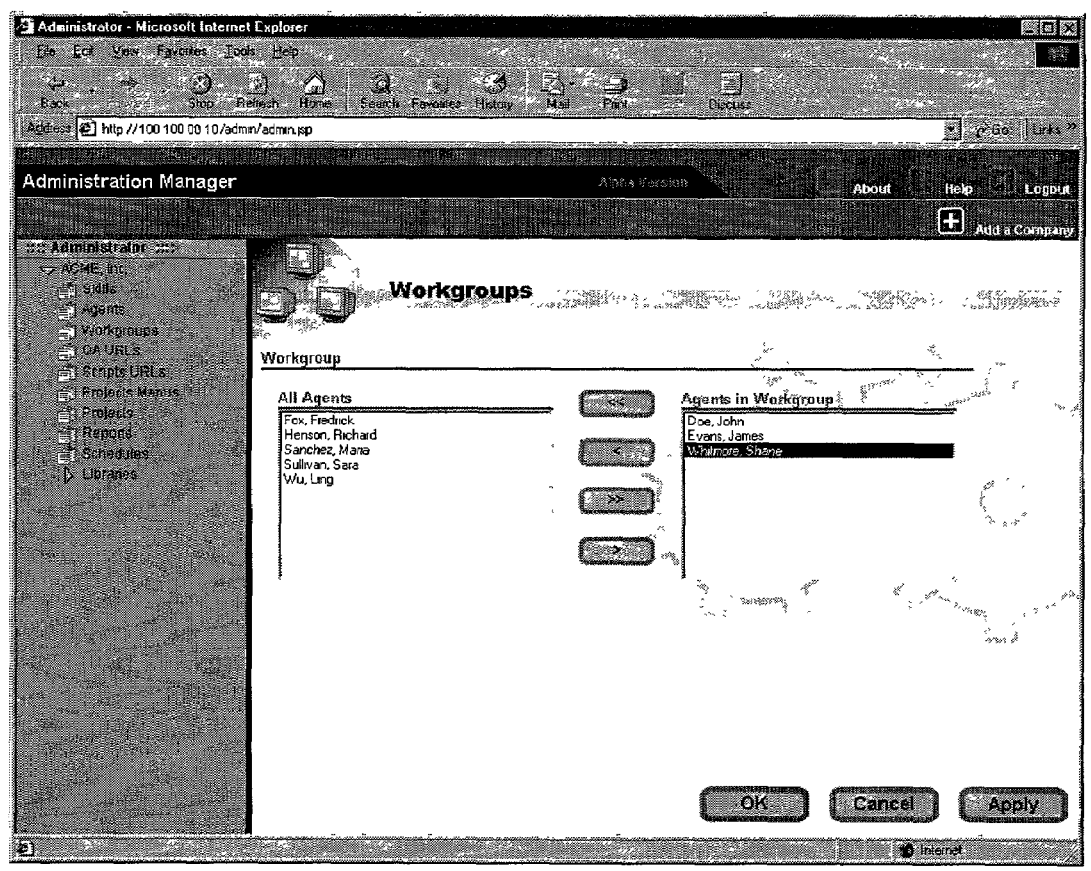

Removing Agents from a Workgroup is illustrated in FIG. 33. The process for removing Agents is as follows:

1. From the main left-hand column, select the Company in which an Agent is to be removed from a Workgroup;

2. Click on the Workgroups tab under the Company selected;

3. Right-click on the Workgroup to be modified, and click on Workgroup Agents;

4. Select an Agent from the list of Agents in the Workgroup;

5. Click the left-facing arrow (<) button to remove the Agent from the list of Agents in the Workgroup;

6. Repeat steps 6-7 until to delete more Agents from the Workgroup;

7. Click Apply to save the changes and click OK to return to the main Workgroup window.

Figure 34:
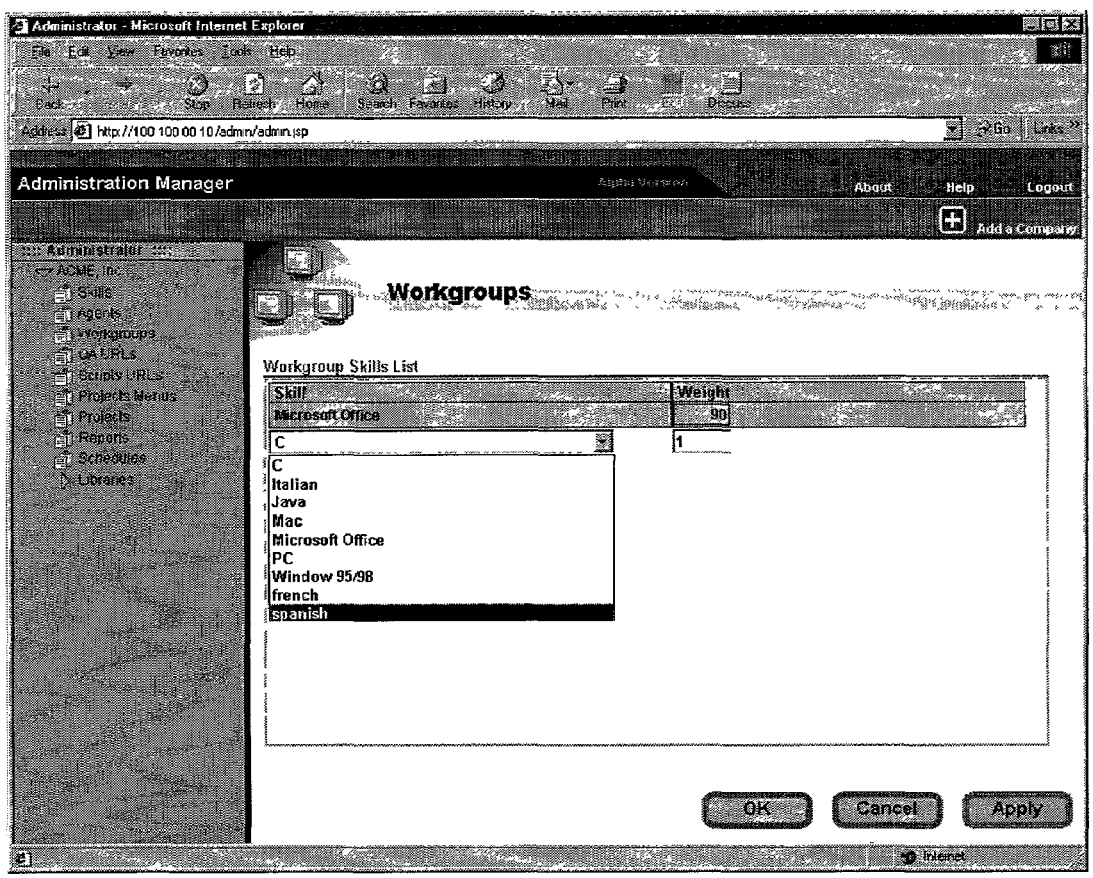
Figure 35:
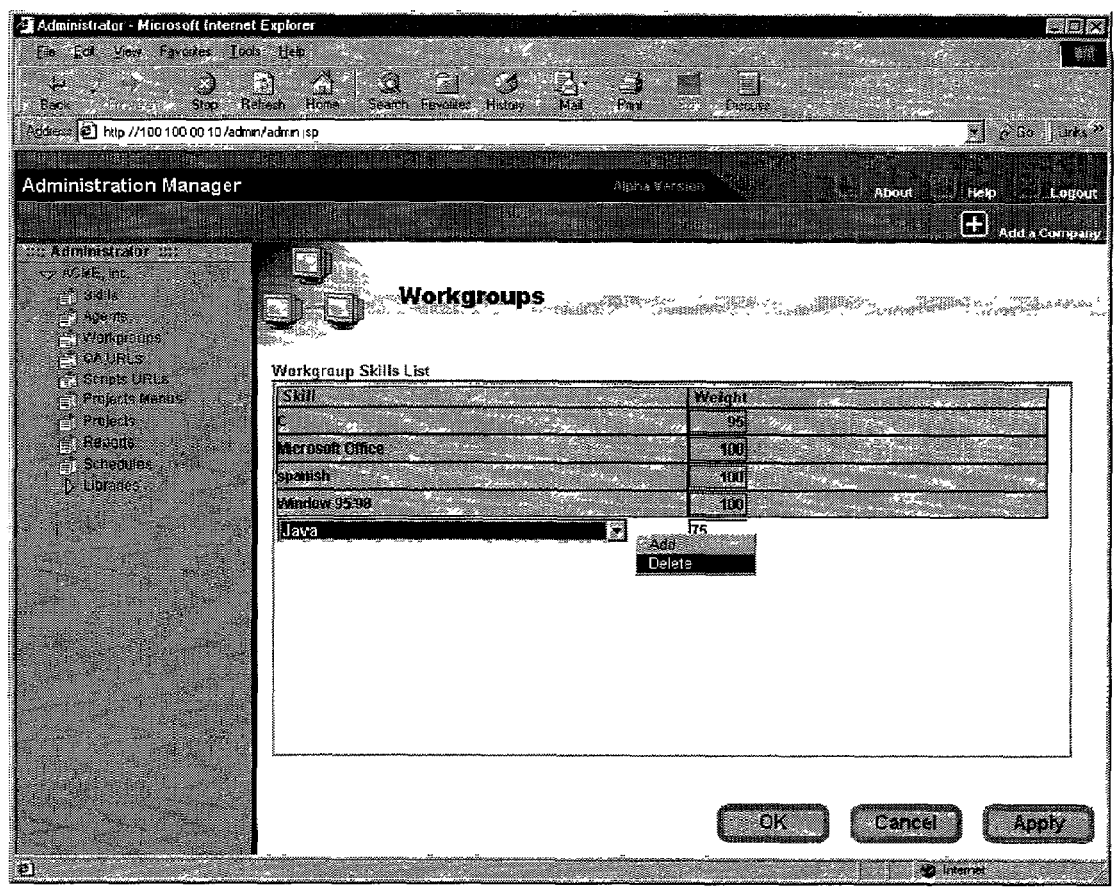

Addition of Skills to a Workgroup and deletion of Skills from a Workgroup are illustrated in FIGS. 34 and 35, respectively. These functions change the Skills in the affected Workgroup. Note that the total value of the Skills in a Workgroup should equal 100 percent.

The process for adding Skills is as follows:

1. From the main left-hand column, select the Company to be modified;

2. Click on the Workgroups tab under the Company selected;

3. Right-click on the Workgroup to be modified, and click on Workgroup Skills;

4. Right-click in the Skill Window and click on Add;

5. Select a Skill from the New Skill drop-down list, which is compiled from the Skills tab;

6. Enter a Value for that Skill from 1-100 in the Weight field;

7. Repeat steps 4-6 until all appropriate Skills have been added.

The process for deleting Skills from a Workgroup is as follows:

1. From the main left-hand column, select the Company to be modified;

2. Click on the Workgroups tab under the Company selected;

3. Right-click on the Workgroup to be modified, and click on Workgroup Skills;

4. Right-click on the Skill to be deleted and click on Delete;

5. A message will pop asking for a confirmation of the deletion request; click OK to delete the skill; and 6. Repeat steps 4-5 to delete more Skills, as needed.

Figure 36:
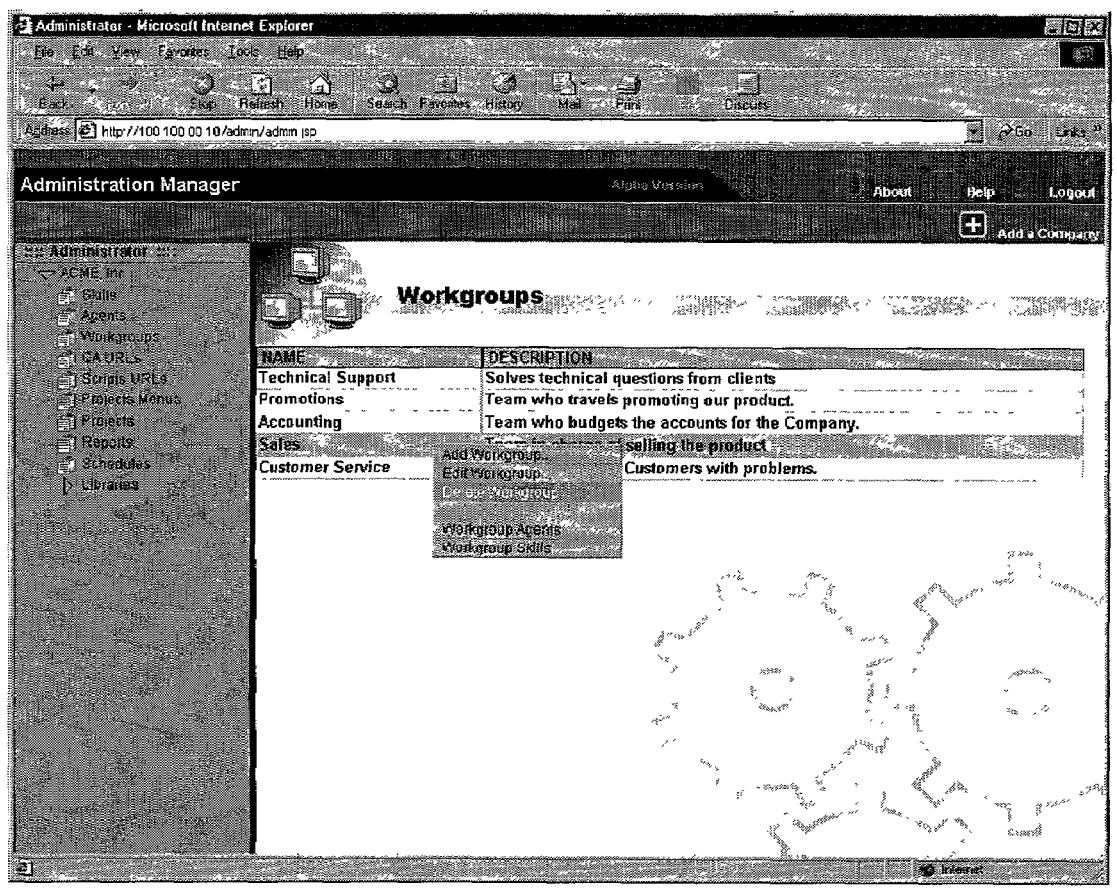

Deletion of a Workgroup is illustrated in FIG. 36. Note that the Agents of the deleted workgroup are not deleted. The process for deleting a Workgroup is as follows:

1. From the main left-hand column, select the Company from which a workgroup is to be deleted;

2. Click on the Workgroups tab under the Company selected;

3. Right-click on the Workgroup to be deleted, and click on Delete Workgroup;

4. A message will pop asking for a confirmation of the deletion request; click OK to delete the Workgroup.

Figure 37:
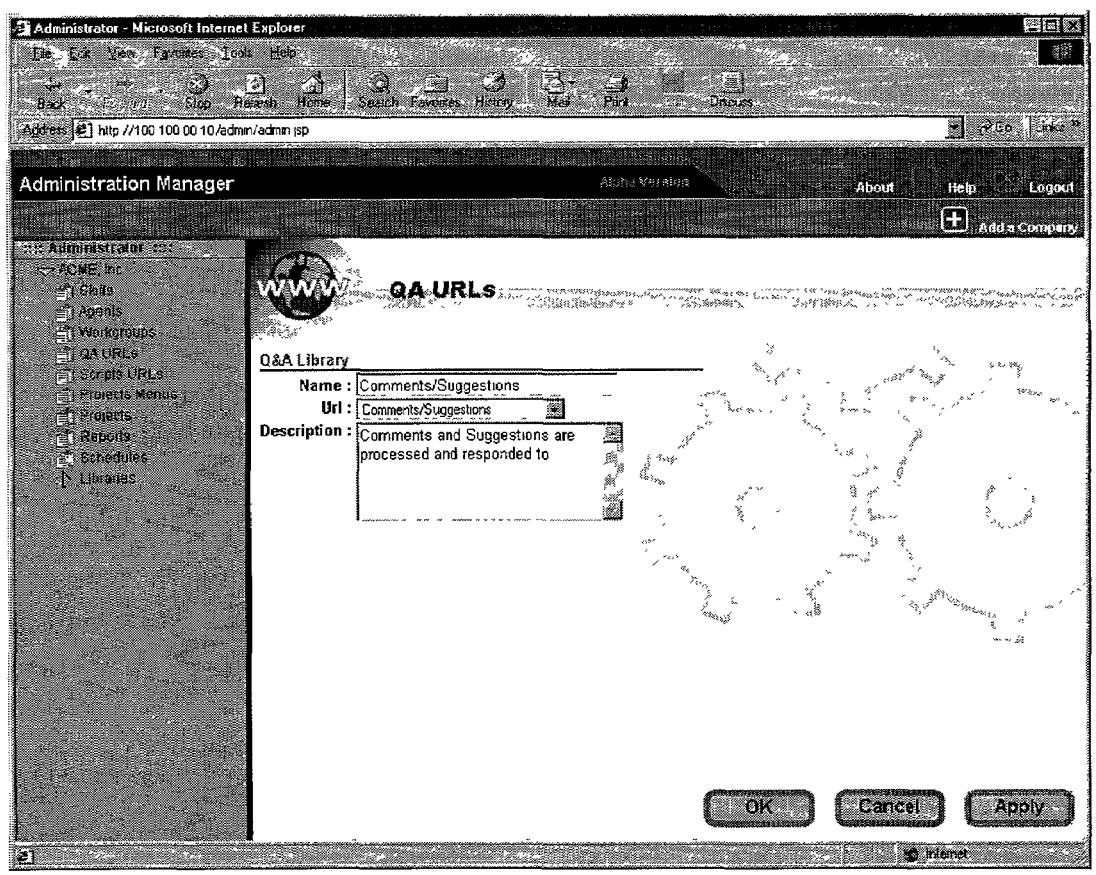
Figure 38:
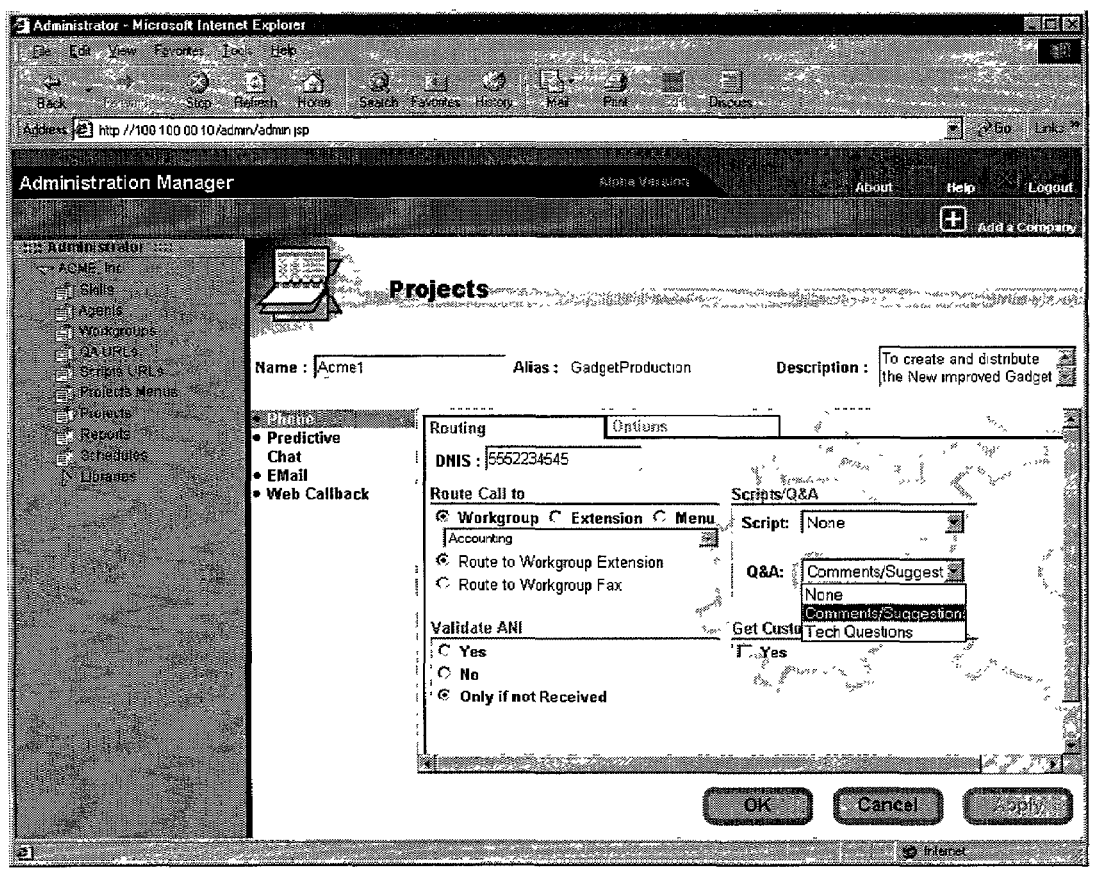

Q&A URLs define screen pop-up windows that can be used in a Call Flow object. (Call Flow will be explained later in this document.) In the Administration Manager, Q&A and other URLs must be created in the URL Library before they can be assigned to the Q&A URL tab. Creating a Q&A URL is illustrated in FIG. 37. Its use during Call Flow definition is illustrated in FIG. 38.

The process of creating Q&A URLs is as follows:

1. From the main left-hand column, select the Company in which a Q&A URL is to be added;

2. Click on the QA URLs tab under the Company selected;

3. Right-click in the QA URL Window, and click on Add QA URL;

4. Enter a name for the Q&A in the Name field;

5. Select from the list of URLs given by selecting one from the URL drop-down list;

6. Enter a description of the QA URL in the Description field;

7. Click Apply to save the changes and click OK to return to the main QA URLs Window.

Figure 39:
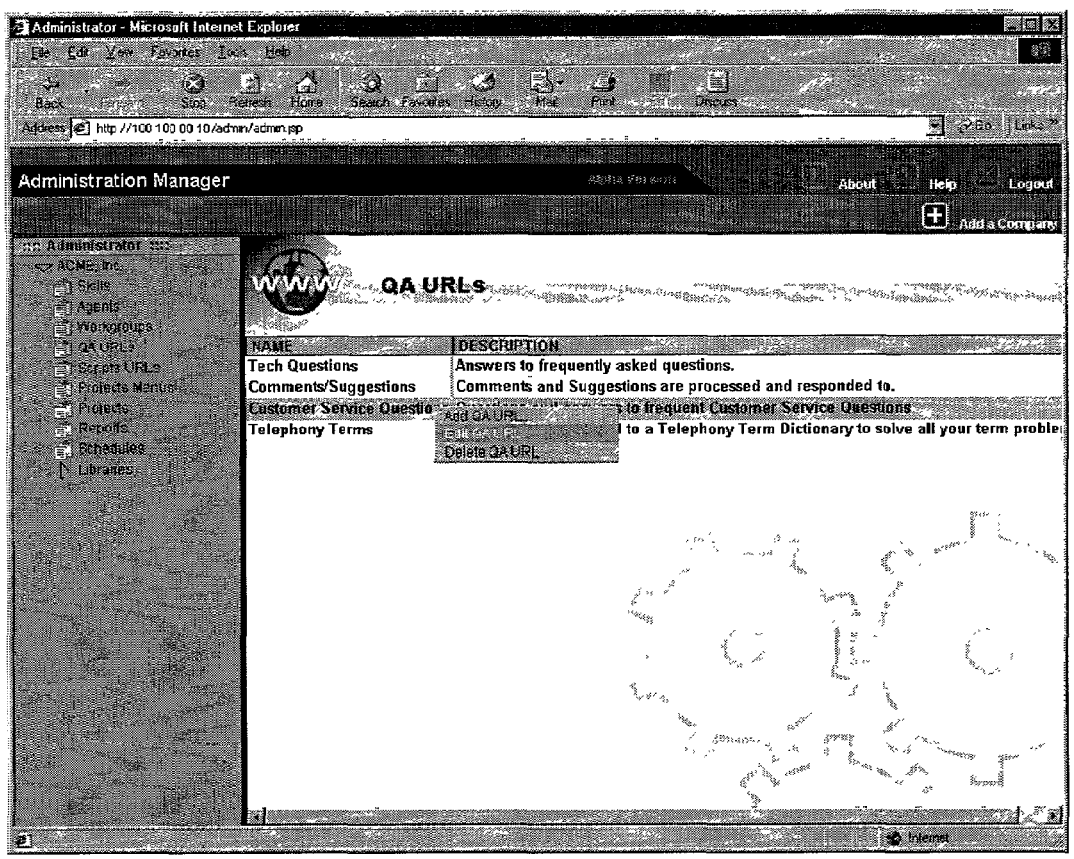

Modifying a Q&A URL is illustrated in FIG. 39. The Q&A modification process is as follows:

1. From the main left-hand column, select the Company in which a Q&A URL is to be modified;

2. Click on the QA URLs tab under the Company selected;

3. Right-click in the QA URL Window, and click on Edit QA URL;

4. Make any necessary changes to the Q&A URL;

5. Click Apply to save the changes and click OK to return to the main QA URLs Window.

Figure 40:
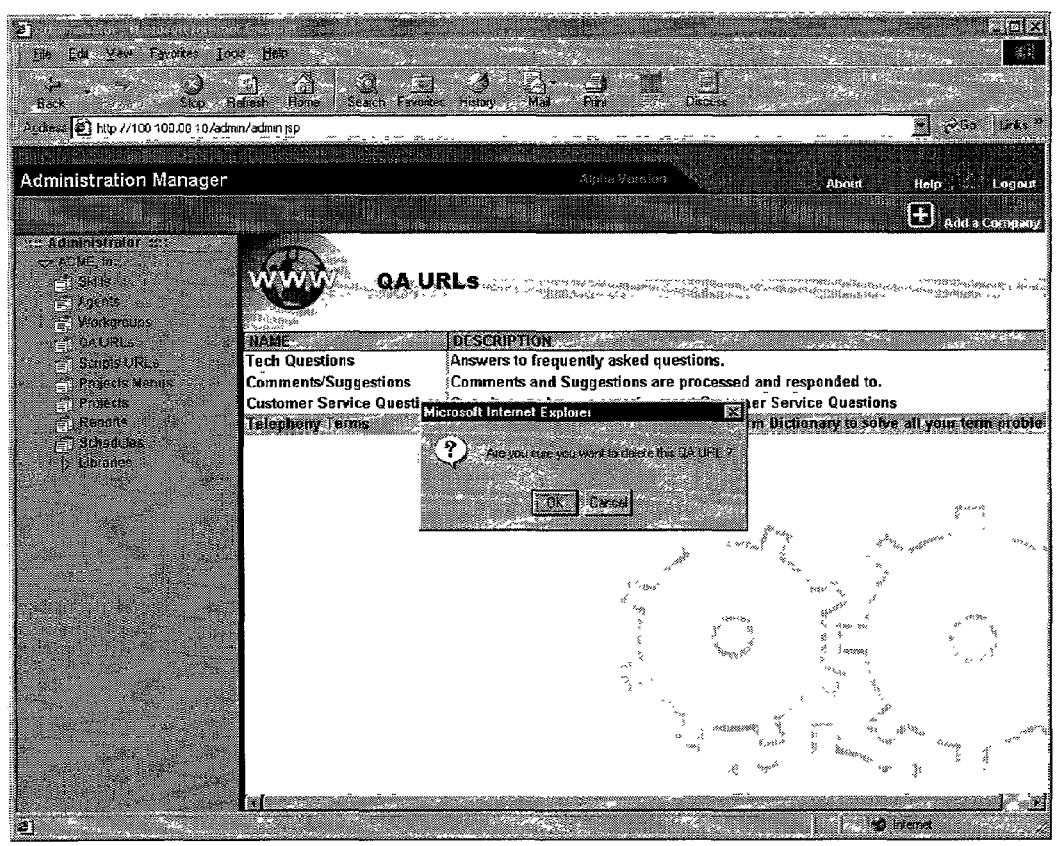

Deleting a Q&A URL is illustrated in FIG. 40. The deletion process is as follows:

1. From the main left-hand column, select the Company from which a Q&A URL is to be deleted;

2. Click on the QA URLs tab under the Company selected;

3. Right-click in the QA URL Window, and click on Delete QA URL;

4. A message will pop asking for a confirmation of the deletion request; click OK to delete the QA URL;

5. Click Apply to save the changes and click OK to return to the main QA URLs Window.

Script URLs, also known as Interaction Scripts, are also used in Call Flow objects. When creating a Call Flow under the Routing sub-tab (located on the Phone section of the Projects tab), Interaction Scripts and Q&A window pops can be associated with incoming calls.

Figure 41:
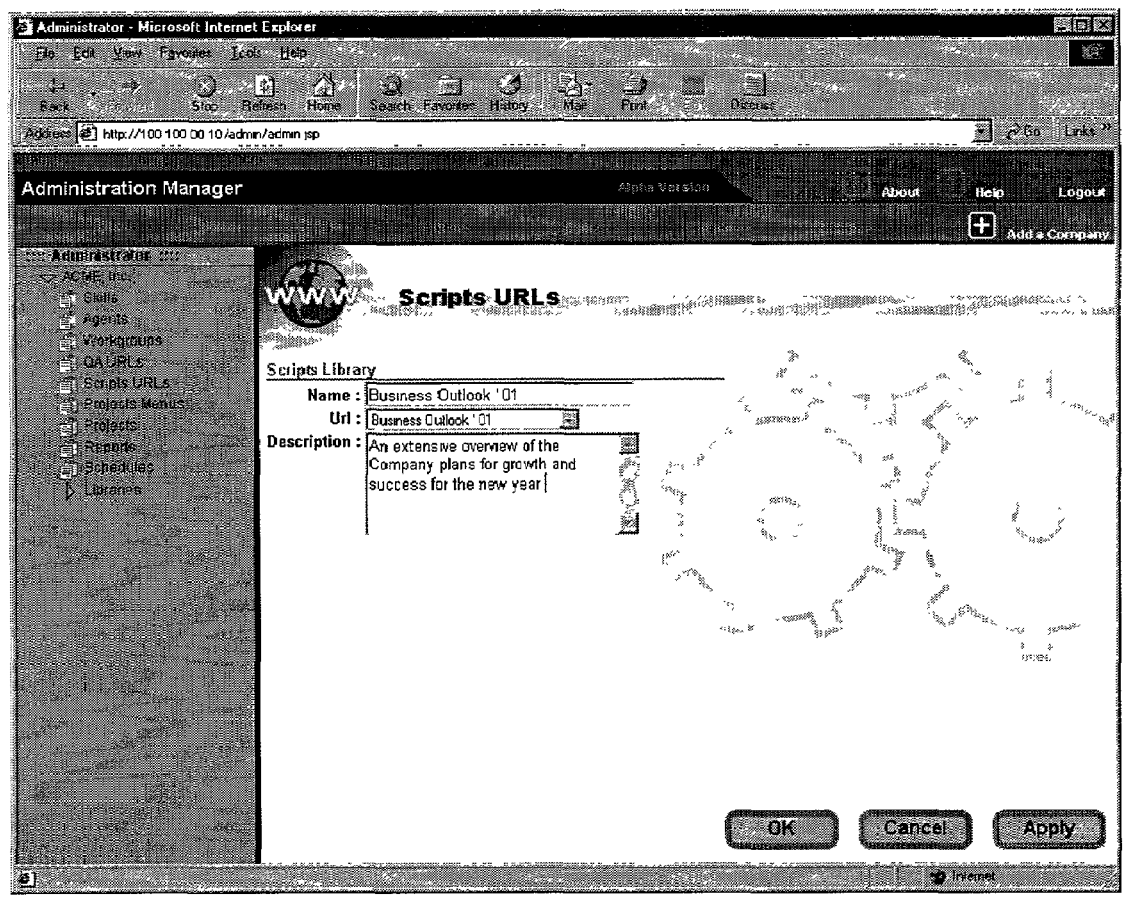
Figure 42:
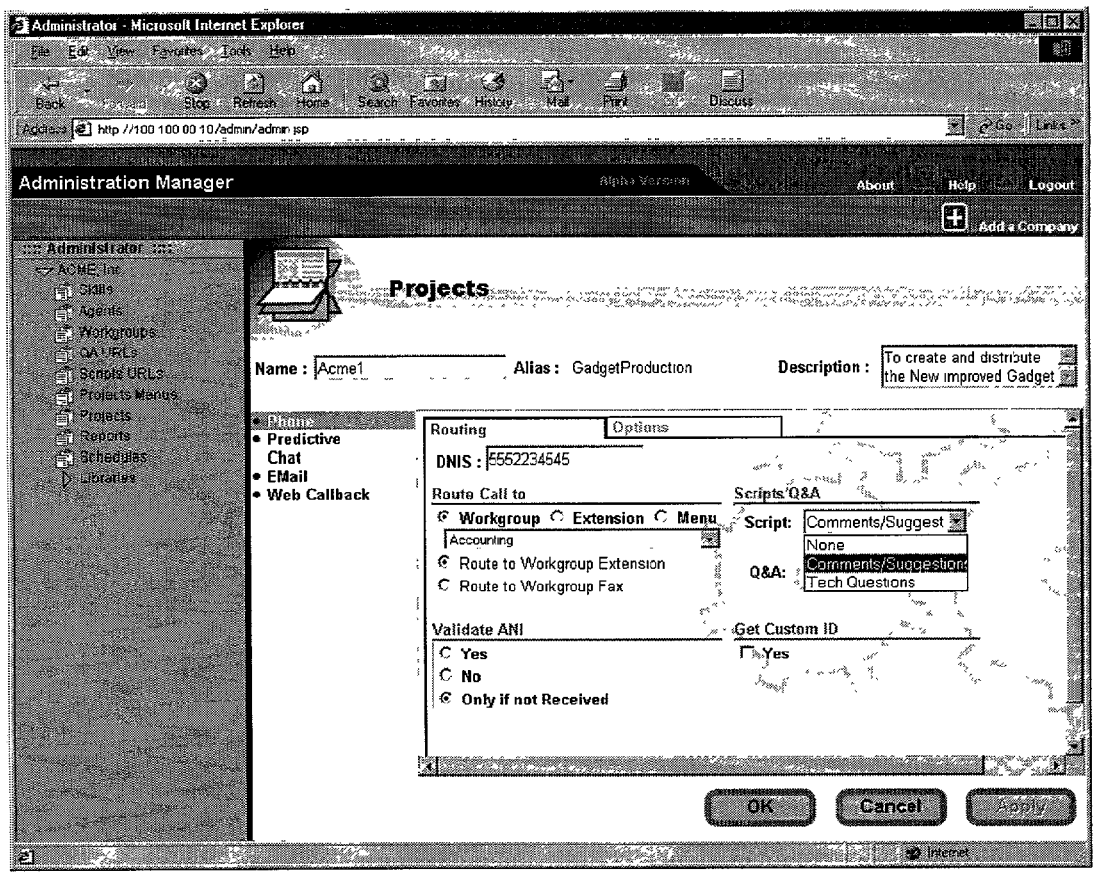

Creating an Interaction Script is illustrated in FIG. 41. The use of an Interaction Script in Call Flow definition is illustrated if FIG. 42.

The process of creating an Interaction Script is as follows:

1. From the main left-hand column, select the Company to which a Script URL is be added;

2. Click on the Scripts URLs tab under the Company selected;

3. Right-click in the Script URL Window, and click on Add Script URL;

4. Enter a name for the Q&A in the Name field;

5. Select from the list of URLs given by selecting one from the URL drop-down list;

6. Enter a description of the Script URL in the Description field;

7. Click Apply to save the changes and click OK to return to the main Scripts URLs Window.

Figure 43:
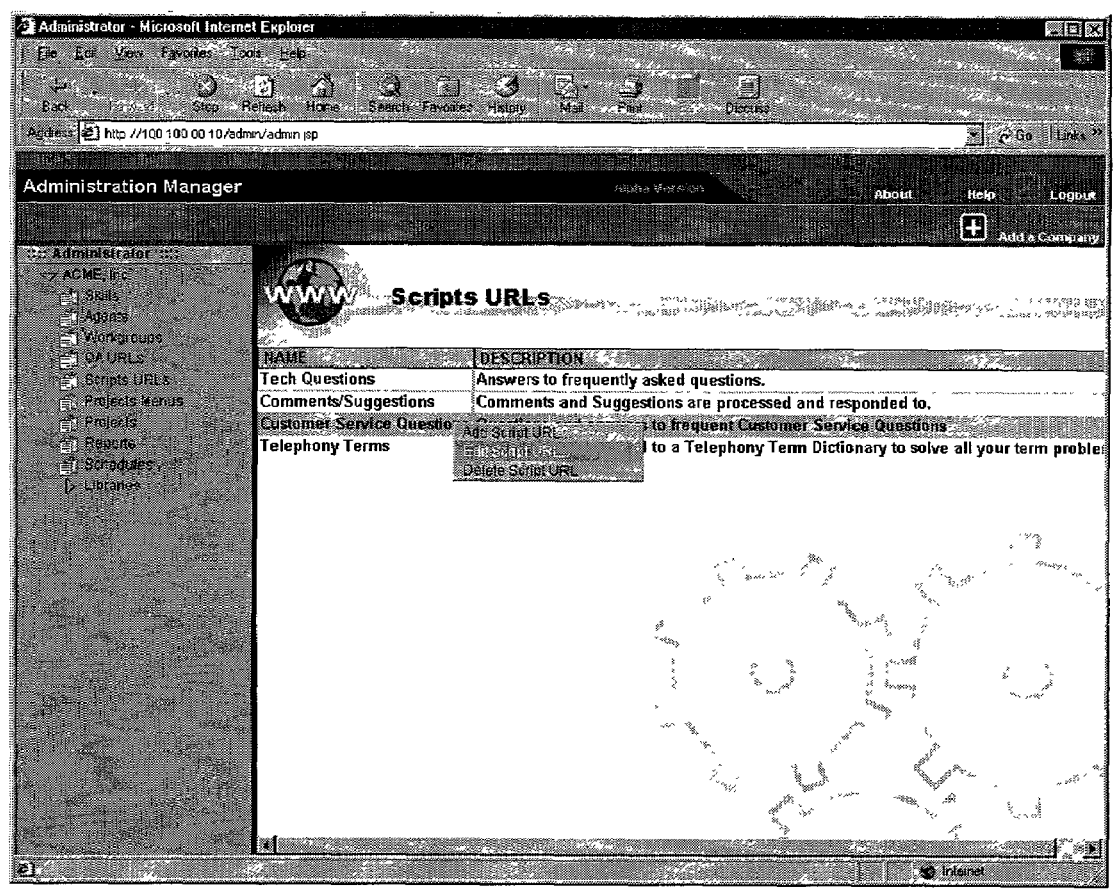

Editing a Script URL is illustrated in FIG. 43. The editing process is as follows:

1. From the main left-hand column, select the Company in which a Script URL is to be modified;

2. Click on the Scripts URLs tab under the Company selected;

3. Right-click in the Scripts URL Window, and click on Edit Script URL;

4. Make any necessary changes to the Script URL;

5. Click Apply to save the changes, and click OK to return to the main Script URLs Window.

Figure 44:
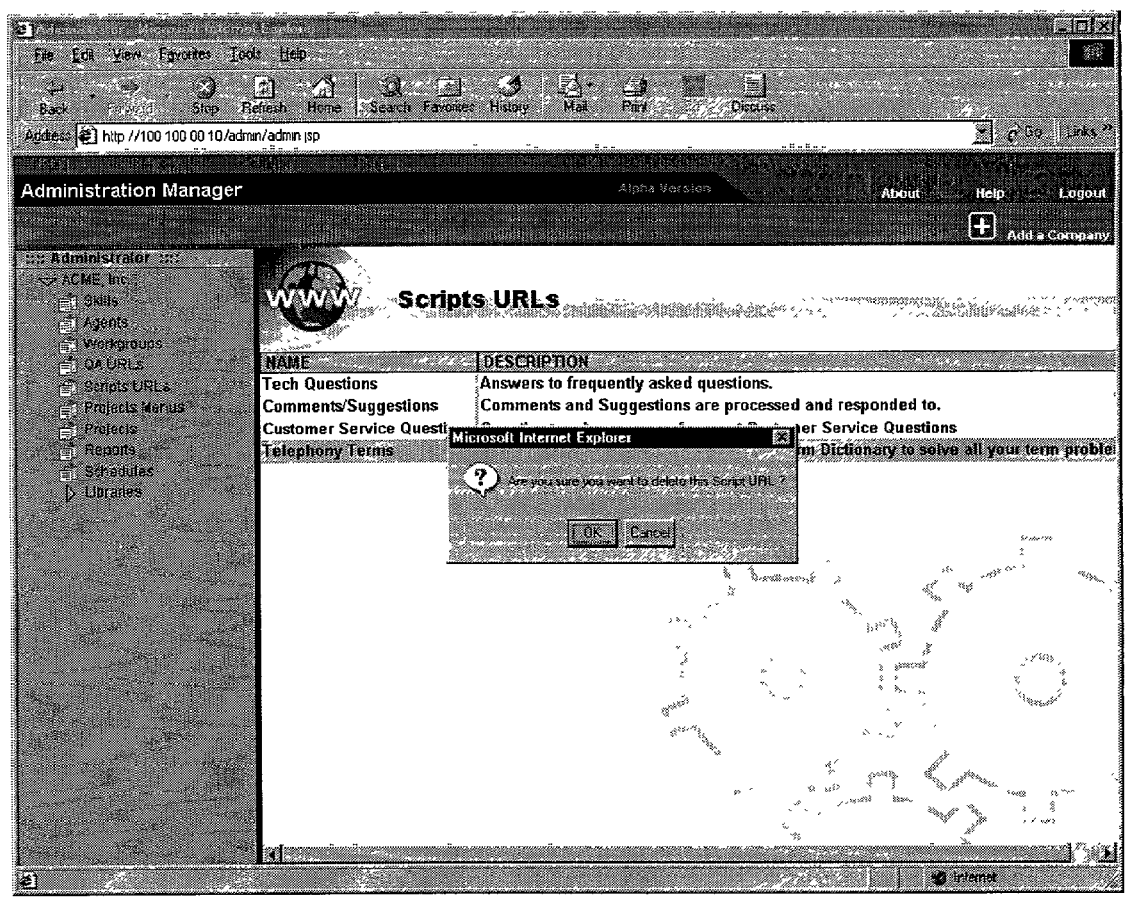

Deleting a Script URL is illustrated in FIG. 44. The deleting process is as follows:

1. From the main left-hand column, select the Company from which a Script URL is to be deleted;

2. Click on the Scripts URLs tab under the Company selected;

3. Right-click in the Scripts URL Window, and click on Delete QA URL;

4. A message will pop asking for confirmation of the deletion request; click OK to delete the Scripts URL;

5. Click Apply to save the changes, and click OK to return to the main Scripts URLs Window.

In the Administration Manager, a Call Flow object is a series of voice menus configurable by the system administrator to enable callers to route their calls to individual extensions, departments, fax resources, pre-recorded informational messages, or to additional submenus.

An Auto-Attendant Menu is a menu that answers a call in a Call Flow process. An Auto-Attendant menu may include a welcome greeting. It may also allow the caller to select other options by entering digits, e.g., to access the Company's directory, or to transfer to a specific extension, to a fax machine, to a specific workgroup, or to select an additional menu.

Before a Call Flow can be created in the Administration Manager, four preliminary steps need to be performed:

1. Define the extensions for the Agents on the system under the Telephone Extension section of the Agents tab.

2. Define one or more Workgroups under the Workgroups tab.

Figure 45:
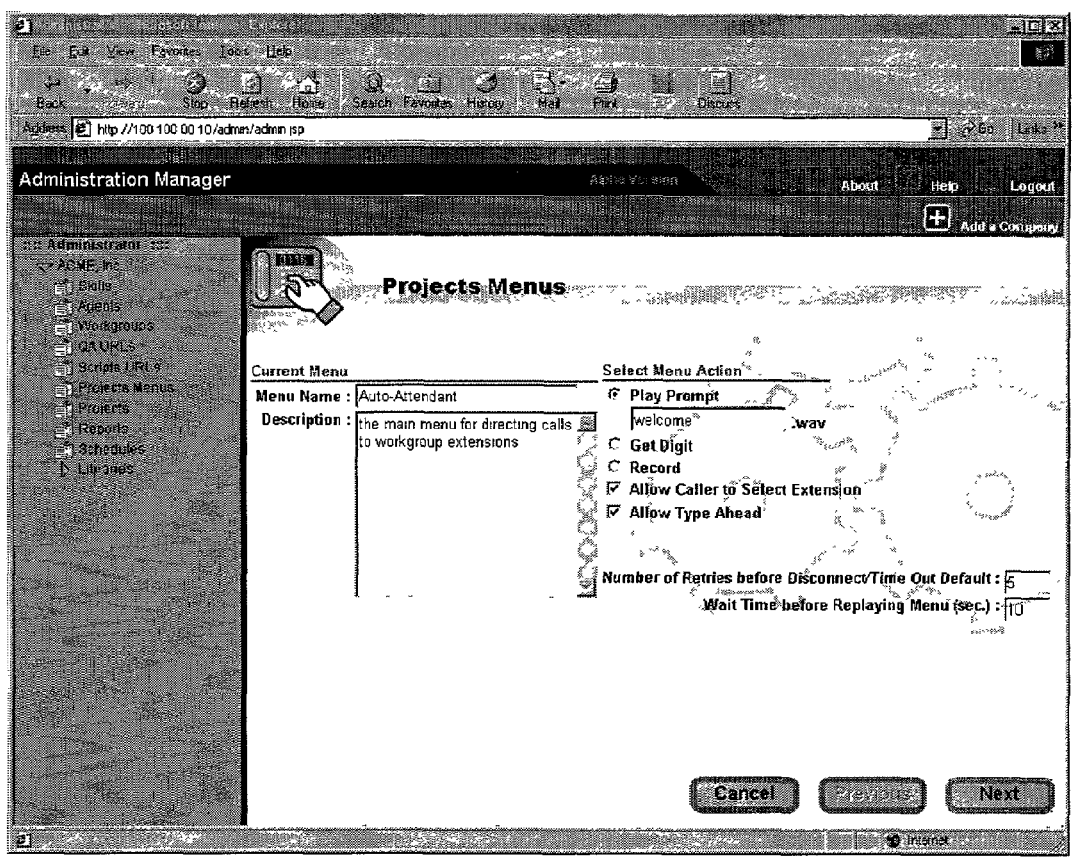

3. Define the various menus that the Call Flow will include when a Project Menu, located on the Project Menus tab, is created. This last step is illustrated in FIG. 45. It may be preferable to start menu definitions with the final menu in the Call Flow and work up, because some of the higher-level menus may include links to the lower level menus (i.e., to the menus created earlier). The individual menus can be modified at a later time, when the structure of the Call Flow is better defined. Because callers will be making menu choices with touch-tone entries, every touch-tone may need to be specified under the Define Menu Events section when adding a Project Menu.

Figure 46:
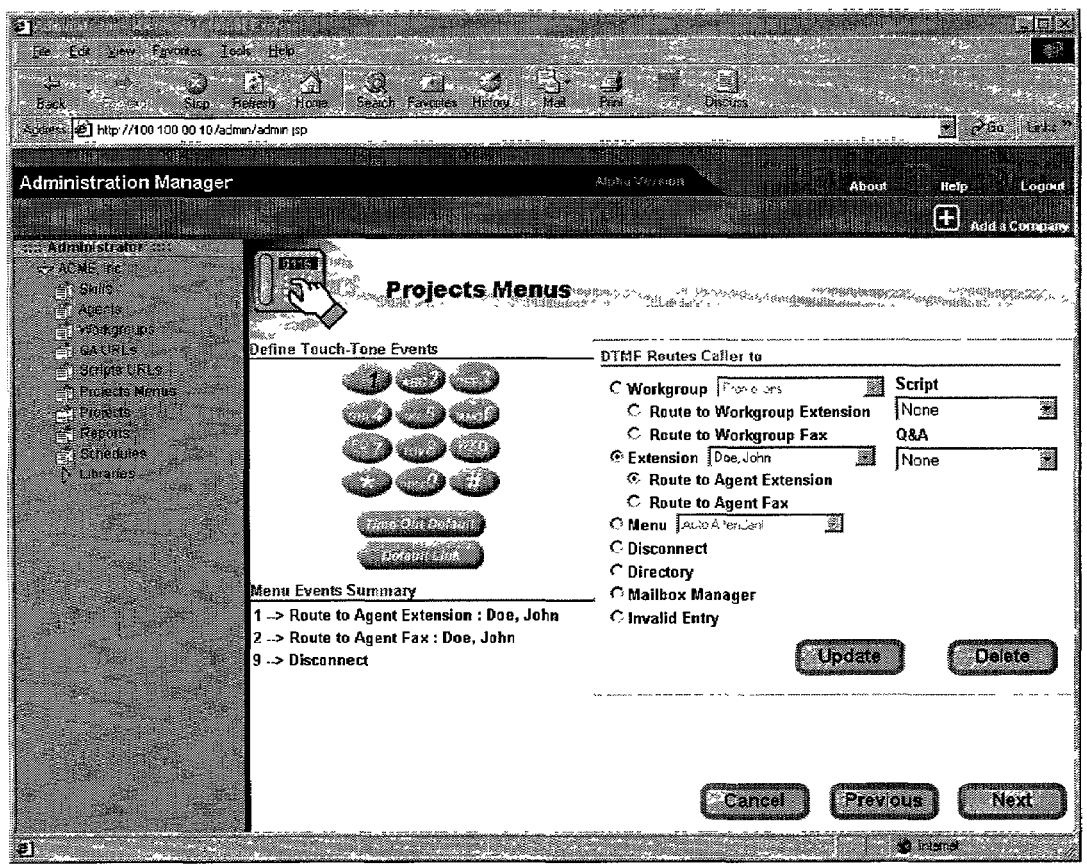

4. In the Define Menu Events section, define whether the caller will be routed to an auto-attendant, a menu, directly to a Workgroup, to an individual extension, or to an individual's fax mailbox. This is illustrated in FIG. 46.

Figure 47:
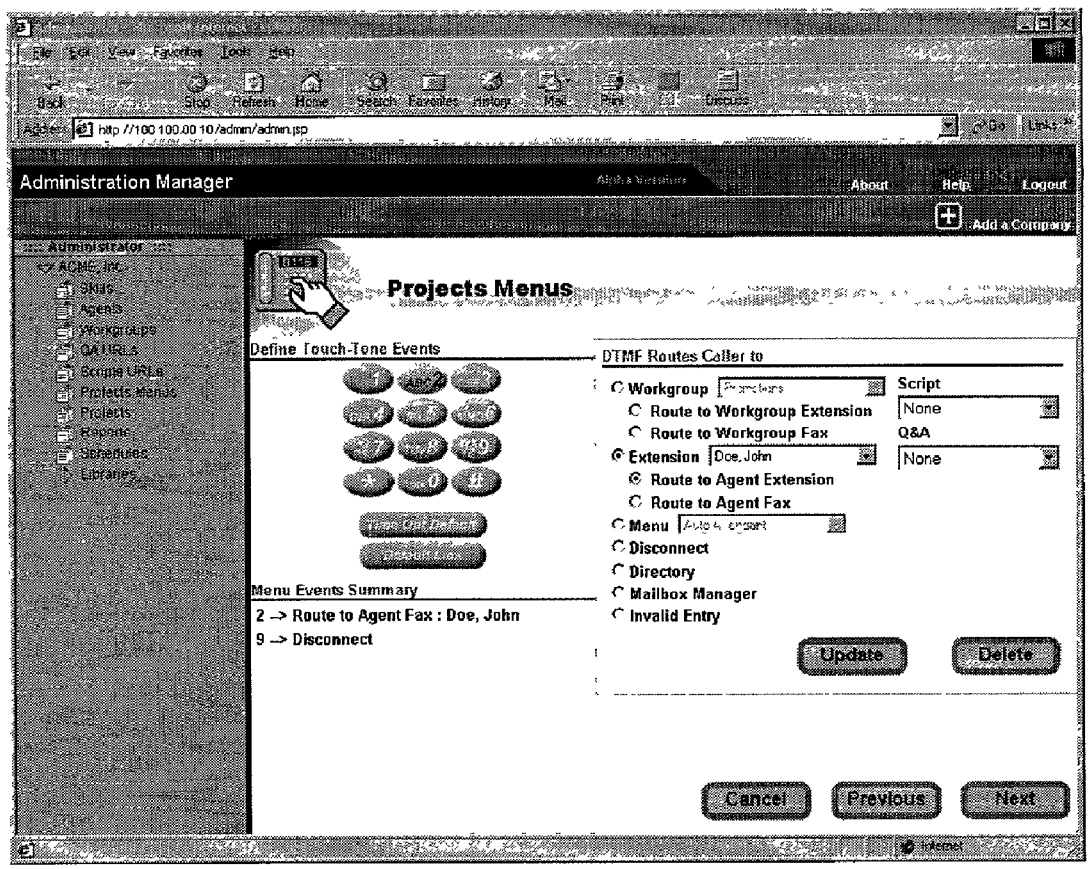

A telephone number or physical channel that will answer with fax-tones using a shared fax resource, e.g., a Dialogic VFX-equipped phone system, can be specified when defining Touch Tone Events for Project Menus. The steps for defining events to route calls directly to a fax resource are listed below and illustrated in FIG. 47.

1. From the main left-hand column, select the Company in which a Project Menu is to be modified;

2. Click on the Project Menus tab under the Company selected;

3. Right-click on a Project Menu and select Edit Menu;

4. From that Project Menu page, click Next to add Touch Tone Events;

5. Click on a number on the keypad in the Define Touch-Tone Events window;

6. To route calls to a Workgroup fax, select the Workgroup check box, select a Workgroup from the Workgroup drop-down list, and select the Route to Workgroup Fax radio button; to route the call to a Fax associated with an extension, select the Extension check box; choose an Agent from the drop-down list and then select the Route to Agent Fax radio button;

7. Click the Update button to save the Touch Tone Event;

8. The new default menu event will now appear in the Menu Events Summary window;

9. Click the Apply button to save the changes to the Project Menu and click OK to return to the main Project Menu window.

A Default Link is a recorded "menu" with no touch-tone options. Essentially, it is a recorded message that will play for the caller before the caller is routed to a predefined destination, such as an auto-attendant, a menu, a workgroup or an individual extension, or a Workgroup or an individual fax mailbox.

Figure 48:
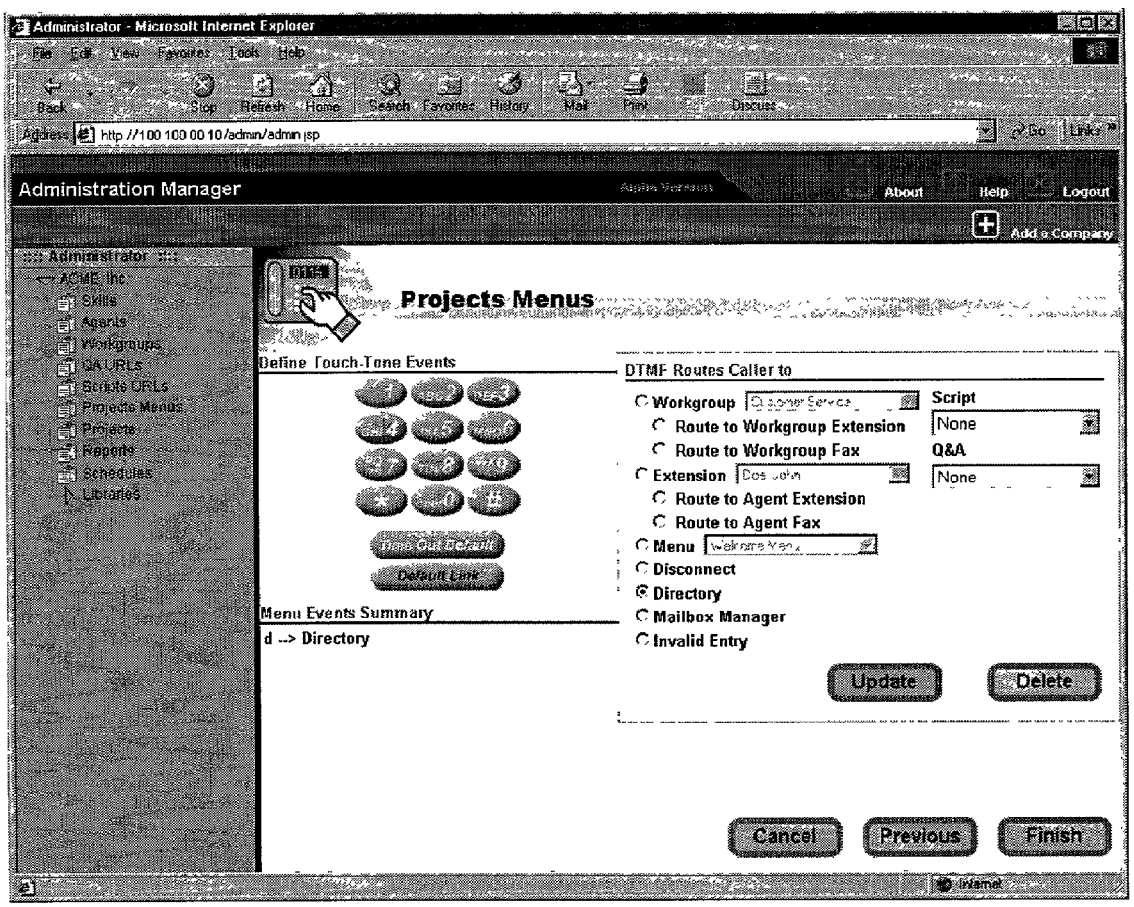

To create a Default Link for a Project Menu, perform the following steps:

1. From the main left-hand column, select the Company in which a Project Menu is to be modified;

2. Click on the Project Menus tab under the Company selected;

3. Right-click on the Project Menu to which a Default Link is to be added and select Edit Menu;

4. From that Project Menu page, click Next to add Touch Tone Events;

5. Select the Default Link button from the Define Touch-Tone Events section;

6. Select an appropriate check box or radio button such as for routing a call to a Workgroup Extension, Workgroup Fax, Agent Extension, Agent Fax, Disconnecting the caller, Playing a Directory, accessing the Mailbox Manager, or Playing an Invalid Entry Message;

7. Click the Update button to save the Default Menu; the new Default Menu event will now appear in the Menu Events Summary section, as FIG. 48 illustrates;

9. Select the Finish button to save the changes and return to the main Project Menu window.

A Voice Menu is a recorded message accompanied by a set of available options that a caller can access with touch-tone entries on a touch-tone phone. When adding a Project Menu, the various menus that a Call Flow will include under the Menu Information page can be defined. Again, it may be preferable to start with the last menu and work up, making changes as necessary. And because the callers will interact with the menus using touch-tone entries, every touch-tone may need to be defined for that menu.

Figure 49:
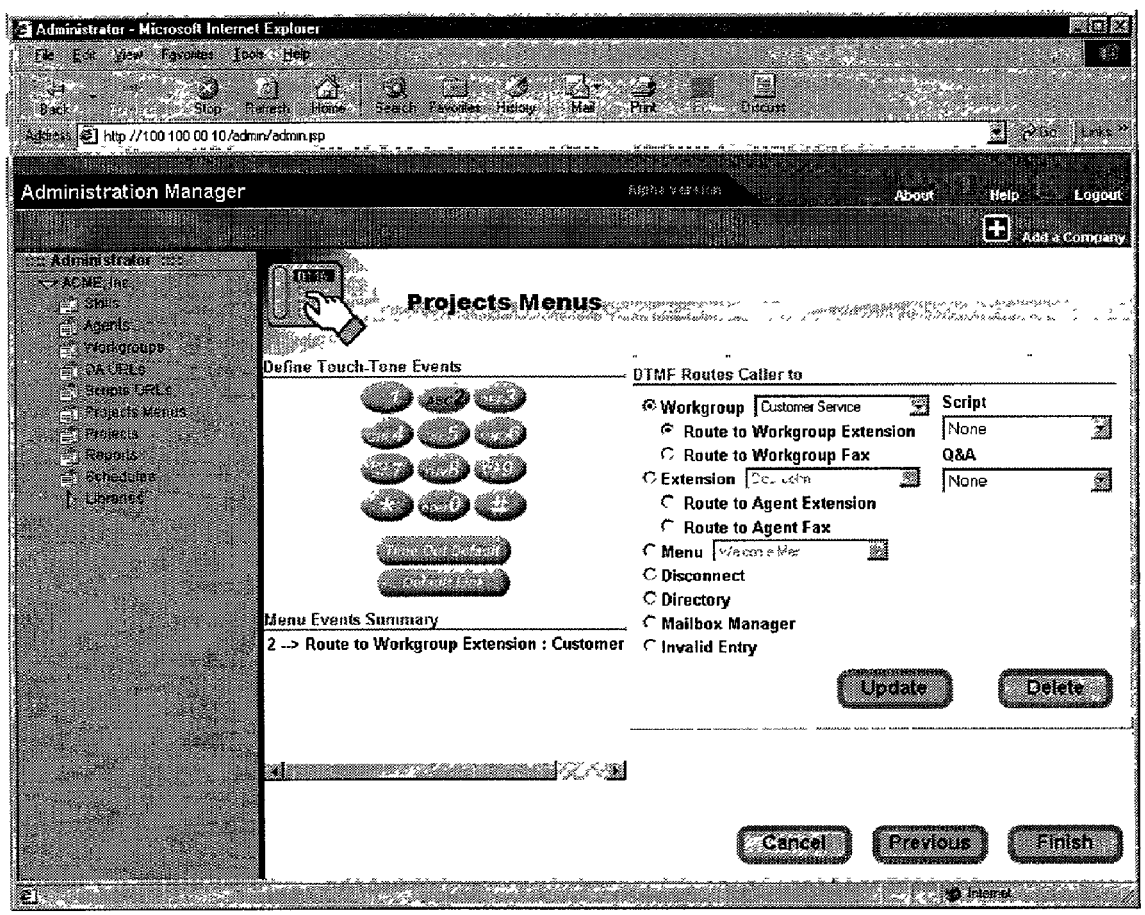

To define a touch-tone menu event, select a digit on the telephone keypad graphic and select the event that this touch-tone key will trigger. For example, performing the following six steps will result in a caller who selects "2" on the touch-tone telephone being routed to the selected extension in the Customer Service Workgroup, as is illustrated in FIG. 49:

1. Select the number two "2" on the keypad;
2. Select the Workgroups check box;
3. Select the Route to Workgroup Extension radio button;
4. Select a Workgroup from the Workgroup drop-down list;
5. Click the Update button to save the new event;
6. Select the Finish button to save the changes and return to the main Project Menu window.

To delete one of these events, perform the following steps:

1. From the main left-hand column, select the Company in which the event in a Project Menu is to be deleted;

2. Click on the Project Menus tab under the Company selected;

3. Right-click on the Project Menu from which to the Menu Event is to be deleted;

4. From the Project Menu page, click Next to modify the Touch Tone Events;

5. To delete one of the defined Menu Events for a Project Menu, click the number on the keypad that is assigned to that defined Menu Event and click the Delete button;

6. Once the Menu Event is deleted, the save the Project Menu by selecting the Finish button, thereby updating the Project Menu after the deletion.

Figure 50:
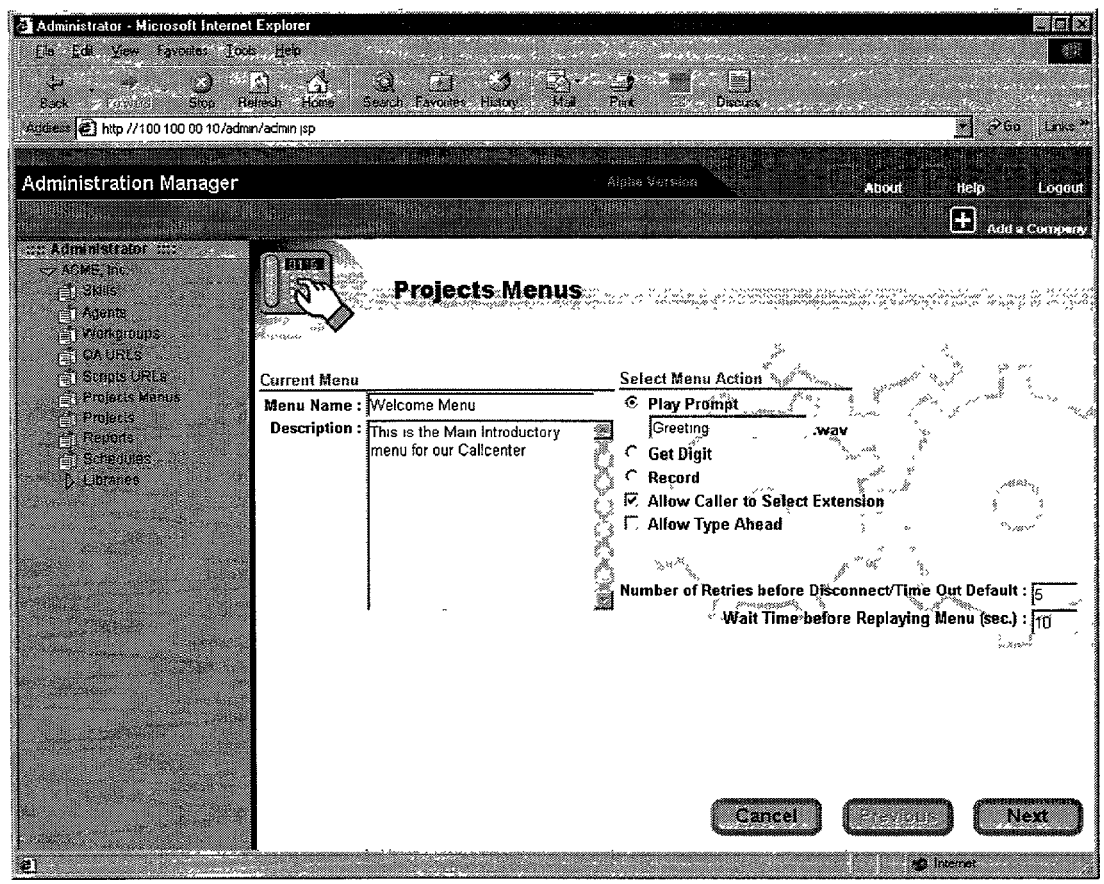

Adding a Project Menu is illustrated in FIG. 50. The process is as follows:

1. From the main left-hand column, select the Company you to which a Project Menu is to be added;

2. Click on the Project Menus tab under the Company selected;

3. Right-click on the Project Menu you wish to add Menu Information for and select Create Menu;

4. Enter the name of the menu to be created in the Menu Name field;

5. If desired, select the check box of any appropriate Menu Action such as Play Prompt (entering the .wav file name in the .wav file field), Allow Caller to Select Extension, or Allow Type Ahead;

6. Enter the number of retries before the system disconnects the caller;

7. Enter the wait time in seconds before replaying a menu;

8. Select Next and define any necessary menu events (see the description of defining Menu Events);

9. Click the Finish button when complete to save and return to the main Project Menu window.

When the Get Digit option shown in FIG. 50 is checked, the system will wait for a digit to be entered by the caller. When the Record option is checked, the caller's actions in the Menu will be recorded.

To modify a Project Menu, perform the following steps:

1. From the main left-hand column, select the Company in which a Project Menu is to be modified;

2. Click on the Project Menus tab under the Company selected;

3. Right-click on the Project Menu in which Menu Information is to be modified and select Edit Menu;

4. Make any necessary changes to the Menu Information;

8. Select Next and modify any necessary menu events (see the section pertaining to defining Menu Events);

9. Click the Finish button when done to save and return to the main Project Menu window.

To delete a Project Menu, perform the following steps:

1. From the main left-hand column, select the Company from which a Project Menu is to be deleted;

2. Click on the Project Menus tab under the Company selected;

3. Right-click on the Project Menu to be delete and select Delete Menu;

4. A message will pop asking for a confirmation of the deletion request; click Yes to delete the Project Menu.

Figure 51:
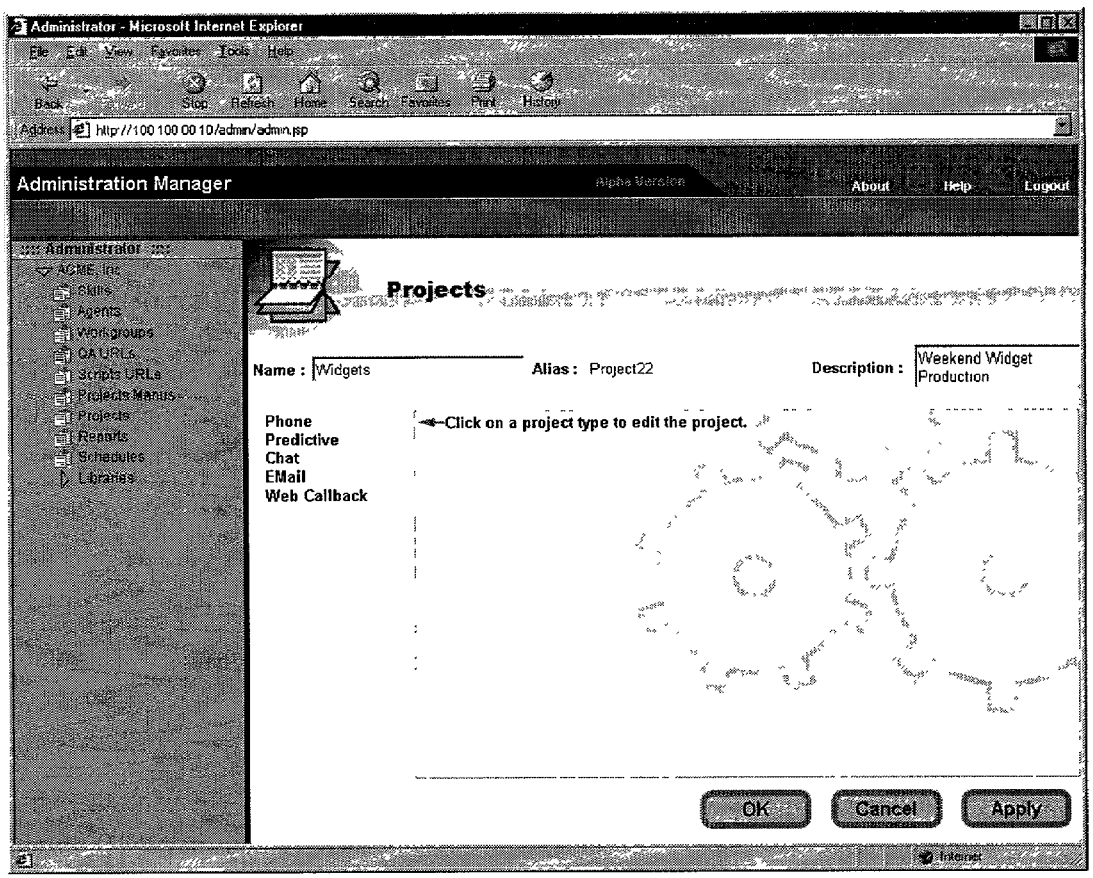

Creating a Project is illustrated in FIG. 51. The process is as follows:

1. From the main left-hand column, select the Company for which a Project is to be created;

2. Click on the Projects tab under the Company selected;

3. Right-click in the Project window and select Create Project;

4. Enter the new Project name in the Name field;

5. Enter the Project Alias in the Alias field;

6. Enter the Project Description in the Description field;

7. Click the Apply button to save the Project; a list of Project types will appear in the left-hand portion of the Projects window. Select one of these types (the Project Types can be configured separately as is explained below, in the portion of this document pertaining to configuration of the Phone, Predictive, Chat, Email, and Web Callback types).

Figure 52:
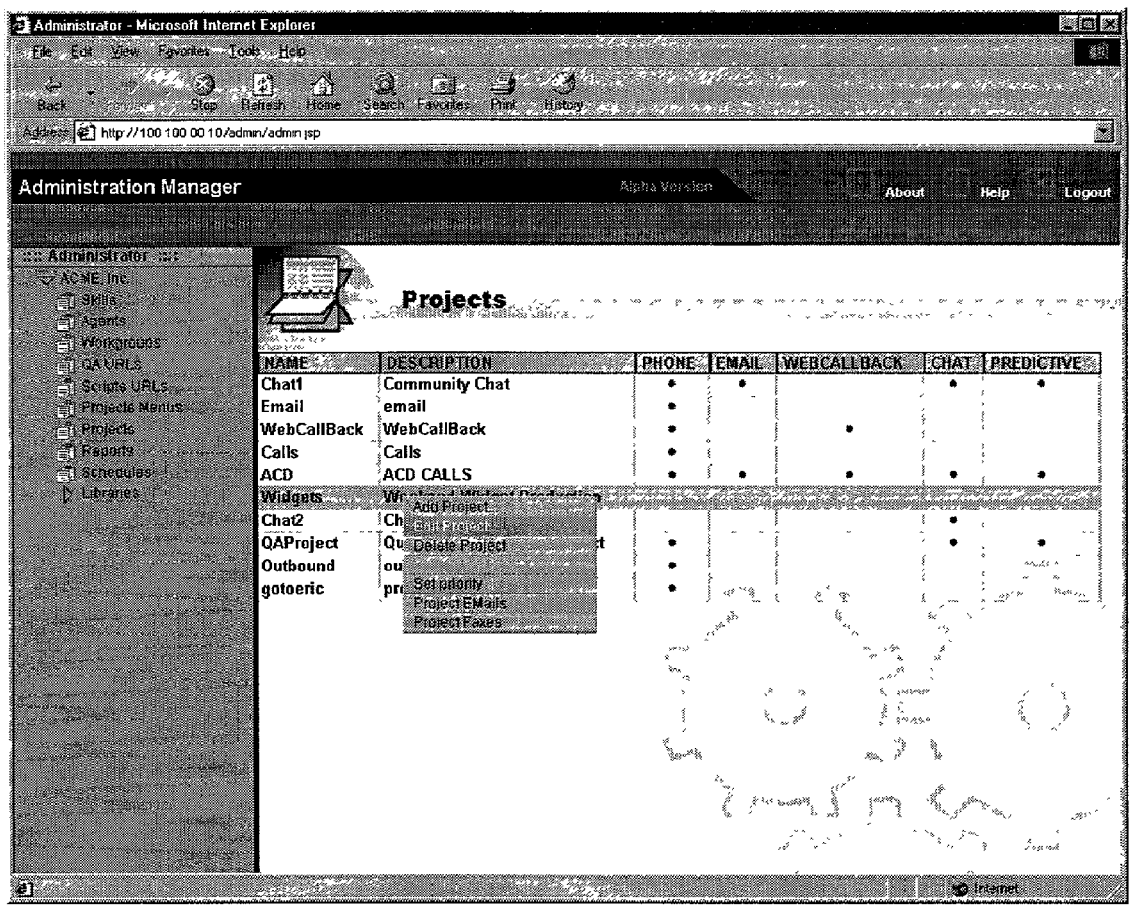

Modifying a Project is illustrated in FIG. 52. The process is as follows:

1. From the main left-hand column, select the Company in which a Project is to be modified;

2. Click on the Projects tab under the Company selected;

3. Right-click on the Project to be modified and select Edit Project;

4. Make any necessary changes; if any changes are made to the Project types, click on the Save button within each type tab to save the update;

5. Click Apply to save the changes and click OK to return to the main Project window.

To delete a Project, perform the following steps:

1. From the main left-hand column, select the Company from which a Project is to be deleted;
2. Click on the Projects tab under the Company selected;
3. Right-click on the Project to be deleted and select Delete Project;
4. A message will pop asking for a confirmation of the deletion request; click the OK button to delete the Project.

Figure 53:
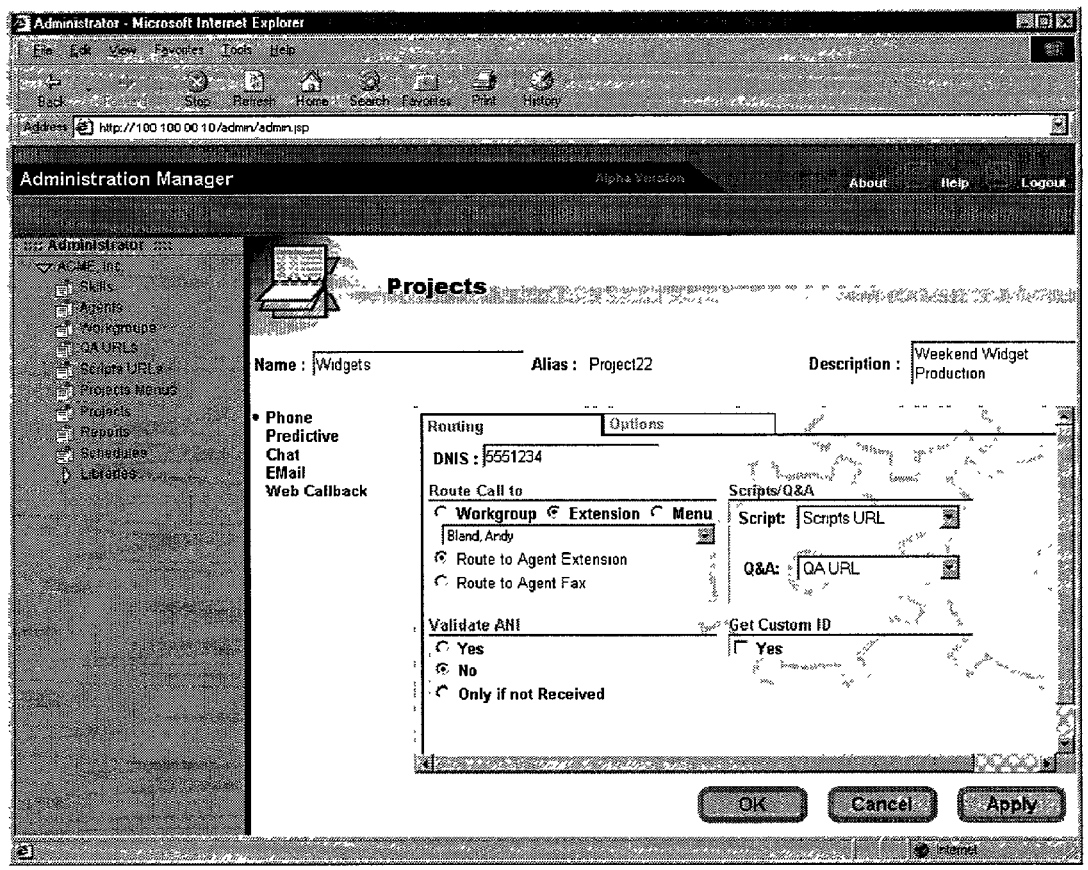
Figure 54:
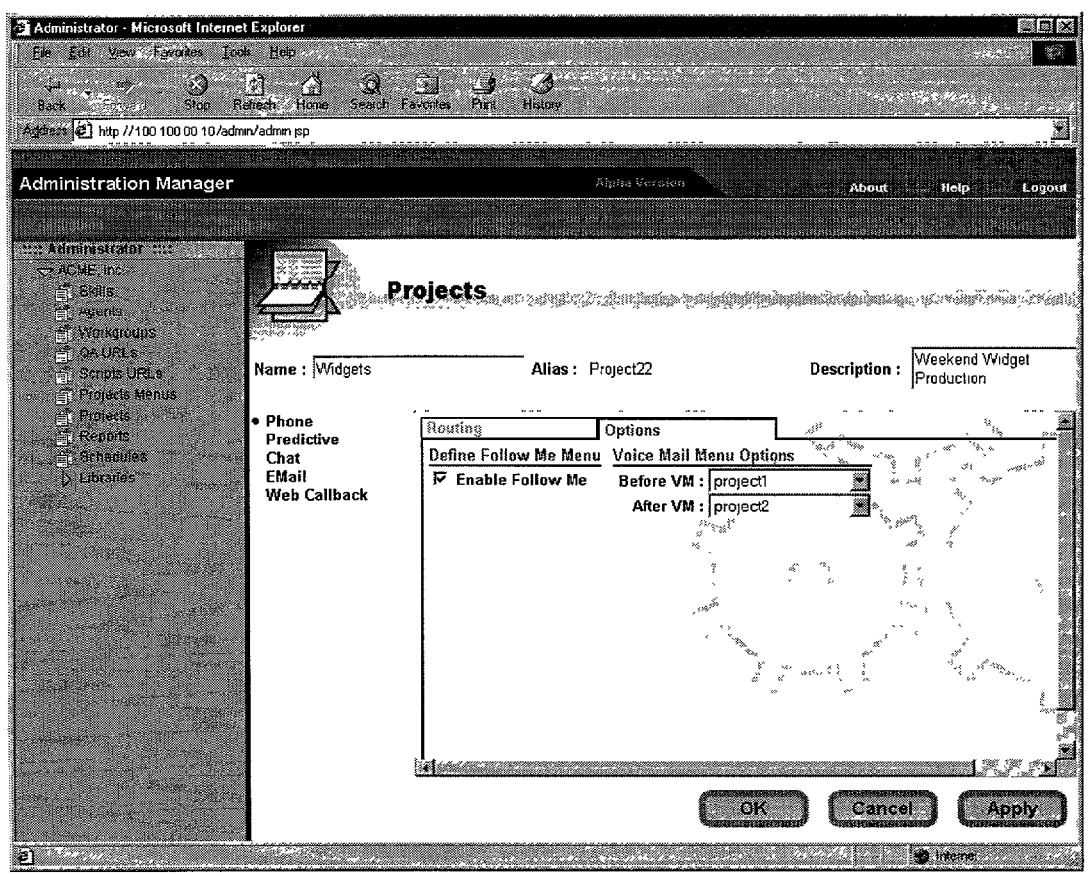

In the Administration Manager, a Project may be one of five types: (1) Phone, (2) Predictive, (3) Chat, (4) Email, and (5) Web Callback. FIGS. 53 and 54 illustrate transforming a previously-created Project into a Phone-type Project. The process is as follows:

1. From the main left-hand column, select the Company to in which a Project is to be transformed into a Phone Project;
2. Click on the Projects tab under the Company selected;
3. Right-click on the Project to be modified and select Edit Project;
4. Select the Phone Project type from the left-hand column in the Project window;
5. Enter the phone number to be used for routing in the DNIS field;
6. On the Routing sub-tab select Route to Workgroup Extension, Route to Workgroup Fax, an Route to Agent Extension, Route to Agent Fax, or a Menu;
7. Select a Script to be played from the Script drop-down list and/or a Q&A from the Q&A drop-down list;
8. Select whether to validate the ANI by selecting Yes, No, or Only if not Received from the Validate ANI section;
9. To get a customer's identification when the customer calls in (and the ID has not yet been determined), select Yes from the Get Custom ID section;
10. When done with the Routing sub-tab, select the Options sub-tab to finish the configuration;
11. To have the Follow Me Option enabled for the Project's Phone Type, select the check box next to Enable Follow Me, located under the Define Follow Me Menu section;
12. To have a Menu played before or after a caller reaches the Project's Voice Mail, select a Menu from the Before VM drop-down list or from the After VM drop-down list, located under the Voice Mail Menu Options;
13. Scroll down from the Options sub-tab and click on the Save button to apply the configuration to the selected Project;
14. Click Apply to save the Project's Phone Type and click OK to return to the main Project window.

Figure 55:
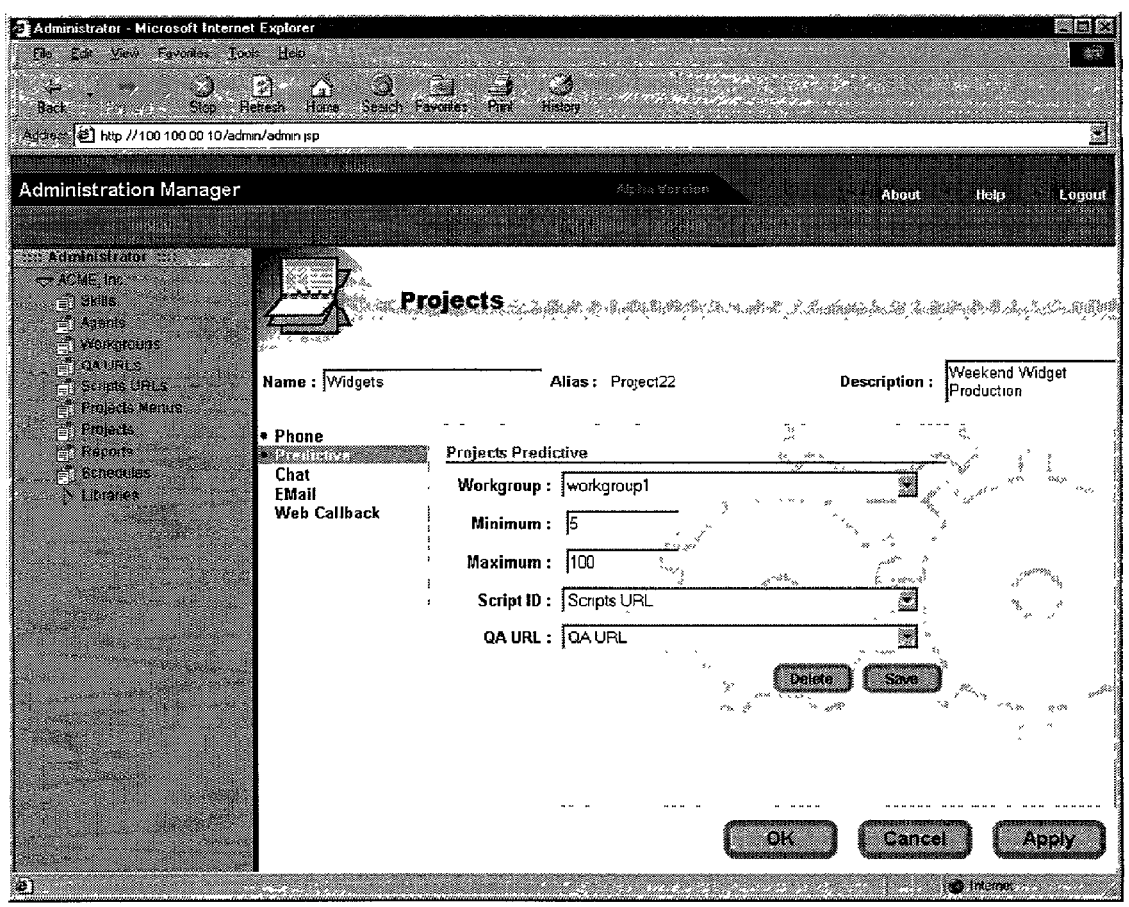

FIG. 55 illustrates transforming a Project into a Predictive Project. The process is as follows:

1. From the main left-hand column, select the Company in which a Project is to be transformed;
2. Click on the Projects tab under the Company selected;
3. Right-click on the Project to be transformed and select Edit Project;
4. Select the Predictive Project type from the left-hand column in the Project window;
5. Select a workgroup for the Predictive Project by selecting one from the Workgroup drop-down list located under the Projects Predictive section;
6. Enter the minimum number of Predictive calls for the Project in the Minimum field;
7. Enter the maximum number of Predictive calls for the Project in the Maximum field;
8. Select a Script ID for the Predictive type from the Script ID drop-down list;
9. Select a Q&A URL for the Predictive type from the QA URL drop-down list;
10. Click the Save button to apply the configuration to the selected Project;
11. Click Apply to save the Project's Predictive Type and click OK to return to the main Project window.

Figure 56:
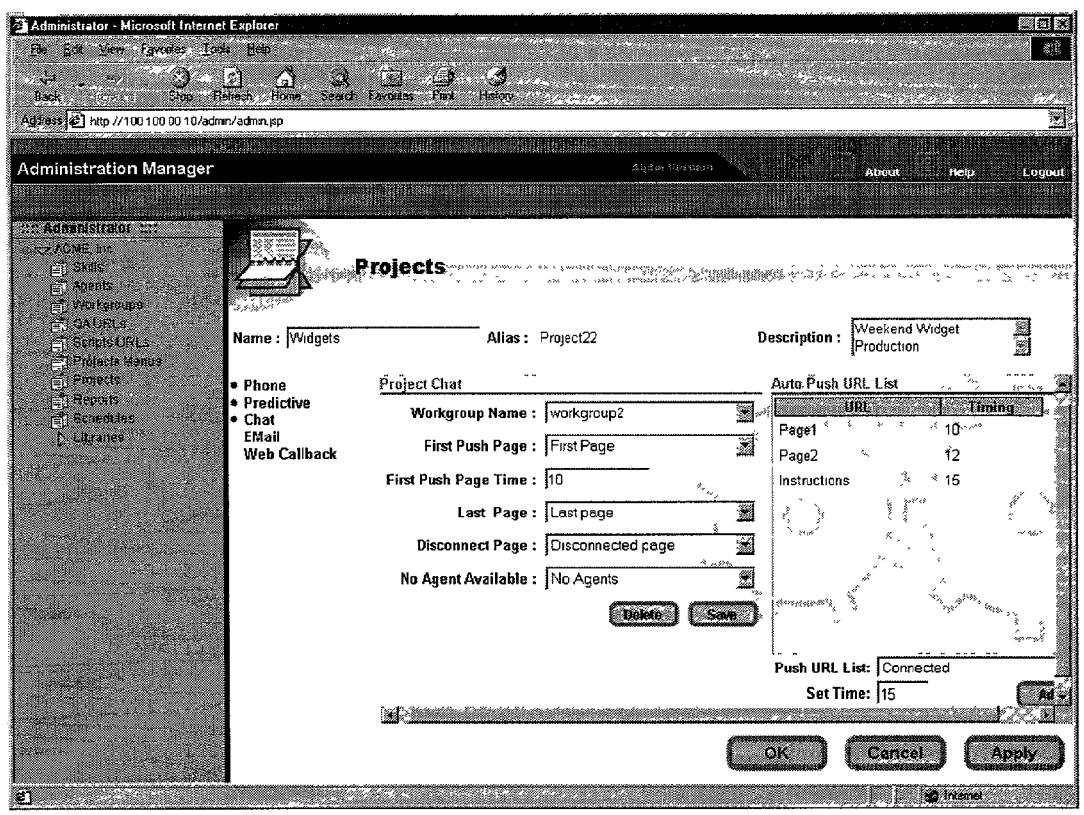

FIG. 56 illustrates transforming a Project into a Chat Project. The process is as follows:

1. From the main left-hand column, select the Company in which a Project is to be transformed
2. Click on the Projects tab under the Company selected;
3. Right-click on the Project to be transformed into a Chat type Project and select Edit Project;
4. Select the Chat Project type from the left-hand column in the Project window;
5. Select Project Chat Workgroup Name from the Workgroup Name drop-down list;
6. Select the First Push Page for the Project Chat type from the First Push Page drop-down list;
7. Enter a time (in seconds) into the First Push Page Time field to determine when the first page is to be pushed to the caller;
8. Select URLs from the drop-down lists to determine the Last Page, Disconnect Page, and No Agents Available page, as needed;
9. Click the Save button to apply the Chat configuration to the selected Project;
10. Click Apply to save the Project's Chat Type and click OK to return to the main Project window.

Figure 57:
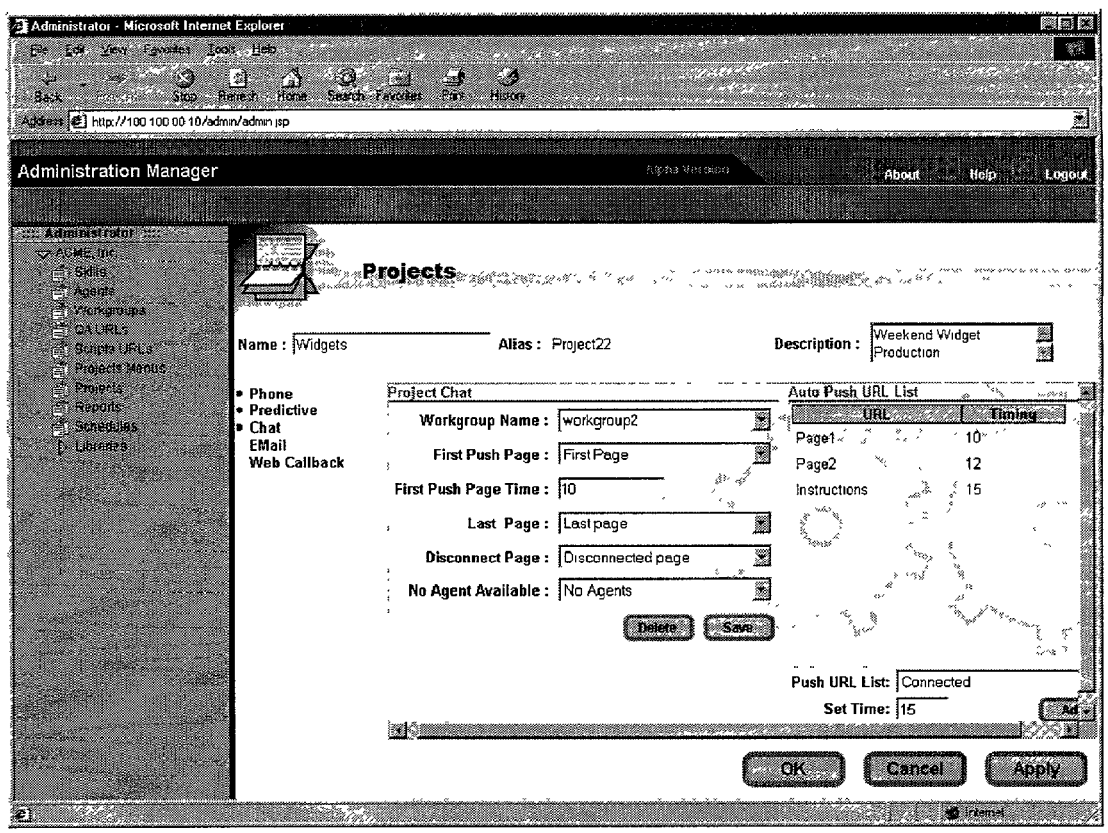

The Administration Manager provides the capability to push a set of pages from an Auto Push URL List to a caller while the caller is waiting to receive a Chat message from an Agent. Adding pages to the Auto Push URL List is illustrated in FIG. 57. The process is as follows:

1. Right-click on the Project for which push pages are to be created and select Edit Project;
2. Select the Chat Project type from the left-hand column in the Project window;
3. Select a URL from the Push URL List drop-down list and enter the time duration the page will be displayed in the Set Time field (the Push URL List is discussed later in this document);
4. To add the page to the Auto Push List, click the Add button;
5. To delete a previously added page, select that page from the list and click the Delete button;
6. To save the push URL list to the Project, click the Save button from the Project Chat section;
7. Click Apply to save the Project and click the OK button to return to the main Project Window.

Figure 58:
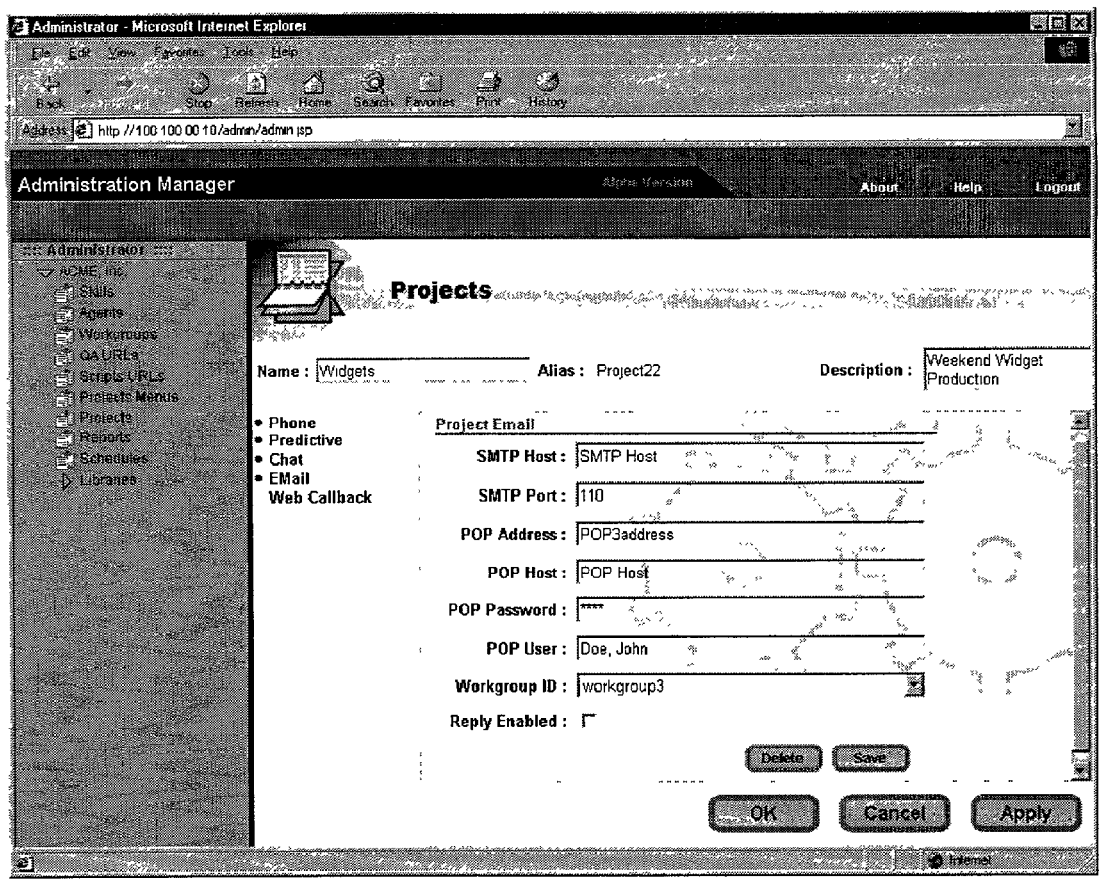

FIG. 58 illustrates transforming a Project into an Email Project. The process is as follows:

1. From the main left-hand column, select the Company in which a Project is to be transformed into an Email Project type;
2. Click on the Projects tab under the Company selected;
3. Right-click on the Project to be transformed and select Edit Project;
4. Select the Email Project type from the left-hand column in the Project window;
5. Enter the SMTP Host name into the SMTP Host field;
6. Enter the SMTP Port number into the SMTP Port field;
7. Enter the POP Address into the POP Address field;
8. Enter the POP Host name and POP Password into the respective POP Host and POP Password field;
9. Enter the POP User name into the POP User field;

10. Select the Workgroup ID for the Email type from the Workgroup ID drop-down list;

11. To enable Reply for the Email type, select the check box next to Reply Enabled;

12. Click the Save button to apply the Email configuration to the selected Project;

13. Click Apply to save the Project's Email Type and click OK to return to the main Project window.

Figure 59:
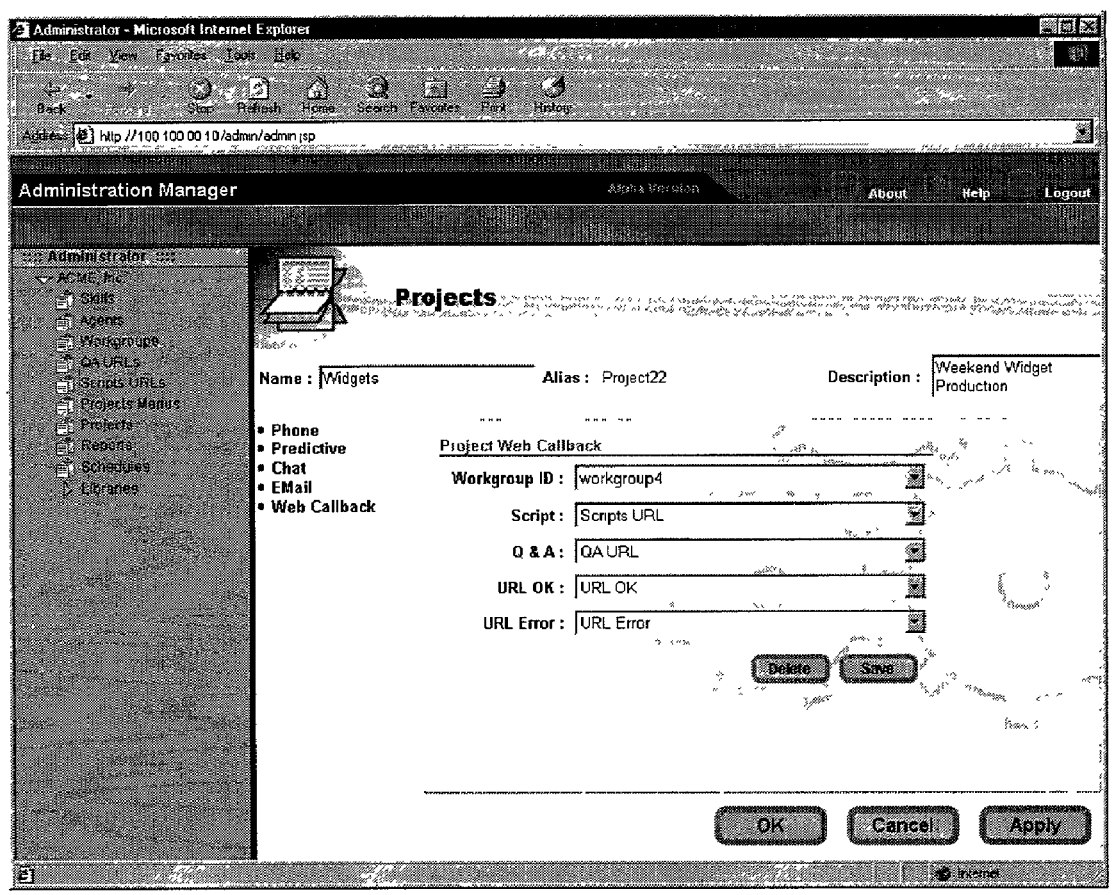

FIG. 59 illustrates transforming a Project into a Web Callback Project. The process is as follows:

1. From the main left-hand column, select the Company in which a Project is to be transformed;

2. Click on the Projects tab under the Company selected;

3. Right-click on the Project to be transformed and select Edit Project;

4. Select the Web Callback Project type from the left-hand column in the Project window;

5. Select the Workgroup for the Web Callback type from the Workgroup ID drop-down list;

6. If a Script is to be associated with the Web Callback type, select one from the Script drop-down list;

7. If a Q & A is desired for the Web Callback type, select one from the Q & A drop-down list;

8. Select the page to be displayed when the Web Callback is successful from the URL OK drop-down list;

9. Select the page to be displayed when the Web Callback is unsuccessful from the URL Error drop-down list;

10. Click the Save button to apply the Web Callback configuration to the selected Project;

11. Click Apply to save the Project's Web Callback Type and click OK to return to the main Project window.

Figure 60:
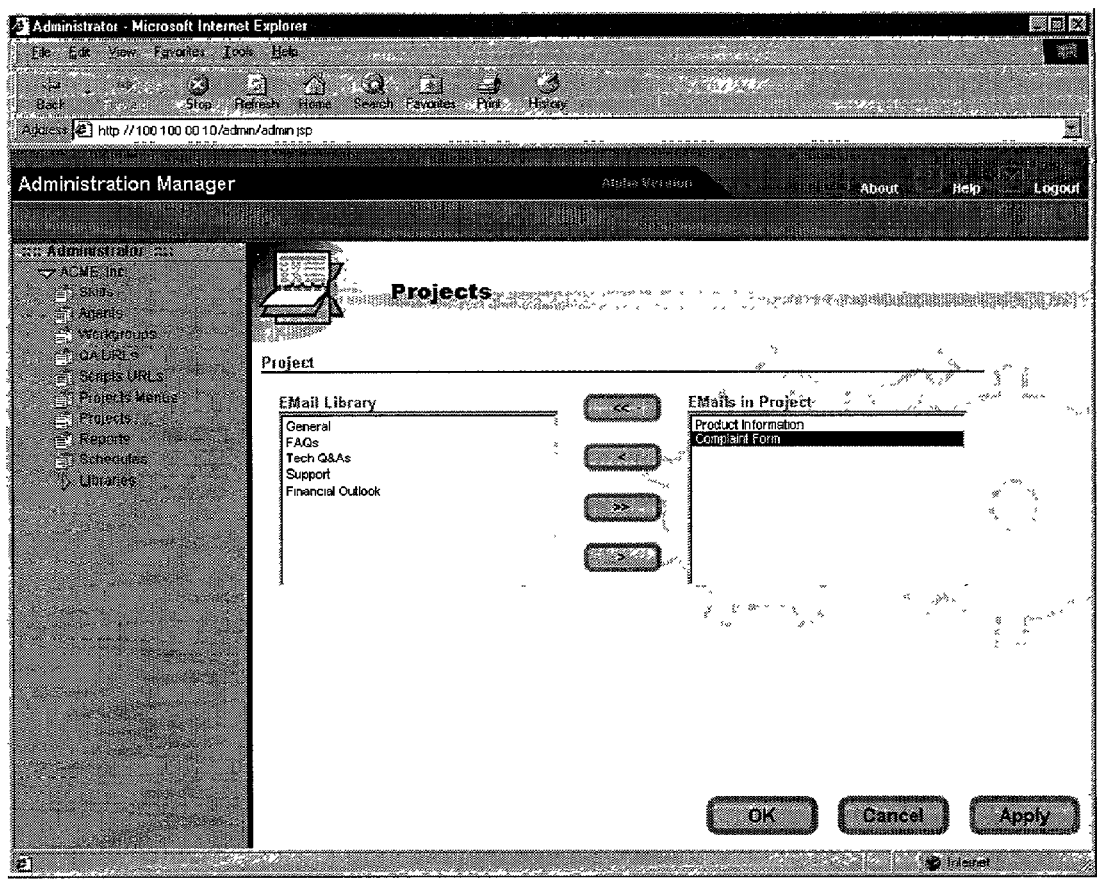

A Project may be associated with various Email and Fax Templates from the libraries of templates (discussed at a later point in this document) that the Agents assigned to the Project may find useful. Adding Email Templates to a Project is illustrated in FIG. 60. The process for adding and removing Email Templates is as follows:

1. From the main left-hand column, select the Company with the Project in which Email Templates are to be added;

2. Click on the Projects tab under the Company selected;

3. Right-click on the Project in which the Email Templates are to be added and select Project Emails;

4. Select the appropriate Email Template from the Email Library list and then click on the (>) button to add that Template; to add all the Templates to the Email Templates in the Project window, click on the (>>) button;

5. To delete Email Templates from the list of Templates in the Emails in the Project, click on the (<) button; to remove all the Templates from the Project, click on the (<<) button;

6. Click Apply to save the changes made and click the OK button to return to the main Project window.

Figure 61:
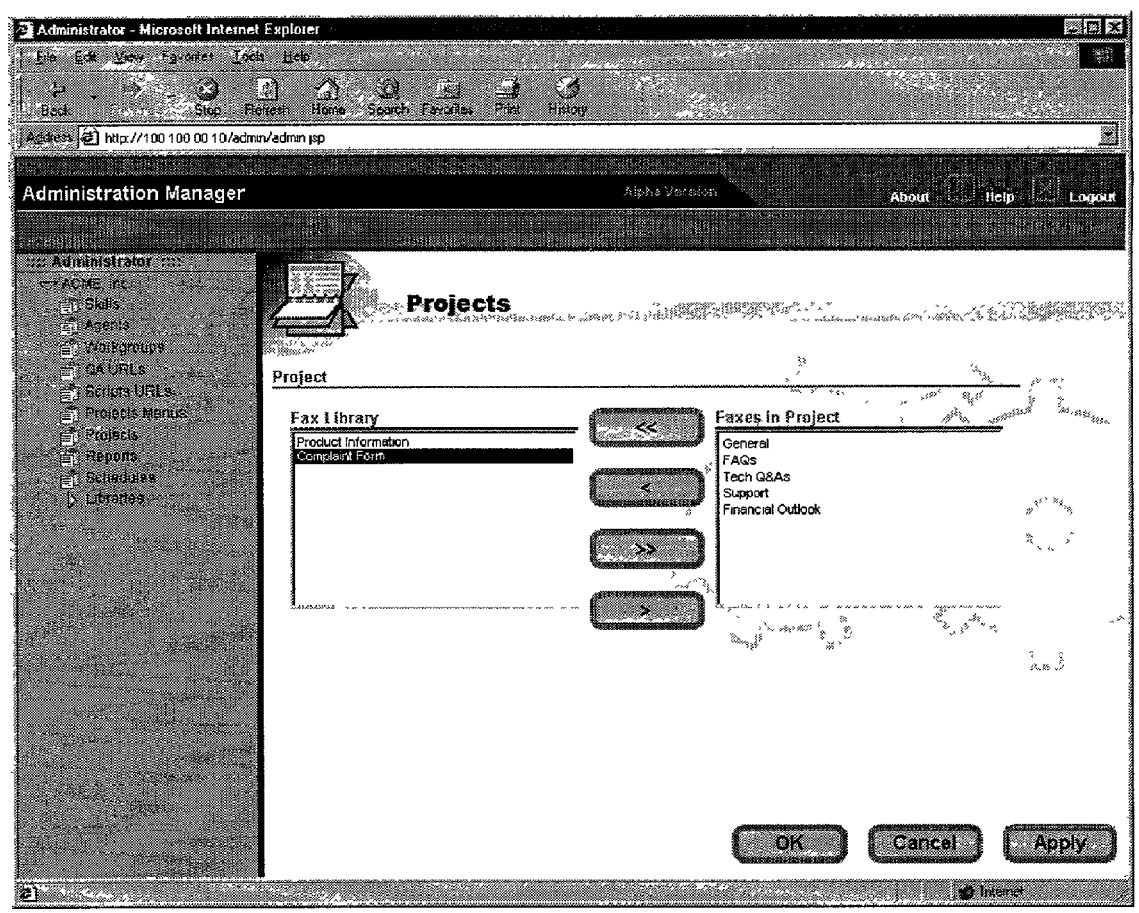

Adding Fax Templates to a Project is illustrated in FIG. 61. The process for adding and deleting Fax Templates is as follows:

1. From the main left-hand column, select the Company with the Project in which Fax Templates are to be added;

2. Click on the Projects tab under the Company selected;

3. Right-click on the Project to which Fax Templates are to be added and select Project Faxes;

4. Select the appropriate Fax Template from the Fax Library list and then click on the (>) button to add that Template; to add all the Templates to the Faxes in Project window, click on the (>>) button;

5. To delete Fax Templates from the list of Templates in the Faxes in Project, click on the (<) button to delete that Template; to remove all the Templates from the Project, click on the (<<) button;

6. Click Apply to save the changes made and click the OK button to return to the main Project window.

Figure 62:
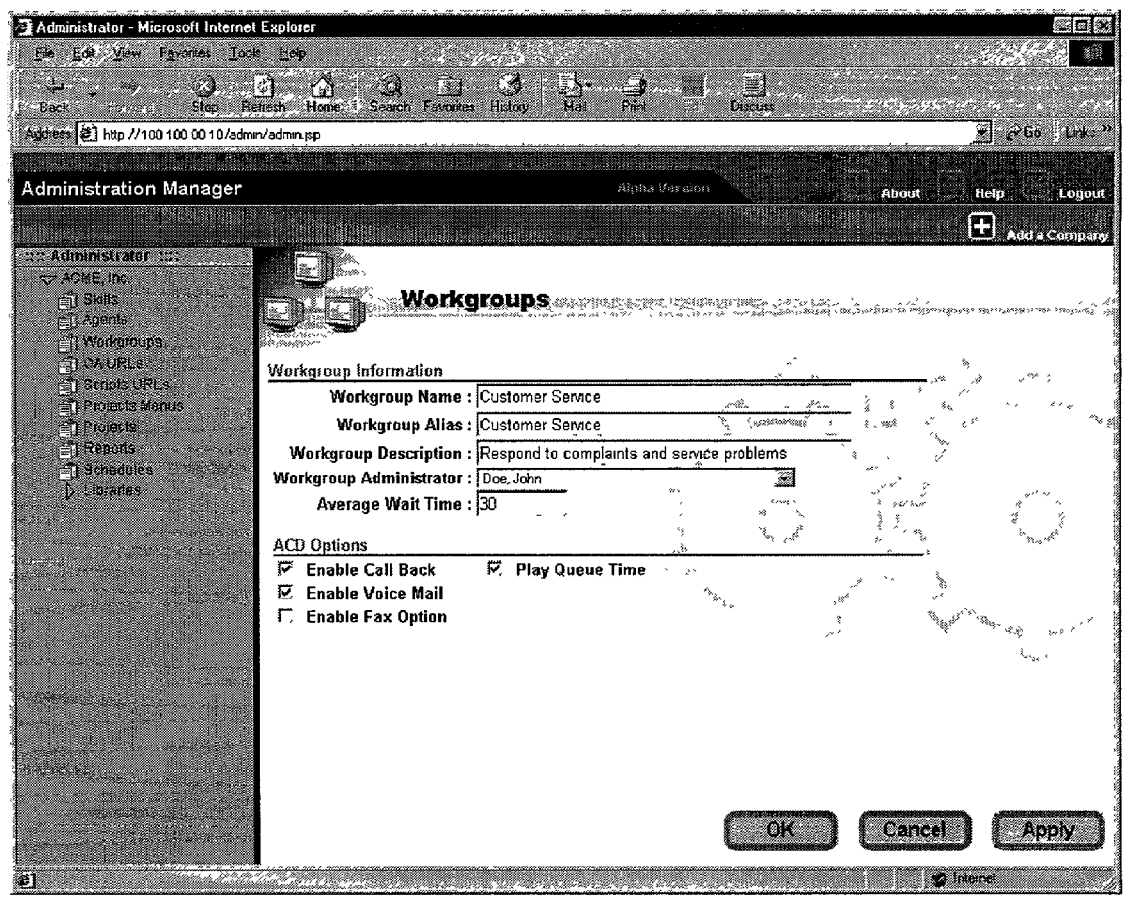

Abandoned ACD calls may be automatically returned to the Workgroup to which they had been originally routed. Modifying a Workgroup to enabling this feature is illustrated in FIG. 62. The process is as follows:

1. From the main left-hand column, select the Company to be modified;

2. Click on the Workgroups tab under the Company selected;

3. Right-click on the Workgroup to which abandoned ACD calls will be automatically routed and select Edit Workgroup;

4. Select the Enable Call Back check box in the ACD Options section to have abandoned ACD calls returned;

3. Click Apply to save the changes to the Workgroup and click the OK button to return to the main Workgroup window.

Reports

The Reports tab in the Administration Manager is used for generating and displaying reports of data pertaining to the operation of the call center. For example, reports can be used for tracking information about the efficiency of Agents, as well as the volume of calls made and received through the call center. Such reports can be useful in computing billing costs and estimating customer satisfaction through Outcome notes.

Figure 63:
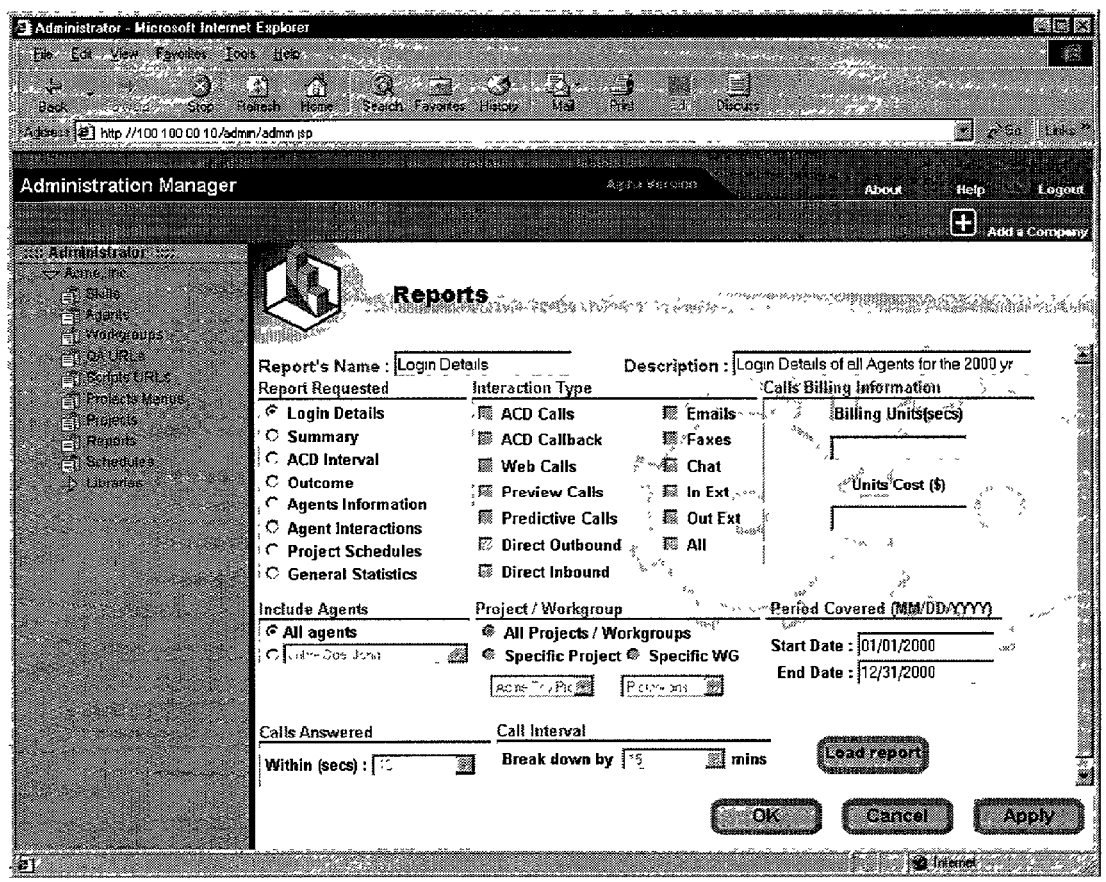

The Login Details Report displays login dates, times, and durations for the Agents. FIG. 63 illustrates defining a Login Report. The process is as follows:

1. From the main left-hand column, select the Company for which a Report is to be created;

2. Click on the Reports tab under the Company selected;

3. Right-click in the Reports window and click on Create Report;

4. Enter a name and a description of the Report in the respective Report's Name and Description fields;

5. Select the Login Details radio button in the Report Requested section;

6. To generate a Report for all Agents, select the All Agents radio button in the Include Agents section; to generate a Report for a specific Agent, select the radio button next to the list of Agents and select that Agent from the drop-down list;

7. Enter a Start Date and End Date under the Period Covered field to specify the dates to be included in the Report;

8. Click Apply to save the Report and click OK to return to the main Reports window, or click the Load Report button to view a previously created Report.

Figure 64:
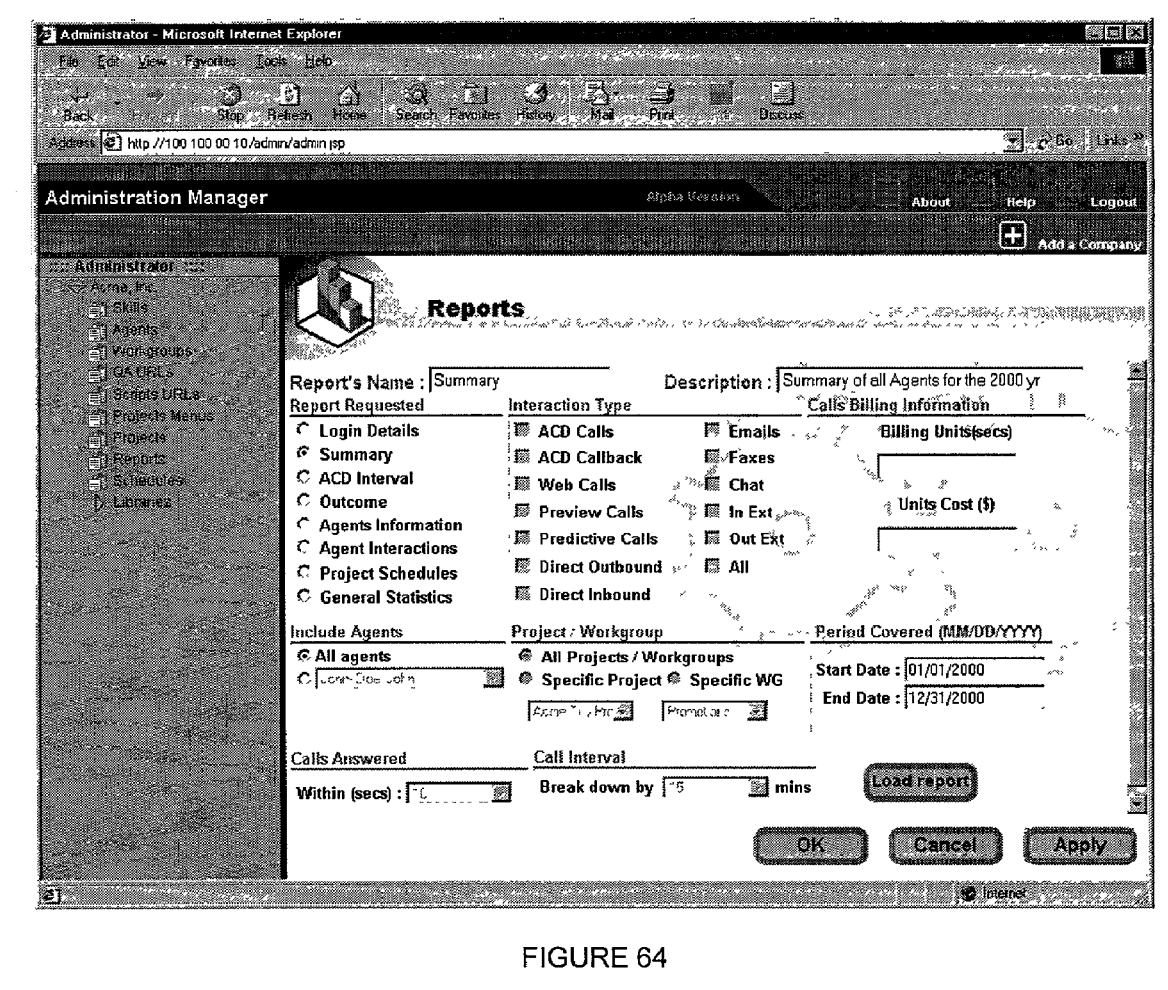

FIG. 64 illustrates enabling generation of a Summary Report. The process is as follows:

1. From the main left-hand column, select the Company for which a Report is to be created;

2. Click on the Reports tab under the Company selected;

3. Right-click in the Reports window and click on Create Report;

4. Enter a name and a description of the Report in the respective Report's Name and Description fields;

5. Select the Summary radio button in the Report Requested section;

6. To generate a Report for all Agents, select the All Agents radio button in the Include Agents section; to generate a Report for a specific Agent, select the radio button next to the list of Agents and select that Agent from the drop-down list;

7. Enter a Start Date and End Date under the Period Covered field to specify the dates to be included in the Report;

8. Click Apply to save the Report and click OK to return to the main Reports window, or click the Load Report button to view a previously created Report.

Figure 65:
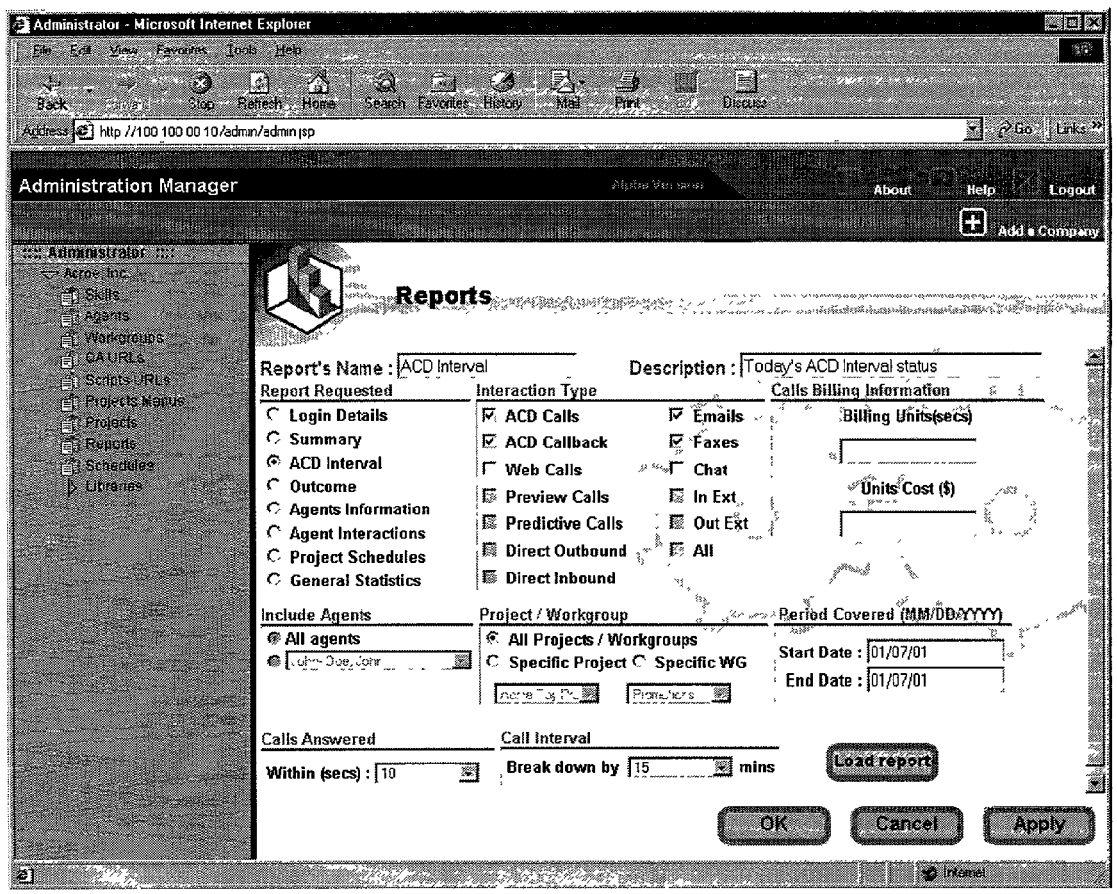

FIG. 65 illustrates enabling generation of an ACD Interval Report. The process is as follows:

1. From the main left-hand column, select the Company for which a Report is to be created;

2. Click on the Reports tab under the Company selected;

3. Right-click in the Reports window and click on Create Report;

4. Enter a name and a description of the Report in the respective Report's Name and Description fields;

5. Select the ACD Interval radio button in the Report Requested section;

6. Select Interaction statistics to be generated in the Report by selecting a combination of highlighted interaction types under the Interaction Type section; the Interaction types include ACD Calls, ACD Callbacks, Web Calls, E-mails, Faxes, and Chats; select the check box for the interaction statistics to be included in the Report;

7. Choose a Project or a Workgroup to be included in the Report by selecting the corresponding radio button in the Project/Workgroup section; if the Specific Project or Specific WG radio buttons is selected, select the specific Project/Workgroup from the drop-down list;

8. Select the interval in minutes from the Call Interval section in the "Break down by" drop-down list;

9. Select the interval in seconds from the Calls Answered section from the Within drop-down list (this function records the percentage of calls answered within so many seconds and then the rest of the calls after that time);

10. Select a Start Date and End Date under the Period Covered field to specify the dates to be included in the Report;

11. Click Apply to save the Report and click OK to return to the main Reports window, or click the Load Report button to view a previously created Report.

Figure 66:
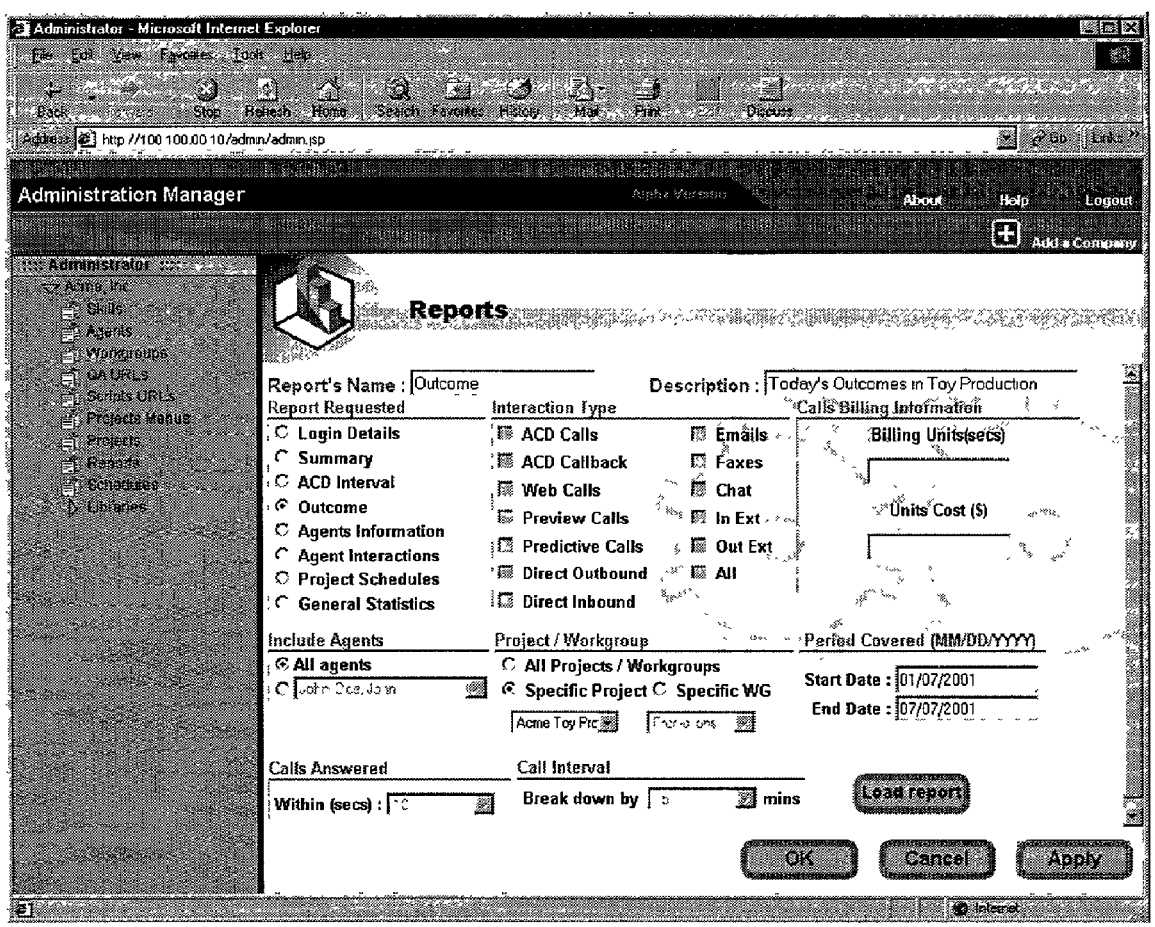

An Outcome Report provides statistics relating to the results of Agents' interactions with the callers. FIG. 66 illustrates defining an Outcome Report. The process is as follows:

1. From the main left-hand column, select the Company for which you an Outcome Report is to be created;

2. Click on the Reports tab under the Company selected;

3. Right-click in the Reports window and click on Create Report;

4. Enter a name and a description of the Report in the respective Report's Name and Description fields;

5. Select the Outcome radio button in the Report Requested section;

6. To generate a Report for all Agents, select the All Agents radio button in the Include Agents section; to generate a Report for a specific Agent, select the radio button next to the list of Agents and select the Agent from the drop-down list;

7. Choose the Project or Workgroup to be included in the Report by selecting the corresponding radio button in the Project/Workgroup section; if the Specific Project or Specific WG radio buttons is selected, select the specific Project/Workgroup from the drop-down list;

8. Enter a Start Date and End Date under the Period Covered field to specify the dates to be included in the Report;

9. Click Apply to save the Report and click OK to return to the main Reports window, or click the Load Report button to view a previously created Report.

Figure 67:
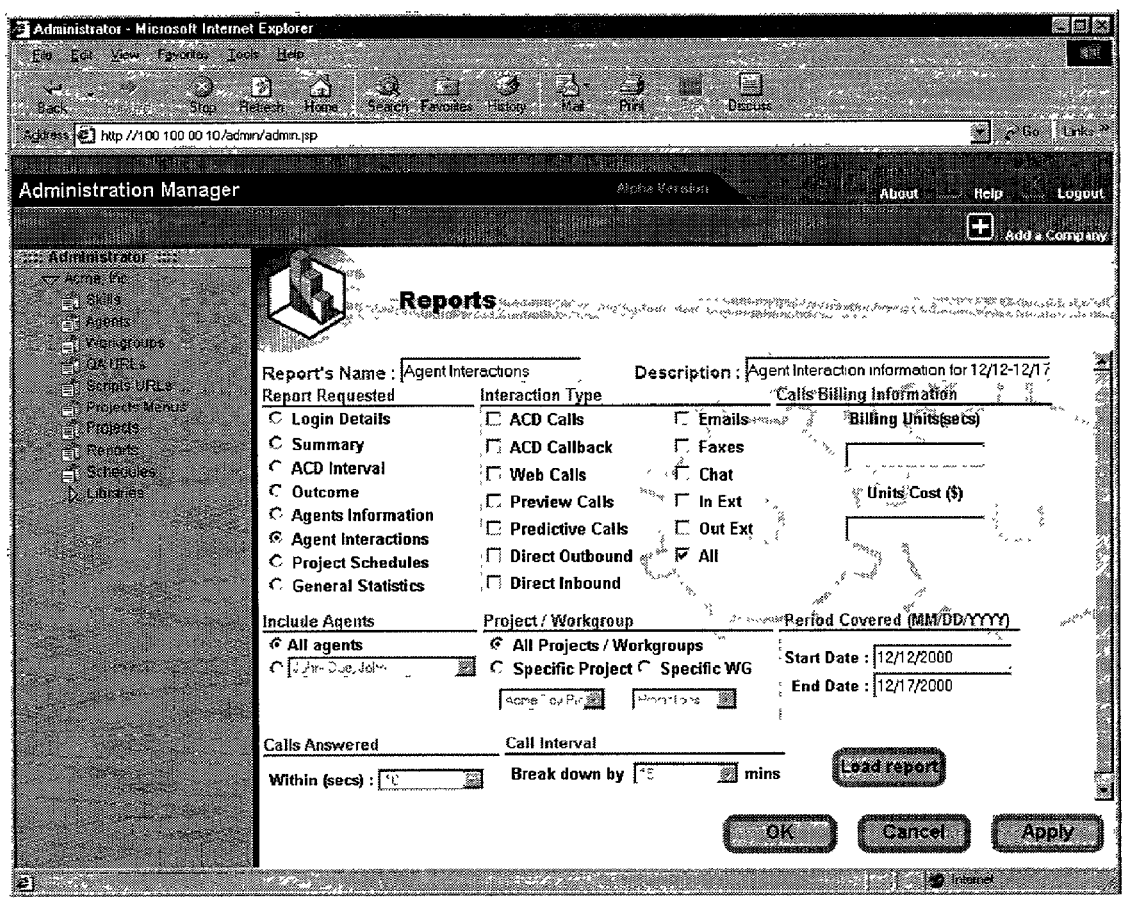

FIG. 67 illustrates defining an Agent Interaction Report. The process is as follows:

1. From the main left-hand column, select the Company for which the Report is to be created;

2. Click on the Reports tab under the Company selected;

3. Right-click in the Reports window and click on Create Report;

4. Enter a name and a description of the Report in the respective Report's Name and Description fields;

5. Select the Agent Interactions radio button in the Report Requested section;

6. Choose the Interaction statistics to be included in the Report by selecting a combination of interaction types under the Interaction Type section; the Interaction types include ACD Calls, ACD Callbacks, Preview Calls, Predictive Calls, Direct Outbound, Direct Inbound, Web Calls, E-mails, Faxes, Chats, In Ext, and Out Ext; select the check box for the interaction statistics to be included in the Report (e.g., to choose all interaction types, select the All check box);

7. To generate a Report for all Agents, select the All Agents radio button in the Include Agents section; to generate a Report for a specific Agent, select the radio button next to the list of Agents and select that Agent from the drop-down list;

8. Choose the Project or Workgroup to include in the Report by selecting the corresponding radio button in the Project/Workgroup section; if the Specific Project or Specific WG radio buttons are selected, select the specific Project/Workgroup from the drop-down list;

9. Enter a Start Date and End Date under the Period Covered field to specify the dates to be included in the Report;

10. Click Apply to save the Report and click OK to return to the main Reports window, or click the Load Report button to view a previously created Report.

Figure 68:
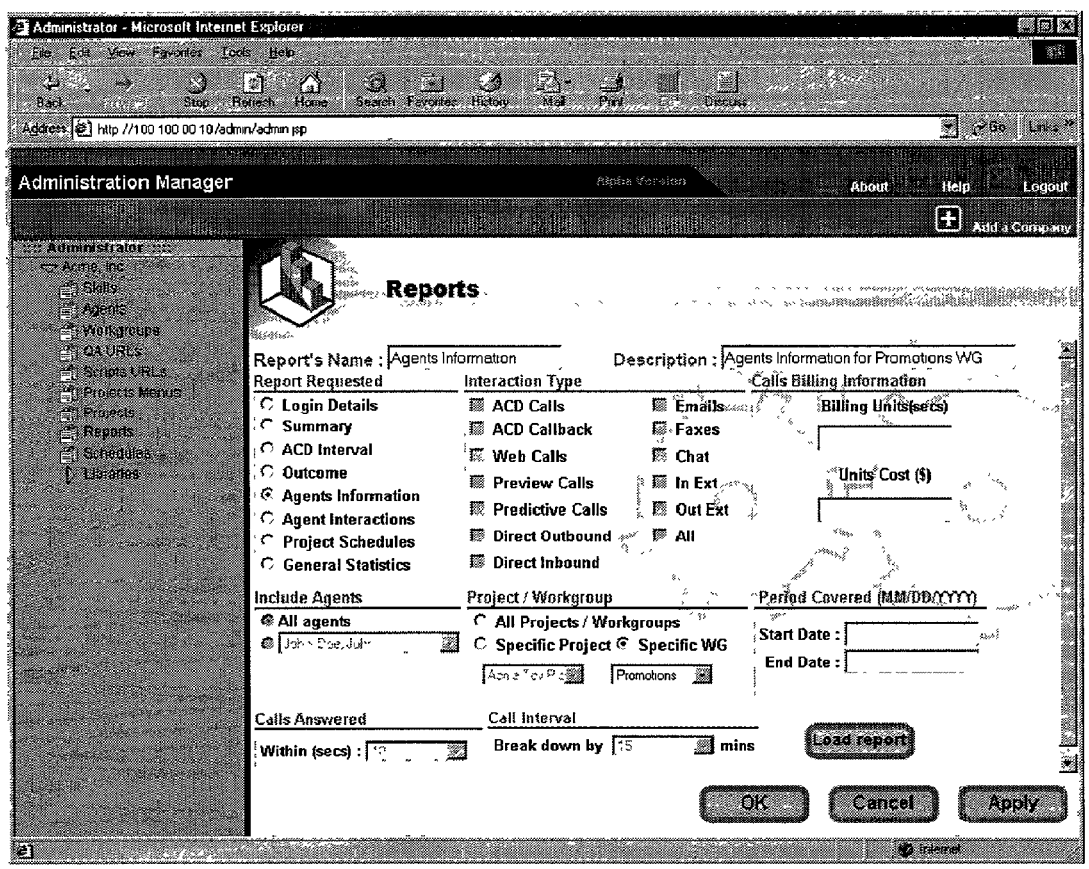

FIG. 68 illustrates defining an Agent Information Report that displays information pertaining to specified Agents, such as their extensions, phone numbers, MSI IDs, and email addresses. The process is as follows:

1. From the main left-hand column, select the Company for which the Report is to be created;

2. Click on the Reports tab under the Company selected;

3. Right-click in the Reports window and click on Create Report;

4. Enter a name and a description of the Report in the respective Report's Name and Description fields;

5. Select the Agents Information radio button in the Report Requested section;

6. Choose the Project or workgroup to be included in the Report by selecting the corresponding radio button in the Project/Workgroup section; if the Specific Project or Specific WG radio buttons is selected, select the specific Project/Workgroup from the drop-down list;

7. Click Apply to save the Report and click OK to return to the main Reports window, or click the Load Report button to view a previously created Report.

Figure 69:
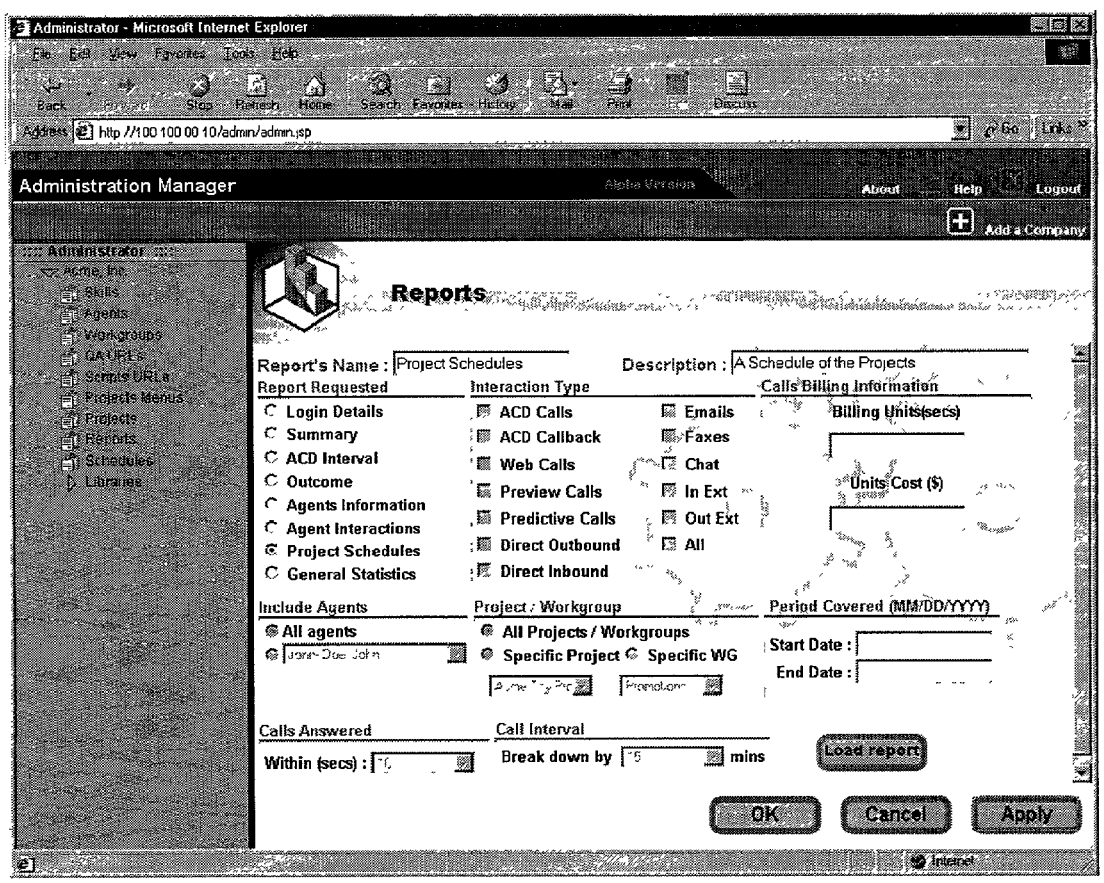

FIG. 69 illustrates creation of a Project Schedule Report that displays, for example, the Schedule of Projects that each Agent in the Company is performing. The process for creating this type of Report is as follows:

1. From the main left-hand column, select the Company for which the Report is to be created;

2. Click on the Reports tab under the Company selected;

3. Right-click in the Reports window and click on Create Report;

4. Enter a name and a description of the Report in the respective Report's Name and Description fields;

5. Select the Project Schedules radio button in the Report Requested section;

6. Click Apply to save the Report and click OK to return to the main Reports window, or click the Load Report button to view a previously created Report.

Figure 70:
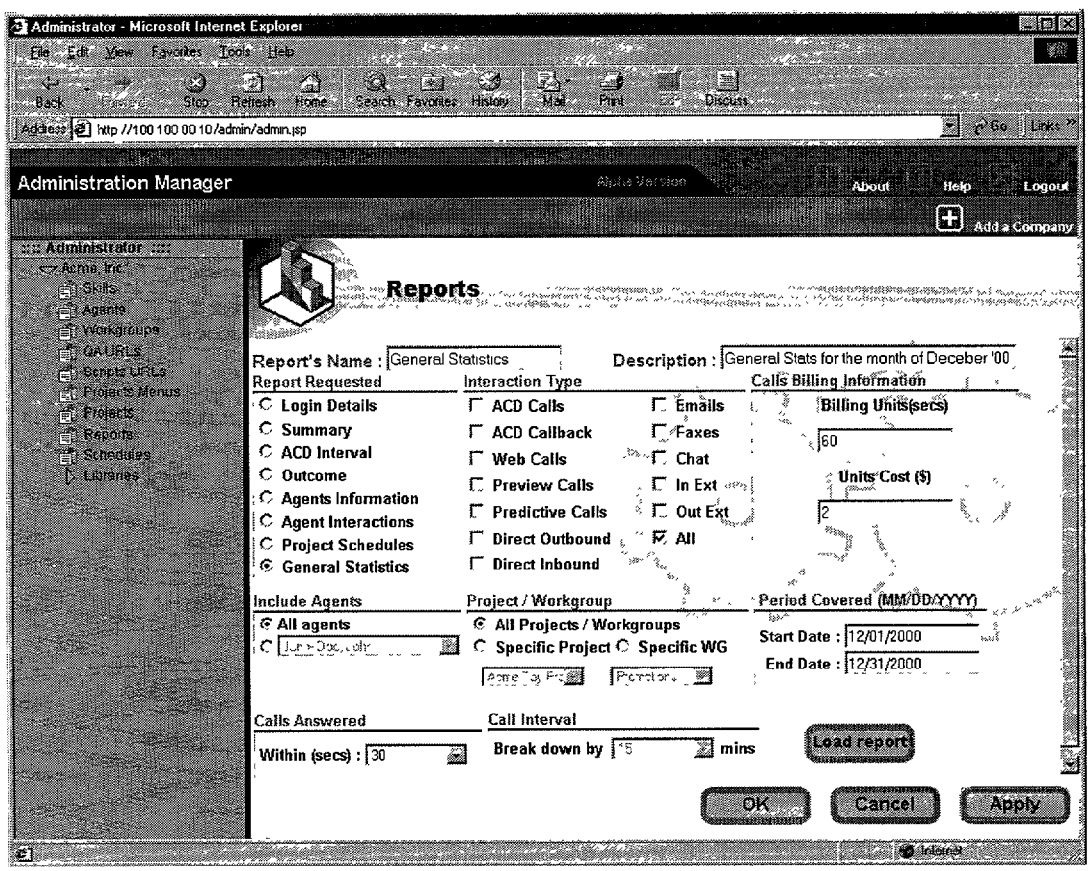

A General Statistics Report displays general statistical information pertaining to all chosen Interactions, Averages, Percentage Statistics, and Billing and Answered Calls percentages. FIG. 70 illustrates creation of the General Statistics Report. The process for creating this Report is as follows:

1. From the main left-hand column, select the Company for which the Report is to be created;

2. Click on the Reports tab under the Company selected;

3. Right-click in the Reports window and click on Create Report;

4. Enter a name and a description of the Report in the respective Report's Name and Description fields;

5. Select the General Statistics radio button in the Report Requested section;

6. Choose the Interaction statistics to be included in the Report by selecting a combination of interaction types under the Interaction Type section; the Interaction types include ACD Calls, ACD Callbacks, Preview Calls, Predictive Calls, Direct Outbound, Direct Inbound, Web Calls, E-mails, Faxes, Chats, In Out, and Out Ext; select the check box for the interaction statistics to be included in the Report; to select all interaction types, select the All check box;

7. Enter the number of seconds for the Billing Units in the Billing Units field in the Calls Billing Information section; enter a corresponding amount for the unit cost in dollars in the Unit Cost field, also in the Calls Billing Information section;

8. To generate a Report for all Agents, select the All Agents radio button in the Include Agents section; to generate a Report for a specific Agent, select the radio button next to the list of Agents, and select the Agent from the drop-down list;

9. Choose the Project or Workgroup to be included in the Report by selecting the corresponding radio button in the Project/Workgroup section; if the Specific Project or Specific WG radio buttons is selected, select the specific Project/Workgroup from the drop-down list;

10. Select the interval in seconds from the Calls Answered section from the Within drop-down list; this function records the percentage of calls answered within so many seconds;

11. Enter a Start Date and an End Date under the Period Covered field to specify the dates to be included in the Report;

12. Click Apply to save the Report and click OK to return to the main Reports window, or click the Load Report button to view a previously created Report.

Figure 71:
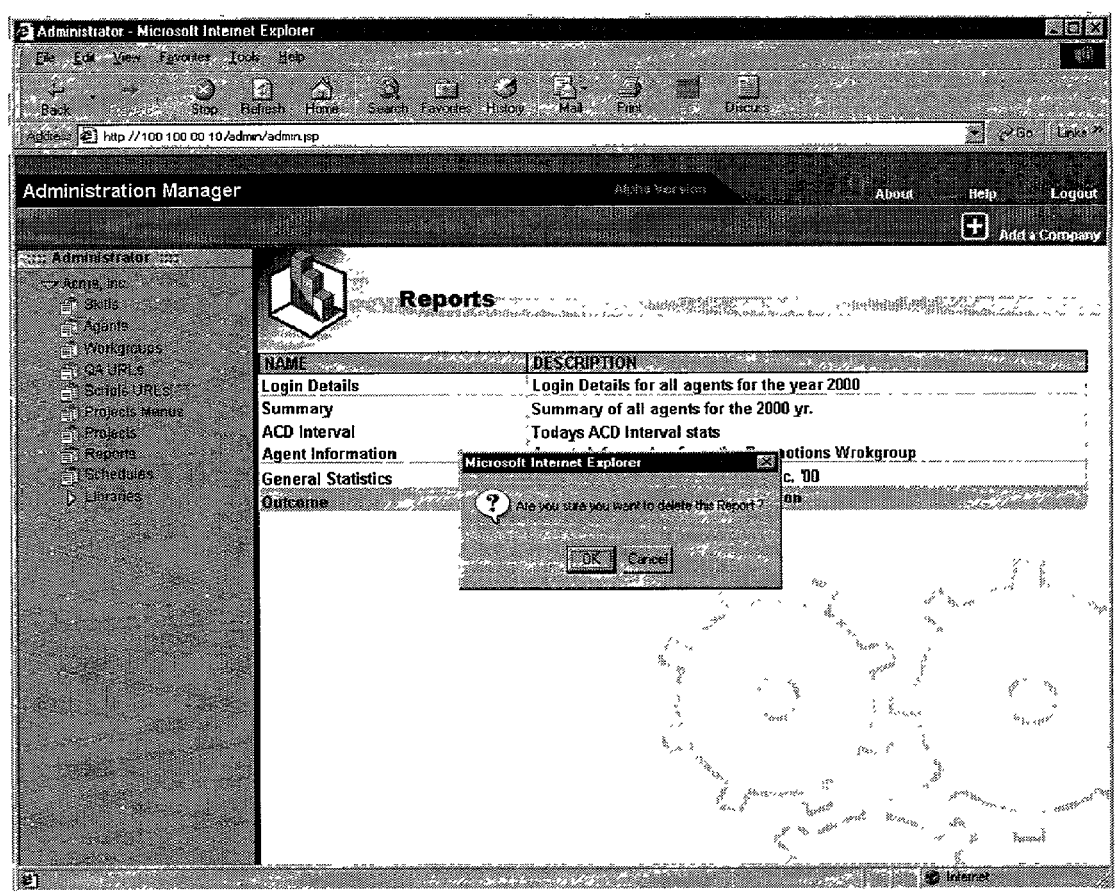

FIG. 71 illustrates deletion of a previously generated Report. The Report deletion process is as follows:

1. From the main left-hand column, select the Company whose Report is to be deleted;

2. Click on the Reports tab under the Company selected;

3. Right-click on the Report to be deleted and click on Delete Report;

4. A message will pop asking for a confirmation of the deletion request; click OK to delete the Report.

Figure 72:
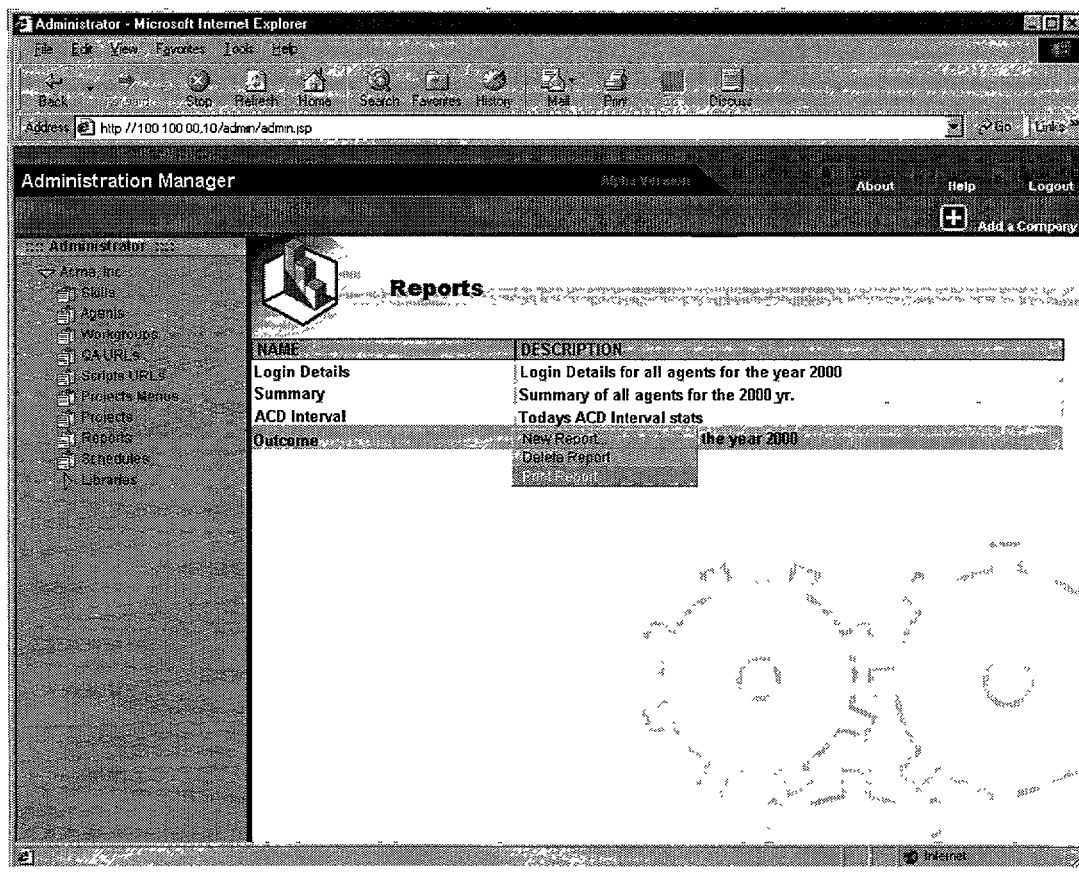

FIG. 72 illustrates printing a previously generated Report. The process is as follows:

1. From the main left-hand column, select the Company whose Report is to be printed;

2. Click on the Reports tab under the Company selected;

3. Right-click on the Report you wish to print and click on Print Report.

Schedules

Schedules can be created to establish the dates and times a particular Project is active. In this way, certain resources, e.g., DNIS, can service more than one Project during a given period. Note that the Current Project is the Project that is running when the new Schedule is to take over. Also note that one Project automatically ends when another Project begins.

Consider the following example of creating two scheduled Projects: "ProjectOne" is to run from 8 a.m.-8 p.m. Monday through Friday; "ProjectTwo" should run from 8 p.m.-8 a.m. Monday through Friday and all day Saturday and Sunday. The two Projects are listed in both the Current Project and New Project drop-down lists of the Administration Manager. Assign a name to the first Schedule, e.g., "ScheduleOne," and select an appropriate DNIS from the drop-down list. Select the Project that is currently running in the Current Project drop-down list. Next, select "ProjectOne" from the New Project drop-down list. Enter "08:00" in the Time field and select the check boxes next to Monday through Friday. Then save the Project. Now, assign a different name the second Schedule, e.g., "ScheduleTwo," and select the same DNIS as was used for "ScheduleOne." Select "ProjectOne" from the Current Project drop-down list and "ProjectTwo" from the New Project drop-down list. Enter "20:00" in the Time field, select the check boxes next to Monday through Friday, and save the Project.

Figure 73:
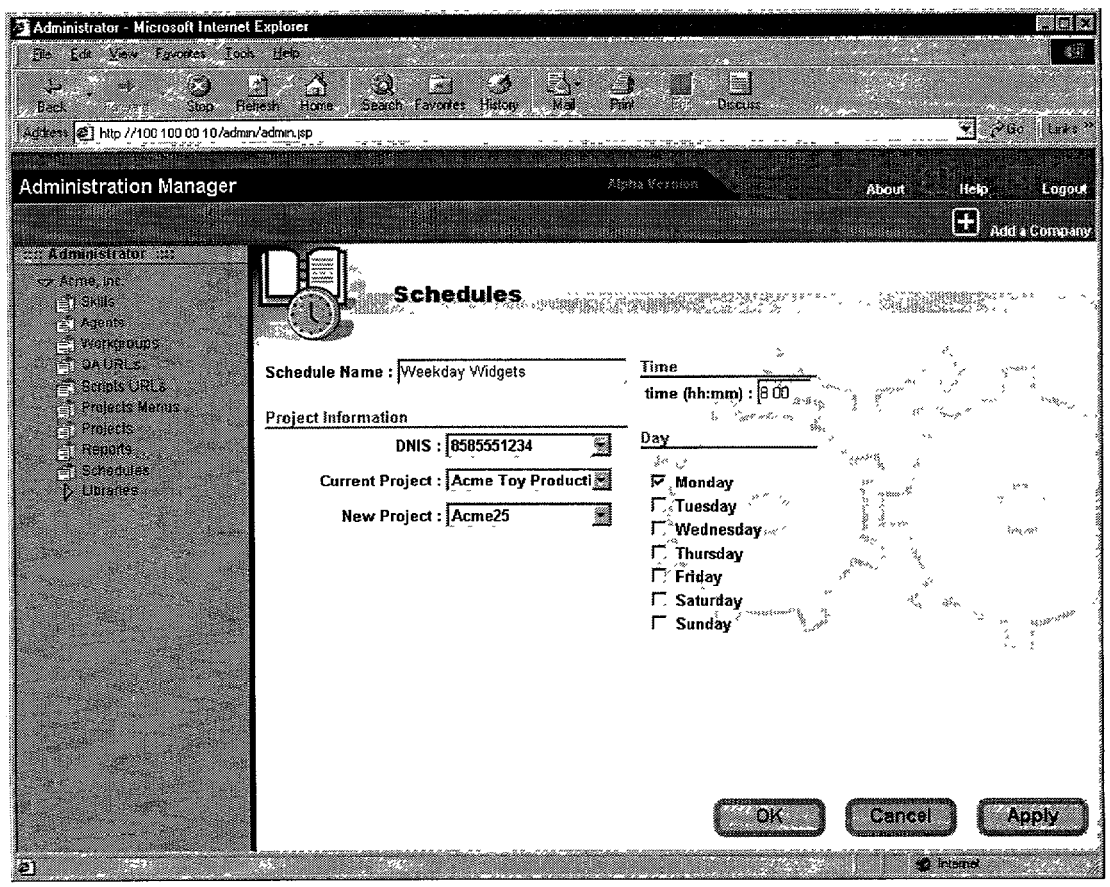

The process of creating a Schedule is illustrated in FIG. 73. The steps of the process are as follows:

1. From the main left-hand column, select the Company for which a Schedule is to be added;

2. Click on the Schedule tab under the Company selected;

3. Right-click in the Schedule window and select Add Schedule;

4. Enter a new Schedule Name in the Schedule Name field;

5. Fill in the appropriate Project Information by selecting the appropriate DNIS, Current Project, and New Project from the respective drop-down lists;

6. Enter a time in the respective Time field;

7. Select a day when the new Project is to take over by clicking the corresponding check box next to the day in the Day section;

8. Click Apply to save the Schedule and click OK to return to the main Schedule window.

Figure 74:
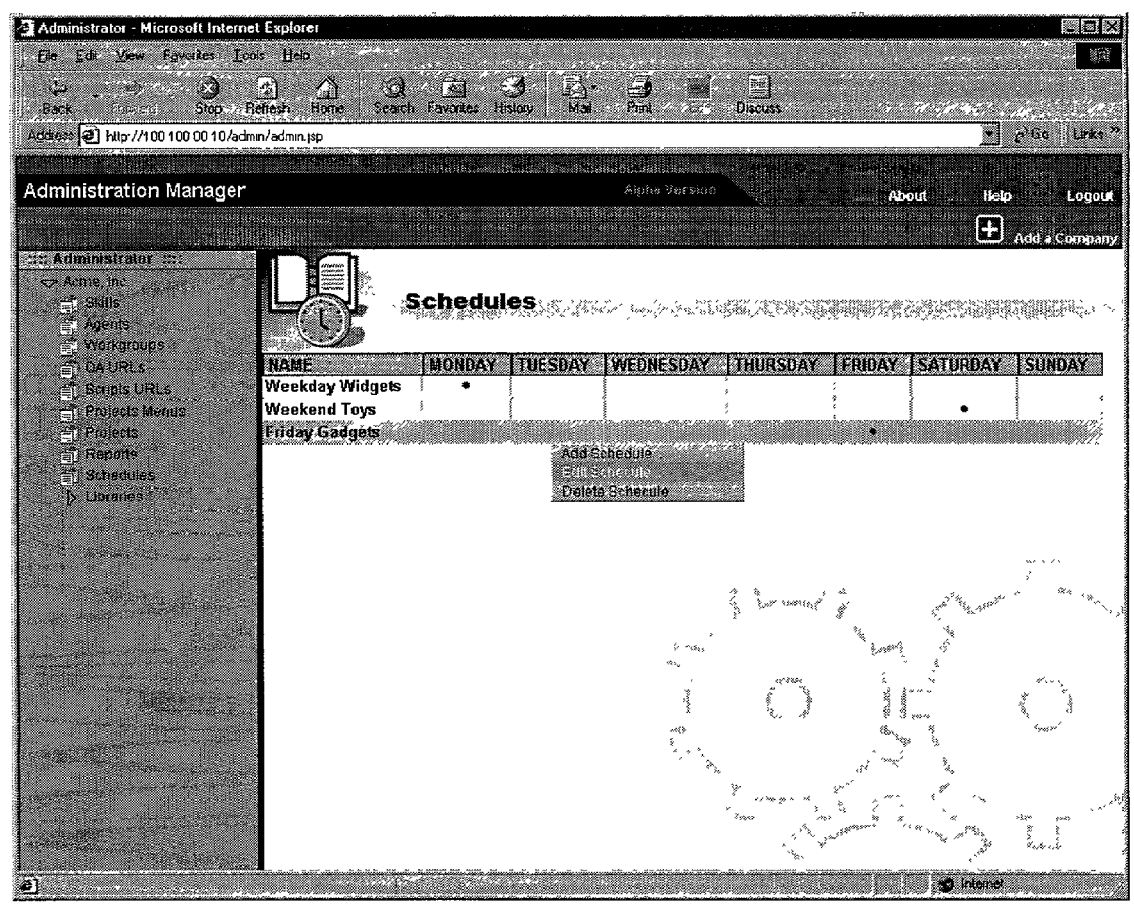

Editing a Schedule is illustrated in FIG. 74. The editing process is as follows:

1. From the main left-hand column, select the Company whose Schedule is to be edited;

2. Click on the Schedule tab under the Company selected;

3. Right-click on the Schedule to be edited and select Edit Schedule;

4. Make any necessary changes to the Schedule information;

5. Click Apply to save the changes and click OK to return to the main Schedule window.

Figure 75:
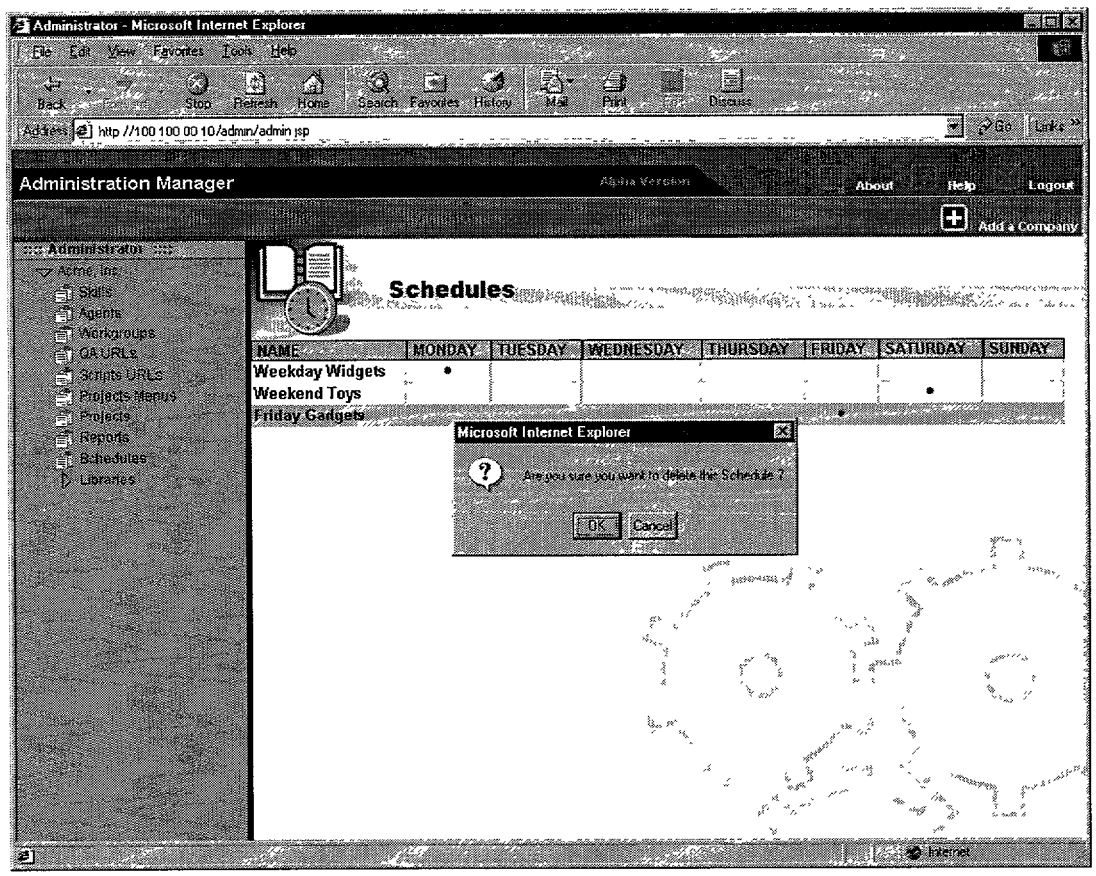

Deletion of an existing Schedule is illustrated in FIG. 75. The deletion process is as follows:

1. From the main left-hand column, select the Company whose Schedule is to be deleted;

2. Click on the Schedule tab under the Company selected;

3. Right-click on the Schedule to be deleted and select Delete Schedule;

4. A message will pop asking for a confirmation of the deletion request; click OK to delete the Schedule.

URL Library

As was discussed in relation to Chat Projects, an Agent can push specific web pages to a caller while being engaged in a Chat with the caller via the Interaction Manager ACD Chat tab. These pages must exist in the call center, and when identified in the Administration Manager, they will appear in a list of URLs when the Agent selects the URL Library button on the ACD Chat tab in the Interaction Manager. URL Libraries are not specific to each Chat Project. This means that once they have been defined in the URL Library window, they need to be added to a Chat Project on the Projects tab.

Figure 76:
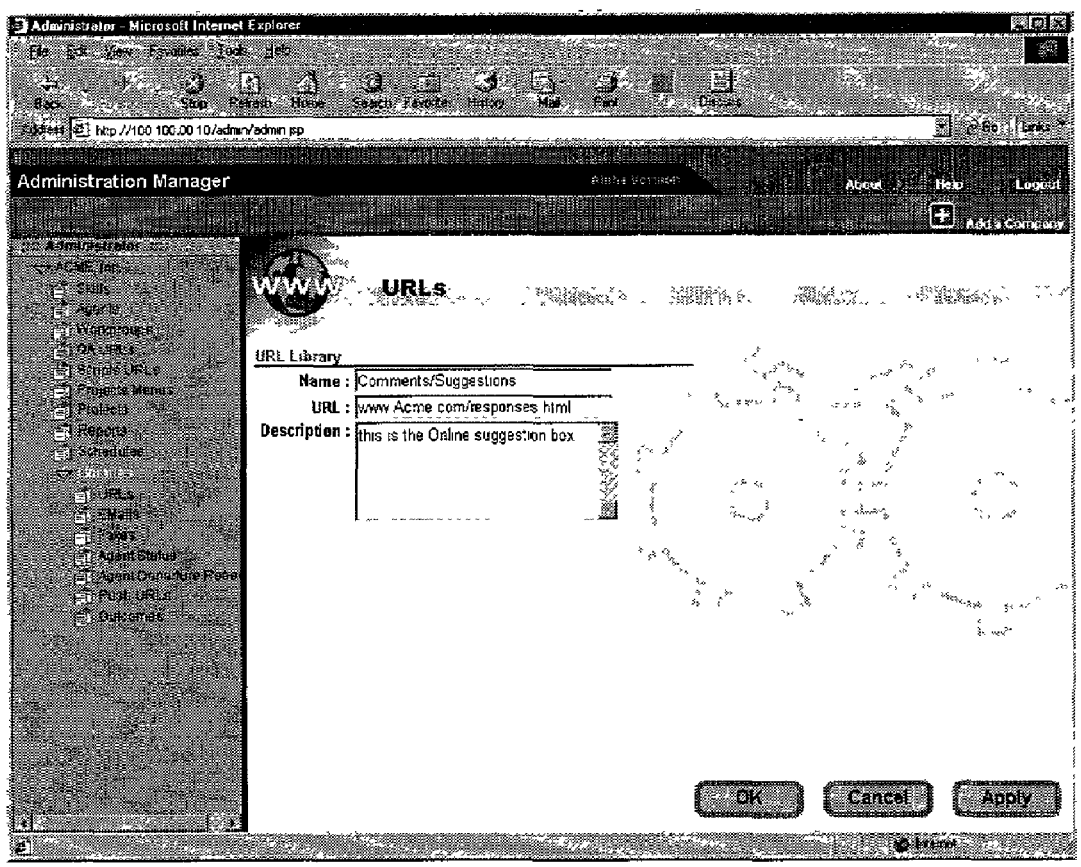

FIG. 76 illustrates the steps of the process of creating a URL for the URL Library. The steps are listed below:

1. From the main left-hand column, select the Company to which a URL is to be added;

2. Open the Library link and click on the URL tab under the Company selected;

3. Right-click in the URL window and select Add URL;

4. Enter a name for the URL in the Name field;

5. Enter the full URL path in the URL field; define the name of the screen pop as well as the full URL path to the html Q&A web page, which can reside on the server;

6. Enter a description of the URL in the Description field;

7. Click Apply to save the URL and click OK to return to the main URL Library window.

Figure 77:
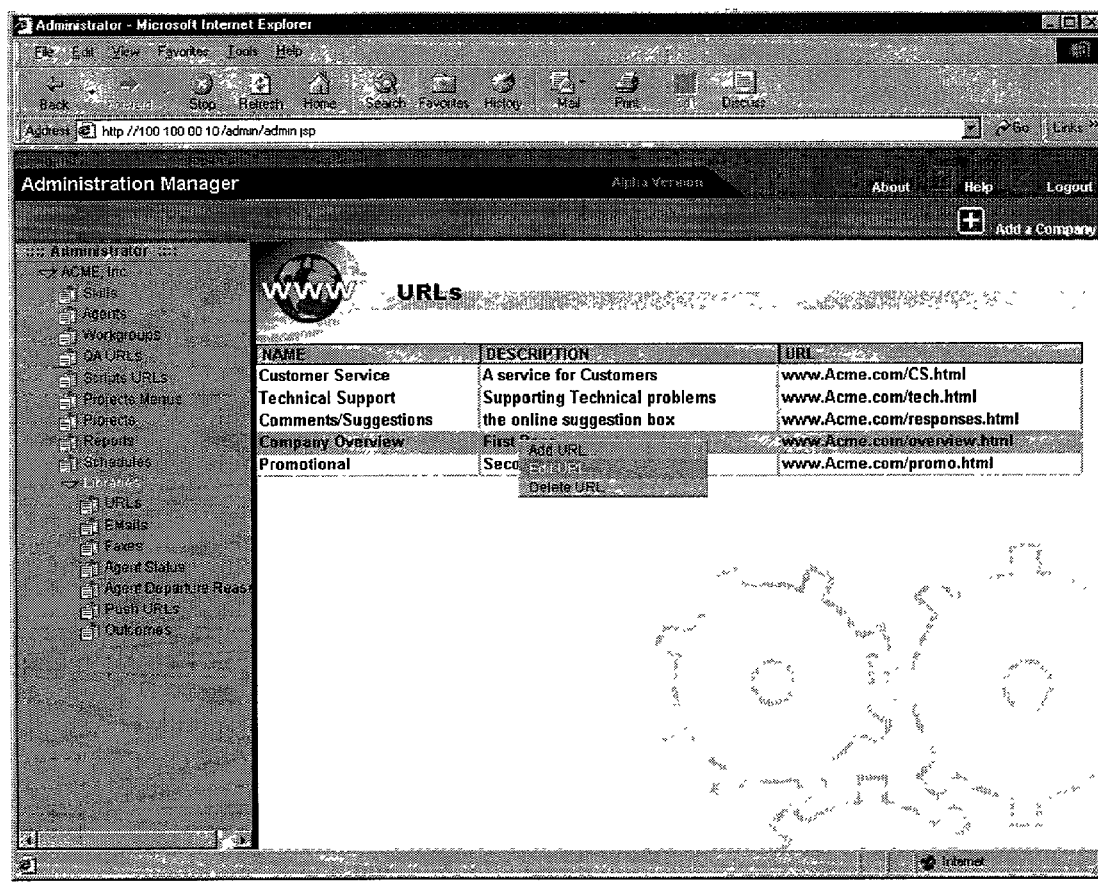
Figure 78:
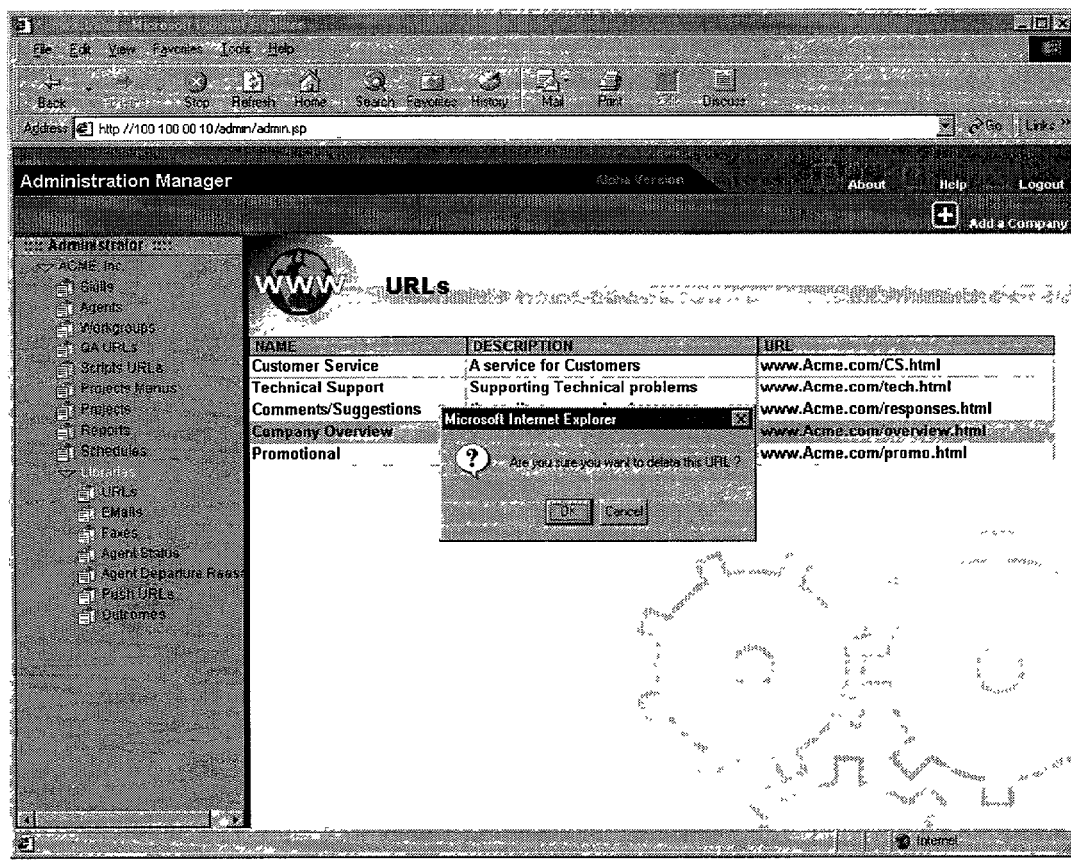

FIG. 77 illustrates the steps of the process of modifying an existing URL in the URL Library. The steps are:

1. From the main left-hand column, select the Company in which an existing URL is to be modified;

2. Open the Library link and click on the URL tab under the Company selected;

3. Right-click on the URL that needs to be modified and select Edit URL;

4. Make the necessary modifications;

5. Click Apply to save the changes and click OK to return to the main URL Library window;

FIG. 78 illustrates the process of deleting an existing URL from the URL Library. The steps of the process are as follows:

1. From the main left-hand column, select the Company from which a URL is to be deleted;

2. Open the Library link and click on the URL tab under the Company selected;

3. Right-click on the URL that needs to be deleted and select Delete URL;

4. A message will pop asking for confirmation of the deletion request; click the OK button to delete the URL.

Email Library

By using Email Templates from the Email Library, Agents can send pre-designed email messages to the callers. Once designed in the Administration Manager, an Agent can select an appropriate template from the list of Email Templates that appears when the E-Mail button is selected from the Contact tab of the Interaction Manager.

Figure 79:
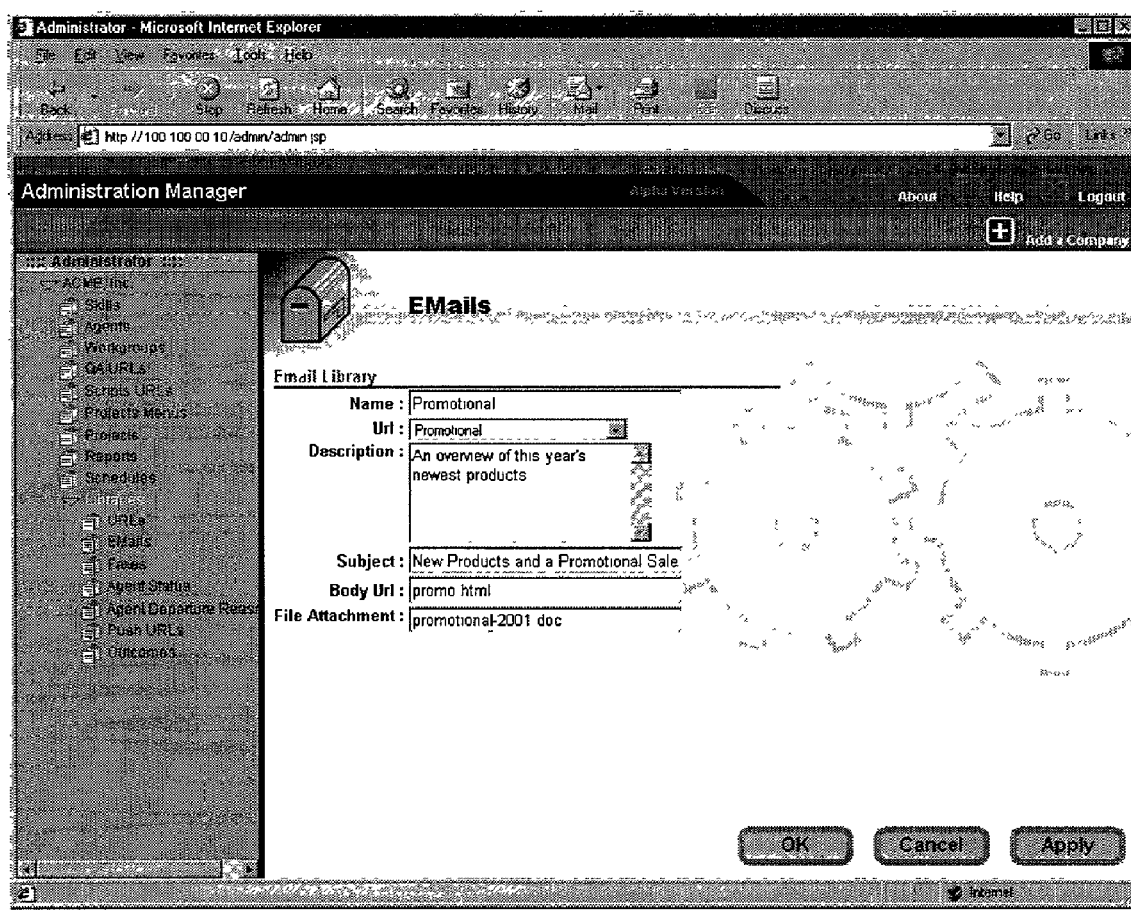

Creating an Email Template for the Email Library is illustrated in FIG. 79. The process for creating an Email Template is as follows:

1. From the main left-hand column, select the Company for which an Email Template is to be created;

2. Open the Library link and click on the Email tab under the Company selected;

3. Right-click in the Email window and click on Add Email;

4. Enter a name for the Email Template in the Name field.

5. Select a URL from the URL drop-down list that corresponds to the new Email Template;

6. Enter a description for the Email Template in the Description field;

7. Enter the Subject that is to be read on the email in the Subject field;

8. Enter the URL for the body of the email in the Body URL field;

9. If there is a file that is to be attached to the Email Template, enter the file into the File Attachment field;

10. Click Apply to save the Email and click OK to return to the main Email Library window.

Figure 80:
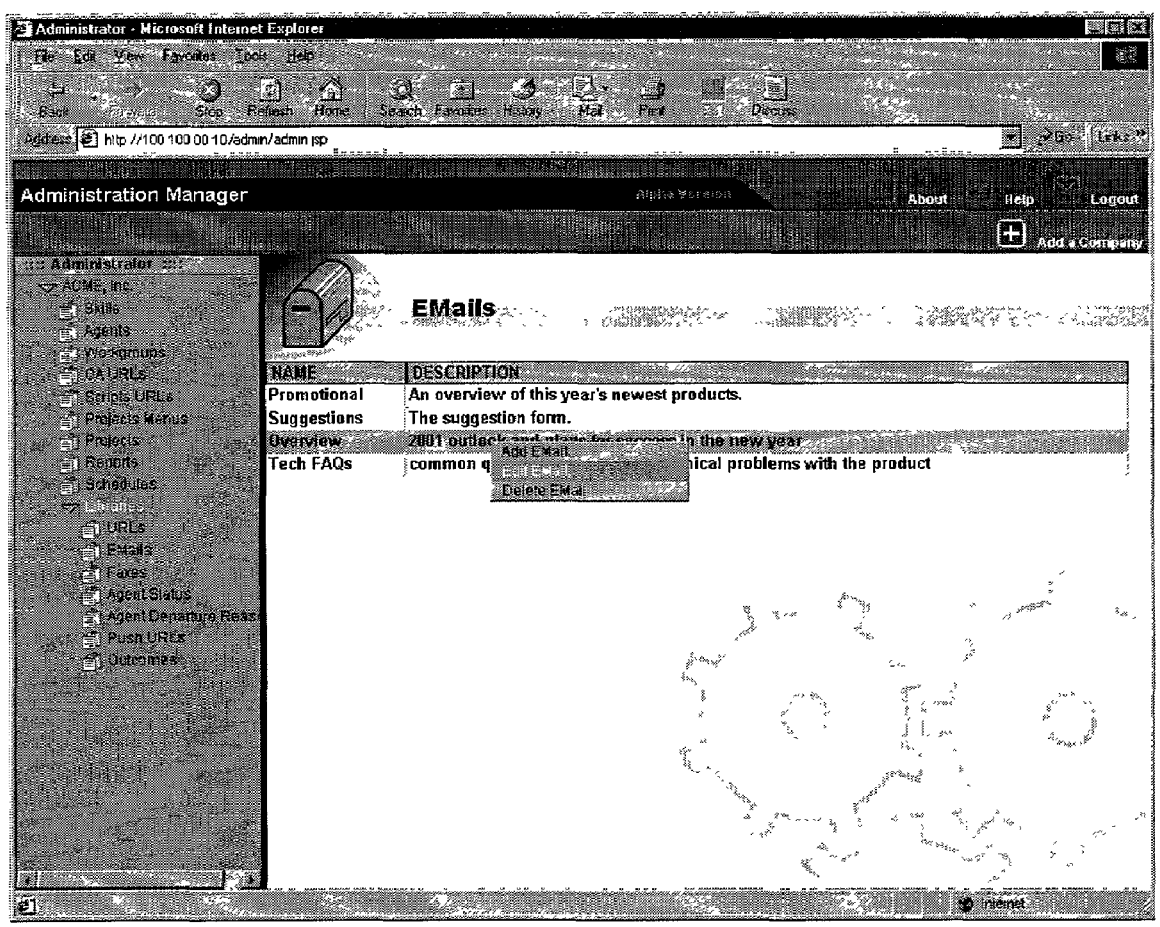

FIG. 80 illustrates the process of modifying an Email Template in the Email Library. The process is as follows:

1. From the main left-hand column, select the Company in which an Email Template is to be modified;

2. Open the Library link and click on the Email tab under the Company selected;

3. Right-click on the Email Template to be modified and click on Edit Email;

4. Make any necessary changes to the Email Template configuration;

5. Click Apply to save the changes and click OK to return to the main Email Library window.

Figure 81:
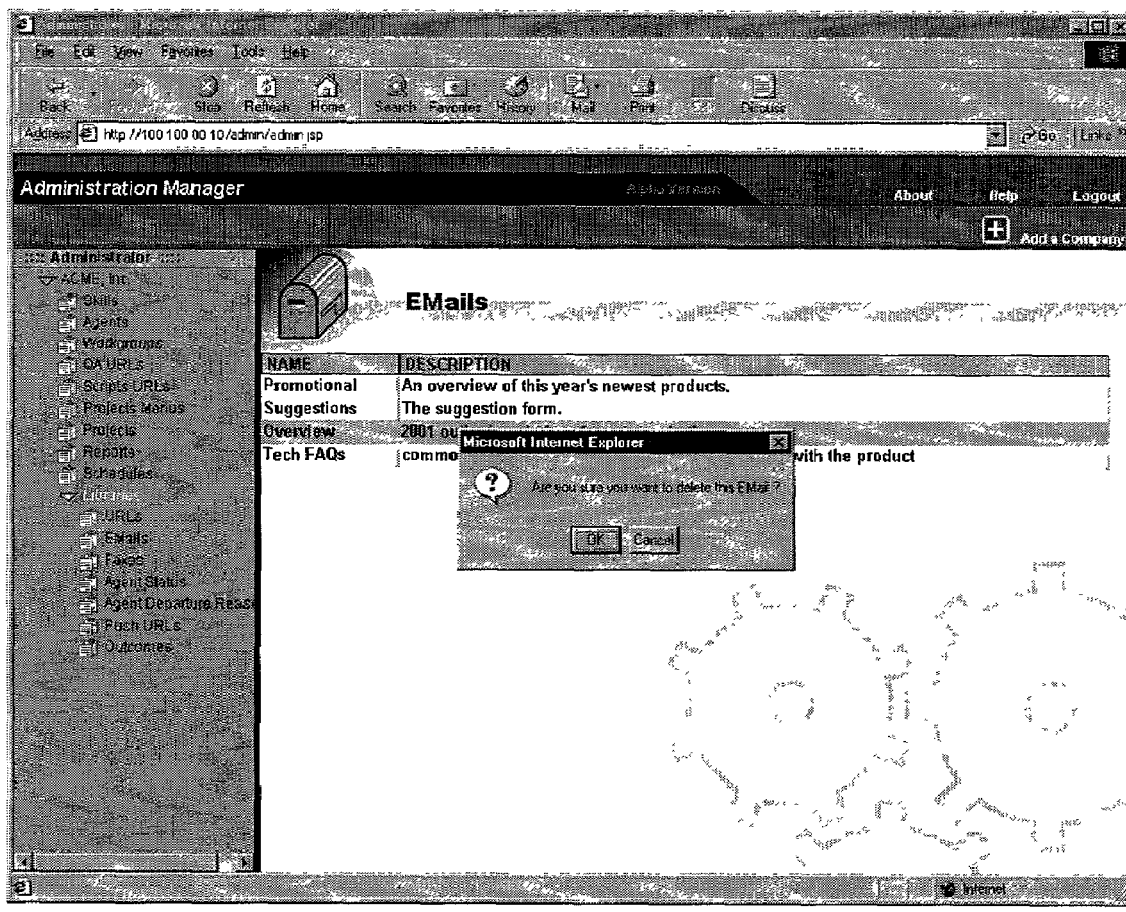

FIG. 81 illustrates the process of deleting an existing Email Template. The process is as follows:

1. From the main left-hand column, select the Company from which an Email Template is to be deleted;

2. Open the Library link and click on the Email tab under the Company selected;

3. Right-click on the Email to be deleted and click on Delete Email;

4. A message will pop asking for a confirmation of the deletion request; click OK to delete the Email template.

Fax Library

Agents can send pre-designed fax files to clients. This is similar to the use of Email Templates described immediately above. The fax file should be available to the host server, and should be identified in the Administration Manager. Then, by selecting the Send Fax button from the Contact tab of the Interaction Manager, an Agent can send a fax to a caller either during or after conversation with the caller.

Figure 82:
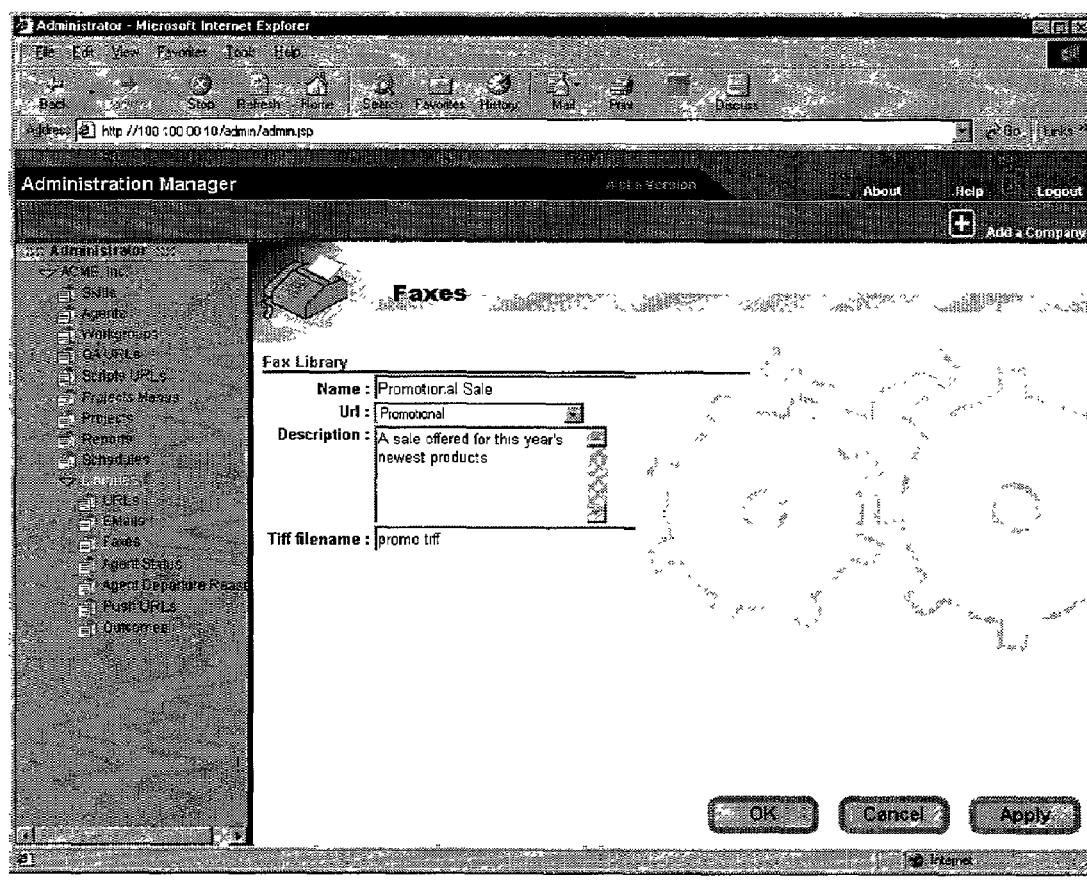

FIG. 82 illustrates creation of a Fax object for the Fax Library. The process of creating a Fax object is as follows:

1. From the main left-hand column, select the Company for which a Fax Template is to be created;

2. Open the Library link and click on the Faxes tab under the Company selected;

3. Right-click in the Fax window and click on Add Fax;

4. Enter a name for the Fax Template in the Name field;

5. Select a URL from the URL drop-down list that corresponds to the new Fax Template;

6. Enter a description of the Fax Template in the Description field;

7. Enter the filename of the Fax Template in the filename field (e.g., tiff filename field for a tiff-type template);

8. Click Apply to save the Fax template and click OK to return to the main Fax Library window.

Other formats can be used instead of, or together with, the tiff format used in the example above.

Figure 83:
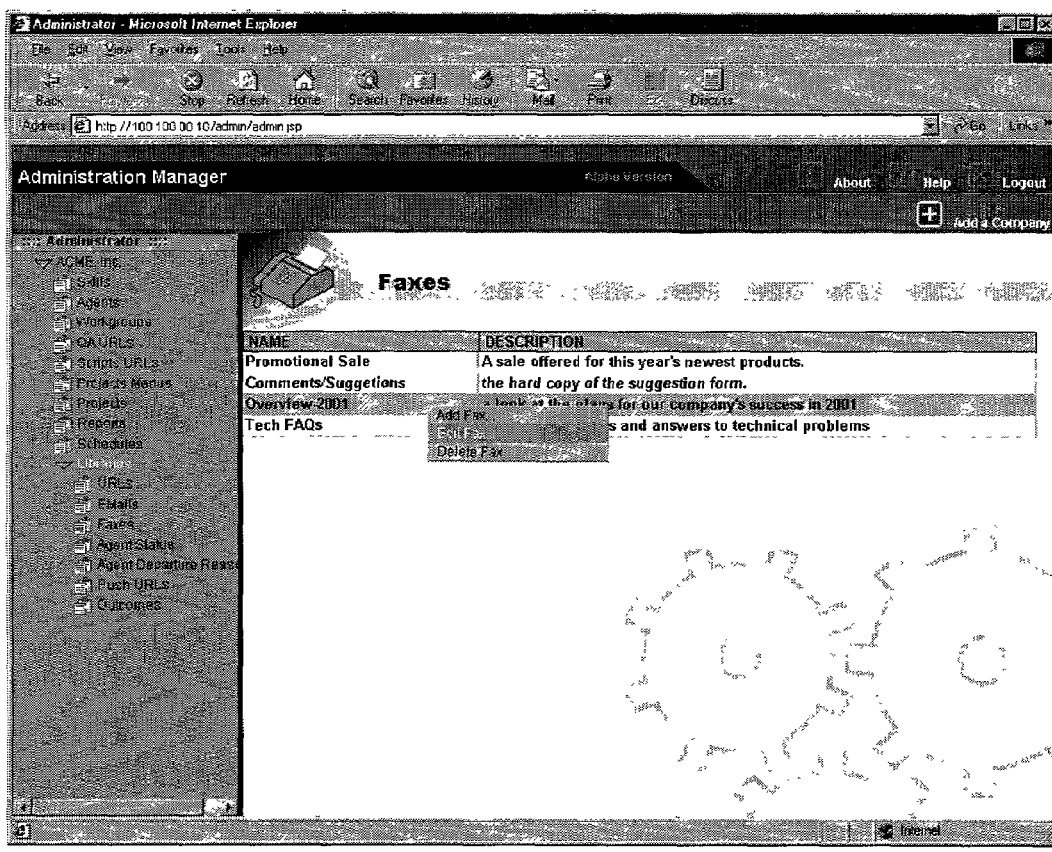

FIG. 83 illustrates the process of modifying a Fax Template in the Fax Library. The process is as follows:

1. From the main left-hand column, select the Company to in which a Fax Template is to be modified;

2. Open the Library link and click on the Faxes tab under the Company selected;

3. Right-click on the Fax Template to be modified and click on Edit Fax;

4. Make any necessary changes to the Fax Template configuration;

5. Click Apply to save the changes and click OK to return to the main Fax Library window.

Figure 84:
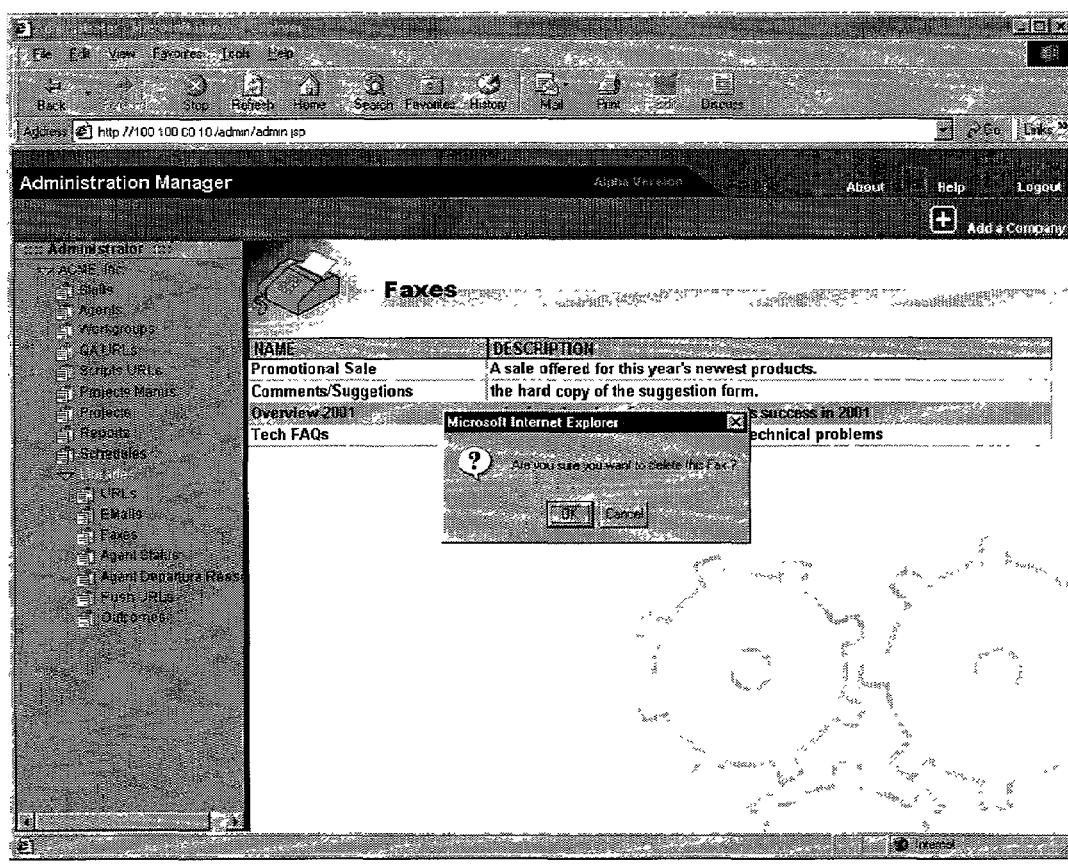

FIG. 84 illustrates the process of deleting a Fax Template from the Fax Library. The process is as follows:

1. From the main left-hand column, select the Company from which a Fax Template is to be deleted;

2. Open the Library link and click on the Faxes tab under the Company selected;

3. Right-click on the Fax to be deleted and click on Delete Fax;

4. A message will pop asking for a confirmation of the deletion request; click OK to delete the Fax.

Agent Status Library

The Administration Manager provides a capability to create Agent Status objects. Such objects pertain to the states of the individual Agents, such as Talking, signifying that the Agent is interacting with a caller; Wrapup, signifying that the Agent is within the time period immediately following an end of an interaction with a caller; and Available, meaning that the Agent is available to receive another interaction.

Figure 85:
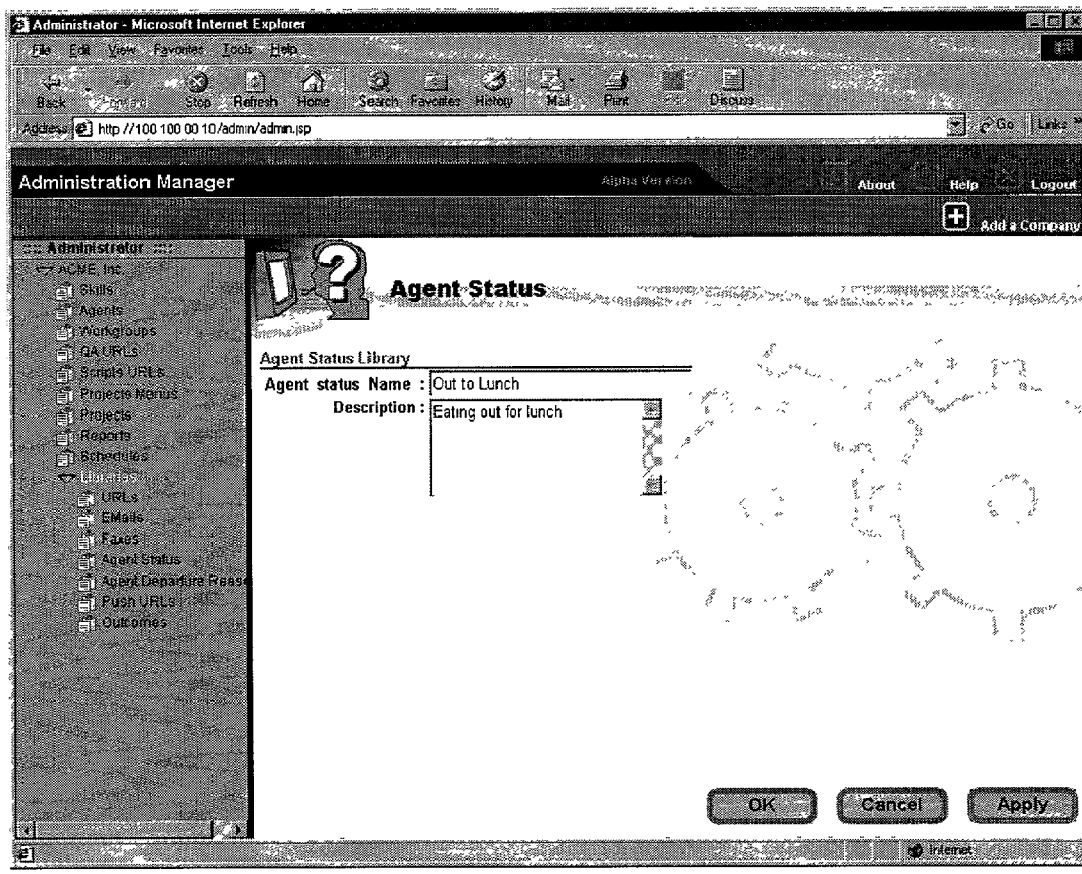

FIG. 85 illustrates the process of defining an Agent Status object for the Agent Status Library, where these objects are stored. The process is as follows:

1. From the main left-hand column, select the Company to which an Agent Status object is to be added;

2. Open the Library link and click on the Agent Status tab under the Company selected;

3. Right-click in the Agent Status window and click on Add Agent Status;

4. Enter a name for the Agent Status in the Agent Status Name field;

5. Enter a description for the Agent Status in the Description field;

6. Click Apply to save the Agent Status and click OK to return to the main Agent Status Library window.

Figure 86:
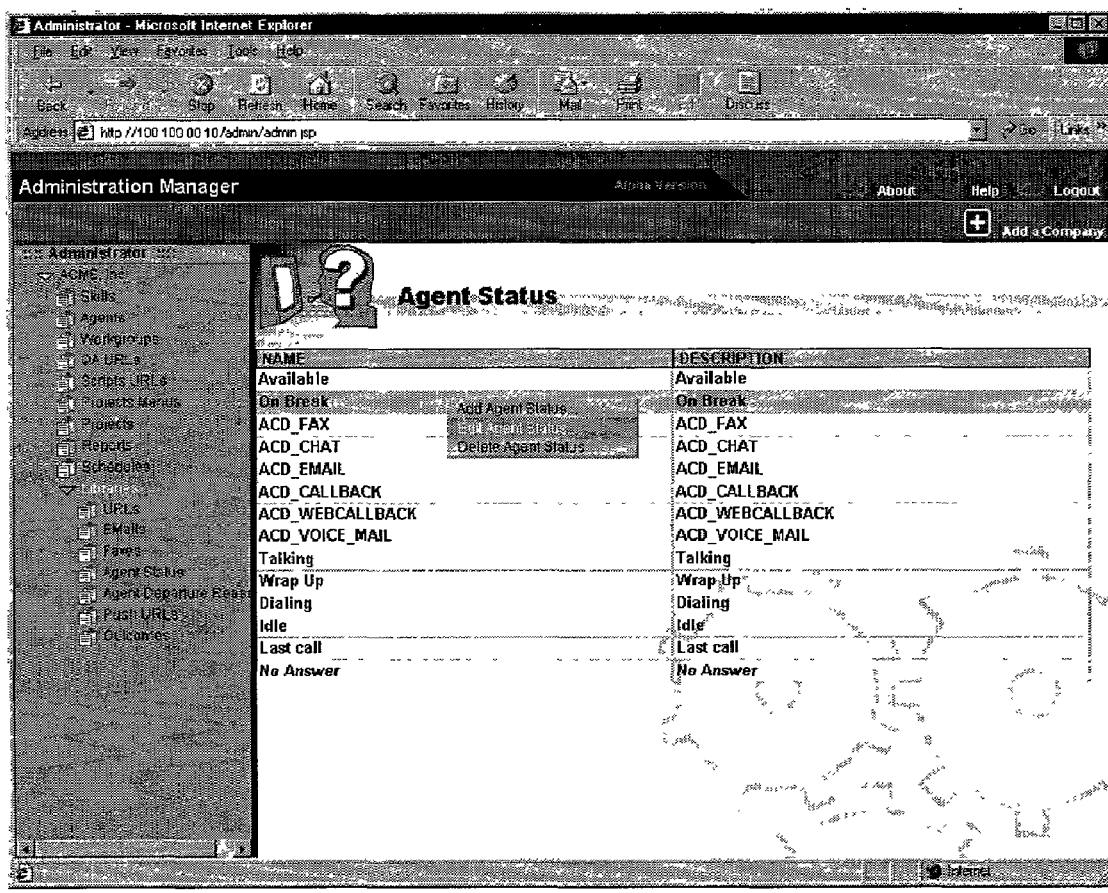

FIG. 86 illustrates the process of modifying a previously defined Agent Status object. The process is as follows:

1. From the main left-hand column, select the Company in which an Agent Status object is to be modified;

2. Open the Library link and click on the Agent Status tab under the Company selected;

3. Right-click on the Agent Status to be modified and click on Edit Agent Status;

4. Make any necessary changes to the Agent Status configuration;

5. Click Apply to save the changes and click OK to return to the main Agent Status Library window.

Figure 87:
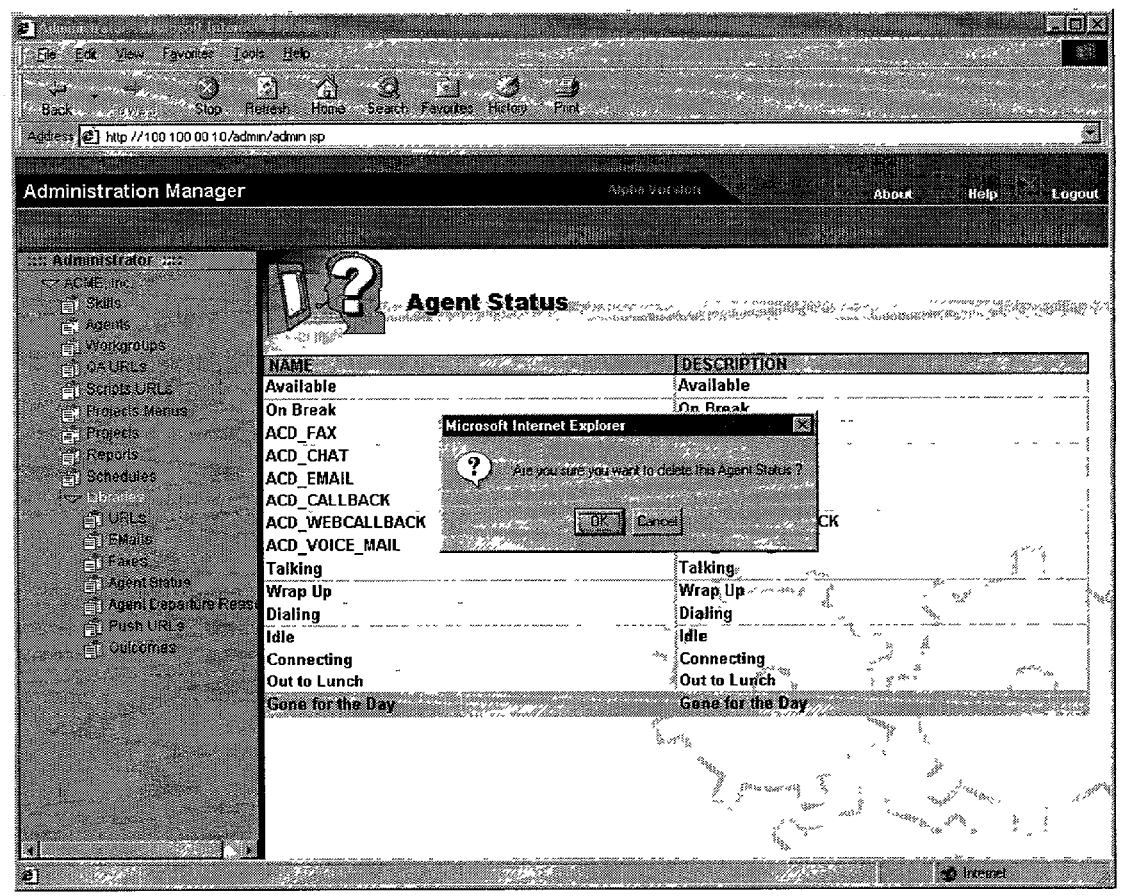

FIG. 87 illustrates the process of deleting a previously defined Agent Status object. The process is as follows:

1. From the main left-hand column, select the Company from which an Agent Status object is to be deleted;

2. Open the Library link and click on the Agent Status tab under the Company selected;

3. Right-click on the Agent Status to be deleted and click on Delete Agent Status;

4. A message will pop asking for a confirmation of the deletion request; click OK to delete the Agent Status.

Agent Departure Reason Library

As was discussed above in relation to FIG. 23, the Administration Manager allows the Company to document the time of and the reason for departure of an individual Agent. The Agent Departure Reason Library is the library of pre-defined standard reasons that can be associated with specific departures.

Figure 88:
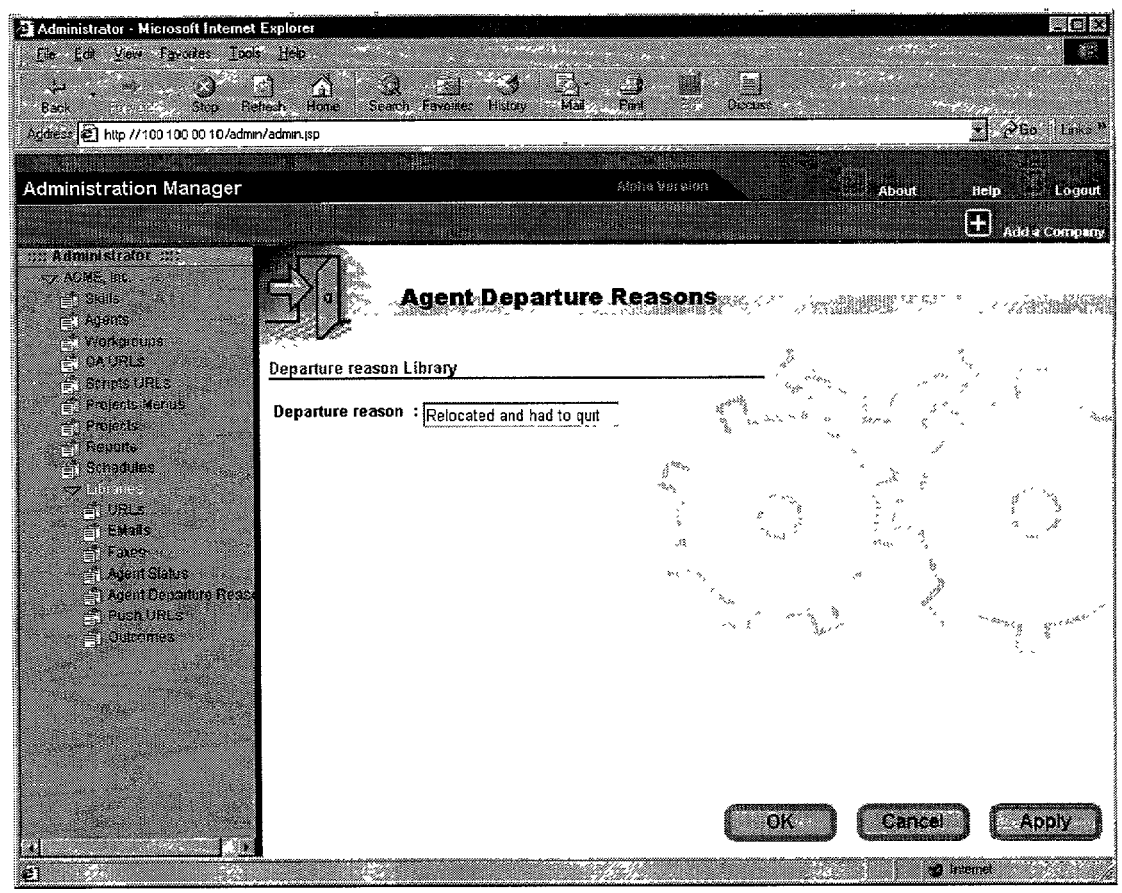
Figure 89:
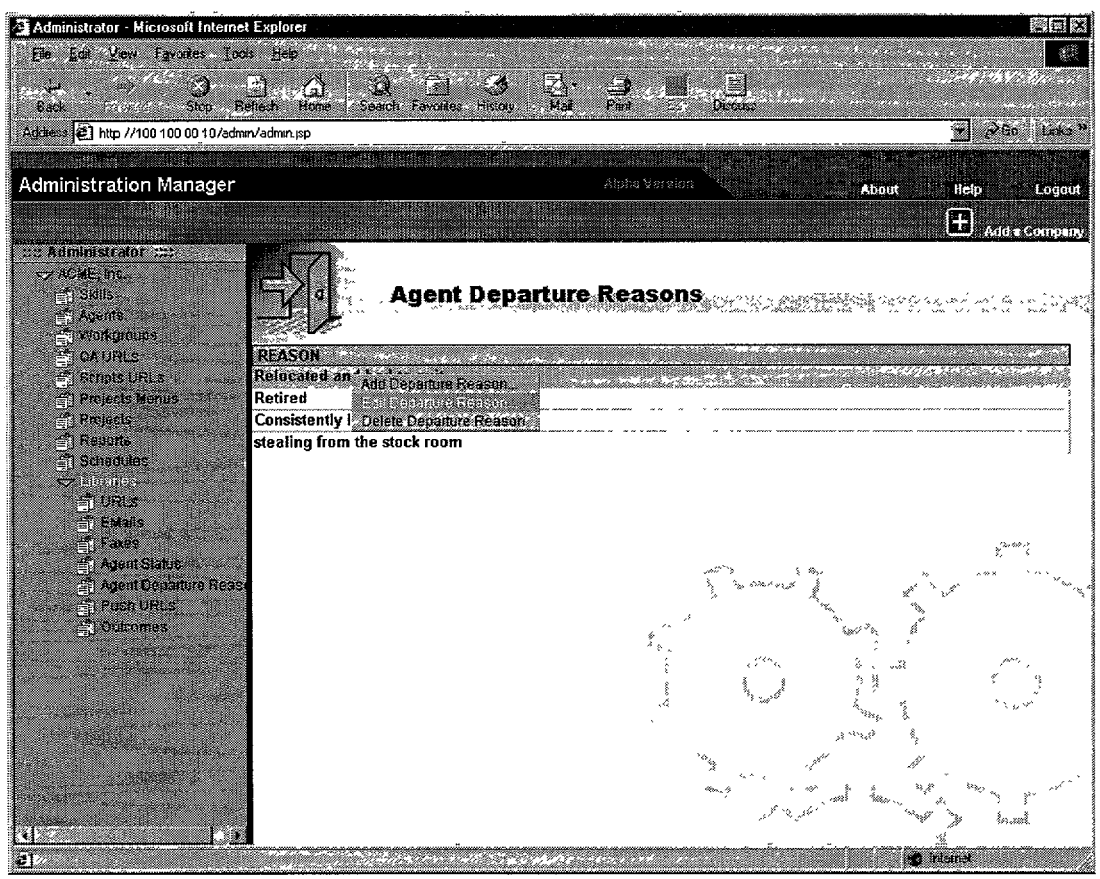

Defining an Agent Departure Reason object is illustrated in FIG. 88. The process is as follows:

1. From the main left-hand column, select the Company to which an Agent Departure Reason is to be added;

2. Open the Library link and click on the Agent Departure Reason tab under the Company selected;

3. Right-click in the Agent Departure Reason window and click on Add Agent Departure Reason;

4. Enter a reason for the Agent's Departure in the Departure Reason field;

5. Click Apply to save the Agent Departure Reason and click OK to return to the main Agent Departure Reason Library window;

FIG. 89 illustrates the process of modifying a previously defined Agent Departure Reason. The process is as follows:

1. From the main left-hand column, select the Company in which an Agent Departure Reason is to be modified;

2. Open the Library link and click on the Agent Departure Reason tab under the Company selected;

3. Right-click on the Agent Departure Reason to be modified and click on Edit Agent Departure Reason;

4. Make any necessary changes to the Agent Departure Reason;

5. Click Apply to save the changes and click OK to return to the main Agent Departure Reason Library window.

Figure 90:
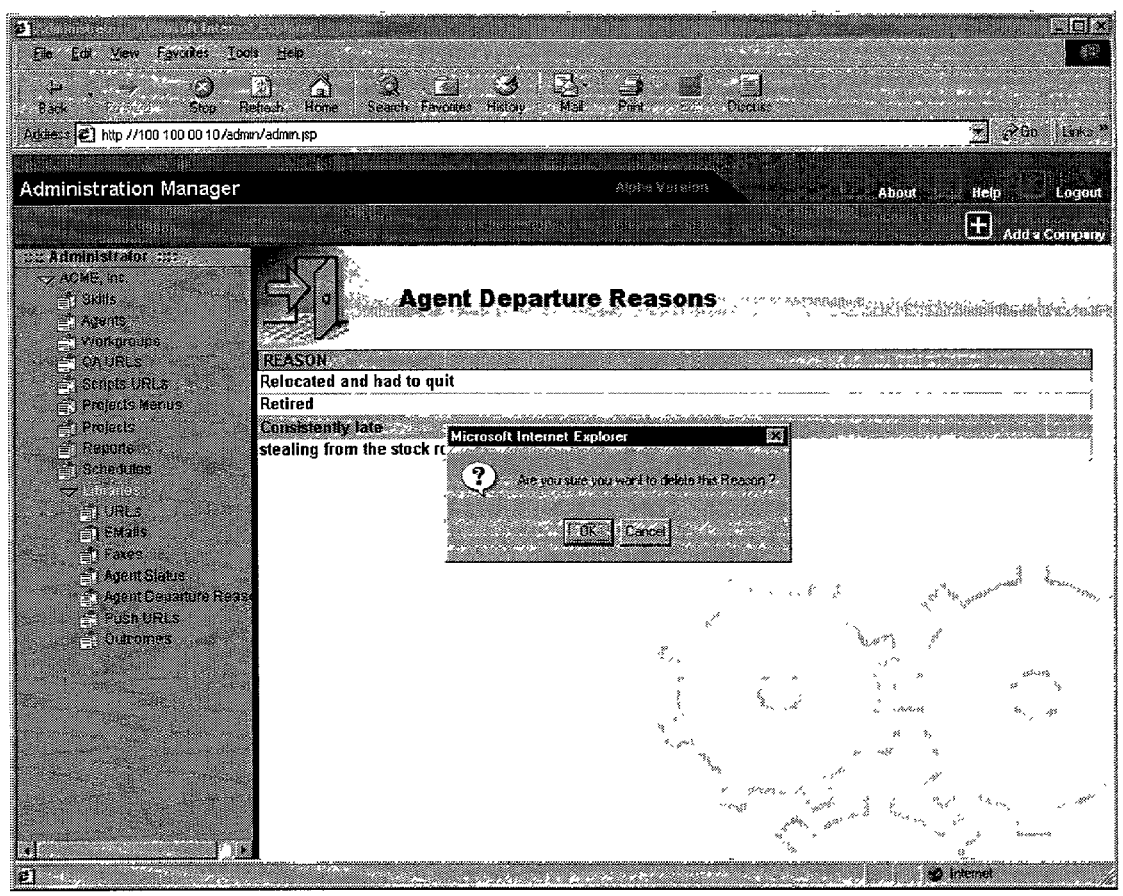

FIG. 90 illustrates the process of deleting a previously defined Agent Departure Reason. The process is as follows:

1. From the main left-hand column, select the Company from which an Agent Departure Reason is to be deleted;

2. Open the Library link and click on the Agent Departure Reason tab under the Company selected;

3. Right-click on the Agent Departure Reason to be deleted and click on Delete Agent Departure Reason;

4. A message will pop asking for a confirmation of the deletion request; click OK to delete the Agent Departure Reason.

Push URL Library

The Push URL Library is a library for centrally organizing pre-defined URLs that can be pushed to a caller while the caller awaits to receive a Chat message from an Agent.

Figure 91:
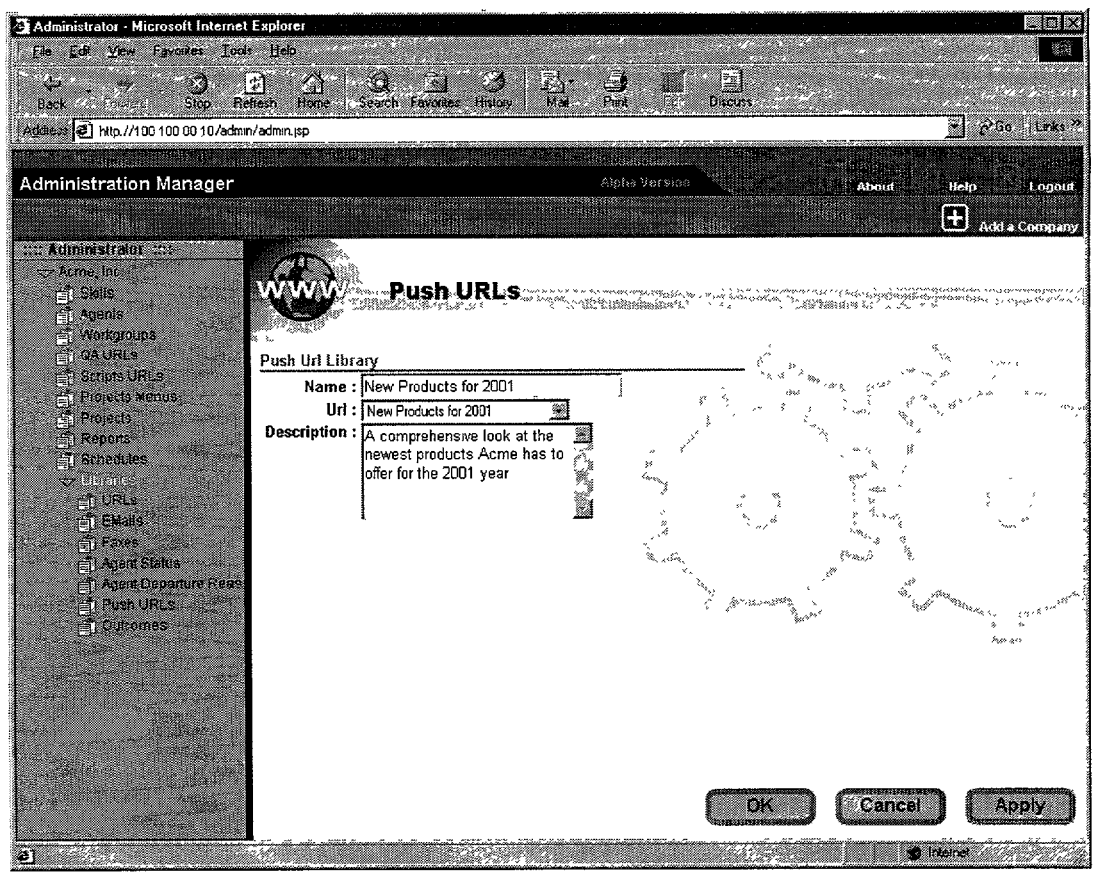

FIG. 91 illustrates the process of adding a Push URL to the Push URL Library. The steps of the process are as follows:

1. From the main left-hand column, select the Company to whose Push URL Library a Push URL is to be added;

2. Open the Library link and click on the Push URL tab under the Company selected;

3. Right-click in the Push URL window and select Add Push URL;

4. Enter a name for the Push URL in the Name field;

5. Select a URL from the URL drop-down list that corresponds to the new Push URL;

6. Enter a description of the Push URL in the Description field;

7. Click Apply to save the Push URL and click OK to return to the main Push URL Library window.

Figure 92:
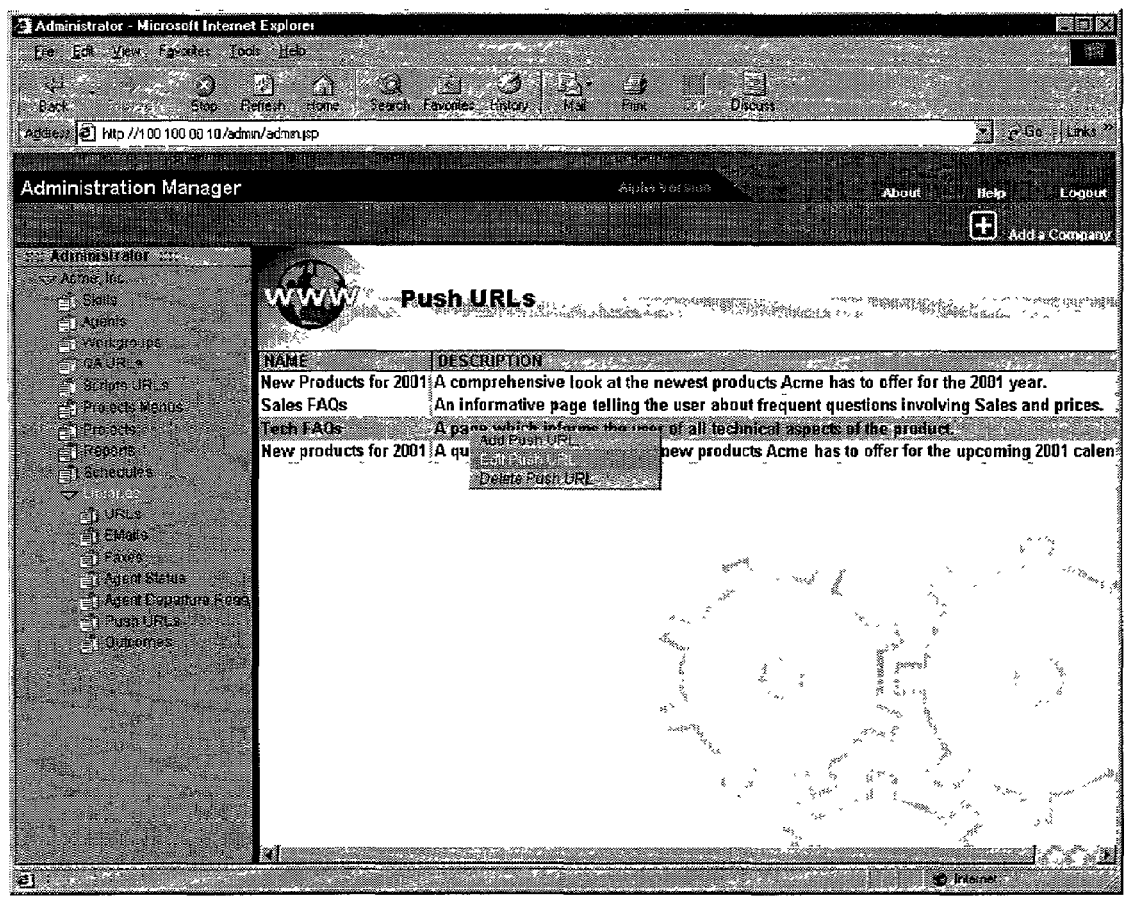

FIG. 92 illustrates the process of modifying a Push URL in the Push URL Library. The steps of the process are as follows:

1. From the main left-hand column, select the Company in whose Push URL Library a Push URL is to be modified;

2. Open the Library link and click on the Push URL tab under the Company selected;

3. Right-click on the Push URL to be modified and select Edit Push URL;

4. Make any necessary changes to the Push URL configuration;

5. Click Apply to save the changes and click OK to return to the main Push URL Library window.

Figure 93:
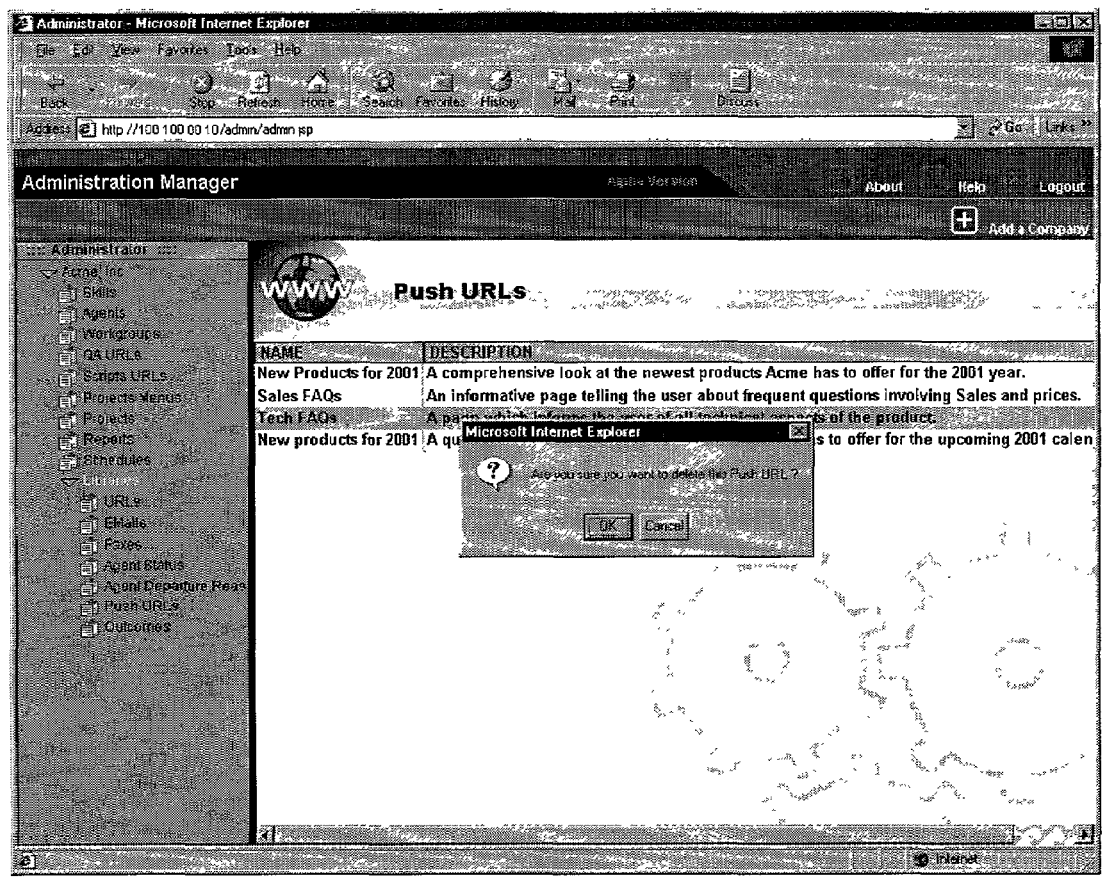
Figure 94:
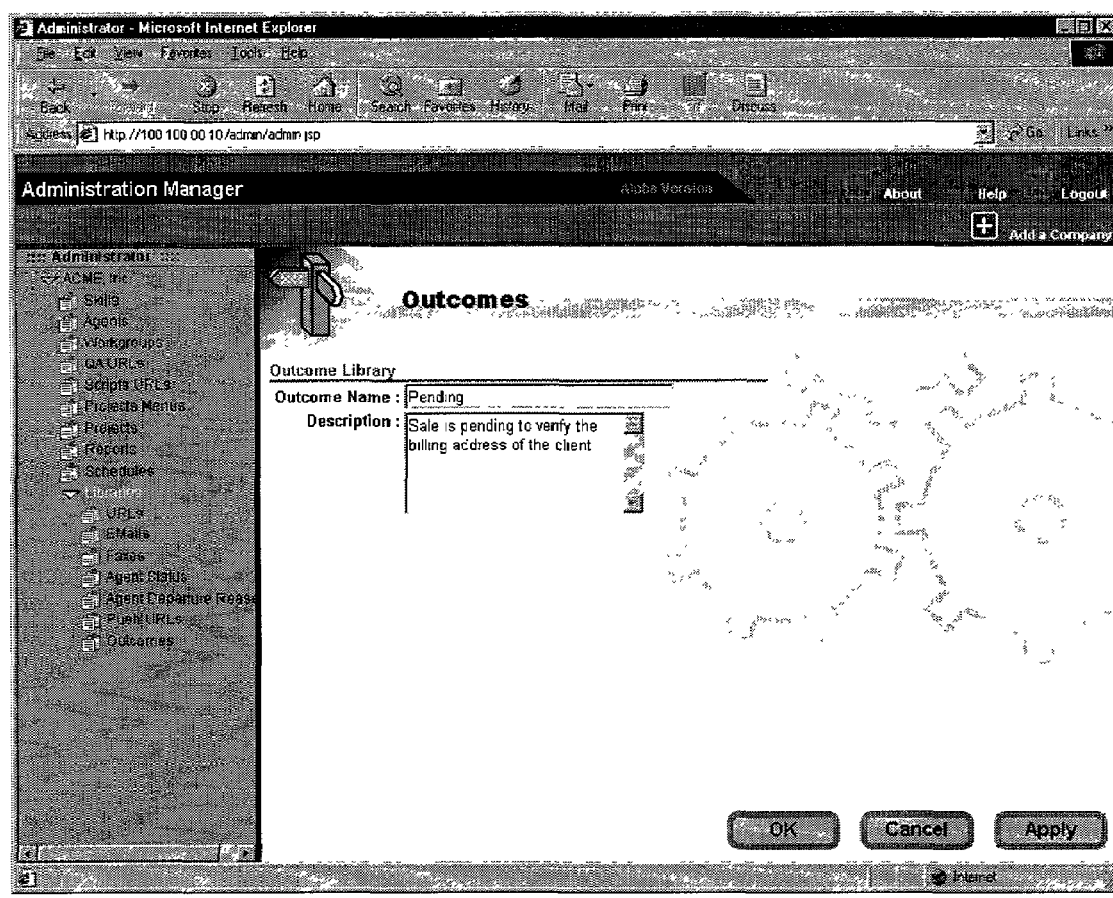

FIG. 93 illustrates deletion of a Push URL from the Push URL Library. The steps of the process are as follows:

1. From the main left-hand column, select the Company from whose Push URL Library a Push URL is to be deleted;

2. Open the Library link and click on the Push URL tab under the Company selected;

3. Right-click on the Push URL to be deleted and select Delete Push URL;

4. A message will pop asking for a confirmation of the deletion request; click OK to delete the Push URL.

Outcome Library

An Outcome is an object describing the result of an interaction with a caller. Examples of calls with Outcomes could be a caller with a question, a potential client calling for product info, or a call needing technical support. For these and many other calls, it becomes more efficient to label the result of the interaction. Whether the call was completed successfully, remains pending, or should be returned by another Agent, it may the useful to label the end result in order to promote efficient call handling and facilitate statistical analysis. The Outcome Library is used as a logical location for organizing the various existing Outcomes.

Adding a new Outcome to the Outcome Library is illustrated in 94. The process of adding an Outcome is as follows:

1. From the main left-hand column, select the Company to whose Outcome Library a new Outcome object is to be added;

2. Open the Library link and click on the Outcomes tab under the Company selected;

3. Right-click in the Outcome window and click on Add Outcome;

4. Enter a name for the Outcome into the Outcome Name field;

5. Enter a description of the Outcome in the Description field;

6. Click Apply to save the Outcome and click OK to return to the main Outcome Library window.

Figure 95:
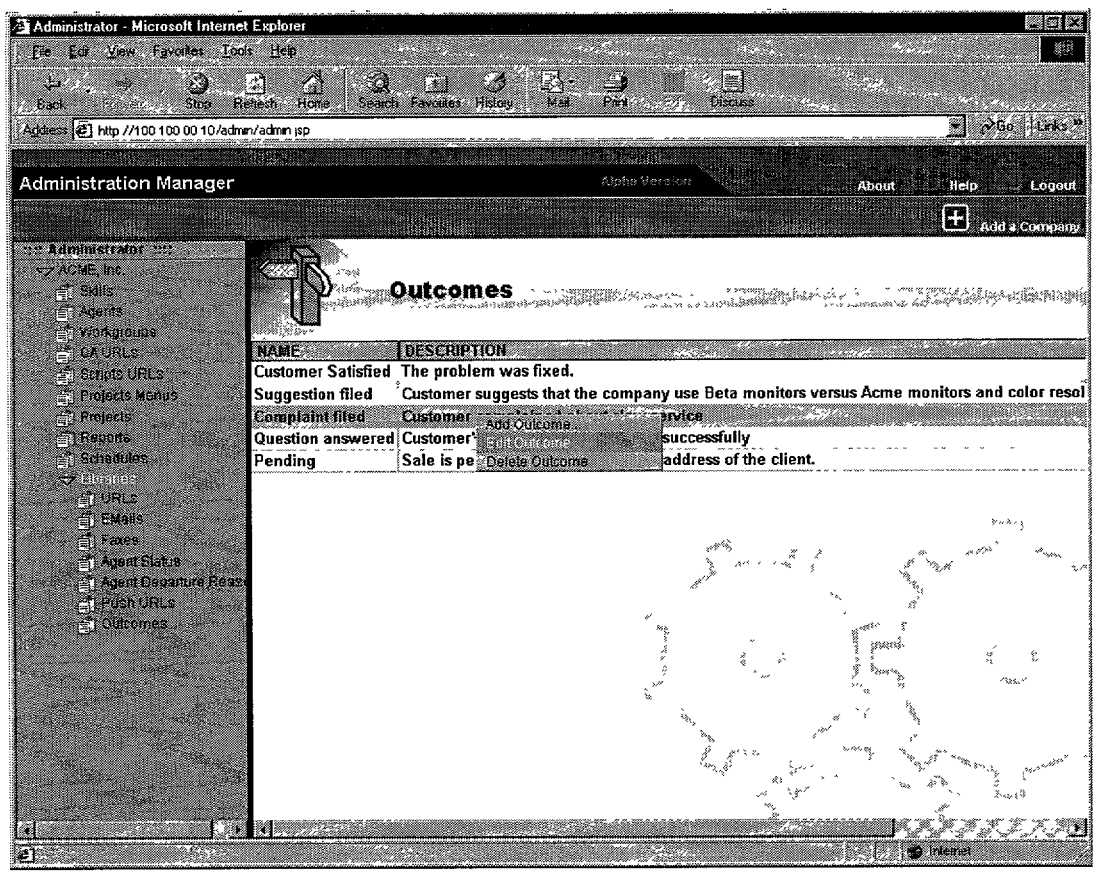

FIG. 95 illustrates the process of modifying an Outcome in the Outcome Library. The steps of the process are as follows:

1. From the main left-hand column, select the Company in whose Outcome Library an Outcome object is to be modified;

2. Open the Library link and click on the Outcomes tab under the Company selected;

3. Right-click on the Outcome to be modified and click on Edit Outcome;

4. Make any necessary changes to the Outcome Information;

5. Click Apply to save the changes and click OK to return to the main Outcome Library window.

FIG. 96 illustrates deletion of a Push URL from the Push URL Library. The steps of the process are as follows:

1. From the main left-hand column, select the Company from whose Outcome Library an Outcome object is to be deleted;

2. Open the Library link and click on the Outcomes tab under the Company selected;

3. Right-click on the Outcome to be deleted and click on Delete Outcome;

4. A message will pop asking for a confirmation of the deletion request; click OK to delete the Outcome.

Setting Priority to a Project

Figure 97:
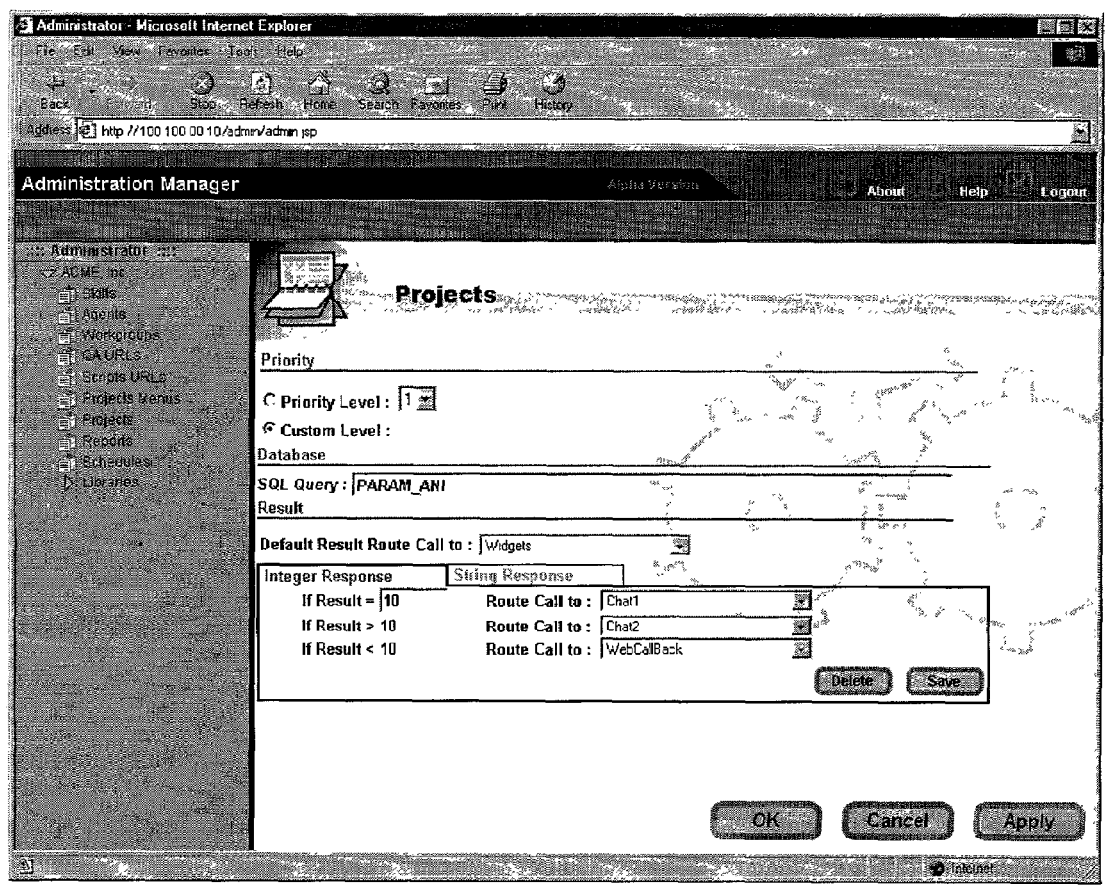
Figure 98:
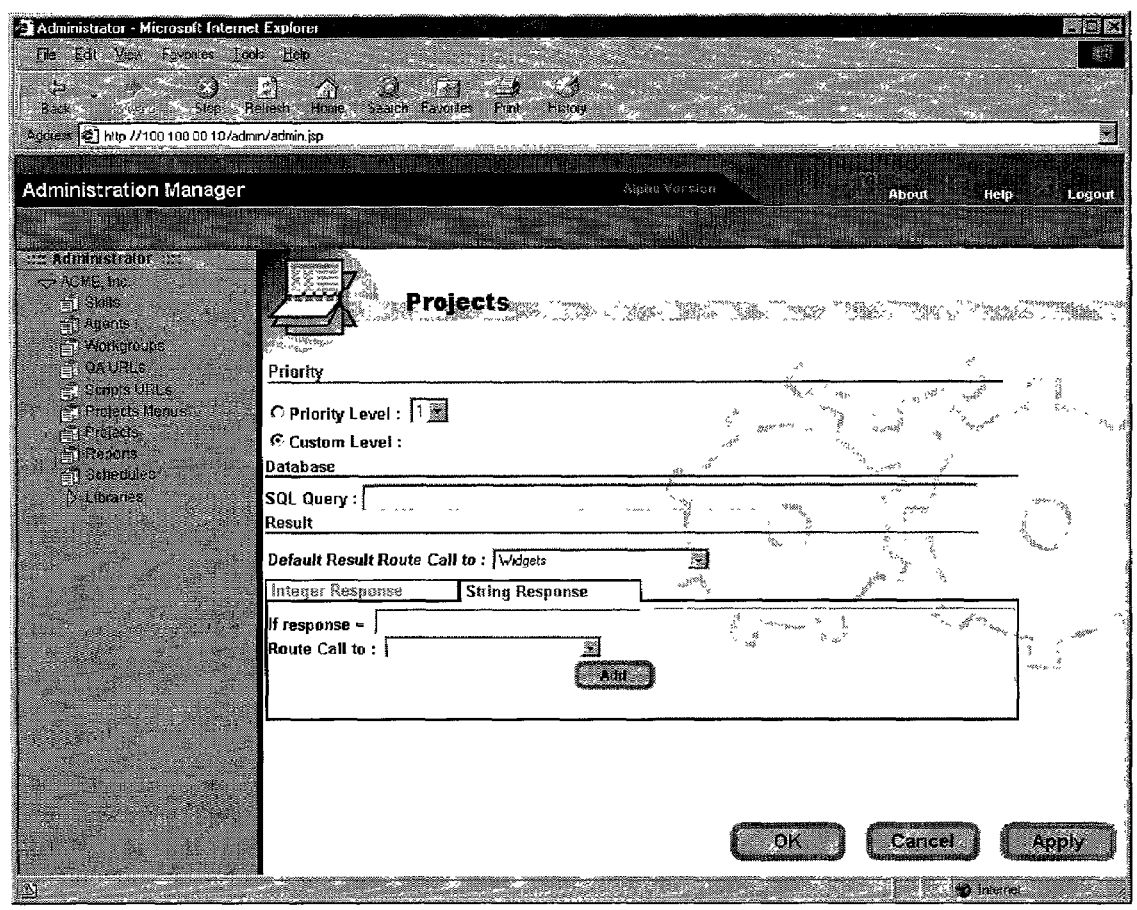

Projects may be assigned different priority levels. FIGS. 97 and 98 illustrate the process of assigning a priority level to a project. The process is as follows:

1. From the main left-hand column, select the Company with a Project to be assigned a priority level;

2. Click on the Projects tab under the Company selected;

3. Right-click on the Project and select Set Priority;

4. To give a priority level to the selected Project, click the Priority Level radio button and then select a number (1-5) from the drop-down list to specify the priority level;

5. To have a Custom Priority level, select the Custom Level radio button and then fill out the remaining fields;

6. To configure the Custom Level, enter an SQL Query which will determine how the Projects are prioritized; depending on the SQL Query, there will be an integer or a string produced;

7. If there is an error in the SQL Query, or if there is no result, select a Project from the Default Result Call to drop-down list to determine the Default Result Project;

8. Depending on the SQL Query, there will be an integer or string produced; if the result is an Integer, then enter a number in the "If Result =" field to determine that Project's typical result integer response;

9. Select Projects from the three drop-down lists that correspond to the integer being equal to, greater than, or less than the integer previously entered; this determines where the Integer Response will be routed depending on the SQL Query result;

10. If the SQL Query result is a string, go through steps 11-15 to configure String Responses;

11. Depending on the SQL Query, there can be multiple String Responses; the Administrator adds all the String Reponses that correspond to that SQL Query;

12. Enter a possible String Response in the "If Response =" field; then select the Project that the String Response will route to from the "Route Call to" field;

13. Click the Add button to add that String Response to the list of Responses seen at the far right of the String Response sub-tab;

14. Repeat steps 12 and 13 until all corresponding String Responses are added;

15. Click Apply to save the priority level for the Project and click OK to return to the main Project window.

We have described the inventive call center administration manager and some of its features in considerable detail for illustration purposes only. Neither the specific embodiments of the invention as a whole nor those of its features limit the general principles underlying the invention. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention, which function has been reserved for the following claims and their equivalents.

We claim:

1. An administration manager apparatus for remotely administering multiple network-based company call centers using at least some service provider resources, the administration manager apparatus being remotely coupled to the call center through a network, the administration manager apparatus comprising a computer for running a program that allows an operator of the computer to remotely provide data to multiple network based call centers via a single interface, the provided data comprising:
- a plurality of skill definitions describing capabilities of agents of the call center at endpoints of the call center, the agents servicing interactions with a plurality of call center customers, the capabilities being related to interaction servicing;
- a plurality of agent descriptions, each agent description of the plurality of agent descriptions being associated with a different agent, said each agent description comprising:
  - one or more skill data objects, each skill data object identifying a skill definition to describe a capability of the agent associated with said each agent description; and
  - one or more efficiency ratings, one efficiency rating per one of said one or more skill data objects describing a capability of the agent associated with said each agent description, each efficiency rating being indicative of the efficiency of the agent associated with said each agent description in the corresponding capability; and
- at least one workgroup definition of at least one workgroup, each of said at least one workgroup definition comprising a list of agents assigned to the defined at least one workgroup and one or more skill data objects assigned to the defined at least one workgroup definition.

2. An administration manager apparatus according to claim 1, wherein:
- the provided data further comprises a company descriptor, the company descriptor comprising an identifier of the company and an identifier of an administrator of the company call center;
- said each agent description further comprises an identifier of the agent associated with said each agent description;
- and the skill data objects and the efficiency ratings enable the call center to route the interactions to the agents based at least in part on the agents' described capabilities and efficiency ratings.

3. An administration manager apparatus according to claim 2, wherein the provided data further comprises a maximum number of allowed concurrent interactions for the company call center.

4. An administration manager apparatus according to claim 2, wherein said each agent description further comprises a permission variable indicative of an authorization level of the agent associated with said each agent description, the permission variable in said each agent description directing the call center to allow and disallow the agent associated with said each agent description access to at least some information based on the value of the permission variable in said each agent description.

5. An administration manager apparatus according to claim 4, wherein said each agent description further comprises a first flag indicative of Follow Me activation for the agent associated with said each agent description, and a second flag indicative of call recording enablement for the agent associated with said each agent description.

6. An administration manager apparatus according to claim 4, wherein said each agent description further comprises:
- an extension type variable indicative of a type of endpoint of the agent associated with said each agent description, the extension type variable being capable of indicating at least two different endpoint types from a list consisting of: a local extension type, a virtual extension type, a VoIP extension type, a voice mail extension type, and a PBX extension type; and
- an extension descriptor defining the endpoint of the agent associated with said each agent description.

7. An administration manager apparatus according to claim 4, wherein:
- the plurality of agent descriptions comprises a supervisory agent description associated with a supervisory agent of the call center;
- a first value of the permission variable indicates supervisory authorization level;
- when the permission variable indicates supervisory authorization level for the supervisory agent, the supervisory agent description further comprises a list of agents supervised by the supervisory agent, the first value of the permission variable directing the call center to enable the supervisory agent to see information displayed by the endpoints associated with the agents on the list to the agents on the list.

8. An administration manager apparatus according to claim 7, wherein:
- the provided data further comprises a plurality of agent status definitions, each agent status definition defining one of a plurality of agent statuses, each agent on the list being assigned one of the agent statuses depending on the state of said each agent on the list;
- the first value of the permission variable directs the call center to enable the supervisory agent to see the status of said each agent on the list; and
- the call center assigns the interactions to the agents based at least in part on the agents' statuses.

9. An administration manager apparatus according to claim 8, wherein said each agent description further comprises Interaction Manager configuration data for configuring Interaction Manager Options, the Interaction Manager configuration data comprising data for designating at least one default status for at least one state of the agent associated with said each agent description.

10. An administration manager apparatus according to claim 8, wherein the plurality of agent statuses comprises:
- a busy agent status signifying an ongoing interaction with a call center customer;
- a wrapup agent status signifying a time period immediately following a termination of an interaction with a call center customer, the time period being allowed for wrapup of the terminated interaction; and
- an available agent status signifying availability for handling the interactions.

11. An administration manager apparatus according to claim 2, wherein said each agent description further comprises email parameters of the agent associated with said each agent description.

12. An administration manager apparatus according to claim 2, wherein said each agent description further comprises long distance enable flag for enabling and disabling long distance access of the agent associated with said each agent description.

13. An administration manager apparatus according to claim 2, wherein:
- outcomes of at least some interactions are characterized and stored in the call center; and
- said each agent description further comprises an outcome access flag for enabling and disabling access to the stored outcome characterizations.

14. An administration manager apparatus according to claim 2, wherein:

the call center routes the interactions to the agents based at least in part on the agents' workgroup assignments.

15. An administration manager apparatus according to claim 14, wherein the at least one workgroup definition comprises automatic call distributor configuration data means for configuring ACD options of the at least one workgroup.

16. An administration manager apparatus according to claim 14, wherein the at least one workgroup definition comprises data means for substantially simultaneous modification of the skill data objects.

17. An administration manager apparatus according to claim 14, wherein:
the provided data further comprises a first interaction script definition data object defining a first interaction script screen that the call center displays to one of the agents assigned to the defined at least one workgroup when a customer's interaction is routed to said one of the assigned agents.

18. An administration manager apparatus according to claim 14, wherein:
the provided data further comprises a first push URL definition data object defining a first push screen pop-up window that the call center is capable of pushing to a computer of a first customer of the plurality of call center customers for display on the first customer's computer when the first customer interacts with the call center by computer chat interaction;
the at least one workgroup definition further comprises a first workgroup definition of a first workgroup, the first workgroup definition comprising a first list of agents assigned to the first workgroup;
the provided data further comprises chat project definition data for creating a chat project, the chat project definition data defining handling of the chat interaction by the agents assigned to the first workgroup, the chat project definition data comprising an identifier of the first push screen pop-up window and an identifier of a point within the chat interaction where the call center pushes the first push screen pop-up window to the first customer's computer for display on the first customer's computer.

19. An administration manager apparatus according to claim 14, wherein the at least one workgroup definition further comprises a first workgroup definition of a first workgroup, the first workgroup definition comprising an instruction directing the call center automatically to return to the first workgroup a first call abandoned after being routed to the first workgroup.

20. An administration manager apparatus according to claim 14, wherein:
the at least one workgroup definition further comprises a first workgroup definition of a first workgroup, the first workgroup definition comprising a first list of agents assigned to the first workgroup;
the provided data further comprises email project definition data for creating an email project defining handling of an email interaction by the agents assigned to the first workgroup, the email project definition data comprising email configuration data for configuring an email server for use by the agents assigned to the first workgroup in processing the email interaction.

21. An administration manager apparatus according to claim 6, wherein:
the provided data further comprises at least one workgroup definition of at least one workgroup, each said at least one workgroup definition comprising a list of agents assigned to the corresponding defined workgroup;
the call center assigns the interactions to the agents based at least in part on the agents' workgroup assignments; and
the provided data further comprises a plurality of menu definition data objects defining a plurality of configurable project menus, each configurable project menu enabling a call center customer to route an interaction of the customer, said each configurable project menu comprising menu event definition data for defining a destination for the routed interaction based on touch-tone input of the customer, or for defining a default destination for the routed interaction.

22. An administration manager apparatus according to claim 21, wherein:
the at least one workgroup definition further comprises a first workgroup definition of a first workgroup, the first workgroup definition comprising a first list of agents assigned to the first workgroup;
the provided data further comprises predictive project definition data for creating a predictive project defining handling of outbound telephone call interactions originated by the agents assigned to the first workgroup, the predictive project definition data comprising a first number for setting a minimum number of attempts to place each of the outbound telephone call interactions, and a second number for setting a maximum number of attempts to place said each of the outbound telephone call interactions.

23. An administration manager apparatus according to claim 6, wherein:
the provided data further comprises at least one workgroup definition of at least one workgroup, each said at least one workgroup definition comprising a list of agents assigned to the corresponding defined workgroup;
the provided data further comprises phone project definition data for creating a phone project defining handling of telephone call interactions received by the call center based at least in part on telephone numbers dialed by call center customers who originated the received telephone call interactions; and
the call center assigns the received interactions to the agents based at least in part on the agents' workgroup assignments and the telephone numbers dialed by call center customers who originated the received telephone call interactions.

24. An administration manager apparatus according to claim 23, wherein the phone project definition data further comprises a plurality of menu definition data objects defining a plurality of configurable project menus, each configurable project menu enabling a call center customer who originated one of the received telephone call interactions to route the interaction, said each configurable project menu comprising menu event definition data for defining a destination for the routed interaction based on touch-tone input of the customer, or for defining a default destination for the routed interaction.

25. An administration manager apparatus according to claim 24, wherein the plurality of menu definition data objects comprises:
a first menu definition data object defining a first configurable project menu, the first configurable project menu comprising first menu event definition data defining a first destination; and a second menu definition data object defining a second configurable project menu, the second configurable project menu comprising second menu event definition data defining a second destination;

wherein the first destination is the second configurable project menu, thereby creating a first call flow data object.

26. An administration manager apparatus according to claim 14, wherein the provided data further comprises a web callback project definition data for creating a web callback project defining handling of an outbound telephone call interaction in response to a computer network-based interaction originated by a first call center customer requesting a callback.

27. An administration manager apparatus according to claim 6, wherein the provided data further comprises:

a first workgroup definition of a first workgroup, the first workgroup definition comprising a first list of agents assigned to the first workgroup; and first project definition data for creating a first project and defining handling of at least some interactions based at least in part on parameters of each of said at least some interactions, the first project definition data comprising first schedule definition data for setting times when the first project is active, and a first workgroup identifier for identifying the first workgroup in order to route interactions whose parameters indicate handling by the first workgroup to the agents assigned to the first workgroup when the first project is active, the first schedule definition data permitting the call center to remove at least some resources used for servicing the interactions whose parameters indicate handling by the first workgroup during at least some time period when the first schedule definition data does not indicate that the first project is active.

28. A method for remotely administering a multiple network-based company call centers through a single interface and using at least some service provider resources, the method comprising the steps of:

remotely coupling a computer to a call center through a network, said computer capable of acting as a single interface for remotely providing data to the multiple network based data center, selecting a network based call center from the multiple network based call centers for remotely providing data to the selected call center, wherein providing data includes:

providing a plurality of skill definitions describing capabilities of agents of the call center at endpoints of the call center, the agents servicing interactions with a plurality of call center customers, the capabilities being related to interaction servicing; and providing a plurality of agent descriptions, each agent description of the plurality of agent descriptions being associated with a different agent, said each agent description comprising:

one or more skill data objects, each skill data object identifying a skill definition to describe a capability of the agent associated with said each agent description; and one or more efficiency ratings, one efficiency rating per one of said one or more skill data objects describing a capability of the agent associated with said each agent description, each efficiency rating being indicative of the efficiency of the agent associated with said each agent description in the corresponding capability; and providing at least one workgroup definition of at least one workgroup, each said at least one workgroup definition comprising a list of agents assigned to the defined at least one workgroup and one or more skill data objects assigned to the defined at least one workgroup definition.

29. A method for administering a network-based company call center according to claim 28, further comprising the step of providing to the call center, through the network and the computer coupled to the network, a company descriptor, the company descriptor comprising an identifier of the company and an identifier of an administrator of the company call center; wherein:

said each agent description further comprises an identifier of the agent associated with said each agent description; and the skill data objects and the efficiency ratings enable the call center to route the interactions to the agents based at least in part on the agents' described capabilities and efficiency ratings.

30. A method for administering a network-based company call center according to claim 29, further comprising the step of providing to the call center, through the network and the computer coupled to the network, a maximum number of allowed concurrent interactions for the company call center.

31. A method for administering a network-based company call center according to claim 29, wherein said each agent description further comprises a permission variable indicative of an authorization level of the agent associated with said each agent description, the permission variable in said each agent description directing the call center to allow and disallow the agent associated with said each agent description access to at least some information based on the value of the permission variable in said each agent description.

32. A method for administering a network-based company call center according to claim 31, wherein said each agent description further comprises a first flag indicative of Follow Me activation for the agent associated with said each agent description, and a second flag indicative of call recording enablement for the agent associated with said each agent description.

33. A method for administering a network-based company call center according to claim 31, wherein said each agent description further comprises:

an extension type variable indicative of a type of endpoint of the agent associated with said each agent description, the extension type variable being capable of indicating at least two different endpoint types from a list consisting of: a local extension type, a virtual extension type, a VoIP extension type, a voice mail extension type, and a PBX extension type; and an extension descriptor defining the endpoint of the agent associated with said each agent description.

34. A method for administering a network-based company call center according to claim 31, wherein:

the plurality of agent descriptions comprises a supervisory agent description associated with a supervisory agent of the call center;

a first value of the permission variable indicates supervisory authorization level;

when the permission variable indicates supervisory authorization level for the supervisory agent, the supervisory agent description further comprises a list of agents supervised by the supervisory agent, the first value of the permission variable directing the call center to enable the supervisory agent to see information displayed by the endpoints associated with the agents on the list to the agents on the list.

35. A method for administering a network-based company call center according to claim 34, further comprising the step of providing to the call center, through the network and the computer coupled to the network, a plurality of agent status definitions, each agent status definition defining one of a plurality of agent statuses, each agent on the list being assigned one of the agent statuses depending on the state of said each agent on the list;
wherein:
the first value of the permission variable directs the call center to enable the supervisory agent to see the status of said each agent on the list; and
the call center assigns the interactions to the agents based at least in part on the agents' statuses.

36. A method for administering a network-based company call center according to claim 35, wherein said each agent description further comprises Interaction Manager configuration data for configuring Interaction Manager Options, the Interaction Manager configuration data comprising data for designating at least one default status for at least one state of the agent associated with said each agent description.

37. A method for administering a network-based company call center according to claim 35, wherein the plurality of agent statuses comprises:
a busy agent status signifying an ongoing interaction with a call center customer;
a wrapup agent status signifying a time period immediately following a termination of an interaction with a call center customer, the time period being allowed for wrapup of the terminated interaction; and
an available agent status signifying availability for handling the interactions.

38. A method for administering a network-based company call center according to claim 29, wherein said each agent description further comprises email parameters of the agent associated with said each agent description.

39. A method for administering a network-based company call center according to claim 29, wherein said each agent description further comprises long distance enable flag for enabling and disabling long distance access of the agent associated with said each agent description.

40. A method for administering a network-based company call center according to claim 29, further comprising the step of characterizing outcomes of at least some interactions and storing the characterized outcomes in the call center;
wherein said each agent description further comprises an outcome access flag for enabling and disabling access to the stored outcome characterizations.

41. A method for administering a network-based company call center according to claim 29,
wherein the call center routes the interactions to the agents based at least in part on the agents' workgroup assignments.

42. A method for administering a network-based company call center according to claim 31, wherein at least one workgroup definition comprises automatic call distributor configuration data means for configuring ACD options of the at least one workgroup.

43. A method for administering a network-based company call center according to claim 31, wherein the at least one workgroup definition comprises data means for substantially simultaneous modification of the skill data objects.

44. A method for administering a network-based company call center according to claim 31, further comprising the step of providing to the call center, through the network and the computer coupled to the network, a first interaction script definition data object defining a first interaction script screen that the call center displays to one of the agents assigned to the defined at least one workgroup when a customer's interaction is routed to said one of the assigned agents.

45. A method for administering a network-based company call center according to claim 41, wherein the at least one workgroup definition further comprises a first workgroup definition of a first workgroup, the first workgroup definition comprising a first list of agents assigned to the first workgroup;
the method further comprising the steps of:
providing to the call center, through the network and the computer coupled to the network, a first push URL definition data object defining a first push screen pop-up window that the call center is capable of pushing to a computer of a first customer of the plurality of call center customers for display on the first customer's computer when the first customer interacts with the call center by computer chat interaction; and
providing to the call center, through the network and the computer coupled to the network, chat project definition data for creating a chat project, the chat project definition data defining handling of the chat interaction by the agents assigned to the first workgroup, the chat project definition data comprising an identifier of the first push screen pop-up window and an identifier of a point within the chat interaction where the call center pushes the first push screen pop-up window to the first customer's computer for display on the first customer's computer.

46. A method for administering a network-based company call center according to claim 41, wherein the at least one workgroup definition further comprises a first workgroup definition of a first workgroup, the first workgroup definition comprising an instruction directing the call center automatically to return to the first workgroup a first call abandoned after being routed to the first workgroup.

47. A method for administering a network-based company call center according to claim 41, wherein the at least one workgroup definition further comprises a first workgroup definition of a first workgroup, the first workgroup definition comprising a first list of agents assigned to the first workgroup;
the method further comprising the step of providing to the call center, though the network and the computer coupled to the network, email project definition data for creating an email project defining handling of an email interaction by the agents assigned to the first workgroup, the email project definition data comprising email configuration data for configuring an email server for use by the agents assigned to the first workgroup in processing the email interaction.

48. A method for administering a network-based company call center according to claim 33, further comprising the steps of:
providing to the call center, through the network and the computer coupled to the network, at least one workgroup definition of at least one workgroup, each said at least one workgroup definition comprising a list of agents assigned to the corresponding defined workgroup; and
providing to the call center, through the network and the computer coupled to the network, a plurality of menu definition data objects defining a plurality of configurable project menus, each configurable project menu enabling a call center customer to route an interaction of the customer, said each configurable project menu comprising menu event definition data for defining a destination for the routed interaction based on touch-tone input of the customer, or for defining a default destination for the routed interaction;

wherein the call center assigns the interactions to the agents based at least in part on the agents' workgroup assignments.

49. A method for administering a network-based company call center according to claim 48, wherein the at least one workgroup definition further comprises a first workgroup definition of a first workgroup, the first workgroup definition comprising a first list of agents assigned to the first workgroup;

the method further comprising the step of providing to the call center, through the network and the computer coupled to the network, predictive project definition data for creating a predictive project defining handling of outbound telephone call interactions originated by the agents assigned to the first workgroup, the predictive project definition data comprising a first number for setting a minimum number of attempts to place each of the outbound telephone call interactions, and a second number for setting a maximum number of attempts to place said each of the outbound telephone call interactions.

50. A method for administering a network-based company call center according to claim 33, further comprising the step of:

providing to the call center, through the network and the computer coupled to the network, at least one workgroup definition of at least one workgroup, each said at least one workgroup definition comprising a list of agents assigned to the corresponding defined workgroup;

providing to the call center, through the network and the computer coupled to the network, phone project definition data for creating a phone project defining handling of telephone call interactions received by the call center based at least in part on telephone numbers dialed by call center customers who made the received telephone call interactions;

wherein the call center assigns the received telephone call interactions to the agents based at least in part on the agents' workgroup assignments and the telephone numbers dialed by call center customers who originated the received telephone call interactions.

51. A method for administering a network-based company call center according to claim 50, wherein the phone project definition data further comprises a plurality of menu definition data objects defining a plurality of configurable project menus, each configurable project menu enabling a call center customer who originated one of the received telephone call interactions to route the interaction, said each configurable project menu comprising menu event definition data for defining a destination for the routed interaction based on touch-tone input of the customer, or for defining a default destination for the routed interaction.

52. A method for administering a network-based company call center according to claim 51, wherein the plurality of menu definition data objects comprises:

a first menu definition data object defining a first configurable project menu, the first configurable project menu comprising first menu event definition data defining a first destination; and a second menu definition data object defining a second configurable project menu, the second configurable project menu comprising second menu event definition data defining a second destination;

wherein the first destination is the second configurable project menu, thereby creating a first call flow data object.

53. A method for administering a network-based company call center according to claim 41, further comprising the step of providing to the call center, through the network and the computer coupled to the network, web callback project definition data for creating a web callback project defining handling of an outbound telephone call interaction in response to a computer network-based interaction originated by a first call center customer requesting a callback.

54. A method for administering a network-based company call center according to claim 33, further comprising the steps of:

providing to the call center, through the network and the computer coupled to the network, a first workgroup definition of a first workgroup, the first workgroup definition comprising a first list of agents assigned to the first workgroup; and providing to the call center, through the network and the computer coupled to the network, first project definition data for creating a first project and defining handling of at least some interactions based at least in part on parameters of each of said at least some interactions, the first project definition data comprising first schedule definition data for setting times when the first project is active, and a first workgroup identifier for identifying the first workgroup in order to route interactions whose parameters indicate handling by the first workgroup to the agents assigned to the first workgroup when the first project is active, the first schedule definition data permitting the call center to remove at least some resources used for servicing the interactions whose parameters indicate handling by the first workgroup during at least some time period when the first schedule definition data does not indicate that the first project is active.

55. A computer readable medium encoded with machine-readable computer program code, wherein, when the computer code is executed on a computer remotely coupled to a multiple network based call centers with at least some service provider resources, the computer enables an operator of the computer to remotely configure the multiple call center from a single interface by providing data to the call center, the provided data comprising:

a plurality of skill definitions describing potentially available capabilities of agents of the call center at endpoints of the call center, the agents servicing interactions with a plurality of call center customers, the agents having capabilities related to interaction servicing;

a plurality of agent descriptions, each agent description of the plurality of agent descriptions being associated with a different agent, said each agent description comprising:

one or more skill data objects, each skill data object identifying a skill definition to describe a capability of the agent associated with said each agent description; and one or more efficiency ratings, one efficiency rating per one of said one or more skill data objects describing a capability of the agent associated with said each agent description, each efficiency rating being indicative of the efficiency of the agent associated with said each agent description in the corresponding capability; and at least one workgroup definition of at least one workgroup, each said at least one workgroup definition comprising a list of agents assigned to the defined at least one workgroup and one or more skill data objects assigned to the defined at least one workgroup definition.

56. A computer readable medium encoded with machine-readable computer program code according to claim 55, wherein:
the provided data further comprises a company descriptor, the company descriptor comprising an identifier of the company and an identifier of an administrator of the company call center;
said each agent description further comprises an identifier of the agent associated with said each agent description; and
the skill data objects and the efficiency ratings enable the call center to route the interactions to the agents based at least in part on the agents' described capabilities and efficiency ratings.

57. A computer readable medium encoded with machine-readable computer program code according to claim 56, wherein the provided data further comprises a maximum number of allowed concurrent interactions for the company call center.

58. A computer readable medium encoded with machine-readable computer program code according to claim 56, wherein said each agent description further comprises a permission variable indicative of an authorization level of the agent associated with said each agent description, the permission variable in said each agent description directing the call center to allow and disallow the agent associated with said each agent description access to at least some information based on the value of the permission variable in said each agent description.

59. A computer readable medium encoded with machine-readable computer program code according to claim 58, wherein said each agent description further comprises a first flag indicative of Follow Me activation for the agent associated with said each agent description, and a second flag indicative of call recording enablement for the agent associated with said each agent description.

60. A computer readable medium encoded with machine-readable computer program code according to claim 58, wherein said each agent description further comprises:
an extension type variable indicative of a type of endpoint of the agent associated with said each agent description, the extension type variable being capable of indicating at least two different endpoint types from a list consisting of: a local extension type, a virtual extension type, a VoIP extension type, a voice mail extension type, and a PBX extension type; and
an extension descriptor defining the endpoint of the agent associated with said each agent description.

61. A computer readable medium encoded with machine-readable computer program code according to claim 58, wherein:
the plurality of agent descriptions comprises a supervisory agent description associated with a supervisory agent of the call center;
a first value of the permission variable indicates supervisory authorization level;
when the permission variable indicates supervisory authorization level for the supervisory agent, the supervisory agent description further comprises a list of agents supervised by the supervisory agent, the first value of the permission variable directing the call center to enable the supervisory agent to see information displayed by the endpoints associated with the agents on the list to the agents on the list.

62. A computer readable medium encoded with machine-readable computer program code according to claim 61, wherein:
the provided data further comprises a plurality of agent status definitions, each agent status definition defining one of a plurality of agent statuses, each agent on the list being assigned one of the agent statuses depending on the state of said each agent on the list;
the first value of the permission variable directs the call center to enable the supervisory agent to see the status of said each agent on the list; and
the call center assigns the interactions to the agents based at least in part on the agents' statuses.

63. A computer readable medium encoded with machine-readable computer program code according to claim 62, wherein said each agent description further comprises Interaction Manager configuration data for configuring Interaction Manager Options, the Interaction Manager configuration data comprising data for designating at least one default status for at least one state of the agent associated with said each agent description.

64. A computer readable medium encoded with machine-readable computer program code according to claim 62, wherein the plurality of agent statuses comprises:
a busy agent status signifying an ongoing interaction with a call center customer;
a wrapup agent status signifying a time period immediately following a termination of an interaction with a call center customer, the time period being allowed for wrapup of the terminated interaction; and
an available agent status signifying availability for handling the interactions.

65. A computer readable medium encoded with machine-readable computer program code according to claim 56, wherein said each agent description further comprises email parameters of the agent associated with said each agent description.

66. A computer readable medium encoded with machine-readable computer program code according to claim 56, wherein said each agent description further comprises long distance enable flag for enabling and disabling long distance access of the agent associated with said each agent description.

67. A computer readable medium encoded with machine-readable computer program code according to claim 56, wherein:
outcomes of at least some interactions are characterized and stored in the call center; and said each agent description further comprises an outcome access flag for enabling and disabling access to the stored outcome characterizations.

68. A computer readable medium encoded with machine-readable computer program code according to claim 56, wherein:
the provided data further comprises at least one workgroup definition of at least one workgroup, each said at least one workgroup definition comprising a list of agents assigned to the defined at least one workgroup; and
the call center routes the interactions to the agents based at least in part on the agents' workgroup assignments.

69. A computer readable medium encoded with machine-readable computer program code according to claim 68, wherein the at least one workgroup definition comprises automatic call distributor configuration data means for configuring ACD options of the at least one workgroup.

70. A computer readable medium encoded with machine-readable computer program code according to claim 68, wherein the at least one workgroup definition comprises data means for substantially simultaneous modification of the skill data objects of all agents assigned to the workgroup corresponding to the at least one workgroup definition.

71. A computer readable medium encoded with machine-readable computer program code according to claim 68, wherein the provided data further comprises a first interaction script definition data object defining a first interaction script screen that the call center displays to one of the agents assigned to the defined at least one workgroup when a customer's interaction is routed to said one of the assigned agents.

72. A computer readable medium encoded with machine-readable computer program code according to claim 68, wherein:
the provided data further comprises a first push URL definition data object defining a first push screen pop-up window that the call center is capable of pushing to a computer of a first customer of the plurality of call center customers for display on the first customer's computer when the first customer interacts with the call center by computer chat interaction;
the at least one workgroup definition further comprises a first workgroup definition of a first workgroup, the first workgroup definition comprising a first list of agents assigned to the first workgroup;
the provided data further comprises chat project definition data for creating a chat project, the chat project definition data defining handling of the chat interaction by the agents assigned to the first workgroup, the chat project definition data comprising an identifier of the first push screen pop-up window and an identifier of a point within the chat interaction where the call center pushes the first push screen pop-up window to the first customer's computer for display on the first customer's computer.

73. A computer readable medium encoded with machine-readable computer program code according to claim 68, wherein the at least one workgroup definition further comprises a first workgroup definition of a first workgroup, the first workgroup definition comprising an instruction directing the call center automatically to return to the first workgroup a first call abandoned after being routed to the first workgroup.

74. A computer readable medium encoded with machine-readable computer program code according to claim 68, wherein:
the at least one workgroup definition further comprises a first workgroup definition of a first workgroup, the first workgroup definition comprising a first list of agents assigned to the first workgroup;
the provided data further comprises email project definition data for creating an email project defining handling of an email interaction by the agents assigned to the first workgroup, the email project definition data comprising email configuration data for configuring an email server for use by the agents assigned to the first workgroup in processing the email interaction.

75. A computer readable medium encoded with machine-readable computer program code according to claim 60, wherein:
the provided data further comprises at least one workgroup definition of at least one workgroup, each said at least one workgroup definition comprising a list of agents assigned to the corresponding defined workgroup;
the call center assigns the interactions to the agents based at least in part on the agents' workgroup assignments; and
the provided data further comprises a plurality of menu definition data objects defining a plurality of configurable project menus, each configurable project menu enabling a call center customer to route an interaction of the customer, said each configurable project menu comprising menu event definition data for defining a destination for the routed interaction based on touch-tone input of the customer, or for defining a default destination for the routed interaction.

76. A computer readable medium encoded with machine-readable computer program code according to claim 75, wherein:
the at least one workgroup definition further comprises a first workgroup definition of a first workgroup, the first workgroup definition comprising a first list of agents assigned to the first workgroup;
the provided data further comprises predictive project definition data for creating a predictive project defining handling of outbound telephone call interactions originated by the agents assigned to the first workgroup, the predictive project definition data comprising a first number for setting a minimum number of attempts to place each of the outbound telephone call interactions, and a second number for setting a maximum number of attempts to place said each of the outbound telephone call interactions.

77. A computer readable medium encoded with machine-readable computer program code according to claim 60, wherein:
the provided data further comprises at least one workgroup definition of at least one workgroup, each said at least one workgroup definition comprising a list of agents assigned to the corresponding defined workgroup;
the provided data further comprises phone project definition data for creating a phone project defining handling of telephone call interactions received by the call center based at least in part on telephone numbers dialed by call center customers who originated the received telephone call interactions; and
the call center assigns the received interactions to the agents based at least in part on the agents' workgroup assignments and the telephone numbers dialed by call center customers who originated the received telephone call interactions.

78. A computer readable medium encoded with machine-readable computer program code according to claim 77, wherein the phone project definition data further comprises a plurality of menu definition data objects defining a plurality of configurable project menus, each configurable project menu enabling a call center customer who originated one of the received telephone call interactions to route the interaction, said each configurable project menu comprising menu event definition data for defining a destination for the routed interaction based on touch-tone input of the customer, or for defining a default destination for the routed interaction.

79. A computer readable medium encoded with machine-readable computer program code according to claim 78, wherein the plurality of menu definition data objects comprises:

a first menu definition data object defining a first configurable project menu, the first configurable project menu comprising first menu event definition data defining a first destination; and a second menu definition data object defining a second configurable project menu, the second configurable project menu comprising second menu event definition data defining a second destination;

wherein the first destination is the second configurable project menu, thereby creating a first call flow data object.

80. A computer readable medium encoded with machine-readable computer program code according to claim 68, wherein the provided data further comprises a web callback project definition data for creating a web callback project defining handling of an outbound telephone call interaction in response to a computer network-based interaction originated by a first call center customer requesting a callback.

81. A computer readable medium encoded with machine-readable computer program code according to claim 60, wherein the provided data further comprises:

a first workgroup definition of a first workgroup, the first workgroup definition comprising a first list of agents assigned to the first workgroup; and first project definition data for creating a first project and defining handling of at least some interactions based at least in part on parameters of each of said at least some interactions, the first project definition data comprising first schedule definition data for setting times when the first project is active, and a first workgroup identifier for identifying the first workgroup in order to route interactions whose parameters indicate handling by the first workgroup to the agents assigned to the first workgroup when the first project is active, the first schedule definition data permitting the call center to remove at least some resources used for servicing the interactions whose parameters indicate handling by the first workgroup during at least some time period when the first schedule definition data does not indicate that the first project is active.

* * * * *

UNITED STATES PATENT AND TRADEMARK OFFICE
CERTIFICATE OF CORRECTION

PATENT NO. : 7,366,293 B2 Page 1 of 1
APPLICATION NO. : 09/798226
DATED : April 29, 2008
INVENTOR(S) : Ezerzer et al.

It is certified that error appears in the above-identified patent and that said Letters Patent is hereby corrected as shown below:

Column 41, line 35, claim 28: please replace "A method for remotely administering "a" multiple" with -- A method for remotely administering multiple -- [...]

Signed and Sealed this

Twenty-second Day of July, 2008

JON W. DUDAS
*Director of the United States Patent and Trademark Office*